(12) United States Patent
Zhang et al.

(10) Patent No.: US 12,509,731 B2
(45) Date of Patent: Dec. 30, 2025

(54) DECONVOLUTION AND DETECTION OF RARE DNA IN PLASMA

(71) Applicant: The Regents of the University of California, Oakland, CA (US)

(72) Inventors: Kun Zhang, San Diego, CA (US); Dinh Diep, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 260 days.

(21) Appl. No.: 16/470,586

(22) PCT Filed: Dec. 21, 2017

(86) PCT No.: PCT/US2017/067871
§ 371 (c)(1),
(2) Date: Jun. 18, 2019

(87) PCT Pub. No.: WO2018/119216
PCT Pub. Date: Jun. 28, 2018

(65) Prior Publication Data
US 2020/0087731 A1    Mar. 19, 2020

Related U.S. Application Data

(60) Provisional application No. 62/437,512, filed on Dec. 21, 2016, provisional application No. 62/438,401, filed on Dec. 22, 2016.

(51) Int. Cl.
*C12Q 1/6886* (2018.01)
*C12Q 1/6827* (2018.01)
*G16B 20/10* (2019.01)

(52) U.S. Cl.
CPC ......... *C12Q 1/6886* (2013.01); *C12Q 1/6827* (2013.01); *G16B 20/10* (2019.02); *C12Q 2600/118* (2013.01); *C12Q 2600/154* (2013.01); *C12Q 2600/172* (2013.01)

(58) Field of Classification Search
CPC ............ C12Q 1/6827; C12Q 2600/154; C12Q 2600/172
See application file for complete search history.

(56) References Cited

U.S. PATENT DOCUMENTS

| | | | |
|---|---|---|---|
| 2012/0196754 A1 | 8/2012 | Quake et al. | |
| 2012/0295263 A1 | 11/2012 | Cantor et al. | |
| 2014/0199696 A1 * | 7/2014 | Mansour | C12Q 1/6886 |
| | | | 435/6.11 |
| 2016/0340740 A1 | 11/2016 | Zhang | |

FOREIGN PATENT DOCUMENTS

| | | | | |
|---|---|---|---|---|
| CN | 104328183 A | 2/2015 | | |
| EP | 2915883 A1 * | 9/2015 | ........... | C12Q 1/6886 |
| WO | WO-2010062914 A1 * | 6/2010 | ........... | C12Q 1/6886 |
| WO | WO-2014183093 A1 * | 11/2014 | ........... | C12Q 1/6886 |
| WO | WO-2015116837 A1 * | 8/2015 | ........... | C12Q 1/6886 |
| WO | 2016/008451 A1 | 1/2016 | | |
| WO | 2016/127944 A1 | 8/2016 | | |

OTHER PUBLICATIONS

Supporting Information for Guo et al. Nature genetics. 2017. 49(4):635-642 and Online Methods. (Year: 2017).*
Cao et al. Nature Biotechnology. 2015. 33(6):617-622 and Online methods. (Year: 2015).*
PCT International Search Report and Written Opinion for PCT Application No. PCT/US2017/067871 mailed Mar. 1, 2018 (10 pages).
European extended Search Report for EP Application No. 17882359.7 mailed Jul. 24, 2020 (9 pages).
Butcher et al., "Future Impact of Integrated High-Throughput Methylome Analyses on Human Health and Disease," J. Genet. Genomics, 2008, 25:391-401.
Guo et al., "Identification of Methylation Haplotype Blocks Aids in Deconvolution of Heterogeneous Tissue Samples and Tumor Tissue-of-Origin Mapping from Plasma DNA," Nat. Genet., 2017, 49(4):635-642.

* cited by examiner

*Primary Examiner* — Joseph G. Dauner
(74) *Attorney, Agent, or Firm* — Eversheds-Sutherland (US) LLP

(57) ABSTRACT

Some embodiments relate to a method for detecting the presence of one or more nucleic acids indicative of a health condition, tissue of origin, germ layer of origin or organ of origin in a mixture of nucleic acids comprising performing methylation analysis on a sample comprising a plurality of nucleic acids and determining whether the sample includes a plurality of methylation haplotype blocks indicative of the presence one or more nucleic acids indicative of a health condition, tissue of origin, germ layer of origin or organ of origin wherein the methylation haplotype blocks comprise a plurality of methylation sites for which the methylation status is coordinated.

19 Claims, 17 Drawing Sheets

|  | Predicted tissue | |
|---|---|---|
| Cancer tissue | Colon | Lung |
| Colon | 7 | 3 |
| Lung | 2 | 7 |

FIGURE 10

DECONVOLUTION AND DETECTION OF RARE DNA IN PLASMA

CROSS REFERENCE TO RELATED APPLICATIONS

This application claims the priority benefit of PCT/US2017/067871 filed on Dec. 21, 2017 which claims priority benefit to U.S. Provisional Patent Application Ser. Nos. 62/437,512 and 62/438,401 filed on Dec. 21, 2016 and Dec. 22, 2016, respectively, the entire contents of which are hereby incorporated by reference.

STATEMENT REGARDING FEDERALLY SPONSORED R&D

This invention was made with government support under Grant Number R01GM097253 awarded by the National Institutes of Health. The government has certain rights in the invention.

BACKGROUND OF THE INVENTION

Field of the Invention

Some embodiments described herein relate to compositions and methods for detecting a target nucleic acid in a sample. For example, some embodiments may be used for non-invasive detection of tumors or organ damage. Other embodiments may be used, for example, for detection of fetal aneuploidy at a very early stage of pregnancy.

Description of Related Art

CpG methylation in mammalian genomes is a relatively stable epigenetic modification, which can be transmitted across cell division (Wigler et al. (1981)) through DNMT1, and dynamically established, or removed by DNMT3 A/B and TET proteins. Due to the processivity of some of these enzymes, physically adjacent CpG sites on the same DNA molecules can share similar methylation status, although discordant CpG methylation has also been observed, especially in cancer cells. The theoretical framework of linkage disequilibrium (Slatkin (2008)), which was developed to model the coordinated segregation of adjacent genetic variants on human chromosomes among human populations, can be applied to the analysis of CpG co-methylation in cell populations. A number of studies related to the concepts of methylation haplotypes, epi-alleles, or epi-haplotypes have been reported, albeit at small numbers of genomic regions or limited numbers of cell/tissue types. Recent data production efforts, especially by large consortia such as the NIH Road-Map Epigenomics project (Bernstein et al. (2010)) and the EU Blueprint Epigenome project (Jones et al. (2005)) have produced a large number of whole-genome, base-resolution bisulfite sequencing data sets for many tissue and cell types. These public data sets, in combination with additional WGBS data generated, allowed full-genome characterization of local coupled CpG methylation across the largest set of human tissue types available to date to be performed, and annotate these blocks of co-methylated CpGs as a distinct set of genomic features.

DNA methylation is cell-type specific, and the pattern can be harnessed for deconvoluting the relative cell composition of heterogeneous samples, such as different white blood cells in whole blood (Houseman et al. (2016)), fetal components in maternal cell-free DNA (Sun et al. (2015)), or circulating tumor DNA in plasma (Sun et al. (2015)). Most of these recent efforts rely on the methylation level of individual CpG sites, and are fundamentally limited by the technical noise and sensitivity in measuring single CpG methylation. Very recently, Lehmann-Werman et al. demonstrated a superior sensitivity with multi-CpG haplotypes in detecting tissue-specific signatures in circulating DNA (Lehmann-Werman et al. (2016)). The markers in that study were discovered from Infinium 450k methylation array data, which represent only a very limited fraction of the human genome.

SUMMARY OF THE INVENTION

Some embodiments described herein provide accurate tissue-of-origin mapping based on comparing the patterns and abundance of methylation haplotypes against a reference set of human reference tissues and provide accurate quantitative estimation of the cancer DNA fraction.

Some embodiments are described in the following numbered paragraphs:

1. A method for detecting the presence of one or more nucleic acids indicative of a health condition, tissue of origin, germ layer of origin or organ of origin in a mixture of nucleic acids comprising:
   performing methylation analysis on a sample comprising a plurality of nucleic acids; and
   determining whether said sample includes a plurality of methylation haplotype blocks indicative of the presence one or more nucleic acids indicative of a health condition, tissue of origin, germ layer of origin, organ of origin or any combination thereof, wherein said methylation haplotype blocks comprise a plurality of methylation sites for which the methylation status is coordinated.
2. The method of Paragraph 1, wherein said methylation analysis is performed on cell-free DNA.
3. The method of any one of Paragraphs 1 and 2, wherein said methylation analysis is performed on cell-free DNA in a blood sample.
4. The method of any one of Paragraphs 1-3 wherein said plurality of methylation haplotype blocks comprises at least 2, at least 3, at least 4, at least 5, at least 10, at least 20, at least 40, at least 50, at least 100, at least 200, at least 300, at least 400, at least 500 or more than 500 methylation haplotype blocks.
5. The method of any one of Paragraphs 1-4, wherein said health condition is a tumor.
6. The method of Paragraph 5, further comprising determining whether said sample includes a plurality of methylation haplotype blocks indicative of the presence of one or more nucleic acids indicative of a normal tissue or normal organ corresponding to the tissue or organ of origin of said tumor.
7. The method of any one of Paragraphs 1-6, wherein said health condition is fetal aneuploidy.
8. The method of any one of Paragraphs 1-7, wherein said sample is a blood sample.
9. The method of any one of Paragraphs 1-8, further comprising quantitating the level of said one or more nucleic acids indicative of a health condition, tissue of origin, organ of origin or any combination thereof in said sample.
10. The method of any one of Paragraphs 1-9, wherein said methylation analysis is performed using a technique selected from the group consisting of bisulfite methylation analysis, reduced representation bisulfite sequencing, WGBS, BSPP, micro-droplet PCR, selector probe based methods, and MeDiP.

11. The method of any one of Paragraphs 1-10, further comprising determining a methylated haplotype load or unmethylated haplotype load for each methylation haplotype block, wherein said methylation haplotype load comprises the normalized fraction of methylated haplotypes at different lengths and the unmethylated haplotype load comprises the normalized fraction of unmethylated haplotypes at different lengths.

12. The method of any one of Paragraphs 1-11, wherein said methylation haplotype blocks have an average size of 95 bp.

13. The method of any one of Paragraphs 1-12, wherein said methylation haplotype blocks have a minimum of 3 CpGs per block.

14. The method of any one of Paragraphs 1-13 further comprising quantifying the level of said plurality of methylation haplotype blocks indicative of the presence of one or more nucleic acids indicative of a health condition, tissue of origin, germ layer of origin, organ of origin or any combination thereof in said sample.

15. The method of Paragraph 6 further comprising quantifying the level of said plurality of methylation haplotype blocks indicative of the presence of a tumor in said sample and quantifying the level of said plurality of methylation haplotype blocks indicative of the presence of one or more nucleic acids indicative of a normal tissue or normal organ corresponding to the tissue or organ of origin of said tumor in said sample.

16. A method of identifying methylation haplotype blocks comprising:
determining methylation haplotypes in a plurality of nucleic acid segments;
combining the methylation haplotypes and calculating methylation linkage disequilibrium on the combined methylation haplotypes; and
partitioning each segment into a plurality of methylation haplotype blocks, wherein said methylation haplotype blocks comprise a plurality of methylation sites for which the methylation status is coordinated.

17. The method of Paragraph 16, wherein said methylation haplotypes are determined for a portion of a genome.

18. The method of any one of Paragraphs 16 and 17, wherein said methylation haplotypes are determined across a whole genome.

19. The method of any one of Paragraphs 16-18, wherein said methylation haplotype blocks are defined as the genomic region in which the $r^2$ value of two adjacent CpG sites is no less than 0.5.

20. The method of any one of Paragraphs 16-19, wherein said methylation haplotype blocks are identified in nucleic acids from a tumor tissue.

21. The method of any one of Paragraphs 16-20, wherein said methylation haplotype blocks are identified in nucleic acids from a known type of tissue.

22. The method of any one of Paragraphs 16-21, wherein said methylation haplotype blocks are identified in nucleic acids from a fetus.

23. The method of any one of Paragraphs 16-22, wherein said methylation haplotype blocks are identified in nucleic acids from an embryonic stem cell.

24. The method of any one of Paragraphs 16-23, wherein said methylation haplotype blocks are identified in nucleic acids from a known germ layer.

25. The method of any one of Paragraphs 16-24, wherein said methylation haplotype blocks have an average size of 95 bp.

26. The method of any one of Paragraphs 16-25, wherein said methylation haplotype blocks have a minimum of 3 CpGs per block.

27. The method of any one of Paragraphs 16-26, wherein said methylation haplotype blocks are identified in nucleic acid regions from a Whole Genome Bisulfite Sequencing analysis.

28. The method of any one of Paragraphs 16-27, wherein said methylation haplotype blocks are identified in data sets from methylation analysis of ENCODE cell lines or tissue samples.

29. The method of any one of Paragraphs 16-28, wherein said methylation haplotype blocks are identified in data sets from methylation analysis of Infinium HumanMethylation450 BeadChip (HM450K).

30. The method of any one of Paragraphs 16-29, further comprising calculating the pairwise correlation coefficient of adjacent CpG methylation levels across different sample sets for block partitioning.

31. The method of any one of Paragraphs 16-30, further comprising determining methylation haplotype load for each methylation haplotype block, wherein said methylation haplotype load comprises the normalized fraction of methylated haplotypes at different lengths.

32. The method of any one of Paragraphs 16-30, further comprising determining unmethylated haplotype load for each methylation haplotype block, wherein said unmethylated haplotype load comprises the normalized fraction of unmethylated haplotypes at different lengths.

BRIEF DESCRIPTION OF THE DRAWINGS

FIG. 1(a) Schematic overview of data collection, generation, and analysis. FIG. 1(b) An example of MHB at the promoter of the gene APC. FIG. 1(c) Smooth scatterplots of methylation linkage disequilibrium decay of adjacent CpG sites over larger distances. 500,000 adjacent CpG loci in MHB regions were randomly sampled and their corresponding $r^2$ values within different sets of cell types were plotted to demonstrate the differential decay characteristics. The dotted lines at high linkage ($r^2$=0.9) is where stem and progenitor cells (10 WGBS samples), normal adult tissue cells (49 WGBS samples), and primary tumor (6 WGBS samples) cells were found to have 94.8%, 91.2% and 87.8% of CpGs respectively. FIG. 1(d) Co-localization analysis of MHBs with known genomic features. Genome distribution (left) and CpG-island relationships (right). FIG. 1(e). Enrichment of MHBs in known genomic features. Bootstrap random sampling regions with same size for 10,000 times to estimate empirical statistical significance and enrichment factor (fold-change).

FIG. 3(a) Heatmap of MHL values for tissue specific MHBs selected by MHL. FIG. 3(b) Heatmap of uMHL values for tissue specific MHBs selected by uMHL.

FIG. 9(a) Normal vs other. FIG. 9(b) Colon vs other. FIG. 9(c) Lung vs other.

FIG. 10. Confusion matrix of MARS-based feature selection and PLSDA prediction of tissue-of-origin in the test plasma data set. The set of lung and colon tissue specific markers identified from an independent data set was able to correctly classify 74% of the test plasma samples.

FIG. 11(a) Distribution of MHB sizes. FIG. 11(b) Distribution of CpG density (CpGs/bp) in MHB regions. FIG. 11(c) Co-localization of MHB with known genomics features breaking down based on CpG density. MHBs were placed in quartiles where the CpGs/bp of MHBs within quartiles were as follows (0, 0.46), (0.046, 0.096), (0.096, 0.155), and (0.155, 0.6). The $1^{st}$ quartile (MHBs with lowest CpG density) was mostly CGI shelves or shores, and was enriched for LAD, LOCK, and enhancers.

FIG. 12(a) Pearson correlation coefficient ($r^2$) versus absolute LD $r^2$. FIG. 12(b) The Pearson correlation coefficient $r^2$ in RRBS and HM450K were significantly higher in overlapped MHBs with WGBS compared with the MHBs without overlapping with WGBS MHBs. IN: denotes RRBS or HM450K regions within MHB. OUT: denotes RRBS or HM450K regions beyond MHB regions.

DETAILED DESCRIPTION OF THE PREFERRED EMBODIMENT

Figures 1A, 1B:
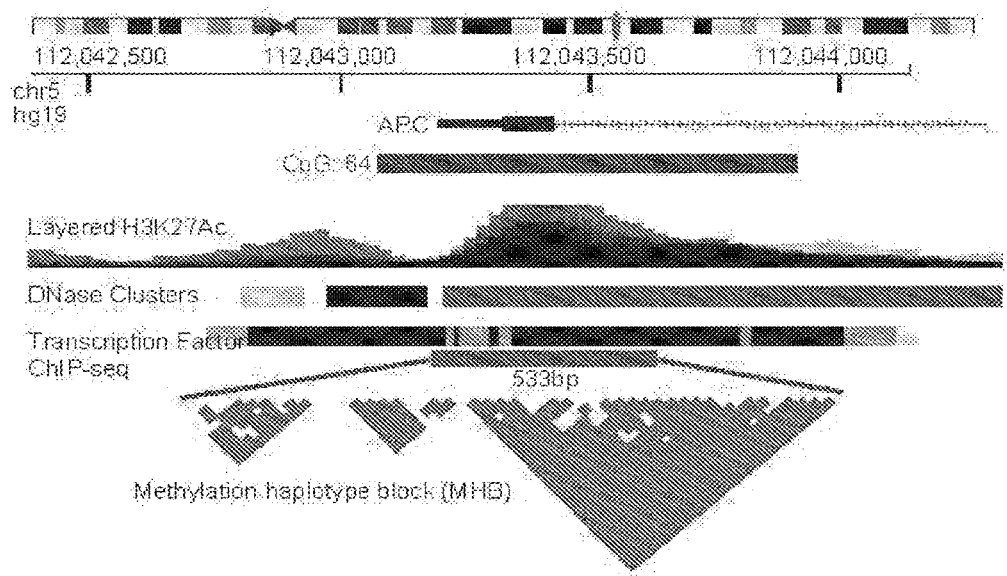
FIGS. 1(a)-1(e). Identification and characterization of human methylation haplotype blocks (MHBs).

Unless defined otherwise, all technical and scientific terms used herein have the same meaning as commonly understood by one of ordinary skill in the art pertinent to the methods and systems described. As used herein, the following terms and phrases have the meanings ascribed to them unless specified otherwise. All patents, applications, published applications and other publications referred to herein are incorporated by reference in their entirety.

"A," "an," and "the" include plural referents, unless the context clearly indicates otherwise. For example, "a nucleic acid" as used herein is understood to represent one or more nucleic acids. As such, the terms "a" (or "an"), "one or more," and "at least one" can be used interchangeably herein.

"About" is used herein to mean approximately, roughly, around, or in the region of. When the term "about" is used in conjunction with a numerical range, it modifies that range by extending the boundaries above and below the values set forth. In general, the term "about" is used herein to modify a numerical value above and below the stated value by a deviation of ±10% and preferably ±5%.

"Comprise," "comprises," "comprising," "include," "includes," and "including" are interchangeable and not intended to be limiting. Furthermore, where the description of one or more embodiments uses the term "comprising," those skilled in the art would understand that, in some specific instances, the embodiment or embodiments can be alternatively described using the language "consisting essentially of" and/or "consisting of."

The following abbreviations are used throughout the application: Methylation Haplotype Block (MHB); Methylation Haplotype Load (MHL); Unmethylated Haplotype Load (uMHL); Group Specific Index (GSI); Circulating cell-free DNA (cfDNA); Reduced Representation Bisulfite Sequencing (RRBS); single-cell Reduced Representation Bisulfite Sequencing (scRRBS); Whole Genome Bisulfite Sequencing (WGBS); The Cancer Genome Atlas project (TCGA); The Encyclopedia of DNA Elements (ENCODE); Gene Expression Omnibus (GEO); Lung Cancer (LC); Colorectal or colon cancer (CRC); cancer associated High Methylation Haplotype (caHMH); tissue-specific Methylation Haplotype Block regions (tsMHB); Colorectal or colon cancer tissue (CCT); colorectal or colon cancer plasma (CCP); lung cancer tissue (LCT); lung cancer plasma (LCP); normal plasma (NP).

"Amplification" refers to any known procedure for obtaining multiple copies of a target nucleic acid or its complement, or fragments thereof. The multiple copies may be referred to as amplicons or amplification products. Amplification, in the context of fragments, refers to production of an amplified nucleic acid that contains less than the complete target nucleic acid or its complement, e.g., produced by using an amplification oligonucleotide that hybridizes to, and initiates polymerization from, an internal position of the target nucleic acid. Known amplification methods include, for example, replicase-mediated amplification, polymerase chain reaction (PCR), reverse transcription polymerase chain reaction (RT-PCR), ligase chain reaction (LCR), strand-displacement amplification (SDA), and transcription-mediated or transcription-associated amplification.

"Complementary" means that a contiguous nucleic acid base sequence is capable of hybridizing to another base sequence by standard base pairing (hydrogen bonding) between a series of complementary bases. Complementary sequences may be completely complementary (i.e. no mismatches in the nucleic acid duplex) at each position in an oligomer sequence relative to its target sequence by using standard base pairing (e.g., G:C, A:T or A:U pairing) or sequences may contain one or more positions that are not complementary by base pairing (e.g., there exists at least one mismatch or unmatched base in the nucleic acid duplex), but such sequences are sufficiently complementary because the entire oligomer sequence is capable of specifically hybridizing with its target sequence in appropriate hybridization conditions (i.e. partially complementary). Contiguous bases in an oligomer are typically at least 80%, preferably at least 90%, and more preferably completely complementary to the intended target sequence.

"Configured to" denotes an actual arrangement of a nucleic acid sequence configuration of a referenced oligonucleotide. For example, a primer that is configured to generate a specified amplicon from a target nucleic acid has a nucleic acid sequence that hybridizes to the target nucleic acid or a region thereof and can be used in an amplification reaction to generate the amplicon. Also as an example, an oligonucleotide that is configured to specifically hybridize to a target nucleic acid or a region thereof has a nucleic acid sequence that specifically hybridizes to the referenced sequence under stringent hybridization conditions.

"Configured to specifically hybridize to" means that an oligonucleotide is designed to have a nucleic acid sequence that can hybridize with a target nucleic acid or region thereof. The oligonucleotide is designed to function as a component of an assay for amplification and detection of a target nucleic acid (or a region thereof) in a sample, and therefore is designed to hybridize with a target nucleic acid (or a region thereof) in the presence of other nucleic acids that may be found in testing samples.

"Fragment" refers to a piece of contiguous nucleic acid that contains fewer nucleotides than the complete nucleic acid.

"Hybridization" or "annealing" refer to the base-pairing interaction of one nucleic acid with another nucleic acid (typically an antiparallel nucleic acid) that results in formation of a duplex or other higher-ordered structure (i.e. a hybridization complex). The primary interaction between the antiparallel nucleic acid molecules is typically base specific, e.g., A/T and G/C. It is not a requirement that two nucleic acids have 100% complementarity over their full length to achieve hybridization. Nucleic acids hybridize due to a variety of well characterized physio-chemical forces, such as hydrogen bonding, solvent exclusion, base stacking and the like. An extensive guide to the hybridization of nucleic acids is found in Tijssen (1993) Laboratory Techniques in Biochemistry and Molecular Biology—Hybridization with Nucleic Acid Probes part I chapter 2, "Overview of principles of hybridization and the strategy of nucleic acid probe assays," (Elsevier, New York), as well as in Ausubel (Ed.) Current Protocols in Molecular Biology, Volumes I, II, and III, 1997, which is incorporated by reference.

"Nucleic acid" or "nucleic acid molecule" refers to a multimeric compound comprising two or more covalently bonded nucleosides or nucleoside analogs having nitrogenous heterocyclic bases, or base analogs, where the nucleosides are linked together by phosphodiester bonds or other linkages to form a polynucleotide. Nucleic acids include RNA, DNA, or chimeric DNA-RNA polymers or oligonucleotides, and analogs thereof. A nucleic acid backbone can be made up of a variety of linkages, including one or more of sugar-phosphodiester linkages, peptide-nucleic acid bonds, phosphorothioate linkages, methylphosphonate linkages, or combinations thereof. Sugar moieties of the nucleic acid can be ribose, deoxyribose, or similar compounds having known substitutions (e.g. 2'-methoxy substitutions and 2'-halide substitutions). Nitrogenous bases can be conventional bases (A, G, C, T, U) or analogs thereof (e.g., inosine, 5-methylisocytosine, isoguanine). A nucleic acid can comprise only conventional sugars, bases, and linkages as found in RNA and DNA, or can include conventional components and substitutions (e.g., conventional bases linked by a 2'-methoxy backbone, or a nucleic acid including a mixture of conventional bases and one or more base analogs). Nucleic acids can include "locked nucleic acids" (LNA), in which one or more nucleotide monomers have a bicyclic furanose unit locked in an RNA mimicking sugar conformation, which enhances hybridization affinity toward complementary sequences in single-stranded RNA (ssRNA), single-stranded DNA (ssDNA), or double-stranded DNA (dsDNA). Nucleic acids can include modified bases to alter the function or behavior of the nucleic acid (e.g., addition of a 3'-terminal dideoxynucleotide to block additional nucleotides from being added to the nucleic acid). Synthetic methods for making nucleic acids in vitro are well known in the art although nucleic acids can be purified from natural sources using routine techniques. Nucleic acids can be single-stranded or double-stranded.

"Primer" refers to an enzymatically extendable oligonucleotide, generally with a defined sequence that is designed to hybridize in an antiparallel manner with a complementary, primer-specific portion of a target nucleic acid. A primer can initiate the polymerization of nucleotides in a template-dependent manner to yield a nucleic acid that is complementary to the target nucleic acid when placed under suitable nucleic acid synthesis conditions (e.g. a primer annealed to a target can be extended in the presence of nucleotides and a DNA/RNA polymerase at a suitable temperature and pH). Suitable reaction conditions and reagents are known to those of ordinary skill in the art. A primer is typically single stranded for maximum efficiency in amplification, but may alternatively be double stranded. If double stranded, the primer is generally first treated to separate its strands before being used to prepare extension products. The primer generally is sufficiently long to prime the synthesis of extension products in the presence of the inducing agent (e.g. polymerase). Specific length and sequence will be dependent on the complexity of the required DNA or RNA targets, as well as on the conditions of primer use such as temperature and ionic strength. Preferably, the primer is about 5-100 nucleotides. Thus, a primer can be, e.g., 5, 8, 9, 10, 11, 12, 13, 14, 15, 16, 17, 18, 19, 20, 21, 22, 23, 24, 25, 26, 27, 28, 29, 30, 31, 32, 33, 34, 35, 40, 45, 50, 55, 60, 65, 70, 75, 80, 85, 90, 95 or 100 nucleotides in length. A primer does not need to have 100% complementarity with its template for primer elongation to occur; primers with less than 100% complementarity can be sufficient for hybridization and polymerase elongation to occur. A primer can be labeled if desired. The label used on a primer can be any suitable label, and can be detected by, for example, spectroscopic, photochemical, biochemical, immunochemical, chemical, or other detection means. A labeled primer therefore refers to an oligomer that hybridizes specifically to a target sequence in a nucleic acid, or in an amplified nucleic acid, under conditions that promote hybridization to allow selective detection of the target sequence.

"Sample preparation" refers to any steps or methods that prepare a sample for subsequent sequencing, amplification, and/or detection of target nucleic acids present in the sample. Sample preparation may include any known method of concentrating components, such as nucleic acids, from a larger sample volume. Sample preparation may include physical disruption and/or chemical lysis of cellular components to release intracellular components into a substantially aqueous or organic phase and removal of debris, such as by using filtration, centrifugation or adsorption. Sample preparation may include use of a nucleic acid oligonucleotide that selectively or non-specifically captures a target nucleic acid and separates it from other sample components.

"Sequencing" refers to any known procedure, method, or technology for determining the precise order of the nucleosides or nucleoside analogs of a target nucleic acid molecule, or its complement, or fragments thereof. Sequencing, in the context of fragments, refers to determining the precise order of nucleosides or nucleotides within a nucleic acid molecule that contains less bases than the complete target nucleic acid molecule e.g., determined by sequencing amplicons produced by using an amplification oligonucleotide that hybridizes to, and initiates polymerization from, an internal position of the target nucleic acid. Known sequencing methods include, for example, whole-genome sequencing as well as targeted sequencing wherein only subset of genes or regions of the genome are isolated and sequenced.

Some embodiments described herein allow a quantitative deconvolution of biological samples (for example, human plasma) that contain mixed DNA molecules, based on comparing the patterns and abundance of methylation haplotypes against a reference set of human tissues. Detection and quantification of low-abundant cancer DNA in plasma, and simultaneous mapping to the tissue of origin has been successfully demonstrated. With the high sensitivity and the capability of detecting rare species in heterogeneous samples. Some embodiments described herein are, for example, suitable for non-invasive detection of tumor or other organ damage (diabetes, stroke etc.) in a subject's plasma, urine, stool, or cerebrospinal fluid, and detection of fetal aneuploidy in maternal blood at a very early stage of pregnancy.

Some embodiments described herein provide methods of creating a database of patient specific methylation haplotypes and unmethylated haplotypes. Some embodiments described herein provide methods of preparing data of comparative methylation haplotypes and unmethylated haplotypes. Some embodiments described herein include further steps for methods of treatment of diagnosed diseases or conditions associated with methylation haplotypes and unmethylated haplotypes.

Some embodiments described herein utilize the co-methylation status of multiple adjacent CpG sites in single DNA molecules rather than the methylation status of individual loci and or their local average. Some embodiments described herein suppress the stochastic noise from the low coverage methylation data and therefore have high sensitivity and specificity in both detecting circulating tumor DNA and mapping the tissue-of-origin of the tumor. Additionally, some embodiments described herein provide a set of MHL based biomarkers and a statistical approach to the detection.

For the quantitative estimation of the level of cancer DNA fractions, a strategy based on a tissue-specific MHL sampling technique which is distinctly different from existing approaches, such as quadratic programming, was developed. Due to the low level of cancer and fetal DNA fragments in the blood (plasma), some embodiments are applicable to even low coverage data based on methylation sequencing, such as RRBS and WGBS, whereas other methods would fail due to the difficulties in dealing with missing values.

For non-invasive cancer diagnosis, current mature commercial assays in the market use bronchial fluid (EPI PRO-LUNG BL Reflex assay), or can only be used for specific cancer type detection (EPI PROCOLON blood assay for colon cancer) without origin-tissue prediction. Some embodiments described herein provide accurate tissue-of-origin mapping based on comparing the patterns and abundance of methylation haplotypes against a reference set of human reference tissues and provide accurate quantitative estimation of the cancer DNA fraction.

Some embodiments described herein relate to a set of markers for cancer detection and tissue-of-origin mapping based on an exhaustive search across the whole genome for methylation haplotype blocks (MHB) that have a higher level of methylation haplotype load (MHL) or higher level of unmethylated haplotype load (uMHL). Some embodiments described herein relate to a statistical approach that takes the information of these markers for the tissue-of-origin mapping and cancer detection. Compared with existing prediction models (such as tree-based: random forest), some embodiments described herein are suitable for sparse methylation sequencing data, which is typical in the clinical setting due to the low amounts of cell-free DNA that can be extracted from patients. Some embodiments described herein are also applicable to detection of fetal aneuploidy in maternal blood. Currently there is a commercial TISSUE OF ORIGIN test from Cancer Genetics Inc. which is an invasive assay that uses tissue biopsies from patients, as compared to non-invasive liquid biopsies that allow far less discomfort for the patients.

Human peripheral blood contains low levels of DNA molecules from other tissues or cell types, such as circulating cancer stem cells, cell-free DNA from apoptotic cancer cells in cancer patients, or fetal DNA in pregnant women. DNA methylation signals along with the DNA molecules are released into the blood simultaneously and these methylation signals are tissue-specific and can be applied to identify the tissue source of the DNA fragment. Methylation haplotypes provide high sensitivity detection of DNA molecules from DNA samples (WO2015/116837 and PCT/US2015/013562 incorporated herein by reference).

In some embodiments, DNA molecules are extracted from plasma samples, from for example cancer patients or healthy individuals, and the DNA methylation status of cell-free DNA molecules are assayed by bisulfite methylation sequencing (reduced representation bisulfite sequencing (RRBS), Meissner et al. (2005)). Note that alternative technologies, such as BSPP (Diep et al. (2012)), micro-droplet PCR (Komori et al. (2011)), Selector probes (Johansson et al. (2011)), or MeDiP (Papageorgiou et al. (2011)) can also potentially be used with some differences in the requirement of input materials and/or cost. Other methods for determining the methylation status of cell-free DNA may also be used.

In some embodiments, regardless of the specific sample preparation methods or sequencing platforms used, bisulfite sequencing reads (single-ends or paired-ends) are used as the input for the proposed analytical framework for detection of cancer and their tissue-of-origin. Methylation haplotypes and their abundance may be derived from the raw sequencing reads. Each haplotype represents the combination of binary methylation status (methylated or unmethylated) at multiple CpG sites of one sequencing read. A computational pipeline (implemented with Perl) was developed to deal with methylation haplotype and further derived metrics, such as methylation haplotype (successive methylation allele combination), methylation haplotype block (linkage disequilibrium regions), highly methylated haplotype (HMH), and methylation/unmethylated haplotype load (MHL/uMHL) (weighted methylation status by haplotype length).

To identify the most informative marker for detecting cancer or tissue mapping, the term "methylation haplotype block" (MHB) was defined to describe genomic regions in which the methylation status of CpG pairs within are in linkage disequilibrium and could be taken as co-methylation regions. A set of Whole Genome Bisulfite Sequencing (WGBS) data was compiled, such as from stem cell, cancer cell, and normal adult tissues, in order to exhaustively search the entire human genome. A total of 147,888 MHBs in the human genome were identified.

A metric was defined, called methylation haplotype load (MHL) for each MHB (as described in WO2015/116837), which is the normalized fraction of methylated haplotypes at different lengths to indicate the methylation status and complexity of the methylation population. MHL is superior to other metrics (such as methylation level, methylation entropy (Xie, H. et al, (2011)), and epi-polymorphism (Landan et al, (2012)) for distinguishing different methylation patterns. In addition, MHL is bounded between 0 and 1, which allows for direct comparison of different regions across many data sets without normalization.

A metric was defined, called unmethylated haplotype load (uMHL) for each MHB, which is the normalized fraction of unmethylated haplotypes at different lengths to indicate the methylation status and complexity for the unmethylated population.

Figure 9A:
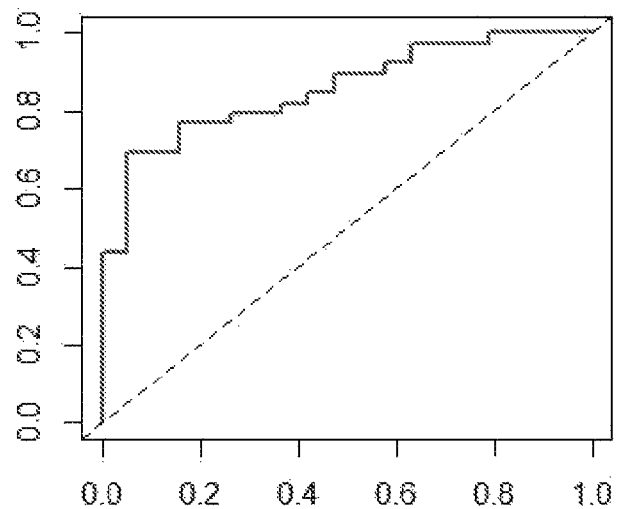
FIGS. 9(a)-9(c). Results of MARS-based binary classification for test plasma data sets. The set of tissue-specific markers derived from an independent set of normal tissue data was able to segregate each class of plasma samples from the other classes in a binary fashion.
Figure 9B:
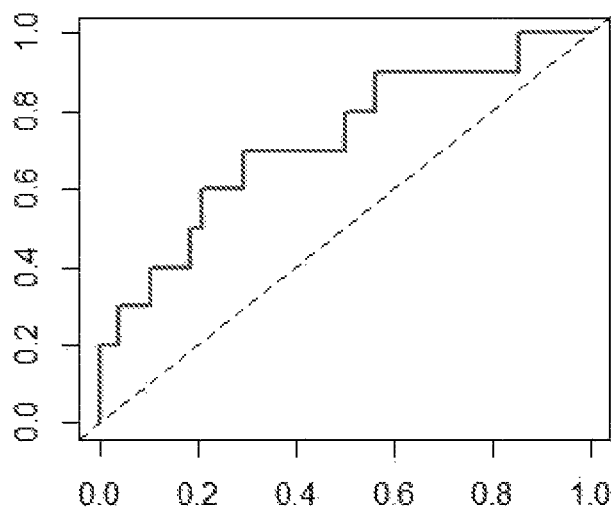
Figure 9C:
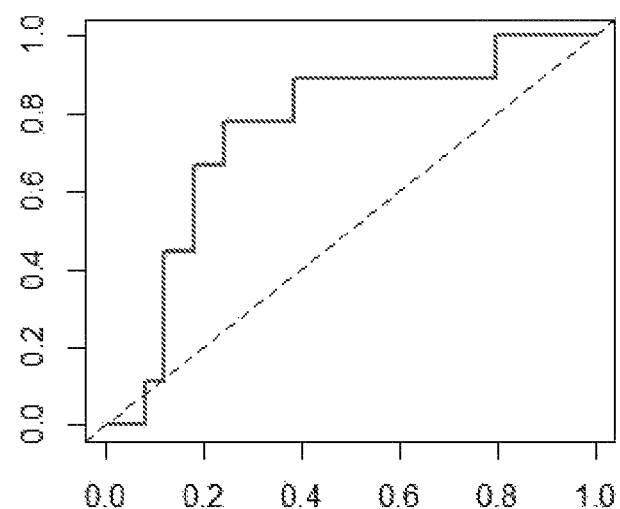

A MHL matrix for a set of human tissues (61 published samples/data sets) was built encompassing all the 147,888 identified MHBs in the entire human genome. From this matrix, tissue-specific MHBs were identified. After including additional training data subsets comprising plasma from cancer patients and healthy controls, sets of 154 MHBs for binary prediction of tissue-of-origin between colon, lung, and normal (no solid tissue) and 295 MHBs for cancer types classification (colon versus lung) non-invasively in the blood were identified (Table 5(a)-(b)). The invention demonstrated binary classification AUCs of 0.856, 0.725, and 0.751 in independent test sets from normal, colon cancer, and lung cancer plasma respectively (FIG. 9(a)-9(c)). Distinguishing between colon cancer and lung cancer plasma achieved classification accuracies of 70% and 78% for test sets comprising colon cancer and lung cancer plasma respectively using cancer type classification (FIG. 10).

The disclosed method was also applicable to tracking metastasized secondary tumors. Significantly higher original tissue markers (46 and 79 for two metastasized cancer samples) in the metastasized cancers (primary colon to liver and primary breast to lung) were identified with MHL measurement and a maximum marker count approach to infer its primary cancer source.

Adjacent CpG sites in mammalian genomes tend to be co-methylated due to the processivity of enzymes responsible for adding or removing the methyl group. Yet discordant methylation patterns have also been observed, and found to be related to stochastic or uncoordinated molecular processes. The invention focused on a systematic search and investigation of regions in the human genome that exhibit highly coordinated methylation.

By examining the co-methylation patterns of multiple adjacent CpG sites, termed methylation haplotypes, in single bisulfite sequencing reads, a greedy-searching strategy was applied to define blocks of tightly coupled CpG sites, called methylation haplotype blocks (MHBs), based on 53 sets of whole genome bisulfite sequencing (WGBS) data, including 43 published sets from human adult tissues, ESC, and in vitro differentiated cell lines, as well as 10 sets from human adult tissues generated in this invention. The MHBs were further validated with 101 sets of RRBS ENCODE data, and 1,274 sets of Illumina450k methylation array data from TCGA tumor and normal samples. Globally, MHBs are enriched in, but only partially overlap with, several well-known genomic features, including CpG islands, promoters, enhancers and VMRs.

To perform quantitative analysis of the MHBs, a metric called methylation haplotype load (MHL) was computed, which covers both average methylation level and methylation complexity, and therefore is more informative than average methylation level or Shannon entropy. Using a feature selection strategy, a set of tissue-specific MHBs was identified that cluster by developmental germ-layers. Interestingly, examination of these MHBs revealed two distinct mechanisms for fate commitment during development: epigenetic silencing of pluripotent genes, such as NANOG, for mesoderm induction; and epigenetic induction (or de-suppression) of lineage-specific factors for ectoderm commitment.

Figure 8:
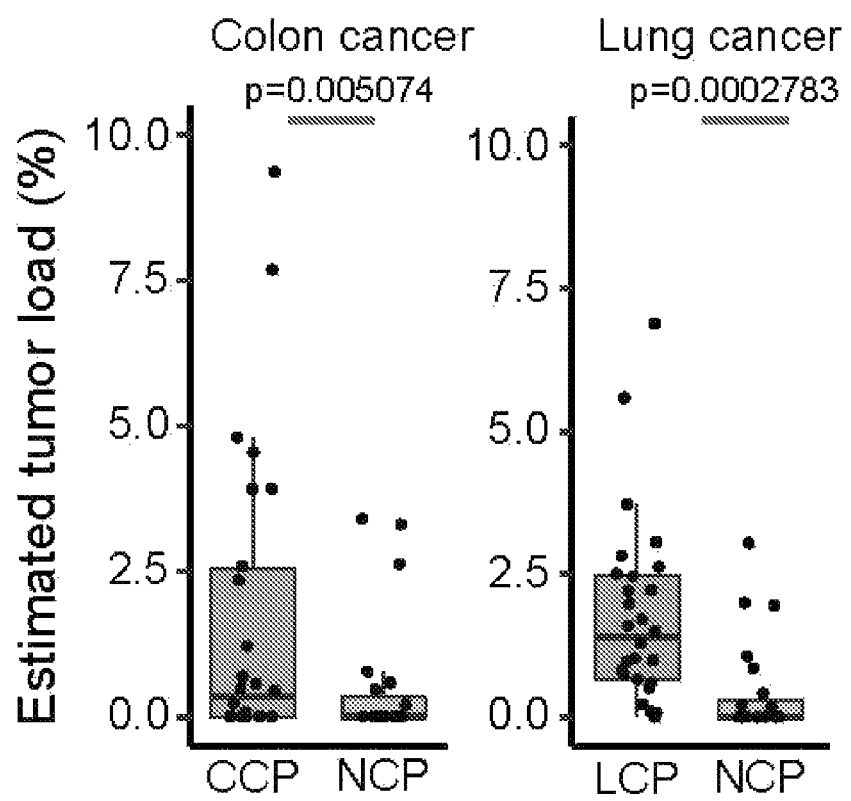
FIG. 8. The tumor fraction between test sets of cancer and normal plasma samples. Cancer plasma (n=30 colon cancer, n=29 lung cancer) had significantly elevated tumor fractions (Two Sample t-test with unequal variance) when compared with normal plasma (n=23) using either colon cancer markers (left) or lung cancer markers (right).

Furthermore, to examine MHBs in cancers and explore its clinical utility, 162 sets of RRBS data from primary tumor tissues and matched plasma from patients with lung cancer, colon cancer, or pancreatic cancer were generated, as well as plasma controls from healthy individuals. Compared with normal tissues and stem cells, primary tumor tissues exhibit a distinct methylation pattern within MHBs, related to locally disordered methylation recently discovered in chronic lymphocytic leukemia (CLL). Importantly, a subset of blocks (Table 4) was derived that can estimate the tumor content from circulating DNA in the plasma (FIG. 8). Finally, prediction of tissue-of-origin was performed on plasma using tissue specific methylation haplotype blocks (Table 5).

A manuscript entitled "Identification of methylation haplotype blocks aids in deconvolution of heterogeneous tissue samples and tumor tissue-of-origin mapping from plasma DNA" by Guo et al. (Nat Genet 2017 April; 49(4):635-642), the disclosure of which is incorporated herein by reference in its entirety, including all figures, tables, supplementary figures and supplementary tables therein or related thereto.

EXAMPLES

An exhaustive search of tissue-specific methylation haplotype blocks across the entire human genome was performed, and block-level metrics including methylation haplotype load (MHL) and unmethylated haplotype load (uMHL) were proposed, for a systematic discovery of informative markers. Applying the disclosed method's analytical framework and identified markers, accurate determination of tissue origin as well as estimation of tumor load in clinical plasma samples from patients of lung cancer (LC) and colorectal cancer (CRC) (FIG. 1(a)) was demonstrated.

Identification and Characterization of Methylation Haplotype Blocks.

To investigate the co-methylation status of adjacent CpG sites along single DNA molecules, the concept of genetic linkage disequilibrium was extended (Slatkin (2008); Shoemaker et al. (2010)) and the $r^2$ metric determined to quantify the degree of coupled CpG methylation among different DNA molecules of the same samples. CpG methylation status of multiple CpG sites in single- or paired-end Illumina sequencing reads were extracted to form methylation haplotypes, and pairwise "linkage disequilibrium" of CpG methylation $r^2$ was calculated from the abundance of different methylation haplotypes (see Methods). The full human genome was partitioned into blocks of tightly coupled CpG methylation sites, called methylation haplotype blocks (MHBs) (FIG. 1(b)), using a $r^2$ cutoff of 0.5. Using slightly different cutoff values, such as 0.3 or 0.7, for partitioning of the human genome into genetic haplotype blocks, resulted in only minor quantitative differences in the block size and number without affecting the global pattern (data not shown).

Figure 1C:
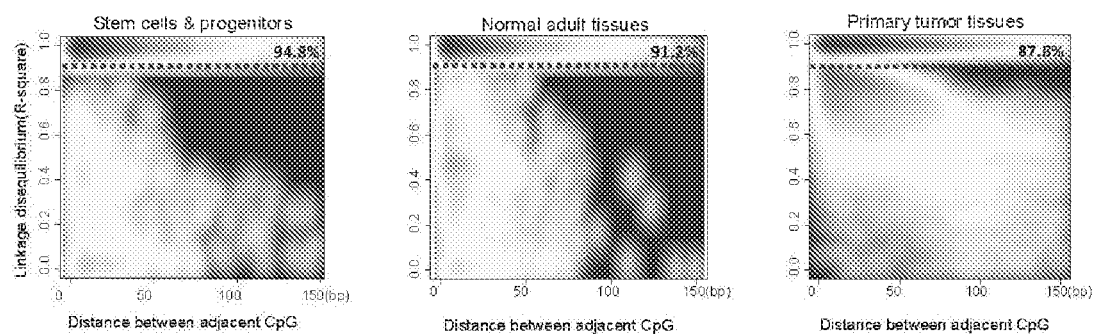
Figure 11A:
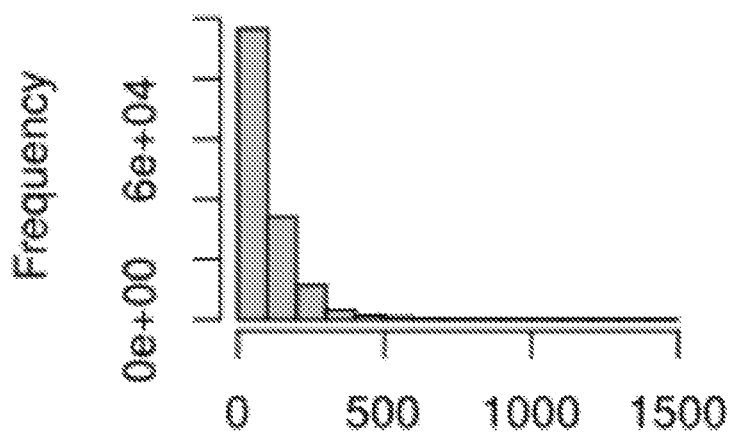
FIGS. 11(a)-11(c). Characteristics of MHB in human genome.
Figure 11B:
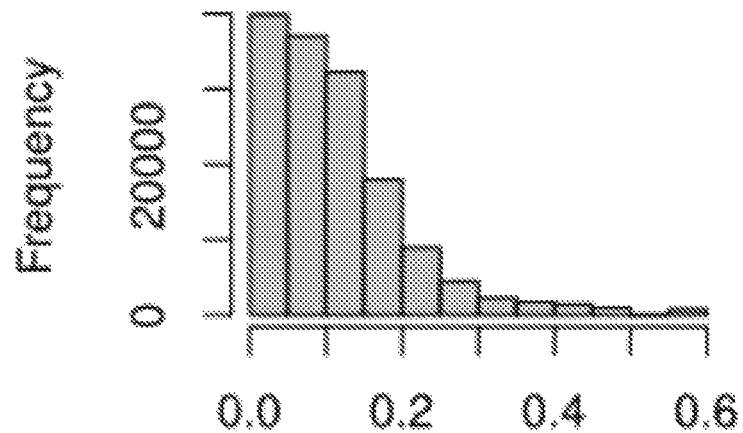

To characterize the global pattern and distribution of MHBs, starting with 51 sets of published Whole Genome Bisulfite Sequencing (WGBS) data from human primary tissues (Schultz et al. (2015); Heyn et al. (2012)), as well as the H1 human embryonic stem cells, in vitro derived progenitors (Xie, W. et al. (2013)), and human cancer cell lines (Blattler et al. (2014); Heyn et al. (2016)). An additional WGBS data set from 10 adult tissues from a single human donor was also generated and included. Across this set of 61 samples (>2000× combined genome coverage) a total of ~55 billion methylation haplotype informative reads covering 58.2% of autosomal CpGs were identified. The uncovered CpG sites were either in regions with low mappability, or CpG sparse regions where there are too few sites within Illumina read pairs for deriving informative haplotypes. 147,888 MHBs with an average size of 95 bp and minimum 3 CpGs per block were identified, representing ~0.5% of the human genome that tends to be tightly co-regulated on the epigenetic status at the level of single DNA molecules (FIG. 11(a)-11(b)). The majority of CpG sites within the same MHBs are near perfectly coupled ($r^2$~1.0) regardless of the sample type. Methylation LD was found to extend further along the DNA in stem cells and progenitors, compared with normal adult tissue, both in the fraction of tightly coupled CpG pairs (94.8% versus 91.2%, P-value<2.6×10$^{-16}$), and the over-representation of partially coupled CpG pairs that are over 100 bp apart while the linkage was slightly decayed in primary cancer data sets (87.8%, mixture of CRC and LC), which was validated by another independent WGBS data set from kidney cancer (Chen et al. (2016)) (FIG. 1(c)). Gene Ontology analysis show cancer loss of linkage regions was significantly associated with number of cancer related pathways and functions. This is consistent with previous observations on a smaller BSPP data set comprising 2,020 CpG islands (Shoemaker et al. (2010)) for culture cell lines and another previous report (Shao et al. (2014)). Interestingly, in tumor samples, a reduction of perfectly coupled CpG pairs was observed, which could be related to the pattern of discordant methylation recently reported in variable methylation regions (VMR) (Landau et al. (2014); Hansen et al. (2011)).

Figure 12A:
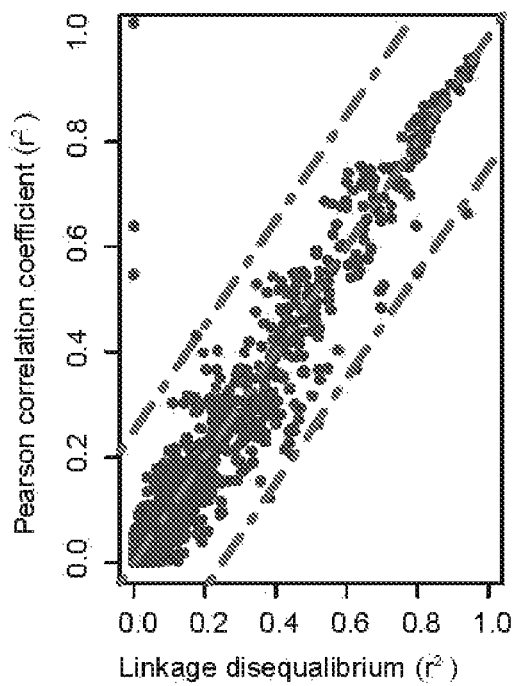
FIGS. 12(a)-12(b). Validation of MHB with Illumina 450k methylation array and RRBS data.
Figure 12B:
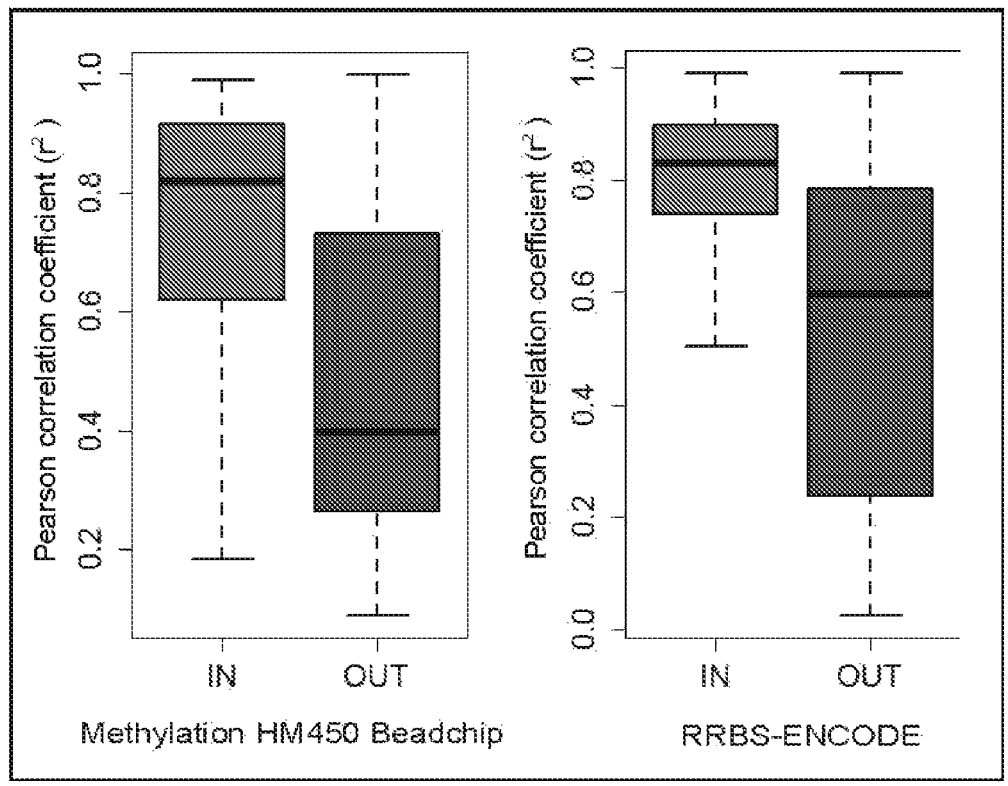

While WGBS data allowed MHBs across the entire genome to unbiasedly be identified, the 61 sets of data did not represent the full diversity of human cell/tissue types. To validate the presence of MHBs in a wider range of human tissues and culture cells, 101 published reduced representation bisulfite sequencing (RRBS) data sets from ENCODE cell lines and tissue samples were examined, as well as 637 sets of Infinium HumanMethylation450 BeadChip (HM450K) data including 11 normal human tissues from the TCGA project. The ENCODE RRBS data sets were generated with short (36 bp) Illumina sequencing reads, greatly limiting the length of methylation haplotypes that can be identified. Similarly, Illumina methylation arrays only report average CpG methylation of all DNA molecules in a sample, preventing a methylation linkage disequilibrium analysis. Therefore, the invention calculated the pairwise correlation coefficient of adjacent CpG methylation levels across different sample sets for block partitioning. Note that the presence of such correlated methylation blocks is a necessary but not sufficient condition for MHBs (FIG. 12(a)). Nonetheless, the absence of correlated methylation blocks in these data sets would invalidate the pattern of MHBs. 23,517 and 2,212 correlated methylation blocks from ENCODE RRBS and TCGA HM450K array data, respectively, were identified, among which 8,920 and 1,258 have significant overlaps with WGBS-defined MHBs. Additionally, significantly higher correlation among the CpGs within the MHB regions compared to CpG loci outside MHBs in the HM450K and RRBS data sets was observed, further supporting the block-like organization of local CpG co-methylation across a wide variety of cells and tissues (FIG. 12(b)). Taken together, the MHBs identified represent a distinct class of genomic features where local CpG methylation is established or removed in a highly coordinated manner at the level of single DNA molecules, presumably due to the processive activities of the related enzymes coupled with the local density of CpG dinucleotides.

Co-Localization of Methylation Haplotype Blocks with Known Regulatory Elements.

Figure 1D:
Figure 1E:
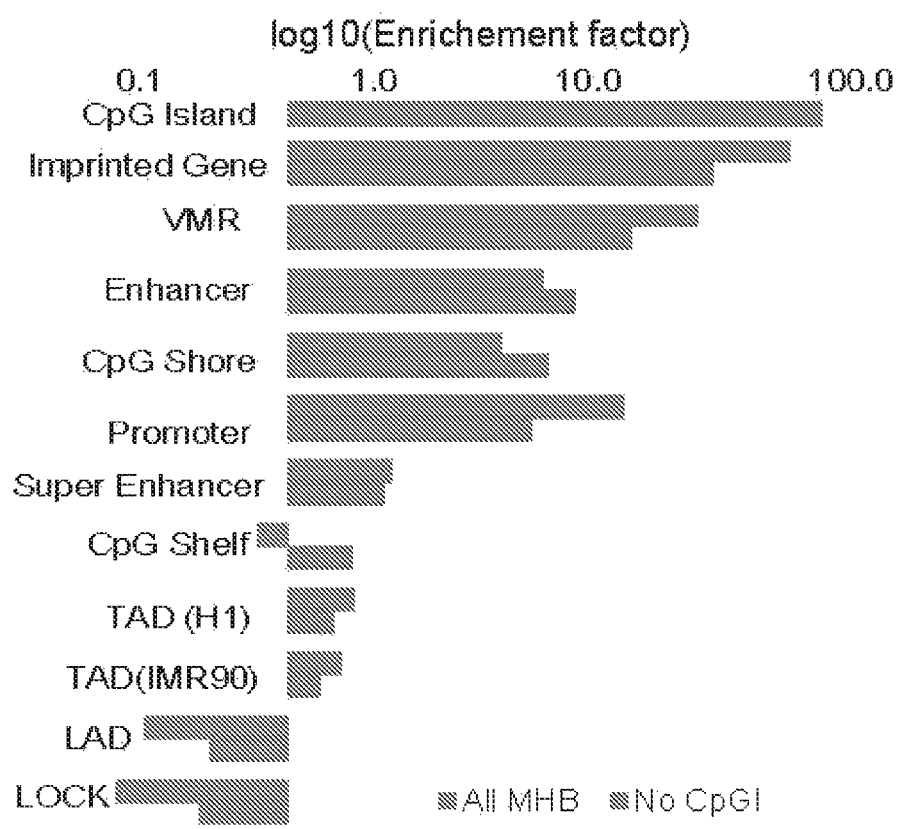
Figure 11C:
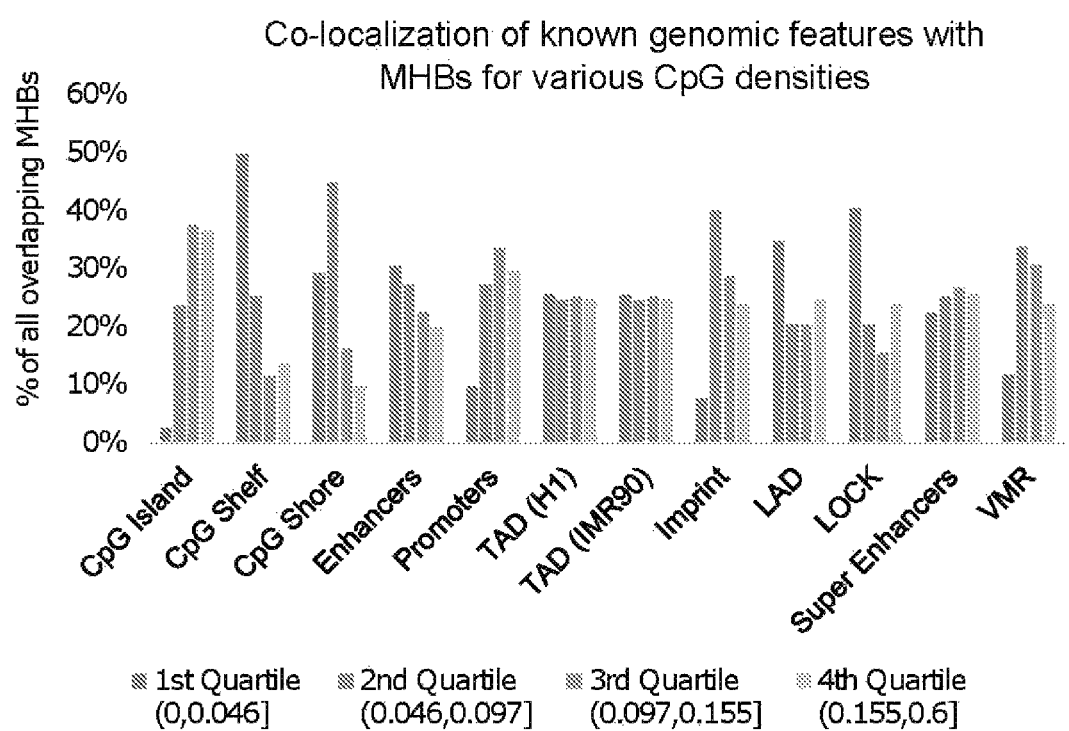

The MHBs established by 61 sets of WGBS data appear to represent a distinct type of genomic feature that partially overlaps with multiple well-documented genomic elements (FIG. 1(d), FIG. 11). Among all the methylation blocks, 60,828 (41.1%) were located in intergenic regions and 87,060 (58.9%) regions in transcribed regions. These MHBs were significantly (p-value<10$^{-6}$) enriched in enhancers (enrichment factor=7.6), super-enhancers (enrichment factor=2.3), promoter regions (enrichment factor=14.5), CpG islands (enrichment factor=70.4), and imprinted genes (enrichment factor=54.6). In addition, modest depletion in LAD was observed (Guelen et al. (2008)) and LOCK regions (Wen et al. (2009)) (46% and 37% of the expected values), and modest enrichment in TAD (Dixon et al. (2012)). Importantly, a very strong (26-fold) enrichment in variable methylation regions (VMR) was observed (Hansen et al. (2011)) (FIG. 1(e)), suggesting that increased epigenetic variability in a cell population or tissue can be coordinated locally among hundreds of thousands of genomic regions (Pujadas et al. (2012)). A subset of MHBs that do not overlap with CpG islands was examined, and a consistent enrichment pattern (FIG. 1(e)) was observed, suggesting that local CpG density alone does not account for the enrichment.

Previous studies on mouse and human samples (Irizarry et al. (2009); Ziller et al. (2013)) demonstrated that dynamically methylated regions were associated with regulatory regions such as enhancer-like regions marked by H3K27ac and transcription factor binding sites. In human, 21.8% of autosomal CpGs were found to be differentially methylated across 30 human cell and tissue types (Hansen et al. (2011)). These CpGs were enriched at low to intermediate CpG density promoters. Using publicly available histone mapping data for human adult tissues, co-localization of methylation haplotype blocks with marks for active promoters (H3K4me3 with H3K27ac) was found, but not for active enhancers (Leung et al. (2015)) (no peak for H3K4me1). Meanwhile, enhancers were found to tend to overlap with CpG sparse MHBs, whereas the overlap with super-enhancers were independent of CpG density (FIG. 11(c)). Therefore, MHBs likely capture the local coherent epigenetic signatures that are directly or indirectly coupled with transcriptional regulation.

Block-Level Analysis of Human Normal Tissues and Stem Cell Lines with Methylation Haplotype Load.

Figure 2:
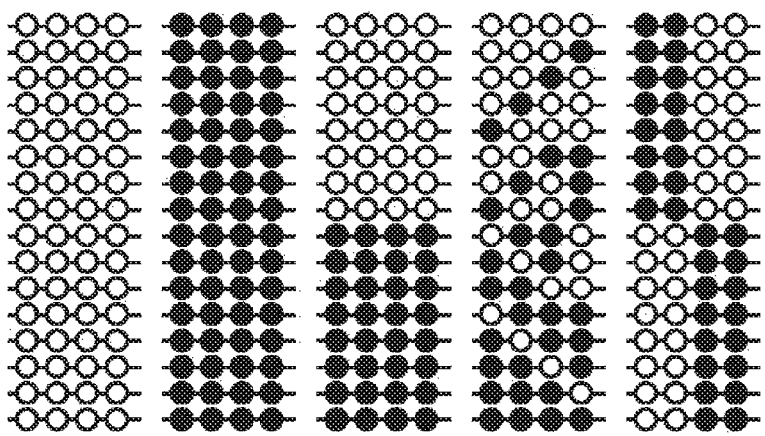
FIG. 2. Comparison of methylation haplotype load with four metrics used in the literature. Five patterns of methylation haplotype combinations are used to illustrate the difference between methylation frequency, methylation entropy, epi-polymorphism and methylation haplotype load. Methylation haplotype load can discriminate all the five patterns while other metrics cannot.

To enable quantitative analysis of the methylation patterns within individual MHBs across many samples, a single metric to define the methylated pattern of multiple CpG sites within each block is needed. Ideally this metric is not only a function of average methylation level for all the CpG sites in the block, but can also capture the pattern of co-methylation on single DNA molecules. For this purpose, methylation haplotype load (MHL) and unmethylated haplotype load (uMHL) were defined, where the first is a weighted mean of the fraction of fully methylated haplotypes and substrings at different lengths (i.e. all possible substrings) and the latter is a weighted mean of the fraction of fully unmethylated haplotypes and substrings at different lengths. Compared with other metrics used in the literature (methylation level, methylation entropy, epi-polymorphism, and haplotypes counts), MHL is capable of distinguishing blocks that have the same average methylation but various degrees of coordinated methylation (FIG. 2). In addition, MHL and uMHL are bounded between 0 and 1, which allows for direct comparison of different regions across many data sets without normalization.

Figure 3A:
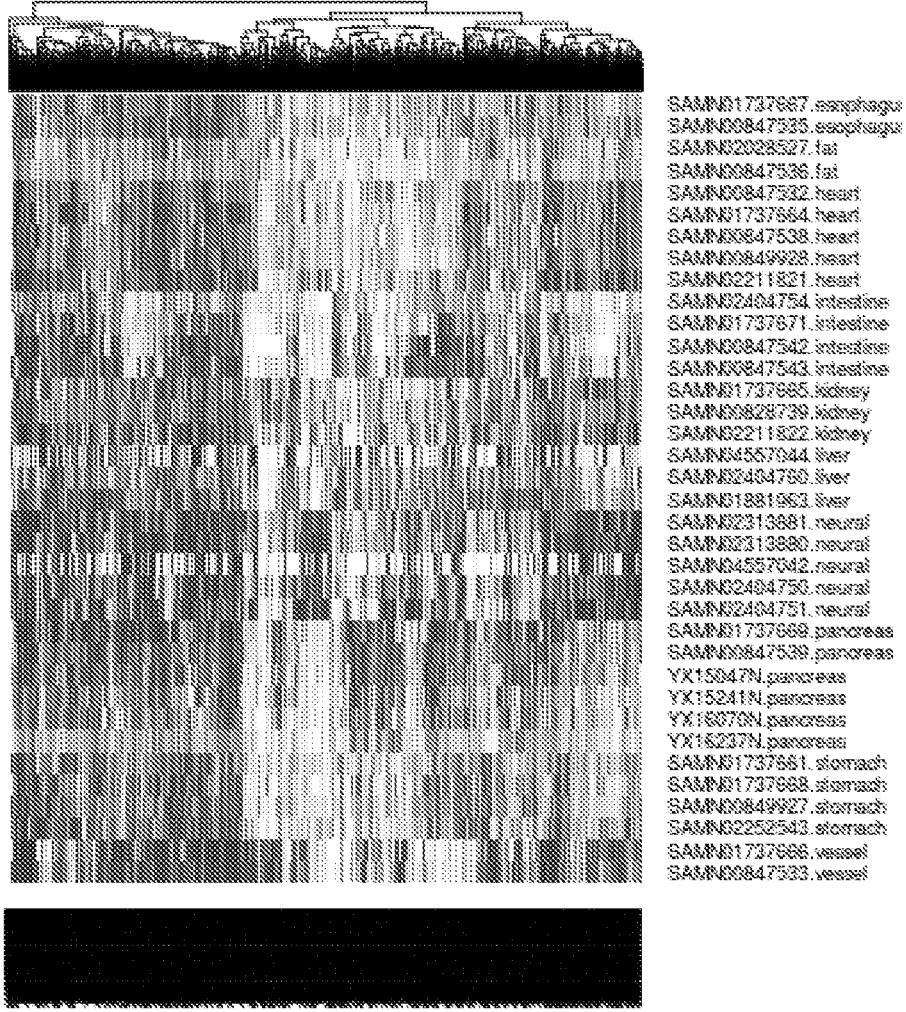
FIGS. 3(a)-3(b). Heatmaps of tissue specific MHBs.
Figure 3B:
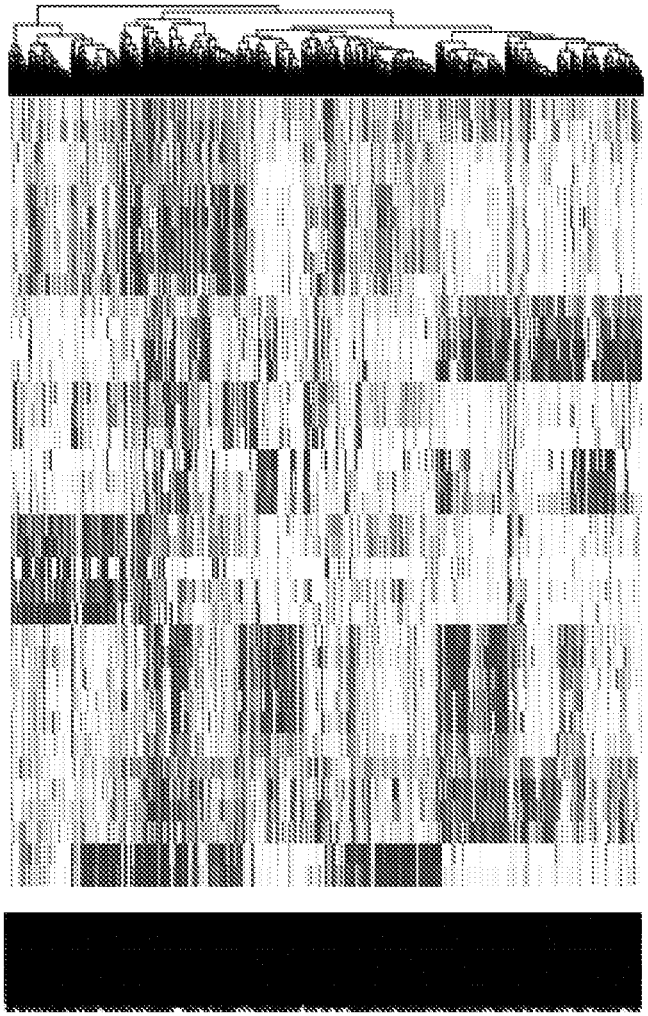
Figure 4:
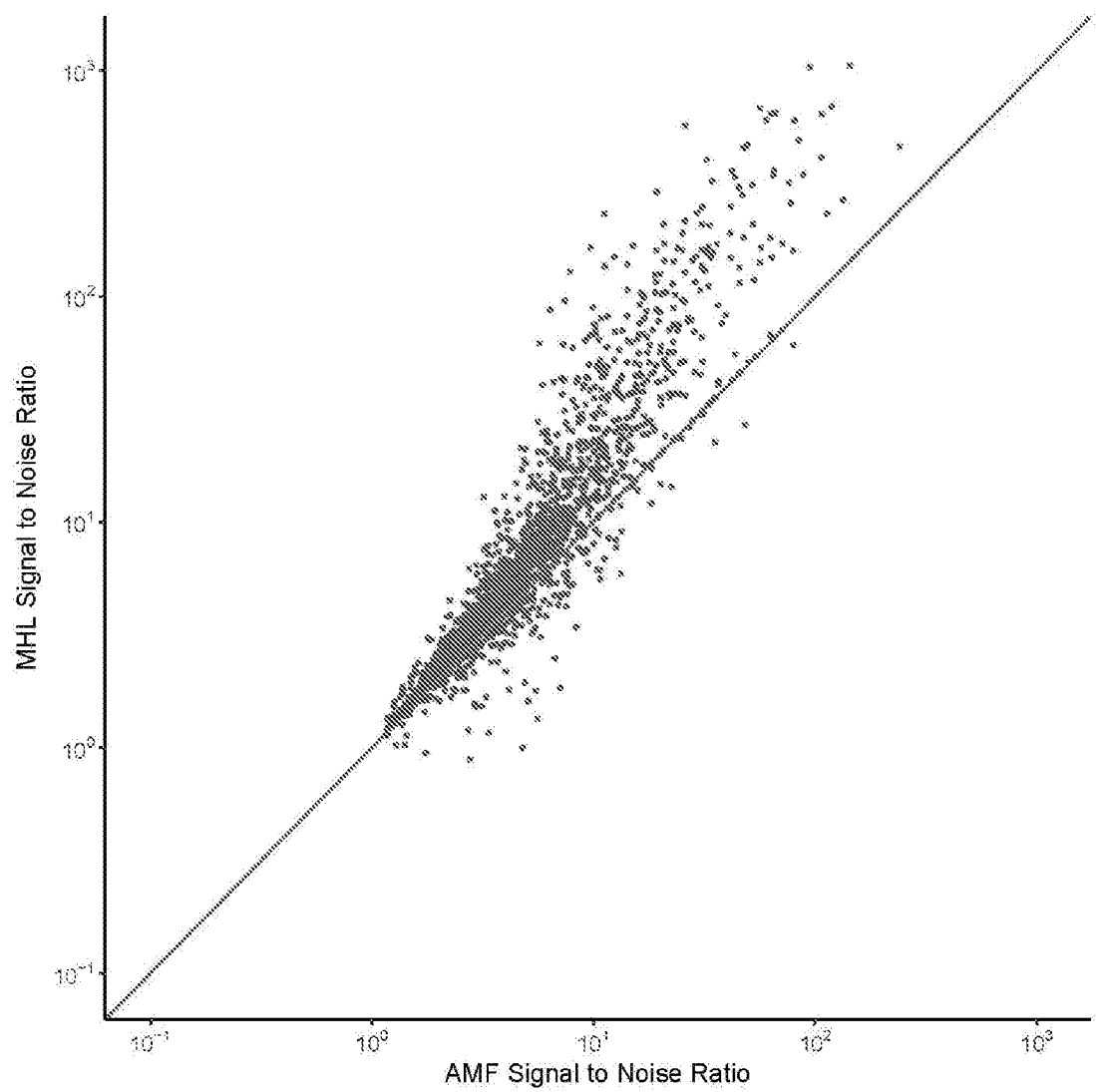
FIG. 4. Comparison of signal to noise ratio between average methylation frequency (AMF) and methylation haplotype load (MHL) metrics at tissue specific differentially methylated loci (Lokk et al. (2014)). For most loci, the MHL metric had a much higher signal to noise ratio than the AMF metric even though these loci were selected using AMF for another data set.

The invention addressed whether treating MHBs as individual genomic elements and performing quantitative analysis based on MHL and uMHL would provide an advantage over previous approaches using the weighted average methylation in genomic windows. To this end, the invention sought to identify tissue specific MHBs from a collection of human solid tissues WGBS datasets based on the MHL and uMHL. A group specific index for each MHB (see Methods) was computed using either MHL or uMHL for every tissue type and then each MHB was assigned to one or more tissues based on their respective GSI. If no other tissue type have a GSI that is at least 80% of the maximum GSI, then only the tissue type with the maximum GSI is reported. From the top 500 MHBs assigned to each tissue, the top tissue specific MHL or uMHL regions were selected using average MHL or uMHL values in blood cells of less than 0.05, and average non-blood cell values greater than 0.4. Using a maximum GSI of greater than 0.6 as a threshold resulted in the identification of 1,290 and 15,377 tissue specific MHL and uMHL regions respectively. To identify the most informative MHL or uMHL marker regions for cancer detection or tissue mapping the top 10% of the identified MHL or uMHL regions determined by GSI value are reported in Tables 1(a) and 1(b). The tissue specific regions using MHL and uMHL were visualized using heatmaps (FIG. 3(a)-3(b)). To demonstrate that MHL was a better metric than AMF, a set of MHBs overlapping with published tissue specific methylated regions (Lokk et al. (2014)) were identified. Using this set of MHBs, the performance between MHL and average methylation fraction in the MHL regions (AMF) were compared. Both MHL and AMF were able to identify tissue specific MHBs, but MHL has better signal (average value from within the tissue specific group) to noise (average value from other groups) than average methylation (FIG. 4).

The human adult tissues used in this invention have various degrees of similarity amongst each other. The invention hypothesized that this is primarily defined by their developmental lineage, and that the related MHBs might reveal epigenetic insights related to germ layer speciation. All the data sets based on the three germ layers were grouped, and searched for MHBs that have differential MHL. In total 114 ectoderm-specific MHBs (99 hyper- and 15 hypo-methylated), 75 endoderm specific MHBs (58 hyper- and 17 hypo-methylated) and 31 mesoderm specific MHBs (9 hyper- and 22 hypo-methylated) were identified. The invention speculated that some of these MHBs might capture binding events of transcription factors (TF) specific to developmental germ-layers. Compared with ENCODE TFBS data (The ENCODE Project Consortium (2012)), distinctive patterns of TFs binding to layer specific MHBs were observed. For layer specific MHBs with hypo-methylation MHL, which tends to represent activation signals, 53 TF binding events in mesoderm specific MHBs, 71 in endoderm specific MHB, and 2 in ectoderm specific MHBs were identified. Gene ontology analysis showed TFs binding to mesoderm exhibit negative regulator activity, while TFs binding to endoderm exhibited positive regulator activity. For layer specific MHBs with hyper-methylation MHL, which tend to represent repressive signals, 38 TF binding events in mesoderm specific MHBs, 102 in endoderm specific MHB, and 145 in ectoderm specific MHBs were identified. Interestingly, ectoderm and endoderm shared few bounded TFs, while mesoderm tissues share multiple groups of TFs with ectoderm and endoderm. Two endoderm specific hyper-MHL regions were identified, which are related to ESRRA and NANOG. This is consistent with a previous finding that mouse ES cells differentiated spontaneously into visceral/parietal endoderm upon NANOG knock-out (Mitsui et al. (2003)). Gene ontology analysis showed that hypo-MHL regions shared by mesoderm and endoderm might have regulatory functions in the fate commitment towards multiple tissues, whereas ectoderm specific hyper-MHL regions might induce the ectoderm development by suppressing the path towards the immune lineage. These observations are indicative of two distinctive "push" and "pull" mechanisms in the transition of cell states that have been harnessed for the induction of pluripotency by over-expressing lineage specifiers (Shu et al. (2013)).

Methylation-Haplotype Based Analysis of Circulating Cell-Free DNA in Cancer Patients and Healthy Donors.

A unique aspect of methylation haplotype analysis is that the pattern of co-methylation, especially within MHBs, is robust for capturing low-frequency alleles among a heterogeneous population of molecules or cells, in the presence of biological noise or technical variability (i.e. incomplete bisulfite conversion or sequencing errors). To explore the clinical potential, the invention focused on the methylation haplotype analysis of cell-free DNA from healthy donors and cancer patients, of which various low fractions of DNA molecules were released from tumor cells and potentially carry epigenetic signatures different from blood. 4-122 ng (average 20 ng) of cell-free DNA from an average of 866 µL human plasma from 75 normal individuals and 59 cancer patients were isolated, except for four with unusually high yield due to cell lysis. Due to the limited DNA availability, scRRBS was performed (Guo et al. (2013)) on 1 to 10 ng of cfDNA from 134 plasma samples and obtained an average of 13 million paired-end 150 bp reads per sample. On average, 57.7% WGBS-defined MHBs were covered in the RRBS data set from the clinical samples.

Figure 13:
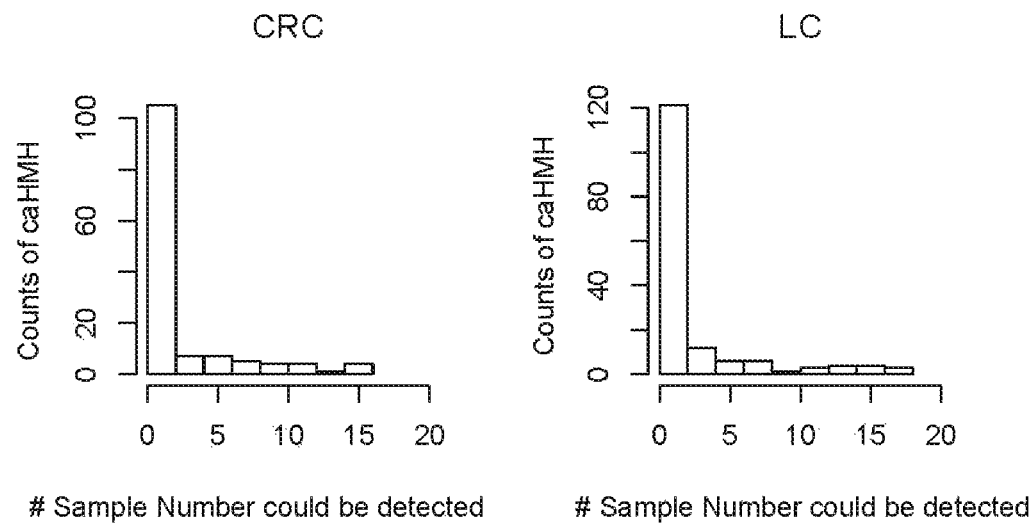
FIG. 13. The distribution of incidence of cancer-associated high-methylated haplotypes (caHMH) in colon cancer (CRC) and lung cancer (LC) plasma samples. Y-axis denotes the frequency of caHMH and x-axis denotes the incidence (number of samples) of the caHMH in cancer plasmas. A majority of caHMH are patient specific.

The invention sought to detect the presence of tumor specific signatures in the plasma samples, using the methylation haplotypes identified in the reference tumor tissues and in normal samples used as the negative controls. For five lung cancer plasma samples and five colorectal cancer plasma samples, matched primary tumor tissues were also obtained, and generated RRBS data (30 million reads per sample) from 100 ng of tumor genomic DNA. The invention focused on MHBs with low MHL (i.e. genomic regions that have low or no methylation) in the blood, and determined whether cancer-associated highly methylated haplotypes (caHMH) can be detected. The invention provides in some embodiments that such haplotypes are present only in the tumor tissues and the matched plasma from the same patient, but not in whole blood or any other non-cancer samples. These highly confident tumor signatures in circulating DNA were considered. caHMH in all cancer patient plasma samples (Average=36, interquartile range (IQR)=17) were detected. These caHMHs were associated with 320 genes, some of which are known to be aberrantly methylated in human cancers such as WDR37, VAX1, SMPD1 (Table 2) The 49 additional cancer plasma samples with no matched tumor samples were analyzed, using 65 normal plasma samples as background and negative control. On average 60 (IQR=31) caHMH were identified for each cancer plasma sample. Interestingly, a significant fraction (35%) of caHMH identified with matched tumor-plasma pairs were also detected in the expanded set of cancer patient plasma samples. A majority of caHMHs were found to be individual specific while few caHMHs were present in at least 53% (16/30) and 62% (18/29) cancer plasma samples for CRC and LC (FIG. 13). Improving the sampling depth, by either using more input cfDNA or reducing sample loss during analysis, will likely increase the number of caHMHs commonly observed in multiple patients.

The tumor load in cancer plasma samples was quantified, using non-negative decomposition with quadratic programming, on the RRBS data from primary cancer biopsies (LC and CRC) and the WGBS data from 10 normal tissues. (Table 3) The invention estimated that a predominant fraction, 72.0% (IQR=40%) in cancer and normal plasma samples were contributed by white blood cells, which is consistent with the levels recently reported based on shallow whole genome bisulfite sequencing (69.4%) (Sun et al. (2015)). Primary tumor and normal tissue-of-origin contributed at the similar level of 2.3% (IQR=3.7%) and 3.0% (IQR=4.4%). In contrast, the similar analysis applied to normal plasma only found residual tumor contributions (0.17%, IQR=2.9% for CRC and 1.0%, IQR=3.1% LC) to normal plasma, which were significantly lower (P=$3.4 \times 10^{-5}$ and $5.2 \times 10^{-10}$ for CRC and LC, respectively) than for cancer plasma. 76.7% plasma samples from CRC patients and 89.6% from LC patients were found to have a detectible contribution from tumor tissues while only 13% and 26% normal plasmas have certain (low) tumor contribution. Therefore, circulating cell-free DNA contains a relatively stable fraction of molecules released from various normal tissues, whereas tumor cells released DNA molecules that can be more abundant in tumor cells than in normal tissues (Tables 3(a)-3(d)). The fractions of white blood cells observed are lower than what was reported previously (Sun et al. (2015)), most likely due to the inclusion of 10 normal tissue types in the deconvolution analysis.

Figure 5:
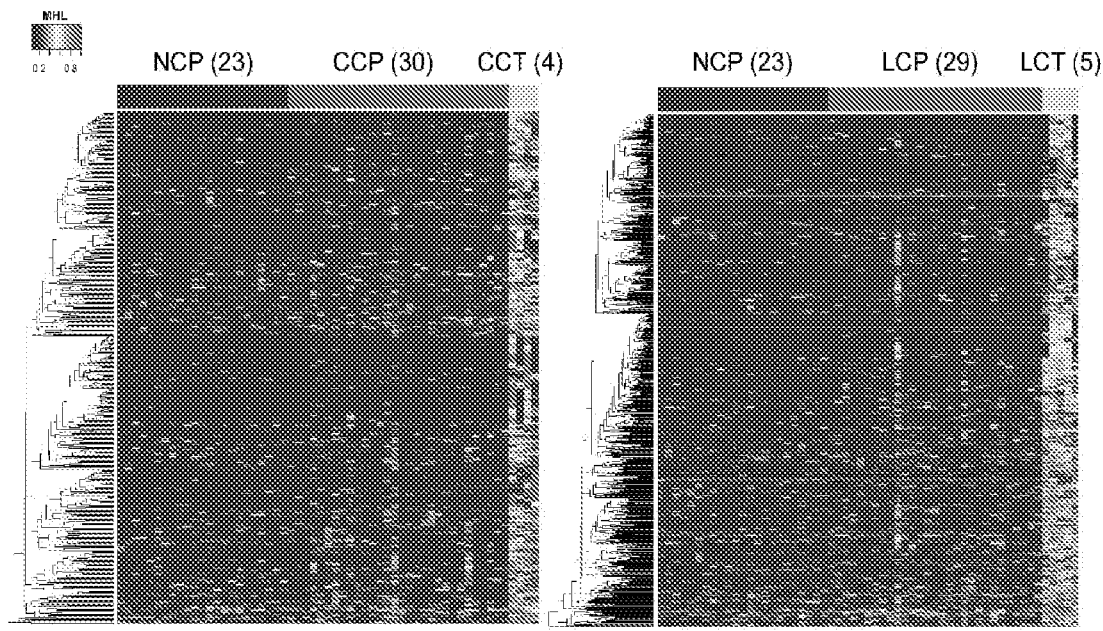
FIG. 5. Heatmap of the MHL in plasma samples in test sets and primary cancer tissues for colon cancer markers (left) and lung cancer markers (right). Cancer markers were identified by comparison of the respective cancer tissues against background (normal plasma set aside for features selection).
Figure 6:
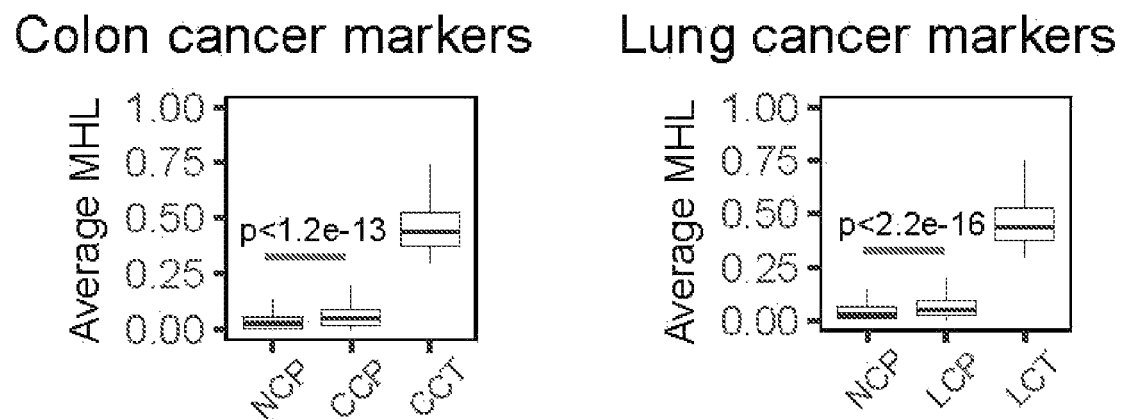
FIG. 6. Boxplots of average MHL in plasma samples in test sets and cancer tissues for colon cancer markers (left) and lung cancer markers (right). The cancer markers were significantly (Two Sample one-sided T-Test) different between the test sets of normal plasma (NP) and cancer plasma (CCP=colon cancer plasma, LCP=lung cancer plasma). The marker regions were highly methylated in tumor tissues (CCT=colon cancer tissue, LCT=lung cancer tissue).
Figure 7:
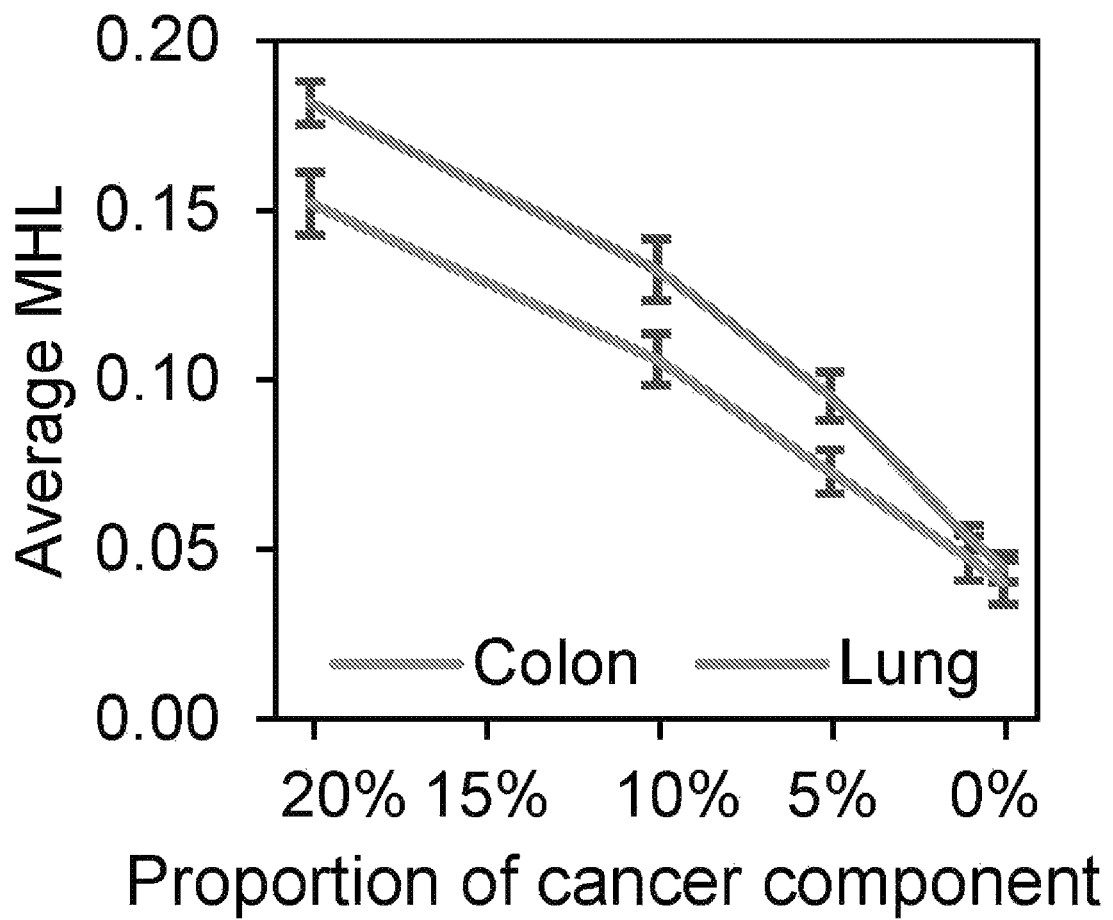
FIG. 7. Simulated standard curves for estimation of tumor fraction. The mean for each cancer fraction from 20 simulations plotted with standard deviations as error bars. A fitted linear model on the standard curve for colon cancer had an adjusted $r^2$ of 0.9621 and the fitted linear model for lung cancer had an adjusted $r^2$ of 0.9573.

The invention sought to use the information from normal human tissues, primary tumor biopsies, and cancer cell lines to improve the detection of cfDNA. The invention selected a subset of MHBs that show high MHL in primary cancer biopsies and low MHL in normal control plasma. A subset of MHBs that have high MHL in cancer tissues and low MHLs in normal plasma was identified for each cancer type (Table 4(a)-(b)). Cancer plasma showed significantly higher MHL in these regions than independent normal plasma (P=$1.2 \times 10^{-13}$ and $2.2 \times 10^{-16}$ for CRC and LC, respectively) (FIG. 5 and FIG. 6). By computationally mixing the sequencing reads from cancer tissues and whole blood samples (WBC), synthetic admixtures at various levels of tumor fraction were created to calibrate the relationship between tumor load and the MHL values in these regions (FIG. 7). A fitted linear model on the standard curve for colon cancer markers had an adjusted R-squared value of 0.9621 and for lung cancer markers the adjusted R-squared value was 0.9573. Note that these MHBs were selected without using any information from the cancer plasma samples, and hence they should be applicable to other cancer plasma samples. Tumor load estimation was performed on test sets of cancer and normal plasma samples. Cancer plasma was found to have significantly higher tumor load than normal plasma (Two Sample t-test with unequal variance, P=0.005074 for colon cancer plasma versus normal and P=0.0002783 for lung cancer plasma versus normal plasma) (FIG. 8).

Recent studies (Sun et al. (2015); Lehmann-Werman et al. (2016); Snyder et al. (2016)) have demonstrated that epigenetic information imbedded in cfDNA has the potential for predicting tumors tissue-of-origin. Here the invention addresses whether a MHL-based framework and a set of targets derived from whole genome data would allow for the prediction of tissue-of-origin with quantifiable sensitivity and specificity, which is crucial for future clinical applications. Training WGBS tissue data from the following tissues: colon, lung, neural, heart, liver, lung, pancreas, and stomach were compiled and a set of 15,000 MHBs selected using their Group Specific Index (GSI) was created. Note that the MHBs with a high GSI score tended to be methylated in fewer tissue types. 20 colon cancer plasma, 20 lung cancer plasma, and 30 normal plasma samples were randomly sampled to create training data sets from the RRBS plasma data sets. The remaining (10 colon, 10 lung, and 39 normal) were held out as test data sets. An ensemble MARS (Multivariate adaptive regression splines) model was generated using the training data sets (Friedman, (1991)). The invention also employed K-means clustering of the MHBs using WGBS data to generate 50 clusters and each MARS model in the ensemble only saw a feature set consisting of 3 features sampled from a cluster (3 features×150 clusters=450 features for each model). To minimize overfitting of training data sets each model selected at most 2 features to use during classification. The first classifier was an ensemble model with 100 MARS models with 154 MHB features (Table 5(a)). In a manner analogous to a random forest classifier, the scores from the resulting ensemble are averaged to compute a prediction score. By utilizing these prediction scores as a binary classifier, the invention was able to obtain a colon vs non-colon AUC of 0.725, a lung vs non-lung AUC of 0.751, and a normal vs abnormal AUC of 0.856 (FIG. 9(*a*)-9(*c*)). Note that these AUC values were obtained using an initial marker set identified from an independent training set of normal WGBS tissue samples only; no cancer tissue samples were used in the initial feature selection, suggesting that plasma samples can be segregated using only tissue specific markers.

To obtain a prediction of tissue-of-origin, the invention focused on colon and lung cancer plasma. First, the top MHBs features that were assigned to either colon, lung, or both tissues ranked by GSI were selected. An ensemble of 500 MARS models identifying 295 unique tissue specific features was made (Table 5(b)). PLSDA (partial least squares discriminant analysis) implemented in the caret R package was used to perform the classification. The classification using this model was assessed using independent test data sets and the accuracy for classifying colon cancer plasma to colon tissue was found to be 70% (7/10) and the accuracy for classifying lung cancer plasma to lung tissue was 78% (7/9) (FIG. 10).

In this invention a well-established concept in population genetics, linkage disequilibrium (LD), was extended to the analysis of co-methylated CpG patterns. While the mathematical representations are identical, there are two key differences. First, traditional linkage disequilibrium (LD) was defined for human individuals in a population, whereas in this invention the analysis was performed on the diploid genome of individual cells in a heterogeneous cell population. Second, linkage disequilibrium in human populations depend on the mutation rate, frequency of meiotic recombination, effective population size and demographic history. The LD level typically decays over the range of hundreds of kilobases to megabases. In contrast, CpG co-methylation depends on DNA methytransferases and demethylases, which tend to have lower processivity, and, in the case of hemi-methyltransferases, much lower fidelity compared with DNA polymerases (Williams et al. (2011)). Therefore, methylation LD decays over much shorter distances ranging from tens to hundreds of bases, with the exception of imprinting regions. Even if longer-read sequencing methods were used no radical change of the block-like pattern presented in this work is expected, which is supported by a recent study (Saito et al. (2015)). Nonetheless, these short and punctuated blocks capture discrete entities of epigenetic regulation in individual cells widespread in the human genome. Such a phenomenon can be harnessed to improve the robustness and sensitivity of DNA methylation analysis, such as the deconvolution of data from heterogeneous samples including circulating cell-free DNA.

Epigenetic abnormalities tend to be more widespread across the genome (compared with somatic mutations), and hence enabling the integration of the sparse coverage across many loci to achieve very accurate prediction by direct counting of methylated haplotypes within the appropriate tissue-specific features.

Methods

Normal and Cancer Samples.

Ten human primary tissues were purchased from BioChain. Cancer tissue and plasma samples were collected from UCSD Moores Cancer Center and normal plasma samples were obtained from UCSD Shiley Eye center under IRB protocols approved by UCSD Human Research Protections Program (HRPP).

Generation of DNA Libraries for Sequencing.

Extracted genomic DNA were prepared for bisulfite sequencing using published protocols. For whole genome bisulfite (WGBS) and reduced representation bisulfite sequencing (RRBS), the DNA fragments were adapted to barcoded methylated adaptors (Illumina). For WGBS, the adapted DNA were converted using the EZ DNA Methylation Lightning kit (Zymo Research) and amplified for 10 cycles using iQ SYBR Green Supermix (BioRad). For RRBS, the adapted DNA were converted using the MethylCode™ Bisulfite Conversion kit (Thermo Fisher Scientific) and amplified using the PfuTurboCx polymerase (Agilent) for 12-14 cycles. Libraries were pooled and size selected using 6% TBE polyacrylamide gels. Libraries were sequenced using the Illumina HiSeq platform for paired-end 100-111 cycles, the Illumina MiSeq platform for paired-end 75 cycles, and the GAIIx (WGBS only) for single-end 36 cycles.

Methylation Haplotype Blocks (MHB).

The human genome was separated into non-overlapping "sequenceable and mappable" segments using a set of generated WGBS data from 10 tissues from a 25-year adult male individual. Mapped reads from WGBS data sets were converted into methylation haplotypes in each segment. Methylation linkage disequilibrium was calculated on the combined methylation haplotypes. Each segment was partitioned into methylation haplotype blocks (MHBs). MHBs were defined as the genomic region in which the $r^2$ value of two adjacent CpG sites is no less than 0.5. MHB regions inferred by WGBS data sets were also validated by bulk data of methylation level. Takai and Jones's sliding-window algorithm (Takai et al. (2002)) was applied for methylation high linkage regions in the HM450K (TCGA) and the RRBS (ENCODE) data set. Finally, simulation analysis to investigate the relationship between LD and correlation of average 5 mC of two CpG loci were conducted based on random sampling of different methylation haplotypes with 1000 individuals, and each individual sampling 10 methylation haplotypes.

Methylation Haplotype Load (MHL).

A methylated haplotype load (MHL) for each candidate region was defined, which is the normalized fraction of methylated haplotypes (MH) at different lengths:

$$MHL = \frac{\sum_{i=1}^{l} w_i \times P(MH_i)}{\sum_{i=1}^{l} w_i}$$

$$w_i = i$$

Unmethylated Haplotype Load (uMHL).

An unmethylated haplotype load (uMHL) for each candidate region was defined, which is the normalized fraction of unmethylated haplotypes (UMH) at different lengths:

$$MHL = \frac{\sum_{i=1}^{l} w_i \times P(UMH_i)}{\sum_{i=1}^{l} w_i}$$

$$w_i = i$$

Where l is the length of haplotypes, $P(MH_i)$ or $P(UMH_i)$ is the fraction of fully successive methylated or unmethylated haplotype with i loci respectively. For a haplotype of length L, all the sub-strings with length from 1 to L were considered in this calculation. $w_i$ is the weight for i-locus haplotype. $w_i=i$ or $w_i=i^2$ was typically used to favor the contribution of longer haplotypes. In the present invention, $w_i=i$ was applied. Quantile normalization, standardization (scale) as well as the batch effect elimination (Johnson et al. (2007)) were applied.

Developmental Germ Layers and Tissue Specific MHB Regions.

In order to investigate the layer and tissue specific MHB regions, group specific index (see below) was applied. An empirical threshold of 0.6 was selected to filter out layer and tissue specific MHB regions. Layer specific MHB regions were selected to show the ability to distinguish between the different development layers. Tissue specific MHB regions were further used for tissue mapping and cancer diagnosis.

$$GSI = \frac{\sum_{j=1}^{n} 1 - \frac{10^{MHL_j}}{10^{MHL_{max}}}}{n-1}$$

n indicates the number of the groups. MHL(j) denotes the average of MHL of $j^{th}$ group. $MHL_{max}$ denotes the average of MHL of highest methylated group.

Deconvolution Analysis.

The deconvolution references were constructed from normal human solid tissues, WBC, colorectal cancer tissues (CCT), and lung cancer tissues (LCT). Tissue specific MHB regions for normal human tissues were selected for brain, colon, esophagus, heart, intestine, kidney, liver, lung, and stomach using candidate features for deconvolution based on non-negative decomposition with quadratic programming (Sun et al. (2015); Houseman et al. (2012); Gong et al. (2013)). Raw MHL signals were logit transformed before deconvolution analysis on plasma samples. Samples with less than 30% whole blood content from deconvolution analysis were considered to have failed due to poor library complexity.

Tumor Load Estimation Using Tumor Specific MHBs.

Pruning and K-nearest neighbors (KNN) imputation was performed on the MHL matrix with only the RRBS plasma and RRBS tumor tissue samples removing samples with low coverage and imputed missing values. Thus 30 colon cancer plasma, 29 lung cancer plasma, 69 normal plasma, 4 colon cancer tissues, and 5 lung cancer tissues remained. The 69 healthy normal plasma samples were split into "training" and "test" sets; with 46 samples set aside for feature selection and training while the remaining 23 samples were used as a completely independent data set to test the quantitation. Tumor specific methylation haplotype blocks were identified by 2-tailed t-test with a False Discovery Rate (FDR) of 0.001 and a minimum difference cutoff of 0.3. Two sets of markers were identified separately for colon cancer and lung cancer. To calibrate the relationship between tumor load and MHL values, 20 sets of simulations in which mixed sequencing reads from cancer tissue samples and normal plasma samples at a 1:5, 1:10, 1:20, 1:100, and 0:1 ratio were generated (totaling 100 simulated data sets for each cancer tissue). The average MHL value for these regions was computed for each region and a linear regression model was generated using these values and the known cancer tissue proportions for each cancer tissue. The model was applied to the average MHL value in these regions for test sets which included 30 colon cancer plasma, 29 lung cancer plasma, and 23 normal plasma samples. The estimated tumor loads for normal versus colon cancer and for normal versus lung cancer were compared using the colon cancer and lung cancer markers respectively.

Cancer Plasma Classification.

Training WGBS data were collected to generate an MHL matrix and the top 15,000 MHBs by GSI were selected. These MHBs were clustered using K-means into 50 marker groups with the WGBS data matrix. Each cluster should have similar methylation patterns across each tissue type. In order to avoid overfitting, 20 colon cancer plasma, 20 lung cancer plasma, and 30 normal plasma samples were randomly selected to create a training data set from the RRBS plasma samples. The remaining samples (10 colon, 10 lung, and 39 normal) were held out as a test data set. For building the classifiers, an ensemble MARS (Multivariate Adaptive Regression Splines) model (Friedman, (1991)) implemented in the Earth R package (https://cran.r-project.org/web/packages/earth/index.html) was trained on the training data set using features from the top 15,000 MHBs ranked by the Group Specific Index (GSI). The ensemble MARS model was used to perform classification on the test plasma data set using the binary classifier. For cancer type classification, the features selected using MARS were used in a PLSDA (partial least squares discriminant analysis) to distinguish colon versus lung.

Data Availability

WGBS and RRBS data are available at the Gene Expression Omnibus (GEO) under accession GSE79279.

Tables:

Table 1. Top 10% tissue specific MHL and uMHL markers identified by GSI.

Table 2. Complete list of high methylated haplotype shared between matched primary tumor tissues and plasma for colon cancer (CRC) and lung cancer (LC) patients.

Table 3. Deconvolution of colon cancer (CRC), lung cancer (LC) and normal plasma into ten tissues using non-negative decomposition with quadratic programming Samples with white blood cells composition greater than 30% were used to report averages.

Table 4. Differentially methylated MHB regions between cancer tissues and normal plasma.

Table 5. The sets of cancer specific and tissue specific markers derived from MARS based features selection on training data sets.

TABLE 1a

Top 10% tissue specific uMHL markers identified by GSI
uMHL Markers

| Region | Group | GSI | refMax |
|---|---|---|---|
| chr19: 5894163:5894242 | vessel | 8.75E−01 | 9.94E−01 |
| chr16: 521904:521925 | neural | 8.73E−01 | 9.60E−01 |
| chr2: 43295338:43295363 | neural | 8.71E−01 | 9.72E−01 |
| chr2: 69345847:69345875 | vessel | 8.71E−01 | 9.63E−01 |
| chr2: 8360246:8360318 | vessel | 8.69E−01 | 9.60E−01 |
| chr2: 110103840:110103879 | vessel | 8.69E−01 | 9.44E−01 |
| chr10: 73767213:73767231 | neural | 8.67E−01 | 1.00E+00 |
| chr21: 39450802:39450857 | vessel | 8.64E−01 | 9.63E−01 |
| chr8: 23201701:23201725 | vessel | 8.63E−01 | 9.29E−01 |
| chr8: 96706051:96706130 | vessel | 8.63E−01 | 9.62E−01 |
| chr10: 17281034:17281085 | vessel | 8.63E−01 | 9.76E−01 |
| chr18: 9535925:9535962 | vessel | 8.62E−01 | 9.64E−01 |
| chr1: 196373497:196373569 | vessel | 8.61E−01 | 9.74E−01 |
| chr7: 73314135:73314205 | vessel | 8.61E−01 | 9.57E−01 |
| chr5: 168192470:168192555 | vessel | 8.59E−01 | 9.41E−01 |
| chr14: 83966994:83967047 | vessel | 8.59E−01 | 9.62E−01 |
| chr10: 14012644:14012740 | vessel | 8.59E−01 | 9.93E−01 |
| chr16: 4420959:4421041 | vessel | 8.59E−01 | 9.93E−01 |
| chr2: 8360333:8360384 | vessel | 8.58E−01 | 9.41E−01 |
| chr1: 2899575:2899616 | vessel | 8.57E−01 | 9.97E−01 |
| chr19: 41932380:41932387 | intestine | 8.57E−01 | 9.37E−01 |
| chr2: 232087015:232087102 | vessel | 8.56E−01 | 9.89E−01 |
| chr17: 738931:738960 | vessel | 8.56E−01 | 9.80E−01 |
| chr17: 48243247:48243305 | vessel | 8.55E−01 | 9.83E−01 |
| chr19: 768642:768715 | vessel | 8.54E−01 | 9.58E−01 |
| chr2: 38460795:38460935 | vessel | 8.54E−01 | 9.42E−01 |
| chr6: 57123002:57123073 | vessel | 8.53E−01 | 9.82E−01 |
| chr1: 243368706:243368788 | vessel | 8.53E−01 | 9.90E−01 |
| chr16: 73086441:73086558 | vessel | 8.53E−01 | 9.53E−01 |
| chr6: 1702288:1702366 | vessel | 8.52E−01 | 9.38E−01 |
| chr10: 45676961:45677042 | vessel | 8.52E−01 | 9.71E−01 |
| chr12: 20700689:20700721 | vessel | 8.52E−01 | 9.80E−01 |

TABLE 1a-continued

Top 10% tissue specific uMHL markers identified by GSI
uMHL Markers

| Region | Group | GSI | refMax |
|---|---|---|---|
| chr12: 20254130:20254176 | vessel | 8.51E-01 | 9.35E-01 |
| chr2: 3496911:3496968 | vessel | 8.51E-01 | 9.23E-01 |
| chr11: 69235366:69235449 | vessel | 8.51E-01 | 9.82E-01 |
| chr17: 38605979:38605996 | liver | 8.51E-01 | 1.00E+00 |
| chr8: 10001048:10001097 | neural | 8.50E-01 | 8.60E-01 |
| chr11: 44994687:44994725 | vessel | 8.50E-01 | 9.53E-01 |
| chr2: 110861027:110861197 | intestine | 8.50E-01 | 8.87E-01 |
| chr3: 64702129:64702144 | vessel | 8.49E-01 | 9.43E-01 |
| chr7: 73389579:73389642 | vessel | 8.49E-01 | 9.67E-01 |
| chr10: 14013737:14013765 | vessel | 8.49E-01 | 9.82E-01 |
| chr3: 4458679:4458863 | vessel | 8.49E-01 | 9.59E-01 |
| chr7: 703821:703897 | vessel | 8.49E-01 | 9.78E-01 |
| chr13: 101302763:101302821 | neural | 8.49E-01 | 8.35E-01 |
| chr19: 16178379:16178427 | vessel | 8.48E-01 | 9.83E-01 |
| chr7: 73389660:73389669 | vessel | 8.48E-01 | 9.48E-01 |
| chr2: 43492333:43492418 | vessel | 8.48E-01 | 9.47E-01 |
| chr14: 93113577:93113776 | vessel | 8.48E-01 | 9.56E-01 |
| chr22: 40845219:40845265 | vessel | 8.48E-01 | 9.59E-01 |
| chr1: 115610338:115610366 | vessel | 8.47E-01 | 9.66E-01 |
| chr6: 131312703:131312868 | vessel | 8.47E-01 | 9.70E-01 |
| chr16: 81520175:81520330 | vessel | 8.47E-01 | 9.83E-01 |
| chr20: 19474573:19474667 | vessel | 8.46E-01 | 9.81E-01 |
| chr1: 244217148:244217329 | neural | 8.46E-01 | 8.57E-01 |
| chr16: 49822649:49822660 | vessel | 8.46E-01 | 9.62E-01 |
| chr1: 202170004:202170040 | vessel | 8.46E-01 | 9.99E-01 |
| chr3: 8562700:8562922 | vessel | 8.46E-01 | 9.60E-01 |
| chr8: 1187134:1187185 | neural | 8.45E-01 | 1.00E+00 |
| chr15: 54832956:54833002 | vessel | 8.45E-01 | 9.57E-01 |
| chr11: 3168353:3168372 | vessel | 8.45E-01 | 9.83E-01 |
| chr12: 116864174:116864293 | vessel | 8.45E-01 | 9.69E-01 |
| chr17: 31128334:31128406 | vessel | 8.45E-01 | 9.83E-01 |
| chr2: 72162546:72162581 | vessel | 8.44E-01 | 9.72E-01 |
| chr9: 137553753:137553885 | vessel | 8.44E-01 | 9.59E-01 |
| chr16: 66957496:66957553 | vessel | 8.44E-01 | 9.88E-01 |
| chr6: 169568133:169568353 | vessel | 8.44E-01 | 9.36E-01 |
| chr8: 133466185:133466297 | vessel | 8.43E-01 | 9.54E-01 |
| chr12: 124774360:124774380 | vessel | 8.43E-01 | 1.00E+00 |
| chr19: 3466975:3467064 | vessel | 8.43E-01 | 9.82E-01 |
| chr9: 98829531:98829605 | vessel | 8.43E-01 | 9.58E-01 |
| chr17: 37279963:37280015 | vessel | 8.43E-01 | 9.39E-01 |
| chr9: 116247804:116247934 | vessel | 8.43E-01 | 9.72E-01 |
| chr1: 87223214:87223344 | vessel | 8.43E-01 | 9.52E-01 |
| chr11: 66138099:66138125 | intestine | 8.42E-01 | 9.22E-01 |
| chr5: 142533336:142533503 | vessel | 8.42E-01 | 9.86E-01 |
| chr7: 4065672:4065679 | vessel | 8.42E-01 | 9.66E-01 |
| chr17: 73831565:73831633 | vessel | 8.42E-01 | 9.67E-01 |
| chr16: 1373394:1373461 | neural | 8.42E-01 | 8.62E-01 |
| chr17: 40477211:40477303 | vessel | 8.42E-01 | 9.78E-01 |
| chr6: 165341974:165342035 | neural | 8.42E-01 | 8.81E-01 |
| chr18: 58648459:58648474 | vessel | 8.42E-01 | 9.33E-01 |
| chr10: 3928761:3928829 | vessel | 8.41E-01 | 9.68E-01 |
| chr15: 67457875:67458134 | vessel | 8.41E-01 | 9.44E-01 |
| chr19: 10233053:10233111 | vessel | 8.41E-01 | 9.42E-01 |
| chr18: 74171483:74171505 | vessel | 8.41E-01 | 9.92E-01 |
| chr22: 49409034:49409082 | vessel | 8.41E-01 | 9.19E-01 |
| chr21: 40047317:40047326 | vessel | 8.41E-01 | 9.33E-01 |
| chr1: 34451152:34451164 | vessel | 8.41E-01 | 9.86E-01 |
| chr9: 136357330:136357347 | vessel | 8.41E-01 | 1.00E+00 |
| chr9: 116681630:116681838 | vessel | 8.41E-01 | 9.21E-01 |
| chr7: 5011476:5011523 | esophagus | 8.41E-01 | 9.33E-01 |
| chr16: 87261081:87261131 | vessel | 8.39E-01 | 9.76E-01 |
| chr5: 172194371:172194450 | vessel | 8.39E-01 | 9.66E-01 |
| chr19: 32450501:32450625 | pancreas | 8.39E-01 | 8.40E-01 |
| chr15: 79052333:79052347 | vessel | 8.39E-01 | 1.00E+00 |
| chr12: 116756805:116756874 | vessel | 8.39E-01 | 9.58E-01 |
| chr12: 2457684:2457778 | vessel | 8.39E-01 | 9.96E-01 |
| chr13: 36273480:36273646 | vessel | 8.39E-01 | 9.52E-01 |
| chr2: 145764662:145764766 | vessel | 8.39E-01 | 9.62E-01 |
| chr4: 140968580:140968766 | vessel | 8.38E-01 | 9.44E-01 |
| chr7: 158890050:158890132 | vessel | 8.38E-01 | 9.15E-01 |
| chr3: 71586325:71586633 | vessel | 8.38E-01 | 9.82E-01 |
| chr3: 125819901:125819917 | vessel | 8.38E-01 | 9.20E-01 |
| chr18: 76551153:76551172 | vessel | 8.38E-01 | 9.48E-01 |
| chr22: 29347978:29348075 | vessel | 8.38E-01 | 9.88E-01 |
| chr2: 11526450:11526505 | vessel | 8.38E-01 | 9.49E-01 |
| chr14: 91765021:91765059 | vessel | 8.38E-01 | 9.94E-01 |
| chr2: 10544929:10545012 | vessel | 8.38E-01 | 9.64E-01 |
| chr2: 217839781:217839805 | vessel | 8.37E-01 | 9.71E-01 |
| chr12: 109179149:109179194 | vessel | 8.37E-01 | 9.33E-01 |
| chr1: 226128702:226128727 | vessel | 8.37E-01 | 9.38E-01 |
| chr7: 40240562:40240640 | vessel | 8.37E-01 | 9.49E-01 |
| chr14: 75039798:75039894 | vessel | 8.37E-01 | 9.50E-01 |
| chr20: 56721581:56721650 | vessel | 8.37E-01 | 9.64E-01 |
| chr8: 6652013:6652077 | vessel | 8.36E-01 | 9.56E-01 |
| chr16: 1146322:1146337 | vessel | 8.36E-01 | 9.60E-01 |
| chr10: 15667379:15667446 | vessel | 8.36E-01 | 9.69E-01 |
| chr15: 89560186:89560238 | vessel | 8.36E-01 | 9.35E-01 |
| chr7: 4707844:4707866 | vessel | 8.36E-01 | 9.43E-01 |
| chr5: 151082200:151082218 | vessel | 8.36E-01 | 8.84E-01 |
| chr3: 193715471:193715560 | vessel | 8.36E-01 | 9.58E-01 |
| chr9: 93727370:93727392 | vessel | 8.36E-01 | 9.47E-01 |
| chr8: 97596962:97597040 | vessel | 8.36E-01 | 9.38E-01 |
| chr21: 44484510:44485019 | vessel | 8.36E-01 | 9.71E-01 |
| chr3: 8279761:8279814 | vessel | 8.36E-01 | 9.59E-01 |
| chr16: 73454353:73454372 | vessel | 8.36E-01 | 9.45E-01 |
| chr3: 14279072:14279273 | vessel | 8.35E-01 | 9.78E-01 |
| chr6: 168498836:168498871 | pancreas | 8.35E-01 | 9.74E-01 |
| chr4: 173973114:173973166 | vessel | 8.35E-01 | 9.77E-01 |
| chr9: 74431770:74431840 | vessel | 8.35E-01 | 9.82E-01 |
| chr12: 2396495:2396507 | vessel | 8.35E-01 | 9.51E-01 |
| chr13: 109807772:109807837 | vessel | 8.34E-01 | 9.61E-01 |
| chr8: 145019179:145019191 | vessel | 8.34E-01 | 9.41E-01 |
| chr12: 109182282:109182346 | vessel | 8.34E-01 | 9.87E-01 |
| chr8: 23201626:23201644 | vessel | 8.34E-01 | 8.96E-01 |
| chr1: 171326156:171326309 | vessel | 8.34E-01 | 9.06E-01 |
| chr3: 30538064:30538174 | vessel | 8.34E-01 | 9.46E-01 |
| chr16: 68857417:68857469 | vessel | 8.34E-01 | 9.67E-01 |
| chr17: 60774267:60774330 | vessel | 8.34E-01 | 9.67E-01 |
| chr7: 64020677:64020788 | vessel | 8.34E-01 | 9.43E-01 |
| chr1: 201748589:201748658 | vessel | 8.34E-01 | 9.79E-01 |
| chr19: 18783073:18783151 | vessel | 8.34E-01 | 8.95E-01 |
| chr13: 112161714:112161827 | vessel | 8.34E-01 | 9.56E-01 |
| chr11: 117070485:117070493 | vessel | 8.34E-01 | 9.57E-01 |
| chr7: 128468433:128468462 | vessel | 8.34E-01 | 9.36E-01 |
| chr1: 2188830:2188947 | neural | 8.33E-01 | 8.29E-01 |
| chr8: 143695065:143695081 | neural | 8.33E-01 | 8.86E-01 |
| chr6: 71790637:71790777 | vessel | 8.33E-01 | 9.84E-01 |
| chr7: 73406729:73406811 | vessel | 8.33E-01 | 9.84E-01 |
| chr12: 1584268:1584438 | vessel | 8.33E-01 | 9.45E-01 |
| chr2: 1657462:1657556 | vessel | 8.33E-01 | 9.28E-01 |
| chr2: 121677850:121677924 | vessel | 8.33E-01 | 9.24E-01 |
| chr13: 99104177:99104223 | vessel | 8.33E-01 | 9.82E-01 |
| chr6: 23004460:23004497 | vessel | 8.33E-01 | 9.08E-01 |
| chr7: 33758956:33759144 | vessel | 8.33E-01 | 9.59E-01 |
| chr11: 65326863:65326909 | vessel | 8.33E-01 | 9.57E-01 |
| chr3: 134052418:134052557 | vessel | 8.33E-01 | 9.33E-01 |
| chr16: 1038028:1038079 | vessel | 8.33E-01 | 9.95E-01 |
| chr7: 25810506:25810570 | vessel | 8.32E-01 | 9.44E-01 |
| chr11: 19601607:19601696 | vessel | 8.32E-01 | 9.91E-01 |
| chr3: 54746711:54746836 | vessel | 8.32E-01 | 9.89E-01 |
| chr3: 126720805:126720813 | vessel | 8.32E-01 | 9.64E-01 |
| chr21: 46453929:46453954 | vessel | 8.32E-01 | 9.61E-01 |
| chr4: 6773182:6773272 | vessel | 8.32E-01 | 9.45E-01 |
| chr5: 149980906:149980972 | vessel | 8.32E-01 | 9.59E-01 |
| chr5: 77830138:77830190 | vessel | 8.32E-01 | 8.86E-01 |
| chr10: 80339365:80339515 | vessel | 8.32E-01 | 9.23E-01 |
| chr17: 12989679:12989753 | vessel | 8.32E-01 | 9.26E-01 |
| chr10: 114344929:114344989 | vessel | 8.32E-01 | 9.41E-01 |
| chr2: 36719487:36719574 | vessel | 8.32E-01 | 9.65E-01 |
| chr14: 75446146:75446254 | vessel | 8.32E-01 | 8.61E-01 |
| chr11: 133895052:133895366 | vessel | 8.32E-01 | 9.55E-01 |
| chr11: 62370671:62370715 | vessel | 8.31E-01 | 9.97E-01 |
| chr5: 52897443:52897563 | vessel | 8.31E-01 | 8.89E-01 |
| chr11: 130545528:130545623 | vessel | 8.31E-01 | 9.84E-01 |
| chr2: 217405801:217405854 | vessel | 8.31E-01 | 9.64E-01 |
| chr6: 169018100:169018147 | vessel | 8.31E-01 | 9.28E-01 |
| chr17: 75598600:75598659 | vessel | 8.31E-01 | 9.48E-01 |
| chr10: 45675475:45675491 | vessel | 8.31E-01 | 9.64E-01 |
| chr18: 53074420:53074508 | neural | 8.31E-01 | 7.93E-01 |
| chr2: 54199164:54199243 | vessel | 8.31E-01 | 9.28E-01 |

TABLE 1a-continued

Top 10% tissue specific uMHL markers identified by GSI
uMHL Markers

| Region | Group | GSI | refMax |
|---|---|---|---|
| chr5: 168451596:168451712 | vessel | 8.31E-01 | 9.28E-01 |
| chr2: 241185226:241185267 | vessel | 8.31E-01 | 9.35E-01 |
| chr7: 70120035:70120076 | vessel | 8.30E-01 | 9.39E-01 |
| chr10: 30109892:30109931 | vessel | 8.30E-01 | 9.74E-01 |
| chr7: 2951480:2951552 | vessel | 8.30E-01 | 9.50E-01 |
| chr16: 79166842:79167002 | vessel | 8.30E-01 | 9.67E-01 |
| chr1: 3464719:3464876 | vessel | 8.30E-01 | 9.07E-01 |
| chr13: 110775448:110775493 | vessel | 8.30E-01 | 9.19E-01 |
| chr20: 19272195:19272440 | vessel | 8.30E-01 | 9.84E-01 |
| chr1: 9386783:9386877 | vessel | 8.30E-01 | 9.70E-01 |
| chr6: 41549109:41549179 | vessel | 8.29E-01 | 9.60E-01 |
| chr11: 63826186:63826257 | neural | 8.29E-01 | 8.91E-01 |
| chr1: 3286118:3286163 | vessel | 8.29E-01 | 9.32E-01 |
| chr16: 88279603:88279618 | vessel | 8.29E-01 | 9.79E-01 |
| chr3: 187769246:187769343 | vessel | 8.29E-01 | 9.64E-01 |
| chr2: 121298318:121298336 | vessel | 8.29E-01 | 9.61E-01 |
| chr10: 87796214:87796244 | vessel | 8.29E-01 | 9.35E-01 |
| chr11: 111784374:111784426 | vessel | 8.29E-01 | 9.77E-01 |
| chr16: 49686422:49686568 | vessel | 8.29E-01 | 9.39E-01 |
| chr10: 711379:711694 | vessel | 8.28E-01 | 9.68E-01 |
| chr4: 71941315:71941425 | vessel | 8.28E-01 | 9.57E-01 |
| chr13: 52304379:52304567 | vessel | 8.28E-01 | 9.81E-01 |
| chr10: 10336914:10336945 | neural | 8.28E-01 | 8.62E-01 |
| chr15: 99498725:99498811 | vessel | 8.28E-01 | 9.59E-01 |
| chr15: 88153699:88153769 | vessel | 8.28E-01 | 9.76E-01 |
| chr5: 149980623:149980743 | vessel | 8.28E-01 | 9.73E-01 |
| chr15: 47765811:47765900 | vessel | 8.28E-01 | 9.64E-01 |
| chr15: 36894077:36894154 | vessel | 8.28E-01 | 9.72E-01 |
| chr3: 73414820:73414881 | vessel | 8.28E-01 | 9.26E-01 |
| chr10: 44197849:44197884 | pancreas | 8.28E-01 | 8.67E-01 |
| chr18: 60387698:60387879 | neural | 8.28E-01 | 8.60E-01 |
| chr20: 17822381:17822534 | vessel | 8.28E-01 | 9.58E-01 |
| chr13: 31470063:31470114 | vessel | 8.28E-01 | 9.67E-01 |
| chr2: 66074251:66074308 | vessel | 8.28E-01 | 9.59E-01 |
| chr9: 131398646:131398694 | pancreas | 8.28E-01 | 8.48E-01 |
| chr1: 234594452:234594635 | liver | 8.27E-01 | 8.36E-01 |
| chr11: 19778332:19778414 | vessel | 8.27E-01 | 9.35E-01 |
| chr6: 155593701:155593747 | neural | 8.27E-01 | 8.79E-01 |
| chr5: 1542556:1542597 | vessel | 8.27E-01 | 9.14E-01 |
| chr17: 2362969:2363062 | vessel | 8.27E-01 | 8.98E-01 |
| chr10: 131488146:131488308 | vessel | 8.27E-01 | 9.41E-01 |
| chr16: 86461393:86461510 | vessel | 8.27E-01 | 9.20E-01 |
| chr13: 111024091:111024104 | vessel | 8.27E-01 | 9.35E-01 |
| chr10: 105879872:105879934 | vessel | 8.27E-01 | 9.57E-01 |
| chr2: 216299024:216299143 | vessel | 8.27E-01 | 9.23E-01 |
| chr2: 206620645:206620696 | vessel | 8.27E-01 | 9.67E-01 |
| chr6: 90708046:90708215 | vessel | 8.27E-01 | 9.21E-01 |
| chr1: 3460222:3460269 | vessel | 8.27E-01 | 9.80E-01 |
| chr16: 88096861:88096956 | vessel | 8.27E-01 | 9.48E-01 |
| chr7: 159004650:159004678 | vessel | 8.26E-01 | 9.08E-01 |
| chr8: 22443383:22443437 | vessel | 8.26E-01 | 9.93E-01 |
| chr20: 35169012:35169055 | vessel | 8.26E-01 | 9.93E-01 |
| chr19: 39889822:39889941 | liver | 8.26E-01 | 8.82E-01 |
| chr10: 129721730:129721745 | vessel | 8.26E-01 | 9.38E-01 |
| chr4: 120636770:120636877 | intestine | 8.26E-01 | 8.81E-01 |
| chr5: 141628521:141628586 | vessel | 8.26E-01 | 9.23E-01 |
| chr5: 59792001:59792053 | vessel | 8.26E-01 | 9.75E-01 |
| chr6: 14925566:14925731 | vessel | 8.26E-01 | 9.37E-01 |
| chr3: 148729585:148729652 | vessel | 8.26E-01 | 9.84E-01 |
| chr5: 117889340:117889421 | vessel | 8.26E-01 | 9.03E-01 |
| chr18: 74918812:74918906 | vessel | 8.26E-01 | 9.13E-01 |
| chr19: 2523639:2523852 | vessel | 8.26E-01 | 9.87E-01 |
| chr2: 218692718:218692749 | vessel | 8.26E-01 | 9.67E-01 |
| chr7: 70133955:70134155 | vessel | 8.26E-01 | 9.19E-01 |
| chr14: 37504457:37504520 | vessel | 8.26E-01 | 9.28E-01 |
| chr2: 121371664:121371708 | vessel | 8.26E-01 | 9.93E-01 |
| chr1: 203491536:203491617 | vessel | 8.26E-01 | 9.47E-01 |
| chr11: 114237690:114237718 | vessel | 8.26E-01 | 9.20E-01 |
| chr13: 111000221:111000344 | vessel | 8.26E-01 | 9.10E-01 |
| chr18: 12646025:12646103 | vessel | 8.26E-01 | 9.00E-01 |
| chr11: 64631168:64631193 | vessel | 8.26E-01 | 9.61E-01 |
| chr7: 1135564:1135633 | vessel | 8.25E-01 | 9.72E-01 |
| chr5: 158945587:158945820 | vessel | 8.25E-01 | 9.58E-01 |
| chr18: 46353742:46353814 | vessel | 8.25E-01 | 9.54E-01 |
| chr2: 137330457:137330466 | vessel | 8.25E-01 | 9.43E-01 |
| chr5: 77844053:77844099 | vessel | 8.25E-01 | 9.26E-01 |
| chr5: 177694377:177694398 | vessel | 8.25E-01 | 9.18E-01 |
| chr20: 35168933:35168988 | vessel | 8.25E-01 | 9.46E-01 |
| chr3: 70048580:70048701 | vessel | 8.25E-01 | 9.41E-01 |
| chr11: 12097899:12098112 | vessel | 8.25E-01 | 9.52E-01 |
| chr2: 20055744:20055772 | vessel | 8.25E-01 | 9.46E-01 |
| chr1: 10614315:10614356 | liver | 8.25E-01 | 8.10E-01 |
| chr10: 14012441:14012468 | vessel | 8.25E-01 | 9.80E-01 |
| chr12: 111707943:111708004 | vessel | 8.25E-01 | 9.64E-01 |
| chr1: 3460137:3460182 | vessel | 8.25E-01 | 9.98E-01 |
| chr20: 17830926:17830968 | vessel | 8.25E-01 | 8.96E-01 |
| chr9: 133895273:133895401 | vessel | 8.25E-01 | 9.81E-01 |
| chr16: 68386106:68386174 | intestine | 8.25E-01 | 9.04E-01 |
| chr7: 2719029:2719102 | neural | 8.25E-01 | 9.63E-01 |
| chr2: 174060123:174060220 | vessel | 8.25E-01 | 9.47E-01 |
| chr11: 12136324:12136406 | vessel | 8.25E-01 | 9.86E-01 |
| chr2: 42226193:42226234 | vessel | 8.25E-01 | 9.50E-01 |
| chr22: 33313719:33313805 | vessel | 8.25E-01 | 9.73E-01 |
| chr11: 126033028:126033048 | vessel | 8.25E-01 | 9.75E-01 |
| chr11: 1418719:1418773 | neural | 8.25E-01 | 8.11E-01 |
| chr22: 31489110:31489197 | vessel | 8.24E-01 | 9.79E-01 |
| chr11: 45260506:45260585 | vessel | 8.24E-01 | 9.07E-01 |
| chr2: 47040392:47040486 | vessel | 8.24E-01 | 9.90E-01 |
| chr3: 186819136:186819178 | vessel | 8.24E-01 | 9.62E-01 |
| chr3: 9153801:9153977 | vessel | 8.24E-01 | 9.38E-01 |
| chr8: 73559260:73559345 | vessel | 8.24E-01 | 9.72E-01 |
| chr16: 29142419:29142508 | liver | 8.24E-01 | 9.36E-01 |
| chr1: 9410453:9410468 | vessel | 8.24E-01 | 9.66E-01 |
| chr21: 47512644:47512690 | vessel | 8.24E-01 | 9.36E-01 |
| chr9: 16247410:16247417 | vessel | 8.24E-01 | 9.76E-01 |
| chr18: 46309140:46309233 | vessel | 8.24E-01 | 9.79E-01 |
| chr3: 66413019:66413233 | vessel | 8.23E-01 | 9.14E-01 |
| chr20: 10641514:10641548 | vessel | 8.23E-01 | 9.54E-01 |
| chr10: 17280749:17280812 | vessel | 8.23E-01 | 9.77E-01 |
| chr7: 5592713:5592836 | intestine | 8.23E-01 | 8.14E-01 |
| chr14: 23318835:23318857 | vessel | 8.23E-01 | 9.86E-01 |
| chr7: 42779397:42779584 | vessel | 8.23E-01 | 9.61E-01 |
| chr1: 61914656:61914841 | vessel | 8.23E-01 | 9.79E-01 |
| chr19: 13962429:13962502 | vessel | 8.23E-01 | 9.20E-01 |
| chr4: 76270190:76270273 | vessel | 8.23E-01 | 9.13E-01 |
| chr10: 81915105:81915176 | vessel | 8.23E-01 | 9.79E-01 |
| chr11: 94573359:94573509 | vessel | 8.23E-01 | 9.41E-01 |
| chr11: 44729756:44729789 | vessel | 8.23E-01 | 9.53E-01 |
| chr7: 73424958:73425002 | vessel | 8.23E-01 | 9.17E-01 |
| chr8: 141960637:141960714 | vessel | 8.23E-01 | 8.98E-01 |
| chr2: 3452386:3452438 | fat | 8.23E-01 | 8.23E-01 |
| chr2: 101402810:101403044 | vessel | 8.23E-01 | 9.79E-01 |
| chr8: 77316559:77316617 | neural | 8.23E-01 | 8.38E-01 |
| chr2: 240733175:240733324 | vessel | 8.23E-01 | 9.25E-01 |
| chr15: 26135892:26136025 | vessel | 8.23E-01 | 9.09E-01 |
| chr2: 107193220:107193348 | vessel | 8.23E-01 | 9.14E-01 |
| chr20: 39392677:39392771 | vessel | 8.22E-01 | 9.35E-01 |
| chr1: 3314113:3314144 | vessel | 8.22E-01 | 8.57E-01 |
| chr8: 141057820:141057872 | vessel | 8.22E-01 | 9.57E-01 |
| chr10: 5660858:5660911 | vessel | 8.22E-01 | 9.61E-01 |
| chr5: 8696414:8696485 | vessel | 8.22E-01 | 9.70E-01 |
| chr13: 45289725:45289758 | vessel | 8.22E-01 | 9.17E-01 |
| chr7: 37039869:37039998 | vessel | 8.22E-01 | 9.52E-01 |
| chr12: 32293438:32293717 | neural | 8.22E-01 | 9.04E-01 |
| chr5: 2515778:2515802 | neural | 8.22E-01 | 8.27E-01 |
| chr10: 10336989:10337032 | neural | 8.22E-01 | 8.49E-01 |
| chr9: 72012687:72012707 | vessel | 8.22E-01 | 9.64E-01 |
| chr16: 88976391:88976404 | vessel | 8.22E-01 | 9.77E-01 |
| chr17: 30001481:30001529 | vessel | 8.22E-01 | 9.53E-01 |
| chr16: 80752918:80753020 | vessel | 8.22E-01 | 9.47E-01 |
| chr11: 130283367:130283389 | vessel | 8.22E-01 | 9.10E-01 |
| chr16: 72928691:72928785 | vessel | 8.22E-01 | 9.75E-01 |
| chr11: 10714431:10714466 | vessel | 8.22E-01 | 9.51E-01 |
| chr19: 18783185:18783216 | vessel | 8.22E-01 | 9.40E-01 |
| chr16: 61245717:61245888 | vessel | 8.22E-01 | 9.57E-01 |
| chr9: 129517613:129517699 | intestine | 8.21E-01 | 7.94E-01 |
| chr9: 124615315:124615387 | vessel | 8.21E-01 | 8.99E-01 |
| chr6: 15455978:15456143 | vessel | 8.21E-01 | 8.72E-01 |
| chr5: 137727491:137727661 | neural | 8.21E-01 | 8.51E-01 |
| chr3: 13560010:13560122 | vessel | 8.21E-01 | 9.49E-01 |

TABLE 1a-continued

Top 10% tissue specific uMHL markers identified by GSI
uMHL Markers

| Region | Group | GSI | refMax |
|---|---|---|---|
| chr1: 16346068:16346121 | vessel | 8.21E-01 | 9.30E-01 |
| chr10: 711944:712088 | vessel | 8.21E-01 | 9.18E-01 |
| chr22: 49412171:49412287 | vessel | 8.21E-01 | 9.49E-01 |
| chr2: 40355055:40355244 | vessel | 8.21E-01 | 9.16E-01 |
| chr22: 29146497:29146625 | vessel | 8.21E-01 | 9.23E-01 |
| chr16: 14418702:14418748 | vessel | 8.21E-01 | 9.57E-01 |
| chr21: 42496716:42496736 | vessel | 8.21E-01 | 9.44E-01 |
| chr2: 1820299:1820400 | vessel | 8.21E-01 | 9.69E-01 |
| chr13: 111922451:111922625 | vessel | 8.21E-01 | 9.42E-01 |
| chr7: 158207285:158207423 | neural | 8.21E-01 | 8.86E-01 |
| chr14: 75086815:75086860 | vessel | 8.21E-01 | 9.32E-01 |
| chr6: 45784561:45784755 | vessel | 8.21E-01 | 8.71E-01 |
| chr12: 98869058:98869255 | vessel | 8.21E-01 | 9.13E-01 |
| chr17: 39680190:39680212 | neural | 8.21E-01 | 9.27E-01 |
| chr2: 3473947:3474025 | vessel | 8.21E-01 | 9.20E-01 |
| chr6: 16725500:16725574 | vessel | 8.21E-01 | 9.80E-01 |
| chr3: 123419686:123419782 | vessel | 8.21E-01 | 1.00E+00 |
| chr5: 78099270:78099340 | vessel | 8.21E-01 | 9.53E-01 |
| chr4: 82057849:82058045 | vessel | 8.20E-01 | 9.35E-01 |
| chr7: 73465618:73465668 | vessel | 8.20E-01 | 9.54E-01 |
| chr7: 30818374:30818439 | vessel | 8.20E-01 | 9.14E-01 |
| chr4: 88461671:88461843 | vessel | 8.20E-01 | 9.81E-01 |
| chr1: 3459727:3459820 | vessel | 8.20E-01 | 9.70E-01 |
| chr12: 109179337:109179529 | vessel | 8.20E-01 | 9.65E-01 |
| chr14: 51237067:51237132 | vessel | 8.20E-01 | 9.13E-01 |
| chr3: 141151136:141151212 | vessel | 8.20E-01 | 9.68E-01 |
| chr1: 203541608:203541617 | vessel | 8.20E-01 | 9.70E-01 |
| chr18: 3622294:3622340 | vessel | 8.20E-01 | 9.36E-01 |
| chr1: 3459875:3459893 | vessel | 8.20E-01 | 9.34E-01 |
| chr12: 52938381:52938412 | vessel | 8.20E-01 | 9.74E-01 |
| chr4: 5736721:5736775 | vessel | 8.20E-01 | 9.30E-01 |
| chr1: 39933015:39933081 | vessel | 8.20E-01 | 9.80E-01 |
| chr19: 16178735:16178766 | vessel | 8.20E-01 | 9.03E-01 |
| chr20: 57473842:57473881 | vessel | 8.20E-01 | 9.78E-01 |
| chr12: 123738593:123738662 | vessel | 8.19E-01 | 9.66E-01 |
| chr16: 88677685:88677878 | neural | 8.19E-01 | 7.95E-01 |
| chr1: 3142374:3142411 | vessel | 8.19E-01 | 8.72E-01 |
| chr17: 57565015:57565070 | vessel | 8.19E-01 | 9.36E-01 |
| chr10: 134527781:134527839 | neural | 8.19E-01 | 8.61E-01 |
| chr10: 30083908:30083982 | vessel | 8.19E-01 | 9.79E-01 |
| chr2: 72366403:72366433 | vessel | 8.19E-01 | 9.41E-01 |
| chr4: 24732279:24732305 | vessel | 8.19E-01 | 9.72E-01 |
| chr17: 75861540:75861581 | vessel | 8.19E-01 | 8.97E-01 |
| chr7: 66935160:66935181 | vessel | 8.19E-01 | 9.33E-01 |
| chr14: 69410822:69410995 | vessel | 8.19E-01 | 9.15E-01 |
| chr5: 175119757:175119816 | vessel | 8.19E-01 | 9.77E-01 |
| chr16: 86965611:86965651 | vessel | 8.19E-01 | 9.94E-01 |
| chr5: 52658535:52658625 | vessel | 8.19E-01 | 9.62E-01 |
| chr5: 109775450:109775504 | vessel | 8.19E-01 | 9.29E-01 |
| chr5: 73234564:73234688 | vessel | 8.19E-01 | 9.39E-01 |
| chr2: 161777367:161777468 | vessel | 8.19E-01 | 9.72E-01 |
| chr13: 33922144:33922332 | vessel | 8.19E-01 | 9.79E-01 |
| chr7: 120164933:120164963 | vessel | 8.19E-01 | 9.30E-01 |
| chr13: 110918379:110918481 | vessel | 8.19E-01 | 9.16E-01 |
| chr17: 2011086:2011131 | vessel | 8.19E-01 | 9.69E-01 |
| chr9: 7984790:7984898 | vessel | 8.19E-01 | 9.40E-01 |
| chr18: 20682264:20682338 | intestine | 8.19E-01 | 8.40E-01 |
| chr7: 104978120:104978212 | vessel | 8.19E-01 | 9.63E-01 |
| chr5: 166634253:166634335 | vessel | 8.19E-01 | 9.03E-01 |
| chr18: 56534875:56534925 | vessel | 8.19E-01 | 9.70E-01 |
| chr3: 187988060:187988137 | vessel | 8.19E-01 | 9.76E-01 |
| chr10: 121438397:121438569 | vessel | 8.19E-01 | 9.68E-01 |
| chr19: 39182926:39182945 | vessel | 8.19E-01 | 9.35E-01 |
| chr13: 99667976:99668059 | neural | 8.18E-01 | 8.29E-01 |
| chr7: 127584205:127584527 | neural | 8.18E-01 | 8.66E-01 |
| chr11: 35651590:35651804 | vessel | 8.18E-01 | 9.19E-01 |
| chr11: 103407665:103407717 | vessel | 8.18E-01 | 8.98E-01 |
| chr7: 135433499:135433541 | vessel | 8.18E-01 | 9.64E-01 |
| chr1: 23098725:23098744 | vessel | 8.18E-01 | 9.51E-01 |
| chr1: 3494166:3494235 | vessel | 8.18E-01 | 9.52E-01 |
| chr2: 2107292:2107346 | neural | 8.18E-01 | 7.72E-01 |
| chr8: 101427557:101427651 | vessel | 8.18E-01 | 9.11E-01 |
| chr10: 14016066:14016097 | vessel | 8.18E-01 | 9.41E-01 |
| chr11: 10647667:10647725 | vessel | 8.18E-01 | 9.56E-01 |
| chr16: 75278952:75279001 | vessel | 8.18E-01 | 9.60E-01 |
| chr9: 124089044:124089101 | vessel | 8.18E-01 | 9.70E-01 |
| chr17: 21185776:21185831 | vessel | 8.18E-01 | 9.89E-01 |
| chr3: 11178498:11179102 | vessel | 8.17E-01 | 9.40E-01 |
| chr17: 57925734:57925805 | intestine | 8.17E-01 | 8.84E-01 |
| chr20: 16106391:16106635 | vessel | 8.17E-01 | 9.07E-01 |
| chr2: 241536131:241536192 | vessel | 8.17E-01 | 9.91E-01 |
| chr5: 76714624:76714674 | vessel | 8.17E-01 | 9.08E-01 |
| chr8: 42521965:42522125 | vessel | 8.17E-01 | 9.75E-01 |
| chr11: 36003464:36003500 | vessel | 8.17E-01 | 9.59E-01 |
| chr20: 23251275:23251362 | vessel | 8.17E-01 | 9.59E-01 |
| chr1: 168578476:168578512 | vessel | 8.17E-01 | 9.42E-01 |
| chr20: 50186917:50186939 | vessel | 8.17E-01 | 8.95E-01 |
| chr3: 49556866:49557077 | neural | 8.17E-01 | 8.96E-01 |
| chr10: 131324082:131324193 | vessel | 8.17E-01 | 9.67E-01 |
| chr1: 205780103:205780116 | vessel | 8.17E-01 | 9.51E-01 |
| chr1: 42003200:42003221 | vessel | 8.17E-01 | 9.57E-01 |
| chr11: 2730324:2730441 | vessel | 8.17E-01 | 9.80E-01 |
| chr5: 156988163:156988221 | vessel | 8.16E-01 | 8.84E-01 |
| chr19: 6744481:6744634 | vessel | 8.16E-01 | 8.99E-01 |
| chr20: 56472461:56472592 | liver | 8.16E-01 | 8.74E-01 |
| chr6: 1624318:1624399 | vessel | 8.16E-01 | 9.29E-01 |
| chr12: 106517592:106517795 | vessel | 8.16E-01 | 9.85E-01 |
| chr6: 44195262:44195347 | vessel | 8.16E-01 | 9.04E-01 |
| chr19: 39182585:39182856 | vessel | 8.16E-01 | 9.65E-01 |
| chr10: 126104092:126104263 | vessel | 8.16E-01 | 9.75E-01 |
| chr2: 66528170:66528286 | vessel | 8.16E-01 | 9.69E-01 |
| chr22: 19971912:19971946 | vessel | 8.16E-01 | 9.42E-01 |
| chr21: 47403346:47403426 | vessel | 8.16E-01 | 9.03E-01 |
| chr16: 87234734:87234896 | vessel | 8.16E-01 | 9.64E-01 |
| chr2: 38611005:38611050 | vessel | 8.16E-01 | 9.82E-01 |
| chr2: 12677328:12677416 | vessel | 8.16E-01 | 9.22E-01 |
| chr9: 101749596:101749621 | vessel | 8.16E-01 | 9.13E-01 |
| chr9: 92300357:92300439 | vessel | 8.16E-01 | 9.28E-01 |
| chr14: 76461726:76461806 | vessel | 8.16E-01 | 9.80E-01 |
| chr6: 159624504:159624617 | vessel | 8.16E-01 | 9.82E-01 |
| chr4: 57909186:57909239 | vessel | 8.16E-01 | 9.74E-01 |
| chr21: 40195044:40195130 | vessel | 8.16E-01 | 9.57E-01 |
| chr1: 2899714:2899770 | neural, vessel | 8.16E-01 | 9.66E-01 |
| chr1: 9384754:9384813 | vessel | 8.16E-01 | 9.67E-01 |
| chr16: 57149767:57149848 | neural | 8.16E-01 | 8.76E-01 |
| chr2: 1656844:1657056 | vessel | 8.16E-01 | 9.72E-01 |
| chr15: 68777293:68777315 | vessel | 8.16E-01 | 9.89E-01 |
| chr6: 164506404:164506437 | vessel | 8.16E-01 | 9.35E-01 |
| chr2: 218722879:218722891 | vessel | 8.15E-01 | 9.67E-01 |
| chr9: 137536001:137536060 | vessel | 8.15E-01 | 9.40E-01 |
| chr13: 106439974:106440058 | vessel | 8.15E-01 | 9.44E-01 |
| chr3: 123132072:123132158 | vessel | 8.15E-01 | 9.64E-01 |
| chr14: 105802382:105802561 | neural | 8.15E-01 | 7.82E-01 |
| chr18: 7607703:7607797 | vessel | 8.15E-01 | 8.85E-01 |
| chr1: 2868537:2868570 | vessel | 8.15E-01 | 8.53E-01 |
| chr19: 1081908:1081925 | intestine | 8.15E-01 | 9.06E-01 |
| chr7: 3322236:3322467 | vessel | 8.15E-01 | 9.44E-01 |
| chr19: 10464320:10464378 | liver | 8.15E-01 | 9.20E-01 |
| chr12: 125106220:125106281 | vessel | 8.15E-01 | 9.49E-01 |
| chr2: 242668092:242668152 | neural | 8.15E-01 | 8.47E-01 |
| chr15: 26050364:26050411 | vessel | 8.15E-01 | 9.66E-01 |
| chr16: 1033828:1033849 | neural | 8.15E-01 | 7.58E-01 |
| chr15: 92573244:92573323 | vessel | 8.15E-01 | 9.82E-01 |
| chr16: 29206978:29207023 | vessel | 8.15E-01 | 9.69E-01 |
| chr10: 50155412:50155484 | vessel | 8.15E-01 | 9.06E-01 |
| chr4: 7844482:7844728 | vessel | 8.15E-01 | 9.33E-01 |
| chr5: 177799176:177799310 | vessel | 8.15E-01 | 9.86E-01 |
| chr7: 71563965:71564049 | vessel | 8.15E-01 | 9.22E-01 |
| chr18: 77398817:77398865 | vessel | 8.15E-01 | 9.82E-01 |
| chr19: 15361966:15362035 | vessel | 8.15E-01 | 9.85E-01 |
| chr1: 156111362:156111379 | vessel | 8.15E-01 | 9.21E-01 |
| chr4: 141207852:141207918 | neural | 8.15E-01 | 8.40E-01 |
| chr18: 46316977:46317049 | vessel | 8.15E-01 | 9.60E-01 |
| chr19: 7580118:7580276 | vessel | 8.15E-01 | 9.76E-01 |
| chr2: 238322615:238322681 | vessel | 8.15E-01 | 9.55E-01 |
| chr11: 4726406:4726437 | vessel | 8.15E-01 | 9.63E-01 |
| chr16: 1243486:1243578 | liver | 8.14E-01 | 8.16E-01 |
| chr9: 101749649:101749733 | vessel | 8.14E-01 | 9.54E-01 |
| chr11: 12184939:12185109 | vessel | 8.14E-01 | 9.59E-01 |
| chr15: 26047396:26047413 | vessel | 8.14E-01 | 9.12E-01 |

TABLE 1a-continued

Top 10% tissue specific uMHL markers identified by GSI
uMHL Markers

| Region | Group | GSI | refMax |
|---|---|---|---|
| chr1: 204401170:204401223 | vessel | 8.14E-01 | 9.58E-01 |
| chr1: 59986591:59986617 | vessel | 8.14E-01 | 9.06E-01 |
| chr17: 43188128:43188157 | vessel | 8.14E-01 | 9.70E-01 |
| chr13: 24658482:24658536 | neural | 8.14E-01 | 7.67E-01 |
| chr5: 168168241:168168258 | vessel | 8.14E-01 | 8.15E-01 |
| chr1: 55909399:55909463 | vessel | 8.14E-01 | 9.66E-01 |
| chr2: 20001248:20001401 | vessel | 8.14E-01 | 9.92E-01 |
| chr22: 45907965:45908083 | vessel | 8.14E-01 | 9.42E-01 |
| chr8: 21499839:21499917 | vessel | 8.14E-01 | 9.58E-01 |
| chr1: 203526848:203526898 | vessel | 8.14E-01 | 9.59E-01 |
| chr6: 148561802:148561903 | vessel | 8.14E-01 | 9.39E-01 |
| chr2: 21676719:21676761 | vessel | 8.14E-01 | 9.26E-01 |
| chr21: 30502731:30502809 | vessel | 8.14E-01 | 9.58E-01 |
| chr15: 71621595:71621649 | vessel | 8.14E-01 | 9.32E-01 |
| chr2: 25078720:25078801 | vessel | 8.14E-01 | 9.30E-01 |
| chr6: 2355526:2355693 | vessel | 8.13E-01 | 9.42E-01 |
| chr19: 1136134:1136202 | intestine | 8.13E-01 | 8.14E-01 |
| chr5: 141628696:141628776 | vessel | 8.13E-01 | 9.55E-01 |
| chr14: 89895046:89895080 | vessel | 8.13E-01 | 8.91E-01 |
| chr19: 38485266:38485425 | pancreas | 8.13E-01 | 7.91E-01 |
| chr17: 42875273:42875297 | vessel | 8.13E-01 | 9.35E-01 |
| chr20: 50368876:50368956 | vessel | 8.13E-01 | 9.89E-01 |
| chr7: 75595987:75596208 | vessel | 8.13E-01 | 9.61E-01 |
| chr9: 80384641:80384724 | neural | 8.13E-01 | 8.16E-01 |
| chr10: 123901799:123901843 | vessel | 8.13E-01 | 9.40E-01 |
| chr13: 98082290:98082421 | neural | 8.13E-01 | 8.78E-01 |
| chr19: 33674931:33674961 | vessel | 8.13E-01 | 9.23E-01 |
| chr16: 88195380:88195408 | vessel | 8.13E-01 | 9.09E-01 |
| chr17: 8584339:8584382 | vessel | 8.13E-01 | 9.72E-01 |
| chr11: 44729854:44729898 | vessel | 8.13E-01 | 9.74E-01 |
| chr3: 129899423:129899521 | heart, vessel | 8.13E-01 | 9.71E-01 |
| chr17: 14047988:14048092 | vessel | 8.13E-01 | 9.35E-01 |
| chr22: 32976039:32976101 | liver | 8.13E-01 | 8.36E-01 |
| chr11: 57184788:57184846 | vessel | 8.13E-01 | 9.39E-01 |
| chr22: 43079771:43079865 | vessel | 8.13E-01 | 9.98E-01 |
| chr1: 32045230:32045272 | vessel | 8.13E-01 | 9.39E-01 |
| chr2: 242775475:242775494 | vessel | 8.13E-01 | 9.83E-01 |
| chr1: 2899810:2899955 | vessel | 8.13E-01 | 9.03E-01 |
| chr22: 47331564:47331659 | liver | 8.13E-01 | 8.83E-01 |
| chr6: 37046101:37046167 | vessel | 8.12E-01 | 9.11E-01 |
| chr4: 36056662:36056826 | vessel | 8.12E-01 | 9.21E-01 |
| chr2: 1566219:1566233 | vessel | 8.12E-01 | 8.87E-01 |
| chr1: 3282806:3282902 | vessel | 8.12E-01 | 9.80E-01 |
| chr12: 2749661:2749704 | vessel | 8.12E-01 | 9.48E-01 |
| chr7: 73119356:73119403 | vessel | 8.12E-01 | 8.94E-01 |
| chr21: 44690743:44690783 | neural | 8.12E-01 | 8.09E-01 |
| chr14: 104018772:104018857 | vessel | 8.12E-01 | 9.82E-01 |
| chr2: 46893583:46893684 | vessel | 8.12E-01 | 9.49E-01 |
| chr14: 95875180:95875232 | vessel | 8.12E-01 | 9.74E-01 |
| chr15: 27573948:27574019 | neural | 8.12E-01 | 8.87E-01 |
| chr20: 46756899:46756983 | vessel | 8.12E-01 | 9.89E-01 |
| chr2: 46531085:46531128 | vessel | 8.12E-01 | 9.51E-01 |
| chr1: 217203173:217203214 | vessel | 8.12E-01 | 9.66E-01 |
| chr18: 71442341:71442413 | vessel | 8.12E-01 | 8.94E-01 |
| chr7: 151133987:151134097 | vessel | 8.12E-01 | 9.16E-01 |
| chr2: 144282564:144282630 | vessel | 8.12E-01 | 9.76E-01 |
| chr3: 188624320:188624396 | vessel | 8.12E-01 | 9.38E-01 |
| chr16: 4092830:4092845 | vessel | 8.12E-01 | 9.07E-01 |
| chr9: 136437866:136437930 | vessel | 8.12E-01 | 9.56E-01 |
| chr1: 61657038:61657079 | vessel | 8.12E-01 | 9.58E-01 |
| chr8: 142420181:142420195 | vessel | 8.12E-01 | 9.40E-01 |
| chr8: 69783211:69783254 | vessel | 8.12E-01 | 9.73E-01 |
| chr17: 37833823:37833848 | vessel | 8.12E-01 | 9.77E-01 |
| chr11: 12255071:12255245 | vessel | 8.12E-01 | 9.29E-01 |
| chr15: 100708207:100708246 | vessel | 8.12E-01 | 9.37E-01 |
| chr16: 51868437:51868468 | vessel | 8.12E-01 | 9.06E-01 |
| chr17: 46343933:46343974 | intestine | 8.12E-01 | 8.75E-01 |
| chr10: 30110183:30110189 | vessel | 8.12E-01 | 8.90E-01 |
| chr8: 70846160:70846211 | vessel | 8.12E-01 | 9.12E-01 |
| chr7: 132037792:132037854 | vessel | 8.11E-01 | 9.53E-01 |
| chr16: 49686581:49686695 | vessel | 8.11E-01 | 9.46E-01 |
| chr17: 30821748:30821864 | neural | 8.11E-01 | 7.47E-01 |
| chr20: 24631061:24631099 | vessel | 8.11E-01 | 9.29E-01 |
| chr18: 74172210:74172240 | vessel | 8.11E-01 | 9.23E-01 |
| chr6: 41419353:41419617 | vessel | 8.11E-01 | 9.58E-01 |
| chr17: 78002601:78002654 | vessel | 8.11E-01 | 8.84E-01 |
| chr2: 99427338:99427414 | vessel | 8.11E-01 | 9.86E-01 |
| chr1: 156271781:156271977 | liver | 8.11E-01 | 8.87E-01 |
| chr15: 56208850:56209086 | vessel | 8.11E-01 | 9.61E-01 |
| chr19: 16178499:16178673 | vessel | 8.11E-01 | 8.57E-01 |
| chr9: 126081436:126081458 | vessel | 8.11E-01 | 9.68E-01 |
| chr5: 156988956:156989239 | neural | 8.11E-01 | 8.74E-01 |
| chr8: 23201483:23201545 | vessel | 8.11E-01 | 9.40E-01 |
| chr17: 12554165:12554199 | vessel | 8.11E-01 | 9.45E-01 |
| chr7: 2500197:2500212 | neural | 8.11E-01 | 7.78E-01 |
| chr11: 114167495:114167693 | vessel | 8.11E-01 | 9.80E-01 |
| chr12: 123579604:123579635 | vessel | 8.11E-01 | 9.18E-01 |
| chr5: 36569776:36569815 | vessel | 8.11E-01 | 9.62E-01 |
| chr9: 101721017:101721046 | vessel | 8.11E-01 | 9.44E-01 |
| chr11: 7507122:7507225 | vessel | 8.11E-01 | 9.34E-01 |
| chr16: 66737688:66737762 | vessel | 8.11E-01 | 9.54E-01 |
| chr19: 46286747:46286876 | vessel | 8.11E-01 | 9.81E-01 |
| chr2: 107381544:107381755 | vessel | 8.11E-01 | 8.53E-01 |
| chr17: 74736513:74736621 | vessel | 8.10E-01 | 9.65E-01 |
| chr13: 39205072:39205118 | vessel | 8.10E-01 | 9.40E-01 |
| chr9: 92277644:92277734 | neural | 8.10E-01 | 7.89E-01 |
| chr7: 465066:465102 | vessel | 8.10E-01 | 9.47E-01 |
| chr4: 41157591:41157674 | vessel | 8.10E-01 | 9.20E-01 |
| chr10: 131694575:131694682 | neural | 8.10E-01 | 8.35E-01 |
| chr2: 109788545:109788604 | vessel | 8.10E-01 | 9.53E-01 |
| chr9: 285924:285974 | vessel | 8.10E-01 | 9.13E-01 |
| chr1: 9431472:9431636 | vessel | 8.10E-01 | 9.65E-01 |
| chr18: 77246357:77246388 | vessel | 8.10E-01 | 9.48E-01 |
| chr16: 66652537:66652773 | vessel | 8.10E-01 | 9.71E-01 |
| chr19: 3466761:3466827 | vessel | 8.10E-01 | 9.39E-01 |
| chr2: 1565960:1566095 | vessel | 8.10E-01 | 8.86E-01 |
| chr12: 123963634:123963661 | vessel | 8.10E-01 | 9.71E-01 |
| chr13: 21572143:21572171 | vessel | 8.10E-01 | 9.65E-01 |
| chr14: 52373819:52373891 | vessel | 8.10E-01 | 9.29E-01 |
| chr1: 9436026:9436361 | vessel | 8.10E-01 | 9.81E-01 |
| chr15: 100851337:100851552 | vessel | 8.10E-01 | 9.56E-01 |
| chr10: 13801406:13801461 | vessel | 8.10E-01 | 8.38E-01 |
| chr12: 47491451:47491535 | vessel | 8.10E-01 | 9.70E-01 |
| chr12: 57197704:57197748 | vessel | 8.10E-01 | 9.71E-01 |
| chr17: 77460860:77460869 | neural | 8.10E-01 | 8.69E-01 |
| chr7: 143169791:143169807 | intestine | 8.10E-01 | 7.65E-01 |
| chr15: 92462388:92462506 | vessel | 8.10E-01 | 9.12E-01 |
| chr10: 11733400:11733428 | vessel | 8.10E-01 | 9.38E-01 |
| chr6: 1867570:1867643 | pancreas | 8.09E-01 | 8.40E-01 |
| chr13: 113698994:113699050 | neural | 8.09E-01 | 7.75E-01 |
| chr12: 77624317:77624349 | vessel | 8.09E-01 | 9.63E-01 |
| chr2: 12461342:12461469 | vessel | 8.09E-01 | 9.53E-01 |
| chr11: 12352080:12352113 | neural | 8.09E-01 | 8.04E-01 |
| chr18: 72063318:72063459 | vessel | 8.09E-01 | 9.14E-01 |
| chr21: 44162140:44162220 | vessel | 8.09E-01 | 9.31E-01 |
| chr13: 99023307:99023384 | vessel | 8.09E-01 | 9.91E-01 |
| chr1: 179322741:179322768 | vessel | 8.09E-01 | 9.68E-01 |
| chr9: 126927295:126927337 | vessel | 8.09E-01 | 9.43E-01 |
| chr6: 85592864:85592982 | vessel | 8.09E-01 | 9.46E-01 |
| chr8: 106155638:106155841 | neural | 8.09E-01 | 8.65E-01 |
| chr13: 23951893:23951910 | vessel | 8.09E-01 | 9.70E-01 |
| chr22: 27501587:27501648 | vessel | 8.09E-01 | 8.66E-01 |
| chr1: 7728694:7728716 | neural | 8.09E-01 | 7.96E-01 |
| chr9: 137554083:137554352 | vessel | 8.09E-01 | 9.53E-01 |
| chr18: 53074062:53074313 | neural | 8.09E-01 | 8.70E-01 |
| chr16: 72892761:72892801 | vessel | 8.09E-01 | 9.49E-01 |
| chr10: 44339266:44339451 | vessel | 8.09E-01 | 9.17E-01 |
| chr10: 126724009:126724099 | vessel | 8.09E-01 | 9.27E-01 |
| chr9: 73204687:73204768 | vessel | 8.09E-01 | 9.63E-01 |
| chr22: 31440272:31440362 | vessel | 8.09E-01 | 9.83E-01 |
| chr20: 44457872:44457929 | vessel | 8.09E-01 | 8.28E-01 |
| chr16: 79751767:79751800 | vessel | 8.09E-01 | 8.38E-01 |
| chr1: 22658835:22658882 | vessel | 8.09E-01 | 8.65E-01 |
| chr2: 8389473:8389584 | vessel | 8.09E-01 | 9.80E-01 |
| chr7: 98719280:98719357 | vessel | 8.09E-01 | 9.45E-01 |
| chr1: 203526708:203526778 | vessel | 8.09E-01 | 9.86E-01 |
| chr5: 53742361:53742402 | vessel | 8.09E-01 | 9.19E-01 |
| chr2: 1820467:1820494 | vessel | 8.08E-01 | 8.77E-01 |
| chr15: 69841259:69841298 | vessel | 8.08E-01 | 9.39E-01 |

TABLE 1a-continued

Top 10% tissue specific uMHL markers identified by GSI
uMHL Markers

| Region | Group | GSI | refMax |
|---|---|---|---|
| chr20: 61013114:61013193 | vessel | 8.08E−01 | 9.26E−01 |
| chr15: 76470078:76470143 | vessel | 8.08E−01 | 9.68E−01 |
| chr7: 70480615:70480687 | vessel | 8.08E−01 | 8.88E−01 |
| chr9: 116362067:116362205 | vessel | 8.08E−01 | 8.40E−01 |
| chr3: 48732676:48732782 | neural | 8.08E−01 | 8.43E−01 |
| chr10: 103406210:103406384 | vessel | 8.08E−01 | 9.45E−01 |
| chr7: 30885459:30885500 | vessel | 8.08E−01 | 9.82E−01 |
| chr15: 92509445:92509609 | vessel | 8.08E−01 | 9.34E−01 |
| chr15: 84361392:84361425 | vessel | 8.08E−01 | 9.40E−01 |
| chr2: 238322190:238322513 | vessel | 8.08E−01 | 9.58E−01 |
| chr3: 196910630:196910640 | neural | 8.08E−01 | 8.13E−01 |
| chr20: 50187210:50187265 | vessel | 8.08E−01 | 9.67E−01 |
| chr2: 48710712:48710871 | vessel | 8.08E−01 | 9.51E−01 |
| chr18: 34366845:34366901 | vessel | 8.08E−01 | 9.40E−01 |
| chr21: 43147530:43147588 | vessel | 8.08E−01 | 9.70E−01 |
| chr11: 36037604:36037621 | vessel | 8.08E−01 | 9.24E−01 |
| chr6: 160257580:160257599 | vessel | 8.08E−01 | 9.58E−01 |
| chr15: 66914008:66914032 | vessel | 8.08E−01 | 9.67E−01 |
| chr10: 134881126:134881168 | vessel | 8.08E−01 | 9.23E−01 |
| chr7: 7032037:7032089 | intestine | 8.08E−01 | 9.17E−01 |
| chr10: 13881755:13881845 | vessel | 8.08E−01 | 9.46E−01 |
| chr6: 11214781:11215022 | vessel | 8.08E−01 | 9.81E−01 |
| chr14: 76446554:76446750 | vessel | 8.08E−01 | 9.56E−01 |
| chr12: 124004371:124004416 | vessel | 8.08E−01 | 9.48E−01 |
| chr1: 112400108:112400129 | neural | 8.08E−01 | 8.33E−01 |
| chr15: 74496556:74496593 | vessel | 8.07E−01 | 9.46E−01 |
| chr10: 126749370:126749418 | vessel | 8.07E−01 | 9.55E−01 |
| chr13: 49528296:49528490 | vessel | 8.07E−01 | 9.66E−01 |
| chr7: 135440322:135440342 | vessel | 8.07E−01 | 8.04E−01 |
| chr10: 16869686:16869746 | vessel | 8.07E−01 | 9.52E−01 |
| chr21: 32532775:32532824 | neural | 8.07E−01 | 8.82E−01 |
| chr9: 97682657:97682800 | vessel | 8.07E−01 | 9.53E−01 |
| chr20: 49982779:49982992 | vessel | 8.07E−01 | 9.52E−01 |
| chr16: 19872075:19872241 | vessel | 8.07E−01 | 9.51E−01 |
| chr9: 92300116:92300178 | vessel | 8.07E−01 | 9.54E−01 |
| chr6: 37045638:37045671 | vessel | 8.07E−01 | 9.71E−01 |
| chr1: 225838270:225838425 | vessel | 8.07E−01 | 9.04E−01 |
| chr2: 5701195:5701296 | vessel | 8.07E−01 | 9.68E−01 |
| chr1: 19740620:19740711 | vessel | 8.07E−01 | 9.07E−01 |
| chr21: 44161774:44161828 | vessel | 8.07E−01 | 9.53E−01 |
| chr6: 143434808:143435073 | liver | 8.07E−01 | 8.80E−01 |
| chr10: 121040981:121041031 | vessel | 8.07E−01 | 9.32E−01 |
| chr6: 154795868:154796097 | vessel | 8.07E−01 | 8.55E−01 |
| chr2: 233105800:233105832 | kidney | 8.07E−01 | 7.86E−01 |
| chr1: 2006023:2006038 | neural | 8.07E−01 | 7.73E−01 |
| chr1: 241912764:241912999 | vessel | 8.07E−01 | 8.86E−01 |
| chr1: 80251396:80251438 | vessel | 8.07E−01 | 9.04E−01 |
| chr8: 89270337:89270376 | vessel | 8.07E−01 | 9.38E−01 |
| chr8: 22458405:22458469 | vessel | 8.07E−01 | 8.77E−01 |
| chr5: 107754120:107754132 | vessel | 8.07E−01 | 9.57E−01 |
| chr3: 194493573:194493711 | vessel | 8.07E−01 | 9.55E−01 |
| chr5: 158224572:158224690 | vessel | 8.07E−01 | 9.82E−01 |
| chr2: 20262560:20262730 | vessel | 8.07E−01 | 8.69E−01 |
| chr19: 3460058:3460132 | vessel | 8.07E−01 | 9.41E−01 |
| chr9: 92503363:92503383 | vessel | 8.07E−01 | 9.51E−01 |
| chr18: 46375226:46375356 | vessel | 8.07E−01 | 9.01E−01 |
| chr20: 17850931:17851022 | vessel | 8.06E−01 | 9.04E−01 |
| chr19: 2186543:2186661 | vessel | 8.06E−01 | 9.61E−01 |
| chr9: 97682842:97683006 | vessel | 8.06E−01 | 9.71E−01 |
| chr6: 158460945:158461070 | vessel | 8.06E−01 | 9.43E−01 |
| chr9: 2816879:2817023 | vessel | 8.06E−01 | 9.76E−01 |
| chr1: 183187558:183187637 | vessel | 8.06E−01 | 9.47E−01 |
| chr12: 121344919:121344964 | vessel | 8.06E−01 | 9.67E−01 |
| chr20: 35169120:35169198 | vessel | 8.06E−01 | 9.00E−01 |
| chr15: 86185647:86185814 | vessel | 8.06E−01 | 9.46E−01 |
| chr16: 84617788:84617843 | vessel | 8.06E−01 | 9.38E−01 |
| chr17: 43926509:43926525 | vessel | 8.06E−01 | 9.65E−01 |
| chr8: 30420219:30420335 | vessel | 8.06E−01 | 9.57E−01 |
| chr6: 16541787:16541933 | vessel | 8.06E−01 | 9.64E−01 |
| chr17: 78999585:78999726 | neural | 8.06E−01 | 8.25E−01 |
| chr10: 16759844:16759898 | vessel | 8.06E−01 | 9.28E−01 |
| chr14: 95875024:95875083 | vessel | 8.06E−01 | 9.93E−01 |
| chr21: 34192080:34192208 | vessel | 8.06E−01 | 9.26E−01 |
| chr21: 46454122:46454165 | vessel | 8.06E−01 | 9.39E−01 |
| chr18: 13436078:13436235 | vessel | 8.06E−01 | 9.80E−01 |
| chr10: 130094981:130095001 | vessel | 8.06E−01 | 9.48E−01 |
| chr6: 169178590:169178687 | vessel | 8.06E−01 | 9.89E−01 |
| chr15: 58815128:58815195 | vessel | 8.06E−01 | 9.20E−01 |
| chr2: 67487963:67487997 | vessel | 8.06E−01 | 8.92E−01 |
| chr18: 72913659:72913731 | vessel | 8.06E−01 | 9.16E−01 |
| chr22: 23624534:23624645 | vessel | 8.06E−01 | 9.44E−01 |
| chr12: 2494075:2494199 | vessel | 8.06E−01 | 9.18E−01 |
| chr17: 55663160:55663251 | vessel | 8.06E−01 | 8.71E−01 |
| chr2: 65543343:65543411 | vessel | 8.06E−01 | 9.81E−01 |
| chr20: 56305784:56305798 | vessel | 8.06E−01 | 9.53E−01 |
| chr18: 43097228:43097251 | vessel | 8.06E−01 | 9.86E−01 |
| chr9: 98829385:98829459 | vessel | 8.06E−01 | 9.00E−01 |
| chr9: 98812048:98812090 | vessel | 8.06E−01 | 9.27E−01 |
| chr12: 93521229:93521358 | vessel | 8.06E−01 | 9.68E−01 |
| chr10: 3146921:3146961 | vessel | 8.06E−01 | 9.36E−01 |
| chr19: 28609319:28609354 | vessel | 8.06E−01 | 8.70E−01 |
| chr13: 113698901:113698952 | neural | 8.06E−01 | 7.96E−01 |
| chr2: 216298546:216298643 | vessel | 8.05E−01 | 9.78E−01 |
| chr1: 2991642:2991733 | vessel | 8.05E−01 | 9.61E−01 |
| chr17: 76858155:76858303 | vessel | 8.05E−01 | 9.78E−01 |
| chr17: 19390397:19390458 | vessel | 8.05E−01 | 9.75E−01 |
| chr4: 1205974:1206025 | vessel | 8.05E−01 | 9.28E−01 |
| chr11: 11606063:11606090 | vessel | 8.05E−01 | 9.75E−01 |
| chr7: 22757575:22757624 | vessel | 8.05E−01 | 9.70E−01 |
| chr11: 19752027:19752292 | vessel | 8.05E−01 | 9.37E−01 |
| chr9: 97587850:97588035 | vessel | 8.05E−01 | 9.29E−01 |
| chr2: 375931:375958 | vessel | 8.05E−01 | 9.16E−01 |
| chr17: 71773282:71773397 | vessel | 8.05E−01 | 9.61E−01 |
| chr12: 128807935:128807959 | vessel | 8.05E−01 | 9.65E−01 |
| chr13: 23732081:23732140 | vessel | 8.05E−01 | 9.48E−01 |
| chr3: 59003065:59003100 | liver | 8.05E−01 | 8.20E−01 |
| chr1: 157984204:157984269 | vessel | 8.05E−01 | 9.40E−01 |
| chr7: 55112569:55112635 | vessel | 8.05E−01 | 9.85E−01 |
| chr20: 17830714:17830792 | vessel | 8.05E−01 | 9.31E−01 |
| chr4: 95331866:95332202 | vessel | 8.05E−01 | 9.51E−01 |
| chr3: 122692837:122692868 | vessel | 8.05E−01 | 9.03E−01 |
| chr16: 2177303:2177329 | neural, vessel | 8.05E−01 | 1.00E+00 |
| chr15: 85826138:85826201 | vessel | 8.05E−01 | 8.76E−01 |
| chr14: 76461910:76462138 | vessel | 8.05E−01 | 9.54E−01 |
| chr5: 155755991:155756019 | vessel | 8.05E−01 | 8.44E−01 |
| chr4: 57922136:57922184 | vessel | 8.05E−01 | 9.57E−01 |
| chr9: 15401524:15401532 | vessel | 8.05E−01 | 9.68E−01 |
| chr19: 3603394:3603412 | vessel | 8.05E−01 | 9.17E−01 |
| chr19: 47316636:47316653 | vessel | 8.05E−01 | 8.82E−01 |
| chr11: 76360139:76360318 | vessel | 8.05E−01 | 8.86E−01 |
| chr10: 729913:729968 | vessel | 8.05E−01 | 9.23E−01 |
| chr11: 114003718:114003831 | vessel | 8.05E−01 | 9.42E−01 |
| chr17: 75775848:75775881 | vessel | 8.05E−01 | 9.53E−01 |
| chr12: 116737894:116737988 | vessel | 8.05E−01 | 9.32E−01 |
| chr21: 44694448:44694461 | liver | 8.04E−01 | 8.95E−01 |
| chr5: 167372652:167372700 | vessel | 8.04E−01 | 9.18E−01 |
| chr10: 61408493:61408669 | vessel | 8.04E−01 | 9.36E−01 |
| chr5: 156989353:156989478 | vessel | 8.04E−01 | 9.34E−01 |
| chr8: 97419822:97419867 | vessel | 8.04E−01 | 9.02E−01 |
| chr8: 22516858:22516919 | vessel | 8.04E−01 | 9.54E−01 |
| chr6: 38237680:38237861 | vessel | 8.04E−01 | 9.53E−01 |
| chr1: 37773917:37773943 | neural | 8.04E−01 | 7.70E−01 |
| chr7: 95818174:95818283 | vessel | 8.04E−01 | 9.66E−01 |
| chr7: 73428567:73428618 | vessel | 8.04E−01 | 9.58E−01 |
| chr13: 114632959:114633003 | vessel | 8.04E−01 | 9.20E−01 |
| chr1: 59912018:59912049 | vessel | 8.04E−01 | 9.35E−01 |
| chr2: 109941286:109941359 | vessel | 8.04E−01 | 8.91E−01 |
| chr1: 168054694:168054754 | vessel | 8.04E−01 | 9.53E−01 |
| chr3: 69061666:69061765 | vessel | 8.04E−01 | 9.66E−01 |
| chr6: 2382649:2382767 | vessel | 8.04E−01 | 9.59E−01 |
| chr12: 63124047:63124109 | vessel | 8.04E−01 | 9.21E−01 |
| chr14: 73025645:73025673 | vessel | 8.04E−01 | 9.50E−01 |
| chr15: 25813912:25814131 | vessel | 8.04E−01 | 9.46E−01 |
| chr21: 40044046:40044198 | vessel | 8.04E−01 | 9.52E−01 |
| chr19: 38526875:38526924 | vessel | 8.04E−01 | 9.34E−01 |
| chr2: 67488351:67488376 | vessel | 8.04E−01 | 9.53E−01 |
| chr17: 117230:117455 | vessel | 8.04E−01 | 9.76E−01 |
| chr4: 3703023:3703043 | vessel | 8.04E−01 | 9.47E−01 |
| chr18: 73882379:73882586 | intestine | 8.04E−01 | 7.71E−01 |
| chr16: 77465342:77465471 | vessel | 8.04E−01 | 8.69E−01 |

TABLE 1a-continued

Top 10% tissue specific uMHL markers identified by GSI
uMHL Markers

| Region | Group | GSI | refMax |
| --- | --- | --- | --- |
| chr14: 91750605:91750669 | vessel | 8.04E−01 | 9.33E−01 |
| chr11: 44028454:44028472 | vessel | 8.04E−01 | 9.13E−01 |
| chr2: 9377096:9377111 | vessel | 8.04E−01 | 9.67E−01 |
| chr20: 62166877:62166882 | liver | 8.03E−01 | 9.93E−01 |
| chr15: 81384367:81384382 | kidney | 8.03E−01 | 7.88E−01 |
| chr12: 106246647:106246707 | vessel | 8.03E−01 | 9.89E−01 |
| chr2: 79807509:79807533 | vessel | 8.03E−01 | 8.49E−01 |
| chr7: 39793986:39794185 | vessel | 8.03E−01 | 9.14E−01 |
| chr17: 12553963:12554077 | vessel | 8.03E−01 | 9.40E−01 |
| chr3: 194961215:194961310 | vessel | 8.03E−01 | 9.57E−01 |
| chr5: 176884349:176884370 | vessel | 8.03E−01 | 9.77E−01 |
| chr4: 24732341:24732420 | vessel | 8.03E−01 | 9.63E−01 |
| chr22: 20186181:20186409 | intestine | 8.03E−01 | 7.68E−01 |
| chr3: 123397265:123397302 | vessel | 8.03E−01 | 9.79E−01 |
| chr1: 212734867:212734967 | vessel | 8.03E−01 | 9.75E−01 |
| chr9: 89882438:89882551 | vessel | 8.03E−01 | 9.42E−01 |
| chr6: 150848318:150848392 | vessel | 8.03E−01 | 9.59E−01 |
| chr15: 61073748:61073811 | vessel | 8.03E−01 | 8.65E−01 |
| chr3: 126720886:126721050 | vessel | 8.03E−01 | 9.77E−01 |
| chr21: 25397216:25397285 | vessel | 8.03E−01 | 9.59E−01 |
| chr2: 8143877:8143939 | vessel | 8.03E−01 | 9.97E−01 |
| chr16: 82336047:82336082 | vessel | 8.03E−01 | 9.42E−01 |
| chr9: 738321:738429 | vessel | 8.03E−01 | 9.02E−01 |
| chr5: 77843468:77843772 | vessel | 8.03E−01 | 9.25E−01 |
| chr5: 65165845:65165992 | intestine | 8.03E−01 | 8.30E−01 |
| chr16: 1037729:1037750 | vessel | 8.03E−01 | 8.66E−01 |
| chr9: 36566815:36566887 | vessel | 8.03E−01 | 9.76E−01 |
| chr1: 2900163:2900177 | vessel | 8.03E−01 | 9.39E−01 |
| chr2: 218805147:218805216 | vessel | 8.03E−01 | 9.53E−01 |
| chr16: 88976144:88976169 | vessel | 8.03E−01 | 9.71E−01 |
| chr1: 32220068:32220206 | neural | 8.03E−01 | 8.26E−01 |
| chr20: 49983123:49983144 | vessel | 8.03E−01 | 9.11E−01 |
| chr7: 30947529:30947552 | vessel | 8.03E−01 | 9.48E−01 |
| chr2: 97572877:97572933 | vessel | 8.03E−01 | 9.59E−01 |
| chr5: 111890374:111890446 | vessel | 8.03E−01 | 9.57E−01 |
| chr10: 50346525:50346634 | vessel | 8.02E−01 | 8.45E−01 |
| chr10: 100151545:100151593 | vessel | 8.02E−01 | 9.76E−01 |
| chr20: 48651408:48651539 | vessel | 8.02E−01 | 9.53E−01 |
| chr5: 138440901:138441072 | vessel | 8.02E−01 | 9.50E−01 |
| chr13: 40090279:40090501 | vessel | 8.02E−01 | 9.20E−01 |
| chr8: 22516977:22517039 | vessel | 8.02E−01 | 9.26E−01 |
| chr12: 125332183:125332213 | neural | 8.02E−01 | 8.43E−01 |
| chr8: 30658350:30658451 | vessel | 8.02E−01 | 8.37E−01 |
| chr10: 10312643:10312797 | vessel | 8.02E−01 | 8.86E−01 |
| chr22: 44484948:44485088 | vessel | 8.02E−01 | 9.42E−01 |
| chr2: 138721303:138721318 | liver | 8.02E−01 | 9.18E−01 |
| chr16: 16161126:16161243 | vessel | 8.02E−01 | 9.40E−01 |
| chr2: 97019386:97019473 | vessel | 8.02E−01 | 9.83E−01 |
| chr20: 24568297:24568342 | neural | 8.02E−01 | 7.78E−01 |
| chr19: 15360079:15360255 | vessel | 8.02E−01 | 9.06E−01 |
| chr22: 44756580:44756669 | vessel | 8.02E−01 | 9.47E−01 |
| chr22: 29726826:29726886 | kidney | 8.02E−01 | 9.21E−01 |
| chr18: 59685565:59685607 | vessel | 8.02E−01 | 9.01E−01 |
| chr5: 168477679:168477730 | vessel | 8.02E−01 | 9.07E−01 |
| chr20: 50187002:50187064 | vessel | 8.02E−01 | 9.17E−01 |
| chr18: 46468631:46468643 | vessel | 8.02E−01 | 9.55E−01 |
| chr4: 159011359:159011402 | vessel | 8.02E−01 | 9.82E−01 |
| chr1: 3446617:3446738 | vessel | 8.01E−01 | 9.87E−01 |
| chr5: 170910865:170910881 | vessel | 8.01E−01 | 9.44E−01 |
| chr5: 101493402:101493492 | vessel | 8.01E−01 | 8.57E−01 |
| chr19: 18782908:18783006 | vessel | 8.01E−01 | 8.00E−01 |
| chr4: 169765695:169765832 | vessel | 8.01E−01 | 9.79E−01 |
| chr11: 12182856:12182943 | vessel | 8.01E−01 | 9.38E−01 |
| chr3: 98988954:98989145 | vessel | 8.01E−01 | 9.72E−01 |
| chr2: 28958706:28958762 | vessel | 8.01E−01 | 9.29E−01 |
| chr17: 77069737:77069835 | vessel | 8.01E−01 | 9.47E−01 |
| chr15: 101912443:101912517 | vessel | 8.01E−01 | 9.09E−01 |
| chr12: 124959289:124959504 | vessel | 8.01E−01 | 9.17E−01 |
| chr11: 122205905:122205985 | vessel | 8.01E−01 | 8.54E−01 |
| chr21: 39903689:39903803 | vessel | 8.01E−01 | 9.42E−01 |
| chr11: 75269142:75269197 | vessel | 8.01E−01 | 9.60E−01 |
| chr20: 10616067:10616113 | vessel | 8.01E−01 | 9.57E−01 |
| chr9: 73539583:73539651 | vessel | 8.01E−01 | 9.47E−01 |
| chr6: 12349194:12349298 | vessel | 8.01E−01 | 9.30E−01 |
| chr7: 6291930:6292069 | vessel | 8.01E−01 | 9.02E−01 |
| chr2: 1820169:1820243 | vessel | 8.01E−01 | 8.40E−01 |
| chr8: 25936821:25936871 | vessel | 8.01E−01 | 9.56E−01 |
| chr11: 10715379:10715450 | vessel | 8.01E−01 | 9.66E−01 |
| chr20: 35169310:35169362 | vessel | 8.01E−01 | 9.68E−01 |
| chr9: 127047244:127047277 | vessel | 8.01E−01 | 9.61E−01 |
| chr12: 124925719:124925860 | vessel | 8.01E−01 | 9.17E−01 |
| chr6: 157039978:157040028 | vessel | 8.01E−01 | 8.63E−01 |
| chr12: 54071769:54071918 | neural | 8.01E−01 | 8.47E−01 |
| chr16: 4001865:4002028 | vessel | 8.00E−01 | 9.70E−01 |
| chr18: 13542218:13542473 | liver | 8.00E−01 | 8.54E−01 |
| chr3: 71213389:71213444 | vessel | 8.00E−01 | 8.33E−01 |
| chr14: 91622695:91622754 | liver | 8.00E−01 | 8.73E−01 |
| chr5: 78115075:78115276 | vessel | 8.00E−01 | 9.36E−01 |
| chr22: 30737410:30737507 | vessel | 8.00E−01 | 9.69E−01 |
| chr2: 109788226:109788430 | vessel | 8.00E−01 | 9.26E−01 |
| chr9: 112841248:112841282 | vessel | 8.00E−01 | 9.45E−01 |
| chr5: 95194167:95194199 | vessel | 8.00E−01 | 9.88E−01 |
| chr11: 113513456:113513577 | vessel | 8.00E−01 | 8.11E−01 |
| chr7: 41956427:41956582 | vessel | 8.00E−01 | 9.28E−01 |
| chr10: 31108592:31108620 | vessel | 8.00E−01 | 9.61E−01 |
| chr17: 1038460:1038480 | vessel | 8.00E−01 | 9.74E−01 |
| chr5: 158230112:158230269 | vessel | 8.00E−01 | 9.67E−01 |
| chr11: 75444671:75444686 | vessel | 8.00E−01 | 8.50E−01 |
| chr12: 116746846:116746866 | vessel | 8.00E−01 | 9.52E−01 |
| chr9: 97535350:97535437 | vessel | 8.00E−01 | 9.56E−01 |
| chr18: 10376914:10377078 | vessel | 8.00E−01 | 9.25E−01 |
| chr11: 1552850:1552939 | vessel | 8.00E−01 | 9.73E−01 |
| chr18: 76551122:76551148 | vessel | 8.00E−01 | 8.19E−01 |
| chr9: 133734023:133734044 | vessel | 8.00E−01 | 9.43E−01 |
| chr5: 136955094:136955232 | vessel | 8.00E−01 | 9.90E−01 |
| chr19: 42528857:42528937 | vessel | 8.00E−01 | 9.74E−01 |
| chr17: 77993088:77993180 | liver | 8.00E−01 | 8.60E−01 |
| chr9: 139466646:139466672 | vessel | 8.00E−01 | 9.51E−01 |
| chr4: 129440877:129440895 | vessel | 8.00E−01 | 9.07E−01 |
| chr2: 135118406:135118696 | vessel | 8.00E−01 | 9.57E−01 |
| chr8: 1895423:1895593 | vessel | 8.00E−01 | 8.96E−01 |
| chr16: 89900228:89900472 | intestine | 8.00E−01 | 8.66E−01 |
| chr18: 53533397:53533431 | vessel | 8.00E−01 | 8.91E−01 |
| chr8: 1734515:1734583 | vessel | 8.00E−01 | 9.27E−01 |
| chr5: 146783414:146783535 | vessel | 8.00E−01 | 9.21E−01 |
| chr10: 129721163:129721395 | vessel | 8.00E−01 | 9.26E−01 |
| chr16: 88976512:88976545 | vessel | 8.00E−01 | 8.82E−01 |
| chr17: 12534611:12534640 | vessel | 8.00E−01 | 8.99E−01 |
| chr8: 124552202:124552287 | vessel | 8.00E−01 | 9.68E−01 |
| chr5: 4983978:4984033 | vessel | 8.00E−01 | 8.65E−01 |
| chr4: 2589345:2589376 | vessel | 8.00E−01 | 9.62E−01 |
| chr14: 23318984:23319004 | vessel | 8.00E−01 | 9.39E−01 |
| chr3: 125978692:125978717 | vessel | 8.00E−01 | 9.38E−01 |
| chr7: 137668500:137668714 | vessel | 7.99E−01 | 9.45E−01 |
| chr22: 29707734:29707797 | neural | 7.99E−01 | 8.65E−01 |
| chr6: 168811258:168811288 | vessel | 7.99E−01 | 8.85E−01 |
| chr11: 48086058:48086140 | vessel | 7.99E−01 | 9.48E−01 |
| chr1: 32581854:32581901 | vessel | 7.99E−01 | 9.52E−01 |
| chr10: 63817039:63817096 | vessel | 7.99E−01 | 9.83E−01 |
| chr10: 104679620:104679676 | vessel | 7.99E−01 | 9.47E−01 |
| chr18: 72913820:72914028 | vessel | 7.99E−01 | 8.76E−01 |
| chr18: 8381961:8382108 | vessel | 7.99E−01 | 9.32E−01 |
| chr2: 43691730:43692049 | vessel | 7.99E−01 | 9.77E−01 |
| chr16: 66260739:66260808 | vessel | 7.99E−01 | 8.07E−01 |
| chr1: 3314034:3314111 | vessel | 7.99E−01 | 8.05E−01 |
| chr15: 47732211:47732323 | vessel | 7.99E−01 | 9.53E−01 |
| chr16: 88228206:88228258 | intestine | 7.99E−01 | 8.48E−01 |
| chr7: 75595743:75595885 | vessel | 7.99E−01 | 9.21E−01 |
| chr17: 77302405:77302421 | vessel | 7.99E−01 | 9.62E−01 |
| chr7: 133043576:133043707 | vessel | 7.99E−01 | 9.54E−01 |
| chr22: 31640170:31640177 | vessel | 7.99E−01 | 9.54E−01 |
| chr1: 25916675:25916756 | vessel | 7.99E−01 | 9.21E−01 |
| chr1: 184120477:184120508 | vessel | 7.99E−01 | 9.43E−01 |
| chr5: 131713182:131713241 | vessel | 7.99E−01 | 9.30E−01 |
| chr14: 75019600:75019659 | vessel | 7.99E−01 | 9.45E−01 |
| chr16: 16088347:16088528 | vessel | 7.99E−01 | 9.66E−01 |
| chr7: 1135687:1135764 | vessel | 7.99E−01 | 9.33E−01 |
| chr2: 98775072:98775082 | vessel | 7.99E−01 | 9.37E−01 |
| chr10: 5605504:5605530 | vessel | 7.99E−01 | 9.39E−01 |
| chr14: 92391559:92391578 | vessel | 7.99E−01 | 9.16E−01 |

TABLE 1a-continued

Top 10% tissue specific uMHL markers identified by GSI
uMHL Markers

| Region | Group | GSI | refMax |
|---|---|---|---|
| chr8: 20834957:20835064 | vessel | 7.99E−01 | 9.36E−01 |
| chr7: 73414105:73414180 | vessel | 7.99E−01 | 1.00E+00 |
| chr3: 114225764:114225848 | vessel | 7.99E−01 | 9.48E−01 |
| chr19: 47242589:47242709 | vessel | 7.99E−01 | 9.22E−01 |
| chr3: 41042033:41042081 | vessel | 7.99E−01 | 9.30E−01 |
| chr19: 57429326:57429374 | vessel | 7.98E−01 | 9.44E−01 |
| chr7: 41735421:41735459 | vessel | 7.98E−01 | 9.70E−01 |
| chr11: 10886639:10886702 | vessel | 7.98E−01 | 9.58E−01 |
| chr10: 664325:664473 | vessel | 7.98E−01 | 9.17E−01 |
| chr5: 38469431:38469488 | vessel | 7.98E−01 | 9.51E−01 |
| chr16: 15237718:15237812 | vessel | 7.98E−01 | 9.86E−01 |
| chr19: 4571622:4571663 | vessel | 7.98E−01 | 9.20E−01 |
| chr7: 139458285:139458300 | liver | 7.98E−01 | 8.65E−01 |
| chr9: 116967656:116967726 | vessel | 7.98E−01 | 9.49E−01 |
| chr16: 19656482:19656576 | vessel | 7.98E−01 | 9.59E−01 |
| chr16: 12865231:12865387 | vessel | 7.98E−01 | 9.77E−01 |
| chr6: 3766566:3766739 | vessel | 7.98E−01 | 9.28E−01 |
| chr15: 60705703:60705745 | vessel | 7.98E−01 | 9.76E−01 |
| chr1: 85070440:85070481 | vessel | 7.98E−01 | 8.60E−01 |
| chr13: 99622769:99622853 | heart, vessel | 7.98E−01 | 9.55E−01 |
| chr2: 197962437:197962594 | vessel | 7.98E−01 | 9.66E−01 |
| chr8: 70180168:70180286 | vessel | 7.98E−01 | 8.72E−01 |
| chr7: 141768483:141768503 | vessel | 7.98E−01 | 9.25E−01 |
| chr10: 102642706:102642787 | vessel | 7.98E−01 | 9.89E−01 |
| chr11: 19837610:19837706 | vessel | 7.98E−01 | 8.96E−01 |
| chr16: 2176909:2176936 | vessel | 7.98E−01 | 9.19E−01 |
| chr15: 99414209:99414271 | vessel | 7.98E−01 | 8.64E−01 |
| chr1: 3459917:3459985 | vessel | 7.98E−01 | 9.31E−01 |
| chr17: 60830341:60830394 | vessel | 7.98E−01 | 8.74E−01 |
| chr13: 53608851:53608955 | vessel | 7.98E−01 | 9.19E−01 |
| chr7: 143504126:143504224 | vessel | 7.97E−01 | 9.07E−01 |
| chr14: 93530866:93530975 | vessel | 7.97E−01 | 9.50E−01 |
| chr2: 9375605:9375853 | vessel | 7.97E−01 | 8.80E−01 |
| chr17: 2870919:2870940 | vessel | 7.97E−01 | 9.13E−01 |
| chr5: 158018853:158018897 | vessel | 7.97E−01 | 9.54E−01 |
| chr13: 112271255:112271317 | vessel | 7.97E−01 | 9.54E−01 |
| chr11: 3183785:3183815 | neural, vessel | 7.97E−01 | 9.50E−01 |
| chr12: 131430753:131430967 | vessel | 7.97E−01 | 9.64E−01 |
| chr14: 80052309:80052328 | vessel | 7.97E−01 | 9.26E−01 |
| chr16: 79943780:79943836 | vessel | 7.97E−01 | 9.17E−01 |
| chr17: 55498598:55498641 | stomach | 7.97E−01 | 8.66E−01 |
| chr4: 39530807:39530904 | liver | 7.97E−01 | 8.09E−01 |
| chr19: 35629398:35629459 | vessel | 7.97E−01 | 9.85E−01 |
| chr10: 30743560:30743638 | vessel | 7.97E−01 | 9.73E−01 |
| chr2: 1656489:1656558 | vessel | 7.97E−01 | 9.44E−01 |
| chr10: 65831088:65831186 | vessel | 7.97E−01 | 9.41E−01 |
| chr21: 35718410:35718483 | vessel | 7.97E−01 | 9.56E−01 |
| chr1: 3474045:3474120 | vessel | 7.97E−01 | 9.15E−01 |
| chr18: 77246010:77246208 | vessel | 7.97E−01 | 9.92E−01 |
| chr2: 234390268:234390333 | vessel | 7.97E−01 | 8.79E−01 |
| chr7: 73309532:73309575 | vessel | 7.97E−01 | 7.92E−01 |
| chr1: 183013562:183013626 | vessel | 7.97E−01 | 9.03E−01 |
| chr16: 70725685:70726085 | vessel | 7.97E−01 | 9.58E−01 |
| chr1: 154401741:154401879 | neural | 7.97E−01 | 7.74E−01 |
| chr4: 36166725:36166900 | neural | 7.97E−01 | 8.20E−01 |
| chr9: 96366610:96366664 | vessel | 7.97E−01 | 7.96E−01 |
| chr9: 95371219:95371367 | vessel | 7.97E−01 | 9.70E−01 |
| chr10: 13999112:13999167 | vessel | 7.97E−01 | 9.68E−01 |
| chr9: 137535735:137535830 | vessel | 7.97E−01 | 9.05E−01 |
| chr7: 94025970:94026143 | vessel | 7.96E−01 | 9.60E−01 |
| chr20: 46475609:46475683 | vessel | 7.96E−01 | 9.58E−01 |
| chr12: 94580545:94580701 | neural | 7.96E−01 | 8.90E−01 |
| chr1: 160877880:160877935 | vessel | 7.96E−01 | 9.71E−01 |
| chr10: 104380407:104380589 | vessel | 7.96E−01 | 9.58E−01 |
| chr22: 28191297:28191348 | vessel | 7.96E−01 | 8.51E−01 |
| chr4: 99981639:99981676 | vessel | 7.96E−01 | 9.38E−01 |
| chr12: 58287209:58287324 | vessel | 7.96E−01 | 9.50E−01 |
| chr6: 168975596:168975609 | vessel | 7.96E−01 | 9.74E−01 |
| chr14: 104178824:104178840 | vessel | 7.96E−01 | 9.66E−01 |
| chr9: 87051327:87051398 | vessel | 7.96E−01 | 8.95E−01 |
| chr11: 4212243:4212284 | vessel | 7.96E−01 | 9.59E−01 |
| chr5: 125720663:125720715 | vessel | 7.96E−01 | 8.48E−01 |
| chr21: 33570835:33570867 | vessel | 7.96E−01 | 8.36E−01 |
| chr7: 1578135:1578254 | vessel | 7.96E−01 | 9.53E−01 |
| chr16: 15239066:15239131 | vessel | 7.96E−01 | 9.12E−01 |
| chr4: 119711755:119711864 | vessel | 7.96E−01 | 9.04E−01 |
| chr21: 40459773:40459854 | vessel | 7.96E−01 | 9.31E−01 |
| chr11: 61655771:61655827 | vessel | 7.96E−01 | 9.60E−01 |
| chr1: 2286708:2286716 | vessel | 7.96E−01 | 8.17E−01 |
| chr6: 3749643:3749718 | vessel | 7.96E−01 | 8.99E−01 |
| chr5: 71805380:71805534 | vessel | 7.96E−01 | 9.34E−01 |
| chr8: 88927532:88927575 | vessel | 7.96E−01 | 9.48E−01 |
| chr1: 24437962:24437971 | vessel | 7.96E−01 | 9.54E−01 |
| chr5: 158232314:158232393 | vessel | 7.96E−01 | 9.37E−01 |
| chr12: 52938468:52938505 | vessel | 7.96E−01 | 9.35E−01 |
| chr3: 101230854:101230960 | intestine | 7.96E−01 | 7.53E−01 |
| chr7: 156160942:156161041 | liver | 7.96E−01 | 8.01E−01 |
| chr1: 32054262:32054281 | vessel | 7.96E−01 | 9.52E−01 |
| chr16: 3843446:3843552 | vessel | 7.96E−01 | 9.69E−01 |
| chr15: 41316602:41316676 | vessel | 7.96E−01 | 9.72E−01 |
| chr16: 82668011:82668094 | vessel | 7.96E−01 | 9.75E−01 |
| chr9: 82195114:82195183 | pancreas | 7.96E−01 | 7.64E−01 |
| chr10: 31108828:31108849 | vessel | 7.96E−01 | 9.33E−01 |
| chr10: 121006638:121006679 | vessel | 7.96E−01 | 8.31E−01 |
| chr2: 240421723:240421775 | vessel | 7.96E−01 | 9.41E−01 |
| chr10: 3616894:3616970 | heart | 7.96E−01 | 8.22E−01 |
| chr10: 17275675:17275857 | vessel | 7.96E−01 | 9.73E−01 |
| chr3: 105448599:105448786 | vessel | 7.96E−01 | 9.54E−01 |
| chr2: 12597916:12598117 | vessel | 7.96E−01 | 9.03E−01 |
| chr8: 49059786:49059859 | vessel | 7.95E−01 | 9.46E−01 |
| chr11: 19952720:19952784 | vessel | 7.95E−01 | 8.63E−01 |
| chr2: 129936106:129936152 | vessel | 7.95E−01 | 9.60E−01 |
| chr20: 10620456:10620662 | neural, vessel | 7.95E−01 | 9.38E−01 |
| chr5: 176515821:176515829 | kidney | 7.95E−01 | 9.03E−01 |
| chr11: 93869233:93869339 | vessel | 7.95E−01 | 9.31E−01 |
| chr7: 30951682:30951741 | vessel | 7.95E−01 | 9.44E−01 |
| chr7: 70096103:70096122 | vessel | 7.95E−01 | 9.06E−01 |
| chr9: 92716323:92716482 | vessel | 7.95E−01 | 9.39E−01 |
| chr7: 111599315:111599369 | vessel | 7.95E−01 | 8.85E−01 |
| chr2: 27136976:27137029 | vessel | 7.95E−01 | 9.26E−01 |
| chr7: 608326:608527 | vessel | 7.95E−01 | 9.51E−01 |
| chr9: 97684443:97684562 | vessel | 7.95E−01 | 9.63E−01 |
| chr5: 66944023:66944179 | vessel | 7.95E−01 | 9.38E−01 |
| chr2: 190701403:190701607 | vessel | 7.95E−01 | 8.86E−01 |
| chr22: 40673658:40673728 | vessel | 7.95E−01 | 9.55E−01 |
| chr14: 92366261:92366344 | vessel | 7.95E−01 | 9.22E−01 |
| chr7: 75640653:75640744 | vessel | 7.95E−01 | 9.11E−01 |
| chr16: 73059129:73059169 | vessel | 7.95E−01 | 9.09E−01 |
| chr9: 129155111:129155328 | vessel | 7.95E−01 | 9.61E−01 |
| chr2: 183292642:183292828 | vessel | 7.95E−01 | 9.59E−01 |
| chr5: 172123630:172123730 | vessel | 7.95E−01 | 9.93E−01 |
| chr3: 47613082:47613088 | neural | 7.95E−01 | 8.23E−01 |
| chr10: 105408583:105408600 | vessel | 7.95E−01 | 9.13E−01 |
| chr5: 2387936:2388031 | vessel | 7.95E−01 | 8.59E−01 |
| chr5: 2729492:2729508 | vessel | 7.95E−01 | 9.36E−01 |
| chr20: 41766979:41766991 | vessel | 7.95E−01 | 9.07E−01 |
| chr3: 184409648:184409750 | vessel | 7.95E−01 | 9.11E−01 |
| chr10: 88493041:88493164 | vessel | 7.95E−01 | 9.25E−01 |
| chr6: 132270440:132270682 | vessel | 7.95E−01 | 9.80E−01 |
| chr22: 44756989:44757220 | vessel | 7.94E−01 | 9.13E−01 |
| chr14: 68831611:68831749 | vessel | 7.94E−01 | 8.91E−01 |
| chr14: 92367927:92368071 | vessel | 7.94E−01 | 9.11E−01 |
| chr12: 2411416:2411598 | vessel | 7.94E−01 | 9.24E−01 |
| chr22: 18049263:18049365 | liver | 7.94E−01 | 8.26E−01 |
| chr10: 14065428:14065473 | vessel | 7.94E−01 | 8.83E−01 |
| chr7: 111977285:111977345 | vessel | 7.94E−01 | 9.65E−01 |
| chr1: 27445356:27445391 | vessel | 7.94E−01 | 9.69E−01 |
| chr1: 7074131:7074170 | vessel | 7.94E−01 | 9.38E−01 |
| chr17: 15313380:15313443 | vessel | 7.94E−01 | 9.62E−01 |
| chr12: 102820870:102820961 | vessel | 7.94E−01 | 9.04E−01 |
| chr17: 71936239:71936248 | vessel | 7.94E−01 | 8.45E−01 |
| chr13: 22665786:22665867 | vessel | 7.94E−01 | 9.02E−01 |
| chr16: 85187520:85187614 | vessel | 7.94E−01 | 9.75E−01 |
| chr8: 6442958:6443017 | vessel | 7.94E−01 | 9.11E−01 |
| chr14: 91107941:91108028 | vessel | 7.94E−01 | 9.90E−01 |
| chr8: 25806426:25806443 | vessel | 7.94E−01 | 9.64E−01 |
| chr16: 85620451:85620532 | vessel | 7.94E−01 | 8.04E−01 |
| chr21: 43951304:43951331 | neural | 7.94E−01 | 7.97E−01 |
| chr12: 94581206:94581313 | neural | 7.94E−01 | 8.38E−01 |
| chr10: 134527606:134527777 | neural | 7.94E−01 | 7.96E−01 |

TABLE 1a-continued

Top 10% tissue specific uMHL markers identified by GSI
uMHL Markers

| Region | Group | GSI | refMax |
|---|---|---|---|
| chr22: 26143790:26143817 | vessel | 7.94E−01 | 8.69E−01 |
| chr7: 4296052:4296381 | vessel | 7.94E−01 | 8.87E−01 |
| chr3: 134034372:134034636 | vessel | 7.94E−01 | 9.45E−01 |
| chr10: 28111467:28111604 | vessel | 7.94E−01 | 8.67E−01 |
| chr17: 79391325:79391366 | vessel | 7.94E−01 | 9.35E−01 |
| chr14: 96520629:96520665 | vessel | 7.94E−01 | 9.12E−01 |
| chr2: 18699763:18699825 | vessel | 7.94E−01 | 9.71E−01 |
| chr17: 925744:925782 | vessel | 7.94E−01 | 8.75E−01 |
| chr21: 17442467:17442664 | neural | 7.94E−01 | 8.12E−01 |
| chr14: 90042589:90042653 | vessel | 7.94E−01 | 9.12E−01 |
| chr6: 158509133:158509238 | vessel | 7.94E−01 | 9.58E−01 |
| chr8: 141629654:141629773 | kidney | 7.94E−01 | 8.44E−01 |
| chr16: 85196321:85196364 | vessel | 7.94E−01 | 9.71E−01 |
| chr1: 203525849:203525916 | vessel | 7.94E−01 | 9.61E−01 |
| chr16: 521619:521899 | neural | 7.94E−01 | 8.59E−01 |
| chr17: 38612725:38612772 | vessel | 7.94E−01 | 9.17E−01 |
| chr15: 81605401:81605471 | vessel | 7.94E−01 | 9.10E−01 |
| chr9: 135994555:135994742 | neural | 7.93E−01 | 9.64E−01 |
| chr17: 79543666:79544106 | vessel | 7.93E−01 | 9.50E−01 |
| chr17: 79012377:79012405 | vessel | 7.93E−01 | 9.70E−01 |
| chr21: 45968533:45968547 | vessel | 7.93E−01 | 9.44E−01 |
| chr21: 42619547:42619640 | vessel | 7.93E−01 | 9.69E−01 |
| chr20: 19830589:19830718 | vessel | 7.93E−01 | 9.76E−01 |
| chr10: 14712906:14712935 | neural | 7.93E−01 | 8.81E−01 |
| chr2: 145465753:145465804 | vessel | 7.93E−01 | 8.25E−01 |
| chr5: 59504641:59504726 | vessel | 7.93E−01 | 9.03E−01 |
| chr6: 4613067:4613243 | vessel | 7.93E−01 | 9.23E−01 |
| chr18: 11269160:11269181 | vessel | 7.93E−01 | 9.54E−01 |
| chr9: 84113892:84113906 | vessel | 7.93E−01 | 9.48E−01 |
| chr16: 85418413:85418592 | intestine | 7.93E−01 | 8.38E−01 |
| chr20: 17817173:17817268 | vessel | 7.93E−01 | 9.43E−01 |
| chr18: 77398686:77398709 | vessel | 7.93E−01 | 1.00E+00 |
| chr1: 2005083:2005710 | neural | 7.93E−01 | 9.11E−01 |
| chr2: 44502707:44502779 | intestine | 7.93E−01 | 7.91E−01 |
| chr9: 132743907:132744043 | liver | 7.93E−01 | 8.91E−01 |
| chr8: 30343080:30343196 | vessel | 7.93E−01 | 9.10E−01 |
| chr14: 56056039:56056048 | vessel | 7.93E−01 | 9.31E−01 |
| chr1: 6445478:6445510 | vessel | 7.93E−01 | 9.52E−01 |
| chr1: 10168307:10168493 | vessel | 7.93E−01 | 9.08E−01 |
| chr3: 11645230:11645368 | vessel | 7.93E−01 | 9.65E−01 |
| chr4: 13415653:13415732 | vessel | 7.93E−01 | 9.51E−01 |
| chr7: 33732757:33732843 | vessel | 7.93E−01 | 9.04E−01 |
| chr3: 9289465:9289502 | neural | 7.93E−01 | 7.70E−01 |
| chr14: 76445973:76446021 | vessel | 7.93E−01 | 9.92E−01 |
| chr3: 72640590:72640767 | vessel | 7.93E−01 | 9.38E−01 |
| chr7: 67319367:67319425 | neural | 7.93E−01 | 7.89E−01 |
| chr2: 159950921:159951154 | vessel | 7.92E−01 | 9.46E−01 |
| chr2: 10545557:10545645 | vessel | 7.92E−01 | 9.72E−01 |
| chr13: 110874293:110874360 | vessel | 7.92E−01 | 9.51E−01 |
| chr10: 74677129:74677157 | vessel | 7.92E−01 | 9.23E−01 |
| chr12: 124948015:124948049 | neural | 7.92E−01 | 7.85E−01 |
| chr17: 72445156:72445231 | vessel | 7.92E−01 | 9.75E−01 |
| chr15: 26076118:26076279 | vessel | 7.92E−01 | 9.71E−01 |
| chr7: 100761027:100761057 | vessel | 7.92E−01 | 9.50E−01 |
| chr10: 5587760:5587894 | vessel | 7.92E−01 | 9.11E−01 |
| chr2: 217544422:217544603 | vessel | 7.92E−01 | 9.73E−01 |
| chr2: 1743862:1743888 | vessel | 7.92E−01 | 8.09E−01 |
| chr19: 2513246:2513267 | vessel | 7.92E−01 | 9.54E−01 |
| chr9: 110501886:110502051 | vessel | 7.92E−01 | 9.73E−01 |
| chr12: 66025456:66025636 | vessel | 7.92E−01 | 9.75E−01 |
| chr19: 45323868:45323940 | vessel | 7.92E−01 | 9.27E−01 |
| chr5: 141225844:141225865 | neural | 7.92E−01 | 9.00E−01 |
| chr17: 79026865:79026951 | vessel | 7.92E−01 | 9.85E−01 |
| chr1: 16625787:16625849 | vessel | 7.92E−01 | 9.80E−01 |
| chr2: 238321665:238321816 | vessel | 7.92E−01 | 9.20E−01 |
| chr5: 148345506:148345687 | vessel | 7.92E−01 | 9.73E−01 |
| chr1: 172113662:172113921 | vessel | 7.92E−01 | 9.71E−01 |
| chr4: 7369242:7369265 | vessel | 7.92E−01 | 9.10E−01 |
| chr1: 11979065:11979214 | vessel | 7.92E−01 | 9.70E−01 |
| chr16: 585886:585937 | liver | 7.92E−01 | 8.80E−01 |
| chr4: 124707773:124707972 | vessel | 7.92E−01 | 9.42E−01 |
| chr8: 109355301:109355329 | vessel | 7.92E−01 | 8.33E−01 |
| chr12: 107799287:107799331 | vessel | 7.92E−01 | 8.97E−01 |
| chr2: 218722958:218723051 | vessel | 7.92E−01 | 8.87E−01 |
| chr9: 132476798:132476839 | vessel | 7.92E−01 | 9.13E−01 |
| chr19: 13108902:13109094 | vessel | 7.92E−01 | 9.59E−01 |
| chr6: 155398687:155398778 | vessel | 7.92E−01 | 9.07E−01 |
| chr10: 35256271:35256338 | vessel | 7.92E−01 | 9.64E−01 |
| chr4: 15429515:15429573 | vessel | 7.92E−01 | 9.29E−01 |
| chr8: 67405522:67405594 | neural, vessel | 7.92E−01 | 8.89E−01 |
| chr16: 1533917:1533944 | neural | 7.92E−01 | 7.09E−01 |
| chr10: 63797212:63797266 | vessel | 7.92E−01 | 8.82E−01 |
| chr12: 125242958:125242996 | vessel | 7.92E−01 | 9.37E−01 |
| chr21: 33835784:33836018 | vessel | 7.92E−01 | 7.98E−01 |
| chr8: 134194805:134194894 | vessel | 7.92E−01 | 9.23E−01 |
| chr1: 53992643:53992661 | vessel | 7.92E−01 | 9.97E−01 |
| chr2: 72058564:72058590 | vessel | 7.92E−01 | 9.25E−01 |
| chr17: 47768524:47768612 | vessel | 7.91E−01 | 9.59E−01 |
| chr7: 70868724:70868738 | vessel | 7.91E−01 | 9.27E−01 |
| chr7: 1135787:1135880 | vessel | 7.91E−01 | 9.19E−01 |
| chr11: 69981466:69981483 | vessel | 7.91E−01 | 9.04E−01 |
| chr10: 44406319:44406371 | vessel | 7.91E−01 | 9.72E−01 |
| chr17: 62321657:62321769 | vessel | 7.91E−01 | 8.43E−01 |
| chr9: 16276328:16276511 | vessel | 7.91E−01 | 9.60E−01 |
| chr22: 26150622:26150652 | vessel | 7.91E−01 | 9.03E−01 |
| chr13: 111173782:111173824 | vessel | 7.91E−01 | 9.64E−01 |
| chr9: 132465990:132466044 | vessel | 7.91E−01 | 8.89E−01 |
| chr9: 137601605:137601641 | vessel | 7.91E−01 | 9.03E−01 |
| chr12: 2378226:2378306 | vessel | 7.91E−01 | 9.42E−01 |
| chr6: 3868913:3868926 | vessel | 7.91E−01 | 8.56E−01 |
| chr13: 110956979:110957046 | vessel | 7.91E−01 | 9.19E−01 |
| chr3: 10619418:10619432 | vessel | 7.91E−01 | 9.31E−01 |
| chr16: 73454450:73454527 | vessel | 7.91E−01 | 7.99E−01 |
| chr15: 63305915:63305934 | vessel | 7.91E−01 | 9.61E−01 |
| chr7: 4734422:4734577 | vessel | 7.91E−01 | 9.52E−01 |
| chr10: 121006525:121006629 | vessel | 7.91E−01 | 9.38E−01 |
| chr8: 144951293:144951312 | pancreas | 7.91E−01 | 9.25E−01 |
| chr2: 223917511:223917627 | vessel | 7.91E−01 | 9.00E−01 |
| chr16: 72892847:72892919 | vessel | 7.91E−01 | 8.71E−01 |
| chr15: 88525288:88525358 | vessel | 7.91E−01 | 8.77E−01 |
| chr18: 76680559:76680740 | pancreas | 7.91E−01 | 8.21E−01 |
| chr16: 79785861:79785893 | vessel | 7.91E−01 | 9.69E−01 |
| chr13: 113257964:113257997 | vessel | 7.91E−01 | 9.67E−01 |
| chr15: 62851448:62851528 | vessel | 7.90E−01 | 9.67E−01 |
| chr17: 47651712:47651734 | vessel | 7.90E−01 | 9.79E−01 |
| chr15: 94039831:94039861 | vessel | 7.90E−01 | 8.86E−01 |
| chr12: 108788025:108788069 | vessel | 7.90E−01 | 9.26E−01 |
| chr11: 63823800:63823819 | neural | 7.90E−01 | 8.00E−01 |
| chr5: 106553748:106553861 | vessel | 7.90E−01 | 9.36E−01 |
| chr12: 43135893:43136097 | vessel | 7.90E−01 | 8.94E−01 |
| chr1: 20081194:20081286 | vessel | 7.90E−01 | 9.44E−01 |
| chr3: 73560709:73560905 | vessel | 7.90E−01 | 9.25E−01 |
| chr3: 123836445:123836611 | vessel | 7.90E−01 | 9.04E−01 |
| chr1: 7603622:7603720 | vessel | 7.90E−01 | 8.99E−01 |
| chr6: 158464875:158465035 | vessel | 7.90E−01 | 9.46E−01 |
| chr6: 131958144:131958342 | vessel | 7.90E−01 | 8.98E−01 |
| chr15: 67458370:67458404 | vessel | 7.90E−01 | 9.35E−01 |
| chr8: 22458256:22458378 | vessel | 7.90E−01 | 9.49E−01 |
| chr7: 94025305:94025363 | vessel | 7.90E−01 | 9.64E−01 |
| chr6: 16431273:16431391 | vessel | 7.90E−01 | 9.09E−01 |
| chr20: 56523021:56523183 | vessel | 7.90E−01 | 9.04E−01 |
| chr5: 50219227:50219301 | vessel | 7.90E−01 | 7.47E−01 |
| chr21: 47403142:47403214 | vessel | 7.90E−01 | 8.68E−01 |
| chr9: 136801147:136801304 | intestine | 7.90E−01 | 8.17E−01 |
| chr18: 9535708:9535902 | vessel | 7.90E−01 | 9.25E−01 |
| chr18: 9809125:9809169 | vessel | 7.90E−01 | 9.09E−01 |
| chr4: 101089727:101089795 | vessel | 7.90E−01 | 9.35E−01 |
| chr20: 60833682:60833702 | vessel | 7.90E−01 | 9.20E−01 |
| chr2: 66528452:66528529 | vessel | 7.90E−01 | 9.80E−01 |
| chr20: 22707146:22707191 | vessel | 7.90E−01 | 8.44E−01 |
| chr10: 44776635:44776761 | vessel | 7.90E−01 | 8.66E−01 |
| chr3: 52869083:52869162 | vessel | 7.90E−01 | 9.16E−01 |
| chr9: 129155547:129155601 | vessel | 7.90E−01 | 8.97E−01 |
| chr1: 11039869:11039880 | neural | 7.90E−01 | 8.00E−01 |
| chr16: 4461722:4462177 | neural | 7.90E−01 | 8.30E−01 |
| chr5: 173252378:173252404 | vessel | 7.90E−01 | 8.73E−01 |
| chr9: 124042382:124042419 | vessel | 7.90E−01 | 9.78E−01 |
| chr18: 56719116:56719243 | vessel | 7.90E−01 | 9.24E−01 |
| chr11: 11425708:11425747 | vessel | 7.89E−01 | 8.33E−01 |
| chr12: 52056721:52056773 | liver | 7.89E−01 | 8.09E−01 |

TABLE 1a-continued

Top 10% tissue specific uMHL markers identified by GSI uMHL Markers

| Region | Group | GSI | refMax |
|---|---|---|---|
| chr1: 39847630:39847734 | vessel | 7.89E−01 | 9.26E−01 |
| chr12: 114327643:114328085 | vessel | 7.89E−01 | 9.52E−01 |
| chr16: 27256643:27256871 | vessel | 7.89E−01 | 9.53E−01 |
| chr13: 111830279:111830297 | vessel | 7.89E−01 | 9.46E−01 |
| chr19: 49804030:49804037 | vessel | 7.89E−01 | 8.62E−01 |
| chr11: 133371858:133371874 | vessel | 7.89E−01 | 9.54E−01 |
| chr10: 105378386:105378436 | vessel | 7.89E−01 | 9.49E−01 |
| chr2: 21500056:21500255 | vessel | 7.89E−01 | 8.37E−01 |
| chr14: 69419282:69419313 | vessel | 7.89E−01 | 9.48E−01 |
| chr10: 80913511:80913602 | vessel | 7.89E−01 | 8.73E−01 |
| chr14: 69203310:69203388 | vessel | 7.89E−01 | 8.57E−01 |
| chr16: 29706207:29706243 | vessel | 7.89E−01 | 9.41E−01 |
| chr8: 49493773:49493912 | vessel | 7.89E−01 | 8.98E−01 |
| chr10: 13869492:13869597 | vessel | 7.89E−01 | 9.58E−01 |
| chr17: 75724157:75724205 | vessel | 7.89E−01 | 8.95E−01 |
| chr7: 105134734:105134810 | vessel | 7.89E−01 | 9.09E−01 |
| chr10: 78157310:78157339 | vessel | 7.89E−01 | 9.38E−01 |
| chr1: 213155773:213155827 | vessel | 7.89E−01 | 9.55E−01 |
| chr17: 12453277:12453304 | vessel | 7.89E−01 | 9.07E−01 |
| chr11: 130358485:130358572 | vessel | 7.89E−01 | 9.83E−01 |
| chr19: 3536938:3536990 | kidney | 7.89E−01 | 7.85E−01 |
| chr5: 172030681:172030738 | vessel | 7.89E−01 | 9.62E−01 |
| chr1: 24429671:24429689 | vessel | 7.89E−01 | 9.74E−01 |
| chr3: 128098054:128098098 | vessel | 7.89E−01 | 8.66E−01 |
| chr15: 67142607:67142698 | vessel | 7.89E−01 | 9.30E−01 |
| chr17: 64536087:64536138 | neural | 7.89E−01 | 8.10E−01 |
| chr4: 77598869:77598976 | vessel | 7.89E−01 | 8.99E−01 |
| chr10: 10965036:10965181 | pancreas | 7.89E−01 | 7.53E−01 |
| chr2: 223917632:223917948 | vessel | 7.89E−01 | 8.31E−01 |
| chr1: 61742965:61742988 | vessel | 7.89E−01 | 8.91E−01 |
| chr14: 21292114:21292310 | neural | 7.89E−01 | 7.29E−01 |
| chr2: 46564649:46564698 | vessel | 7.89E−01 | 8.81E−01 |
| chr9: 109561663:109561825 | vessel | 7.89E−01 | 9.15E−01 |
| chr10: 112395034:112395067 | vessel | 7.89E−01 | 7.88E−01 |
| chr7: 73406549:73406623 | vessel | 7.89E−01 | 9.58E−01 |
| chr19: 13176607:13176640 | vessel | 7.89E−01 | 9.29E−01 |
| chr4: 166300973:166301086 | vessel | 7.89E−01 | 9.67E−01 |
| chr16: 1559867:1559928 | vessel | 7.89E−01 | 9.81E−01 |
| chr1: 85069466:85069782 | vessel | 7.89E−01 | 9.30E−01 |
| chr2: 8360458:8360518 | vessel | 7.89E−01 | 7.94E−01 |
| chr12: 116008258:116008282 | neural | 7.89E−01 | 8.08E−01 |
| chr9: 132456706:132456716 | vessel | 7.89E−01 | 9.51E−01 |
| chr10: 10686890:10686959 | vessel | 7.89E−01 | 8.74E−01 |
| chr11: 46740703:46740795 | liver | 7.88E−01 | 8.46E−01 |
| chr22: 37419994:37420244 | liver | 7.88E−01 | 7.79E−01 |
| chr21: 47512230:47512291 | vessel | 7.88E−01 | 8.70E−01 |
| chr15: 36169148:36169197 | vessel | 7.88E−01 | 9.59E−01 |
| chr14: 65147082:65147109 | vessel | 7.88E−01 | 9.19E−01 |
| chr16: 49867825:49867955 | vessel | 7.88E−01 | 9.73E−01 |
| chr9: 116464320:116464372 | vessel | 7.88E−01 | 9.07E−01 |
| chr13: 110953976:110954153 | vessel | 7.88E−01 | 8.15E−01 |
| chr15: 68236450:68236481 | vessel | 7.88E−01 | 9.46E−01 |
| chr3: 122803555:122803707 | liver | 7.88E−01 | 9.15E−01 |
| chr11: 130735452:130735480 | vessel | 7.88E−01 | 9.24E−01 |
| chr10: 73608417:73608452 | neural | 7.88E−01 | 7.89E−01 |
| chr13: 111013814:111013913 | vessel | 7.88E−01 | 9.63E−01 |
| chr12: 92290560:92290631 | vessel | 7.88E−01 | 9.07E−01 |
| chr16: 14503474:14503520 | vessel | 7.88E−01 | 9.32E−01 |
| chr16: 49615634:49615896 | vessel | 7.88E−01 | 9.41E−01 |
| chr8: 130499865:130499936 | vessel | 7.88E−01 | 9.17E−01 |
| chr10: 50216911:50217019 | vessel | 7.88E−01 | 9.07E−01 |
| chr12: 20503508:20503619 | vessel | 7.88E−01 | 9.37E−01 |
| chr4: 7287509:7287534 | vessel | 7.88E−01 | 9.35E−01 |
| chr13: 80511183:80511242 | vessel | 7.88E−01 | 8.71E−01 |
| chr11: 12166090:12166124 | vessel | 7.88E−01 | 8.65E−01 |
| chr22: 38864829:38864862 | vessel | 7.88E−01 | 8.37E−01 |
| chr2: 39945836:39946013 | vessel | 7.88E−01 | 9.44E−01 |
| chr3: 71289392:71289422 | vessel | 7.88E−01 | 9.31E−01 |
| chr2: 1689778:1689882 | vessel | 7.88E−01 | 8.04E−01 |
| chr15: 67471125:67471172 | vessel | 7.88E−01 | 9.53E−01 |
| chr13: 114076193:114076253 | vessel | 7.88E−01 | 9.24E−01 |
| chr3: 4468948:4469000 | vessel | 7.88E−01 | 9.07E−01 |
| chr13: 114064797:114064981 | vessel | 7.88E−01 | 8.95E−01 |
| chr16: 75520052:75520187 | intestine | 7.88E−01 | 8.45E−01 |
| chr2: 86452555:86452614 | vessel | 7.88E−01 | 8.71E−01 |
| chr16: 65105398:65105960 | vessel | 7.88E−01 | 9.54E−01 |
| chr2: 235286886:235286969 | vessel | 7.88E−01 | 9.20E−01 |
| chr10: 3182566:3182624 | vessel | 7.88E−01 | 9.04E−01 |
| chr4: 129445552:129445744 | vessel | 7.87E−01 | 9.32E−01 |
| chr16: 49750543:49750635 | vessel | 7.87E−01 | 9.44E−01 |
| chr1: 150164178:150164217 | vessel | 7.87E−01 | 8.23E−01 |
| chr13: 114797349:114797404 | vessel | 7.87E−01 | 9.06E−01 |
| chr13: 47824530:47824646 | vessel | 7.87E−01 | 9.27E−01 |
| chr11: 115882971:115883000 | vessel | 7.87E−01 | 9.58E−01 |
| chr18: 77398729:77398773 | vessel | 7.87E−01 | 9.37E−01 |
| chr1: 3282991:3283074 | vessel | 7.87E−01 | 9.49E−01 |
| chr17: 15416725:15416832 | vessel | 7.87E−01 | 9.02E−01 |
| chr11: 12098290:12098375 | vessel | 7.87E−01 | 9.37E−01 |
| chr9: 13444156:13444186 | vessel | 7.87E−01 | 8.91E−01 |
| chr7: 135430783:135430838 | vessel | 7.87E−01 | 9.31E−01 |
| chr3: 25927064:25927249 | vessel | 7.87E−01 | 8.72E−01 |
| chr5: 65124029:65124117 | vessel | 7.87E−01 | 9.78E−01 |
| chr11: 12455168:12455287 | vessel | 7.87E−01 | 9.57E−01 |
| chr2: 33295587:33295754 | vessel | 7.87E−01 | 8.15E−01 |
| chr2: 240386966:240387067 | vessel | 7.87E−01 | 9.92E−01 |
| chr12: 2411116:2411340 | vessel | 7.87E−01 | 9.61E−01 |
| chr22: 46302183:46302264 | vessel | 7.87E−01 | 9.38E−01 |
| chr5: 148851569:148851626 | intestine | 7.87E−01 | 8.54E−01 |
| chr6: 170491419:170491447 | kidney | 7.87E−01 | 8.52E−01 |
| chr2: 116891317:116891376 | vessel | 7.87E−01 | 8.23E−01 |
| chr3: 20108380:20108465 | vessel | 7.87E−01 | 9.06E−01 |
| chr9: 132156886:132156911 | neural | 7.87E−01 | 7.58E−01 |
| chr11: 76290294:76290405 | vessel | 7.87E−01 | 9.16E−01 |
| chr22: 45945164:45945215 | vessel | 7.87E−01 | 9.08E−01 |
| chr2: 42279054:42279101 | vessel | 7.87E−01 | 9.56E−01 |
| chr3: 58151255:58151409 | vessel | 7.87E−01 | 9.97E−01 |
| chr8: 30073333:30073369 | vessel | 7.87E−01 | 9.47E−01 |
| chr9: 15250121:15250232 | vessel | 7.87E−01 | 9.80E−01 |
| chr17: 17780294:17780370 | vessel | 7.87E−01 | 9.60E−01 |
| chr13: 39969110:39969133 | vessel | 7.87E−01 | 9.51E−01 |
| chr22: 31502874:31502905 | vessel | 7.87E−01 | 9.74E−01 |
| chr19: 31125579:31125600 | pancreas | 7.87E−01 | 8.04E−01 |
| chr14: 84557314:84557472 | vessel | 7.87E−01 | 8.52E−01 |
| chr21: 43514198:43514493 | vessel | 7.87E−01 | 9.64E−01 |
| chr18: 22307046:22307231 | vessel | 7.87E−01 | 9.57E−01 |
| chr8: 21916771:21916803 | vessel | 7.87E−01 | 9.14E−01 |
| chr8: 22498729:22498809 | vessel | 7.86E−01 | 9.68E−01 |
| chr20: 30318764:30318781 | vessel | 7.86E−01 | 8.10E−01 |
| chr6: 136257638:136257678 | vessel | 7.86E−01 | 8.92E−01 |
| chr8: 25250313:25250341 | neural, vessel | 7.86E−01 | 9.44E−01 |
| chr1: 41272962:41273105 | vessel | 7.86E−01 | 9.17E−01 |
| chr9: 97771885:97771906 | vessel | 7.86E−01 | 9.85E−01 |
| chr13: 113695160:113695394 | vessel | 7.86E−01 | 8.81E−01 |
| chr2: 20380163:20380252 | liver | 7.86E−01 | 8.58E−01 |
| chr16: 19863013:19863115 | neural | 7.86E−01 | 9.00E−01 |
| chr8: 125677517:125677565 | vessel | 7.86E−01 | 9.55E−01 |
| chr7: 127670761:127670841 | neural | 7.86E−01 | 7.69E−01 |
| chr6: 168195164:168195233 | pancreas | 7.86E−01 | 7.64E−01 |
| chr15: 85493580:85493683 | vessel | 7.86E−01 | 9.53E−01 |
| chr22: 43031651:43031853 | vessel | 7.86E−01 | 9.73E−01 |
| chr13: 113496626:113496879 | vessel | 7.86E−01 | 8.70E−01 |
| chr16: 14489990:14490064 | neural | 7.86E−01 | 7.96E−01 |
| chr6: 57042660:57042734 | vessel | 7.86E−01 | 8.96E−01 |
| chr3: 46941526:46941607 | vessel | 7.86E−01 | 9.27E−01 |
| chr20: 35987305:35987352 | vessel | 7.86E−01 | 8.54E−01 |
| chr16: 14401759:14401838 | vessel | 7.86E−01 | 9.52E−01 |
| chr1: 14469003:14469067 | vessel | 7.86E−01 | 9.33E−01 |
| chr20: 56534156:56534196 | vessel | 7.86E−01 | 9.66E−01 |
| chr9: 132236150:132236184 | vessel | 7.86E−01 | 9.52E−01 |
| chr1: 3050597:3050633 | vessel | 7.86E−01 | 9.60E−01 |
| chr7: 37524088:37524305 | vessel | 7.86E−01 | 8.47E−01 |
| chr13: 111024166:111024198 | vessel | 7.86E−01 | 9.20E−01 |
| chr12: 6202364:6202394 | vessel | 7.86E−01 | 8.65E−01 |
| chr17: 2116086:2116211 | vessel | 7.86E−01 | 9.50E−01 |
| chr7: 4647117:4647169 | neural | 7.86E−01 | 8.68E−01 |
| chr5: 55821161:55821181 | vessel | 7.86E−01 | 9.22E−01 |
| chr7: 2666687:2666748 | vessel | 7.86E−01 | 8.39E−01 |
| chr22: 45914756:45914798 | vessel | 7.86E−01 | 8.64E−01 |
| chr16: 20624541:20624773 | vessel | 7.86E−01 | 8.82E−01 |
| chr2: 237551381:237551403 | vessel | 7.86E−01 | 9.84E−01 |

TABLE 1a-continued

Top 10% tissue specific uMHL markers identified by GSI
uMHL Markers

| Region | Group | GSI | refMax |
|---|---|---|---|
| chr3: 31363948:31364089 | vessel | 7.86E-01 | 9.52E-01 |
| chr2: 71927938:71927991 | vessel | 7.86E-01 | 9.43E-01 |
| chr16: 80972085:80972168 | vessel | 7.85E-01 | 9.86E-01 |
| chr19: 49673692:49673775 | intestine, stomach | 7.85E-01 | 8.60E-01 |
| chr2: 236843445:236843509 | neural | 7.85E-01 | 7.69E-01 |
| chr1: 15751369:15751446 | intestine | 7.85E-01 | 8.46E-01 |
| chr5: 73045778:73045803 | kidney | 7.85E-01 | 9.14E-01 |
| chr6: 128738839:128739002 | vessel | 7.85E-01 | 9.17E-01 |
| chr4: 85725549:85725639 | vessel | 7.85E-01 | 9.38E-01 |
| chr3: 176622338:176622418 | vessel | 7.85E-01 | 8.82E-01 |
| chr5: 172926847:172926905 | vessel | 7.85E-01 | 9.46E-01 |
| chr16: 85240886:85240936 | vessel | 7.85E-01 | 8.75E-01 |
| chr19: 15324808:15324820 | vessel | 7.85E-01 | 9.51E-01 |
| chr10: 16636258:16636309 | vessel | 7.85E-01 | 9.18E-01 |
| chr17: 79394818:79394831 | vessel | 7.85E-01 | 9.02E-01 |
| chr19: 4373886:4374073 | vessel | 7.85E-01 | 9.41E-01 |
| chr22: 27641211:27641248 | vessel | 7.85E-01 | 8.96E-01 |
| chr11: 1418459:1418562 | neural | 7.85E-01 | 7.35E-01 |
| chr7: 151511780:151511833 | neural | 7.85E-01 | 7.76E-01 |
| chr15: 68677027:68677109 | vessel | 7.85E-01 | 9.37E-01 |
| chr6: 157470211:157470320 | vessel | 7.85E-01 | 9.24E-01 |
| chr19: 18567964:18568032 | vessel | 7.85E-01 | 9.50E-01 |
| chr4: 183152531:183152684 | vessel | 7.85E-01 | 9.72E-01 |
| chr2: 218800243:218800316 | vessel | 7.85E-01 | 9.83E-01 |
| chr2: 239367426:239367504 | vessel | 7.85E-01 | 9.60E-01 |
| chr13: 33163751:33163849 | vessel | 7.85E-01 | 9.22E-01 |
| chr6: 5068481:5068499 | liver | 7.85E-01 | 8.40E-01 |
| chr1: 42091868:42091905 | vessel | 7.85E-01 | 8.60E-01 |
| chr7: 134374786:134374800 | vessel | 7.85E-01 | 9.22E-01 |
| chr16: 15916856:15916909 | vessel | 7.85E-01 | 9.74E-01 |
| chr8: 41061579:41061651 | vessel | 7.85E-01 | 8.97E-01 |
| chr10: 30400645:30400733 | vessel | 7.85E-01 | 9.62E-01 |
| chr8: 30421070:30421152 | vessel | 7.85E-01 | 9.36E-01 |
| chr8: 139613769:139613920 | neural | 7.85E-01 | 7.22E-01 |
| chr10: 114760378:114760459 | vessel | 7.85E-01 | 9.89E-01 |
| chr5: 167361642:167361742 | vessel | 7.85E-01 | 9.28E-01 |
| chr2: 220634112:220634129 | vessel | 7.85E-01 | 9.17E-01 |
| chr1: 3157480:3157571 | vessel | 7.85E-01 | 9.26E-01 |
| chr3: 177545779:177546015 | liver | 7.85E-01 | 8.04E-01 |
| chr8: 54866663:54866734 | vessel | 7.85E-01 | 9.50E-01 |
| chr2: 65804282:65804447 | vessel | 7.84E-01 | 9.02E-01 |
| chr20: 35943041:35943225 | vessel | 7.84E-01 | 9.24E-01 |
| chr19: 1254191:1254317 | neural | 7.84E-01 | 8.08E-01 |
| chr8: 8699113:8699285 | vessel | 7.84E-01 | 9.32E-01 |
| chr16: 51610883:51611016 | vessel | 7.84E-01 | 8.73E-01 |
| chr10: 131744697:131744726 | vessel | 7.84E-01 | 8.56E-01 |
| chr13: 110147363:110147475 | vessel | 7.84E-01 | 9.55E-01 |
| chr5: 134583058:134583072 | vessel | 7.84E-01 | 8.62E-01 |
| chr1: 27891699:27891725 | vessel | 7.84E-01 | 9.55E-01 |
| chr2: 47234673:47234721 | vessel | 7.84E-01 | 9.27E-01 |
| chr6: 74965618:74965651 | esophagus | 7.84E-01 | 8.32E-01 |
| chr4: 7911612:7911672 | vessel | 7.84E-01 | 9.21E-01 |
| chr19: 5059366:5059423 | neural | 7.84E-01 | 9.24E-01 |
| chr13: 24192625:24192669 | vessel | 7.84E-01 | 9.16E-01 |
| chr11: 27536140:27536237 | vessel | 7.84E-01 | 9.69E-01 |
| chr5: 116066604:116066649 | vessel | 7.84E-01 | 9.30E-01 |
| chr11: 7508112:7508197 | vessel | 7.84E-01 | 8.82E-01 |
| chr6: 166879764:166879786 | vessel | 7.84E-01 | 9.59E-01 |
| chr6: 168068881:168068949 | liver | 7.84E-01 | 8.89E-01 |
| chr11: 113424086:113424149 | vessel | 7.84E-01 | 9.27E-01 |
| chr5: 151059157:151059183 | vessel | 7.84E-01 | 9.50E-01 |
| chr22: 43821384:43821428 | vessel | 7.84E-01 | 9.18E-01 |
| chr3: 53807276:53807287 | vessel | 7.84E-01 | 9.49E-01 |
| chr17: 62167638:62167728 | vessel | 7.84E-01 | 9.69E-01 |
| chr8: 123860971:123861059 | vessel | 7.84E-01 | 9.26E-01 |
| chr11: 68894912:68894969 | vessel | 7.84E-01 | 9.47E-01 |
| chr16: 16098416:16098605 | vessel | 7.84E-01 | 8.77E-01 |
| chr5: 55193804:55193902 | vessel | 7.84E-01 | 8.07E-01 |
| chr10: 84118577:84118605 | heart | 7.84E-01 | 7.93E-01 |
| chr1: 226852160:226852233 | vessel | 7.84E-01 | 9.89E-01 |
| chr19: 36180754:36180817 | vessel | 7.84E-01 | 9.35E-01 |
| chr20: 31144652:31144702 | pancreas | 7.84E-01 | 7.25E-01 |
| chr16: 79296157:79296186 | vessel | 7.84E-01 | 8.19E-01 |
| chr22: 19863472:19863495 | intestine, vessel | 7.83E-01 | 9.22E-01 |
| chr12: 105021929:105021960 | vessel | 7.83E-01 | 9.50E-01 |
| chr15: 56209215:56209303 | vessel | 7.83E-01 | 8.85E-01 |
| chr15: 29261980:29262074 | neural | 7.83E-01 | 7.43E-01 |
| chr7: 132087715:132087737 | vessel | 7.83E-01 | 9.36E-01 |
| chr2: 151333241:151333340 | vessel | 7.83E-01 | 9.54E-01 |
| chr19: 6485754:6485800 | intestine | 7.83E-01 | 8.25E-01 |
| chr13: 31272143:31272303 | vessel | 7.83E-01 | 8.99E-01 |
| chr4: 166301164:166301272 | vessel | 7.83E-01 | 9.20E-01 |
| chr2: 121603185:121603207 | vessel | 7.83E-01 | 9.02E-01 |
| chr6: 45530885:45530911 | vessel | 7.83E-01 | 9.34E-01 |
| chr14: 94447303:94447348 | vessel | 7.83E-01 | 9.37E-01 |
| chr1: 242948252:242948360 | vessel | 7.83E-01 | 8.99E-01 |
| chr19: 49481383:49481409 | vessel | 7.83E-01 | 9.30E-01 |
| chr10: 52905224:52905373 | vessel | 7.83E-01 | 9.02E-01 |
| chr8: 25867146:25867194 | vessel | 7.83E-01 | 9.14E-01 |
| chr15: 101912644:101912745 | vessel | 7.83E-01 | 9.07E-01 |
| chr4: 40847393:40847513 | vessel | 7.83E-01 | 9.08E-01 |
| chr17: 70442942:70443022 | vessel | 7.83E-01 | 9.65E-01 |
| chr16: 86060972:86061154 | intestine | 7.83E-01 | 8.22E-01 |
| chr17: 17448903:17448931 | vessel | 7.83E-01 | 9.41E-01 |
| chr5: 134577993:134578042 | vessel | 7.83E-01 | 9.07E-01 |
| chr10: 126644018:126644097 | vessel | 7.83E-01 | 9.57E-01 |
| chr9: 132248466:132248663 | vessel | 7.83E-01 | 9.33E-01 |
| chr3: 149310847:149311097 | vessel | 7.82E-01 | 8.96E-01 |
| chr21: 46549535:46549556 | vessel | 7.82E-01 | 9.41E-01 |
| chr8: 97399458:97399485 | vessel | 7.82E-01 | 9.50E-01 |
| chr10: 134976229:134976248 | neural | 7.82E-01 | 8.67E-01 |
| chr17: 40672856:40672864 | vessel | 7.82E-01 | 9.66E-01 |
| chr16: 29706041:29706152 | vessel | 7.82E-01 | 9.84E-01 |
| chr12: 93708655:93708836 | intestine | 7.82E-01 | 7.67E-01 |
| chr17: 4231044:4231126 | vessel | 7.82E-01 | 8.75E-01 |
| chr10: 104883494:104883599 | vessel | 7.82E-01 | 9.68E-01 |
| chr3: 134115902:134115909 | vessel | 7.82E-01 | 9.55E-01 |
| chr10: 81182412:81182519 | vessel | 7.82E-01 | 8.66E-01 |
| chr12: 43129874:43129987 | vessel | 7.82E-01 | 9.02E-01 |
| chr16: 50619336:50619567 | vessel | 7.82E-01 | 9.37E-01 |
| chr11: 133917437:133917528 | vessel | 7.82E-01 | 9.22E-01 |
| chr12: 23568298:23568404 | vessel | 7.82E-01 | 9.75E-01 |
| chr9: 13485157:13485208 | vessel | 7.82E-01 | 8.87E-01 |
| chr1: 170677495:170677579 | vessel | 7.82E-01 | 8.77E-01 |
| chr17: 79027073:79027118 | neural | 7.82E-01 | 8.77E-01 |
| chr6: 4351916:4351953 | vessel | 7.82E-01 | 9.58E-01 |
| chr8: 13371792:13371850 | vessel | 7.82E-01 | 9.81E-01 |
| chr10: 3366176:3366407 | vessel | 7.82E-01 | 9.36E-01 |
| chr7: 137669463:137669576 | vessel | 7.82E-01 | 9.20E-01 |
| chr9: 124535135:124535408 | vessel | 7.82E-01 | 9.16E-01 |
| chr6: 122273295:122273448 | vessel | 7.82E-01 | 8.98E-01 |
| chr10: 30932923:30932972 | vessel | 7.82E-01 | 9.29E-01 |
| chr8: 102457944:102457961 | vessel | 7.82E-01 | 8.08E-01 |
| chr6: 89871857:89871883 | vessel | 7.82E-01 | 9.05E-01 |
| chr11: 40301875:40301907 | neural | 7.82E-01 | 7.81E-01 |
| chr2: 100241347:100241372 | vessel | 7.82E-01 | 9.52E-01 |
| chr6: 43464262:43464281 | vessel | 7.82E-01 | 9.57E-01 |
| chr11: 2871840:2871864 | neural | 7.82E-01 | 8.29E-01 |
| chr13: 53617306:53617318 | vessel | 7.82E-01 | 9.45E-01 |
| chr12: 2482078:2482201 | vessel | 7.82E-01 | 7.57E-01 |
| chr1: 172114039:172114125 | vessel | 7.82E-01 | 9.42E-01 |
| chr2: 216299434:216299546 | vessel | 7.82E-01 | 9.67E-01 |
| chr13: 27254470:27254486 | vessel | 7.82E-01 | 7.89E-01 |
| chr2: 38387148:38387190 | vessel | 7.82E-01 | 8.78E-01 |
| chr9: 137426232:137426270 | neural | 7.82E-01 | 8.22E-01 |
| chr1: 19778768:19779073 | vessel | 7.82E-01 | 9.21E-01 |
| chr2: 20834577:20834625 | vessel | 7.82E-01 | 9.27E-01 |
| chr19: 12732552:12732570 | neural | 7.82E-01 | 9.70E-01 |
| chr5: 134605567:134605740 | vessel | 7.82E-01 | 8.57E-01 |
| chr11: 1929407:1929484 | vessel | 7.82E-01 | 9.66E-01 |
| chr7: 140048950:140049086 | neural | 7.82E-01 | 8.47E-01 |
| chr16: 73086674:73086828 | vessel | 7.82E-01 | 8.89E-01 |
| chr1: 62353776:62353847 | vessel | 7.82E-01 | 9.58E-01 |
| chr3: 16707220:16707260 | intestine | 7.82E-01 | 7.96E-01 |
| chr15: 99050082:99050108 | vessel | 7.82E-01 | 9.28E-01 |
| chr17: 60706523:60706581 | vessel | 7.81E-01 | 8.84E-01 |
| chr15: 67142417:67142575 | vessel | 7.81E-01 | 9.28E-01 |
| chr20: 56576504:56576598 | vessel | 7.81E-01 | 9.24E-01 |
| chr19: 5036492:5036562 | neural | 7.81E-01 | 8.58E-01 |
| chr20: 25030492:25030618 | vessel | 7.81E-01 | 9.49E-01 |

TABLE 1a-continued

Top 10% tissue specific uMHL markers identified by GSI
uMHL Markers

| Region | Group | GSI | refMax |
|---|---|---|---|
| chr6: 1766006:1766029 | vessel | 7.81E−01 | 9.67E−01 |
| chr18: 72839832:72839844 | intestine | 7.81E−01 | 7.43E−01 |
| chr15: 99995054:99995113 | vessel | 7.81E−01 | 9.19E−01 |
| chr12: 130612543:130612596 | vessel | 7.81E−01 | 9.07E−01 |
| chr6: 37648587:37648654 | vessel | 7.81E−01 | 9.27E−01 |
| chr12: 124984979:124985033 | vessel | 7.81E−01 | 8.60E−01 |

TABLE 1b

Top 10% tissue specific MHL markers identified by GSI
MHL Markers

| Region | Group | GSI | refMax |
|---|---|---|---|
| chr5: 122422637:122422689 | vessel | 8.44E−01 | 9.80E−01 |
| chr16: 88293071:88293119 | vessel | 8.35E−01 | 9.71E−01 |
| chr14: 91790551:91790559 | intestine | 8.29E−01 | 9.76E−01 |
| chr7: 560607:560650 | vessel | 8.29E−01 | 9.12E−01 |
| chr18: 34823918:34823977 | intestine | 8.28E−01 | 8.70E−01 |
| chr5: 122422972:122423004 | vessel | 8.27E−01 | 9.45E−01 |
| chr18: 52613464:52613527 | neural | 8.25E−01 | 7.82E−01 |
| chr4: 174440618:174440652 | vessel | 8.20E−01 | 8.88E−01 |
| chr6: 6000351:6000385 | vessel | 8.20E−01 | 9.56E−01 |
| chr6: 85476611:85476636 | vessel | 8.20E−01 | 9.53E−01 |
| chr2: 66810606:66810640 | vessel | 8.20E−01 | 9.31E−01 |
| chr16: 73098764:73098784 | pancreas | 8.18E−01 | 9.15E−01 |
| chr1: 3310806:3310814 | pancreas | 8.17E−01 | 8.36E−01 |
| chr8: 99961711:99961827 | vessel | 8.16E−01 | 9.06E−01 |
| chr7: 154720589:154720672 | neural | 8.15E−01 | 8.17E−01 |
| chr5: 122423184:122423204 | vessel | 8.10E−01 | 8.88E−01 |
| chr8: 97165649:97165702 | vessel | 8.03E−01 | 9.14E−01 |
| chr2: 45231186:45231227 | vessel | 8.03E−01 | 9.24E−01 |
| chr17: 59532637:59532659 | vessel | 8.02E−01 | 9.46E−01 |
| chr5: 122422007:122422064 | vessel | 8.00E−01 | 9.31E−01 |
| chr11: 2114366:2114498 | kidney | 7.97E−01 | 8.05E−01 |
| chr6: 6000008:6000046 | vessel | 7.96E−01 | 8.05E−01 |
| chr5: 72731939:72731975 | vessel | 7.96E−01 | 8.41E−01 |
| chr8: 71287244:71287415 | neural | 7.95E−01 | 9.26E−01 |
| chr6: 39966947:39967010 | neural | 7.93E−01 | 8.73E−01 |
| chr15: 96909551:96909595 | vessel | 7.93E−01 | 9.30E−01 |
| chr7: 560864:560875 | vessel | 7.92E−01 | 8.38E−01 |
| chr15: 53087377:53087420 | pancreas | 7.91E−01 | 7.83E−01 |
| chr7: 560685:560695 | vessel | 7.91E−01 | 8.47E−01 |
| chr6: 159655065:159655082 | fat | 7.90E−01 | 8.71E−01 |
| chr5: 122422161:122422184 | vessel | 7.90E−01 | 8.74E−01 |
| chr1: 27848198:27848263 | liver | 7.88E−01 | 8.51E−01 |
| chr7: 561160:561184 | pancreas, vessel | 7.88E−01 | 1.00E+00 |
| chr8: 99959774:99959900 | vessel | 7.87E−01 | 7.89E−01 |
| chr16: 73098734:73098753 | pancreas | 7.87E−01 | 8.02E−01 |
| chr3: 73620624:73620814 | neural | 7.86E−01 | 9.13E−01 |
| chr4: 24801971:24802055 | vessel | 7.85E−01 | 8.70E−01 |
| chr19: 13209981:13210007 | vessel | 7.84E−01 | 7.81E−01 |
| chr2: 177004040:177004111 | vessel | 7.84E−01 | 7.65E−01 |
| chr17: 55520634:55520788 | liver | 7.83E−01 | 8.43E−01 |
| chr7: 560782:560796 | vessel | 7.82E−01 | 7.80E−01 |
| chr5: 158532062:158532093 | vessel | 7.80E−01 | 8.87E−01 |
| chr7: 5336543:5336571 | liver | 7.80E−01 | 8.23E−01 |
| chr2: 45240094:45240129 | vessel | 7.79E−01 | 9.15E−01 |
| chr3: 23653540:23653753 | liver | 7.79E−01 | 7.28E−01 |
| chr2: 66810478:66810502 | vessel | 7.77E−01 | 8.71E−01 |
| chr11: 64509762:64509801 | vessel | 7.77E−01 | 8.83E−01 |
| chr5: 72676020:72676058 | vessel | 7.76E−01 | 9.25E−01 |
| chr7: 25892505:25892545 | vessel | 7.76E−01 | 8.16E−01 |
| chr15: 96897012:96897055 | vessel | 7.75E−01 | 7.68E−01 |
| chr10: 126407964:126408032 | vessel | 7.75E−01 | 9.42E−01 |
| chr1: 47909185:47909226 | vessel | 7.74E−01 | 9.58E−01 |
| chr7: 157479397:157479515 | neural | 7.74E−01 | 8.12E−01 |
| chr5: 72597625:72597716 | vessel | 7.74E−01 | 7.40E−01 |
| chr9: 97431689:97431863 | neural | 7.73E−01 | 7.47E−01 |
| chr8: 99961971:99962204 | vessel | 7.72E−01 | 7.37E−01 |
| chr5: 81652981:81653357 | neural | 7.72E−01 | 7.79E−01 |
| chr12: 54088920:54088960 | vessel | 7.72E−01 | 8.92E−01 |
| chr8: 99951082:99951152 | vessel | 7.71E−01 | 8.81E−01 |
| chr4: 15412389:15412548 | neural | 7.70E−01 | 8.16E−01 |
| chr15: 41217790:41217801 | vessel | 7.70E−01 | 8.59E−01 |
| chr17: 48206061:48206096 | vessel | 7.70E−01 | 9.27E−01 |
| chr2: 45231539:45231586 | vessel | 7.69E−01 | 7.61E−01 |
| chr9: 98785107:98785147 | vessel | 7.69E−01 | 8.36E−01 |
| chr4: 1194418:1194505 | liver | 7.69E−01 | 8.79E−01 |
| chr15: 74426581:74426618 | fat | 7.68E−01 | 7.56E−01 |
| chr17: 17628486:17628493 | intestine | 7.68E−01 | 8.62E−01 |
| chr12: 30976279:30976313 | neural | 7.68E−01 | 8.54E−01 |
| chr16: 86968517:86968564 | vessel | 7.67E−01 | 9.11E−01 |
| chr16: 86959129:86959213 | neural | 7.66E−01 | 8.41E−01 |
| chr11: 110581348:110581376 | vessel | 7.66E−01 | 7.83E−01 |
| chr17: 17628638:17628722 | liver | 7.64E−01 | 8.20E−01 |
| chr16: 51669186:51669276 | neural | 7.64E−01 | 8.14E−01 |
| chr10: 119972986:119973016 | neural | 7.63E−01 | 7.86E−01 |
| chr13: 28000468:28000558 | vessel | 7.63E−01 | 7.92E−01 |
| chr8: 99954669:99954686 | vessel | 7.63E−01 | 7.38E−01 |
| chr18: 60173469:60173666 | neural | 7.62E−01 | 7.69E−01 |
| chr10: 105452540:105452576 | liver | 7.62E−01 | 7.91E−01 |
| chr16: 89005381:89005398 | vessel | 7.60E−01 | 9.62E−01 |
| chr6: 168533689:168533704 | vessel | 7.60E−01 | 7.51E−01 |
| chr8: 80740825:80740880 | vessel | 7.59E−01 | 8.20E−01 |
| chr19: 2240088:2240161 | liver | 7.59E−01 | 7.52E−01 |
| chr12: 115251376:115251453 | kidney | 7.58E−01 | 8.58E−01 |
| chr18: 12287438:12287452 | vessel | 7.57E−01 | 7.15E−01 |
| chr20: 39320779:39320848 | vessel | 7.57E−01 | 8.55E−01 |
| chr12: 54807242:54807336 | neural | 7.57E−01 | 7.35E−01 |
| chr2: 177037468:177037632 | vessel | 7.57E−01 | 8.72E−01 |
| chr10: 5489561:5489690 | neural | 7.57E−01 | 8.28E−01 |
| chr12: 54400441:54400545 | vessel | 7.56E−01 | 8.44E−01 |
| chr21: 36901623:36901692 | neural | 7.56E−01 | 7.36E−01 |
| chr2: 241395207:241395347 | vessel | 7.55E−01 | 8.71E−01 |
| chr1: 145440313:145440506 | vessel | 7.55E−01 | 7.93E−01 |
| chr14: 105126561:105126572 | pancreas | 7.55E−01 | 8.19E−01 |
| chr8: 102506473:102506597 | vessel | 7.55E−01 | 8.05E−01 |
| chr13: 95354223:95354262 | neural | 7.54E−01 | 7.52E−01 |
| chr22: 43659543:43659642 | neural | 7.53E−01 | 7.43E−01 |
| chr2: 10231429:10231487 | pancreas | 7.53E−01 | 7.77E−01 |
| chr5: 72676905:72676924 | vessel | 7.53E−01 | 8.17E−01 |
| chr19: 19571777:19571806 | liver | 7.53E−01 | 7.92E−01 |
| chr17: 32705890:32705981 | neural | 7.52E−01 | 7.92E−01 |
| chr15: 53098366:53098407 | pancreas | 7.52E−01 | 7.64E−01 |
| chr10: 123355655:123355837 | vessel | 7.52E−01 | 8.06E−01 |
| chr20: 3053093:3053103 | liver | 7.51E−01 | 8.58E−01 |
| chr1: 170635953:170635964 | vessel | 7.51E−01 | 8.93E−01 |
| chr5: 20041646:20041789 | neural | 7.51E−01 | 8.13E−01 |
| chr20: 39319423:39319447 | esophagus | 7.51E−01 | 7.25E−01 |
| chr7: 27194521:27194570 | vessel | 7.51E−01 | 7.12E−01 |
| chr10: 119300620:119300704 | vessel | 7.51E−01 | 8.79E−01 |
| chr8: 99962451:99962688 | vessel | 7.51E−01 | 7.67E−01 |
| chr15: 53087876:53087895 | pancreas | 7.50E−01 | 7.66E−01 |
| chr9: 139740765:139740775 | pancreas | 7.50E−01 | 8.86E−01 |
| chr14: 105944278:105944310 | vessel | 7.50E−01 | 9.04E−01 |
| chr9: 102587733:102587805 | vessel | 7.49E−01 | 8.72E−01 |
| chr16: 81030772:81030844 | neural | 7.49E−01 | 8.30E−01 |
| chr2: 89166335:89166578 | neural | 7.49E−01 | 8.89E−01 |
| chr8: 99951364:99951421 | vessel | 7.48E−01 | 7.27E−01 |
| chr8: 76316319:76316353 | vessel | 7.48E−01 | 8.59E−01 |
| chr12: 54408685:54408713 | kidney | 7.47E−01 | 7.53E−01 |
| chr9: 136567964:136567975 | liver | 7.47E−01 | 7.47E−01 |
| chr5: 72526768:72526786 | vessel | 7.46E−01 | 7.66E−01 |
| chr2: 66809772:66809852 | vessel | 7.46E−01 | 8.14E−01 |
| chr2: 96814448:96814515 | liver | 7.46E−01 | 8.86E−01 |
| chr5: 38368165:38368317 | neural | 7.46E−01 | 7.62E−01 |
| chr1: 110610678:110610715 | vessel | 7.45E−01 | 7.56E−01 |
| chr12: 54440712:54440753 | vessel | 7.45E−01 | 8.38E−01 |
| chr5: 122421804:122421820 | vessel | 7.44E−01 | 9.30E−01 |
| chr7: 19149999:19150182 | kidney, vessel | 7.44E−01 | 8.83E−01 |
| chr19: 13124365:13124391 | pancreas | 7.44E−01 | 7.18E−01 |
| chr12: 118314033:118314075 | pancreas | 7.43E−01 | 6.85E−01 |

TABLE 2

Complete list of high methylated haplotype shared between matched primary tumor tissues and plasma for colon cancer (CRC) and lung cancer (LC) patients.

| Chr | Start | End | Coordinate | Symbol | Annotation |
|---|---|---|---|---|---|
| 1 | 3527738 | 3527759 | chr1: 3527738-3527759 | MEGF6 | Promoter |
| 1 | 13839806 | 13839815 | chr1: 13839806-13839815 | n/a | n/a |
| 1 | 14219586 | 14219639 | chr1: 14219586-14219639 | n/a | n/a |
| 1 | 17019874 | 17019889 | chr1: 17019874-17019889 | ESPNP | UTR3 |
| 1 | 21836158 | 21836216 | chr1: 21836158-21836216 | ALPL | UTR5 |
| 1 | 22889799 | 22889812 | chr1: 22889799-22889812 | EPHA8 | Promoter |
| 1 | 23279723 | 23279744 | chr1: 23279723-23279744 | n/a | n/a |
| 1 | 23280192 | 23280211 | chr1: 23280192-23280211 | n/a | n/a |
| 1 | 27676453 | 27676616 | chr1: 27676453-27676616 | SYTL1 | Intron |
| 1 | 29563577 | 29563710 | chr1: 29563577-29563710 | PTPRU | Promoter |
| 1 | 39981227 | 39981247 | chr1: 39981227-39981247 | BMP8A | Intron |
| 1 | 44883591 | 44883606 | chr1: 44883591-44883606 | RNF220 | Intron |
| 1 | 46859961 | 46859974 | chr1: 46859961-46859974 | FAAH | UTR5 |
| 1 | 48190891 | 48190924 | chr1: 48190891-48190924 | n/a | n/a |
| 1 | 50884393 | 50884411 | chr1: 50884393-50884411 | DMRTA2 | Exon |
| 1 | 50884419 | 50884430 | chr1: 50884419-50884430 | DMRTA2 | Exon |
| 1 | 50884472 | 50884632 | chr1: 50884472-50884632 | DMRTA2 | Exon |
| 1 | 59280289 | 59280357 | chr1: 59280289-59280357 | n/a | n/a |
| 1 | 59280369 | 59280455 | chr1: 59280369-59280455 | n/a | n/a |
| 1 | 61517642 | 61517933 | chr1: 61517642-61517933 | n/a | n/a |
| 1 | 74663749 | 74663776 | chr1: 74663749-74663776 | LRRIQ3 | UTR5 |
| 1 | 92946665 | 92946767 | chr1: 92946665-92946767 | GFI1 | Intron |
| 1 | 108508530 | 108508549 | chr1: 108508530-108508549 | VAV3 | Promoter |
| 1 | 119543104 | 119543127 | chr1: 119543104-119543127 | TBX15 | Enhancer |
| 1 | 150293718 | 150293852 | chr1: 150293718-150293852 | PRPF3 | Promoter |
| 1 | 156828865 | 156828914 | chr1: 156828865-156828914 | NTRK1 | Promoter |
| 1 | 158151057 | 158151116 | chr1: 158151057-158151116 | CD1D | Intron |
| 1 | 171810397 | 171810513 | chr1: 171810397-171810513 | DNM3 | Promoter |
| 1 | 203096889 | 203096934 | chr1: 203096889-203096934 | ADORA1 | UTR5 |
| 1 | 203598610 | 203598622 | chr1: 203598610-203598622 | ATP2B4 | UTR5 |
| 1 | 214153443 | 214153464 | chr1: 214153443-214153464 | PROX1 | Enhancer |
| 1 | 215256127 | 215256195 | chr1: 215256127-215256195 | KCNK2 | Promoter |
| 1 | 234040873 | 234041006 | chr1: 234040873-234041006 | SLC35F3 | Promoter |
| 1 | 234350457 | 234350469 | chr1: 234350457-234350469 | SLC35F3 | Intron |
| 1 | 236558377 | 236558653 | chr1: 236558377-236558653 | EDARADD | Promoter |
| 1 | 242687600 | 242687610 | chr1: 242687600-242687610 | PLD5 | UTR5 |
| 1 | 244894219 | 244894231 | chr1: 244894219-244894231 | n/a | n/a |
| 1 | 246952304 | 246952348 | chr1: 246952304-246952348 | LOC149134 | Promoter |
| 2 | 3751318 | 3751336 | chr2: 3751318-3751336 | ALLC | Downstream |
| 2 | 8833584 | 8833597 | chr2: 8833584-8833597 | n/a | n/a |
| 2 | 11809996 | 11810041 | chr2: 11809996-11810041 | NTSR2 | Promoter |
| 2 | 26521758 | 26521880 | chr2: 26521758-26521880 | n/a | n/a |
| 2 | 31360797 | 31360816 | chr2: 31360797-31360816 | GALNT14 | Promoter |
| 2 | 39102723 | 39102771 | chr2: 39102723-39102771 | DHX57 | UTR5 |
| 2 | 47596444 | 47596455 | chr2: 47596444-47596455 | EPCAM | UTR5 |
| 2 | 47596483 | 47596505 | chr2: 47596483-47596505 | EPCAM | UTR5 |
| 2 | 70056907 | 70056960 | chr2: 70056907-70056960 | GMCL1 | UTR5 |
| 2 | 70994743 | 70994753 | chr2: 70994743-70994753 | ADD2 | UTR5 |
| 2 | 73429837 | 73429858 | chr2: 73429837-73429858 | NOTO | Promoter |
| 2 | 88470034 | 88470056 | chr2: 88470034-88470056 | THNSL2 | UTR5 |
| 2 | 105459218 | 105459234 | chr2: 105459218-105459234 | POU3F3 | Enhancer |
| 2 | 110372264 | 110372284 | chr2: 110372264-110372284 | ANKRD57 | Promoter |
| 2 | 113956590 | 113956654 | chr2: 113956590-113956654 | LOC440839 | UTR3 |
| 2 | 119604037 | 119604049 | chr2: 119604037-119604049 | EN1 | Exon |
| 2 | 119916314 | 119916319 | chr2: 119916314-119916319 | C1QL2 | UTR5 |
| 2 | 127783309 | 127783371 | chr2: 127783309-127783371 | n/a | n/a |
| 2 | 175594922 | 175594966 | chr2: 175594922-175594966 | n/a | n/a |
| 2 | 176945353 | 176945373 | chr2: 176945353-176945373 | EVX2 | Exon |
| 2 | 176971839 | 176971857 | chr2: 176971839-176971857 | HOXD11 | Promoter |
| 2 | 176972805 | 176972814 | chr2: 176972805-176972814 | HOXD11 | Promoter |
| 2 | 207307674 | 207307712 | chr2: 207307674-207307712 | ADAM23 | Promoter |
| 2 | 220313255 | 220313271 | chr2: 220313255-220313271 | SPEG | Exon |
| 2 | 233351443 | 233351467 | chr2: 233351443-233351467 | ECEL1 | UTR5 |
| 2 | 239755874 | 239755895 | chr2: 239755874-239755895 | TWIST2 | Promoter |
| 3 | 9988661 | 9989203 | chr3: 9988661-9989203 | PRRT3 | Exon |
| 3 | 10749398 | 10749432 | chr3: 10749398-10749432 | n/a | n/a |
| 3 | 10749434 | 10749467 | chr3: 10749434-10749467 | n/a | n/a |
| 3 | 12046446 | 12046504 | chr3: 12046446-12046504 | SYN2 | Promoter |
| 3 | 13324006 | 13324119 | chr3: 13324006-13324119 | n/a | n/a |
| 3 | 16554839 | 16555196 | chr3: 16554839-16555196 | RFTN1 | UTR5 |
| 3 | 42304944 | 42304981 | chr3: 42304944-42304981 | CCK | Exon |
| 3 | 54156903 | 54156978 | chr3: 54156903-54156978 | CACNA2D3 | Promoter |
| 3 | 54156985 | 54157005 | chr3: 54156985-54157005 | CACNA2D3 | Promoter |
| 3 | 69591310 | 69591445 | chr3: 69591310-69591445 | n/a | n/a |
| 3 | 119528983 | 119529218 | chr3: 119528983-119529218 | NR1I2 | Intron |

TABLE 2-continued

Complete list of high methylated haplotype shared between matched primary tumor tissues and plasma for colon cancer (CRC) and lung cancer (LC) patients.

| Chr | Start | End | Coordinate | Symbol | Annotation |
|---|---|---|---|---|---|
| 3 | 122641209 | 122641233 | chr3: 122641209-122641233 | SEMA5B | Exon |
| 3 | 130646225 | 130646274 | chr3: 130646225-130646274 | ATP2C1 | Intron |
| 3 | 151178854 | 151178938 | chr3: 151178854-151178938 | IGSF10 | Promoter |
| 3 | 187676563 | 187676643 | chr3: 187676563-187676643 | n/a | n/a |
| 4 | 124515 | 124758 | chr4: 124515-124758 | ZNF718 | Intron |
| 4 | 467665 | 467684 | chr4: 467665-467684 | ZNF721 | UTR5 |
| 4 | 658004 | 658032 | chr4: 658004-658032 | PDE6B | Intron |
| 4 | 3873182 | 3873271 | chr4: 3873182-3873271 | n/a | n/a |
| 4 | 5713317 | 5713393 | chr4: 5713317-5713393 | EVC2 | Promoter |
| 4 | 11370394 | 11370433 | chr4: 11370394-11370433 | MIR572 | Promoter |
| 4 | 11370452 | 11370520 | chr4: 11370452-11370520 | MIR572 | UTR5 |
| 4 | 30719538 | 30719763 | chr4: 30719538-30719763 | PCDH7 | Promoter |
| 4 | 42153515 | 42153591 | chr4: 42153515-42153591 | BEND4 | Intron |
| 4 | 44449839 | 44449861 | chr4: 44449839-44449861 | KCTD8 | Promoter |
| 4 | 55098179 | 55098209 | chr4: 55098179-55098209 | PDGFRA | UTR5 |
| 4 | 55991626 | 55991684 | chr4: 55991626-55991684 | KDR | UTR5 |
| 4 | 62067517 | 62067536 | chr4: 62067517-62067536 | n/a | n/a |
| 4 | 77819160 | 77819271 | chr4: 77819160-77819271 | ANKRD56 | Promoter |
| 4 | 103940573 | 103940885 | chr4: 103940573-103940885 | NHEDC1 | UTR5 |
| 4 | 103940890 | 103941101 | chr4: 103940890-103941101 | NHEDC1 | Promoter |
| 4 | 126236257 | 126236931 | chr4: 126236257-126236931 | FAT4 | Promoter |
| 4 | 144833142 | 144833212 | chr4: 144833142-144833212 | GYPE | Enhancer |
| 4 | 151000141 | 151000246 | chr4: 151000141-151000246 | DCLK2 | UTR5 |
| 5 | 191803 | 191818 | chr5: 191803-191818 | LRRC14B | Promoter |
| 5 | 5139924 | 5139935 | chr5: 5139924-5139935 | ADAMTS16 | Promoter |
| 5 | 8457467 | 8457735 | chr5: 8457467-8457735 | n/a | n/a |
| 5 | 43603785 | 43604084 | chr5: 43603785-43604084 | NNT | UTR5 |
| 5 | 43604116 | 43604165 | chr5: 43604116-43604165 | NNT | UTR5 |
| 5 | 55117727 | 55117748 | chr5: 55117727-55117748 | n/a | n/a |
| 5 | 76476761 | 76476791 | chr5: 76476761-76476791 | n/a | n/a |
| 5 | 76507004 | 76507082 | chr5: 76507004-76507082 | PDE8B | Promoter |
| 5 | 77147764 | 77147911 | chr5: 77147764-77147911 | n/a | n/a |
| 5 | 113391874 | 113391904 | chr5: 113391874-113391904 | n/a | n/a |
| 5 | 115298740 | 115298778 | chr5: 115298740-115298778 | LVRN | Promoter |
| 5 | 150536722 | 150536746 | chr5: 150536722-150536746 | ANXA6 | UTR5 |
| 5 | 155108288 | 155108355 | chr5: 155108288-155108355 | n/a | n/a |
| 5 | 174151522 | 174151577 | chr5: 174151522-174151577 | MSX2 | UTR5 |
| 5 | 179780701 | 179780801 | chr5: 179780701-179780801 | GFPT2 | Promoter |
| 5 | 180486476 | 180486537 | chr5: 180486476-180486537 | BTNL9 | Exon |
| 6 | 1390421 | 1390427 | chr6: 1390421-1390427 | FOXF2 | Promoter |
| 6 | 1555484 | 1555571 | chr6: 1555484-1555571 | n/a | n/a |
| 6 | 3849234 | 3849541 | chr6: 3849234-3849541 | FAM50B | Promoter |
| 6 | 11242082 | 11242134 | chr6: 11242082-11242134 | NEDD9 | Intron |
| 6 | 18122712 | 18122718 | chr6: 18122712-18122718 | NHLRC1 | Promoter |
| 6 | 29760303 | 29760314 | chr6: 29760303-29760314 | HCG4 | UTR3 |
| 6 | 35888708 | 35888855 | chr6: 35888708-35888855 | SRPK1 | UTR5 |
| 6 | 42072328 | 42072372 | chr6: 42072328-42072372 | C6orf132 | Exon |
| 6 | 137818835 | 137818915 | chr6: 137818835-137818915 | OLIG3 | Promoter |
| 6 | 152129664 | 152129700 | chr6: 152129664-152129700 | ESR1 | Promoter |
| 6 | 166582820 | 166582835 | chr6: 166582820-166582835 | T | Promoter |
| 6 | 170581003 | 170581095 | chr6: 170581003-170581095 | LOC154449 | Enhancer |
| 7 | 27138133 | 27138172 | chr7: 27138133-27138172 | HOXA1 | Promoter |
| 7 | 27146154 | 27146541 | chr7: 27146154-27146541 | HOXA3 | UTR3 |
| 7 | 27147986 | 27148068 | chr7: 27147986-27148068 | HOXA3 | Exon |
| 7 | 27162225 | 27162404 | chr7: 27162225-27162404 | HOXA3 | UTR5 |
| 7 | 27182613 | 27183574 | chr7: 27182613-27183574 | HOXA5 | UTR5 |
| 7 | 27196517 | 27196529 | chr7: 27196517-27196529 | HOXA7 | Promoter |
| 7 | 28997143 | 28997166 | chr7: 28997143-28997166 | TRIL | Promoter |
| 7 | 32110174 | 32110180 | chr7: 32110174-32110180 | PDE1C | UTR5 |
| 7 | 37392844 | 37393124 | chr7: 37392844-37393124 | ELMO1 | UTR5 |
| 7 | 43798072 | 43798080 | chr7: 43798072-43798080 | BLVRA | Promoter |
| 7 | 44349388 | 44349523 | chr7: 44349388-44349523 | CAMK2B | Intron |
| 7 | 45002209 | 45002518 | chr7: 45002209-45002518 | MYO1G | UTR3 |
| 7 | 45002526 | 45002634 | chr7: 45002526-45002634 | MYO1G | Intron |
| 7 | 45614570 | 45614580 | chr7: 45614570-45614580 | ADCY1 | Promoter |
| 7 | 45615005 | 45615102 | chr7: 45615005-45615102 | ADCY1 | Promoter |
| 7 | 50850278 | 50850659 | chr7: 50850278-50850659 | GRB10 | UTR5 |
| 7 | 56355680 | 56355715 | chr7: 56355680-56355715 | n/a | n/a |
| 7 | 64022988 | 64023250 | chr7: 64022988-64023250 | ZNF680 | Promoter |
| 7 | 65971098 | 65971186 | chr7: 65971098-65971186 | n/a | n/a |
| 7 | 82792010 | 82792128 | chr7: 82792010-82792128 | PCLO | UTR5 |
| 7 | 100203335 | 100203366 | chr7: 100203335-100203366 | PCOLCE | Exon |
| 7 | 103629981 | 103630092 | chr7: 103629981-103630092 | RELN | Promoter |
| 7 | 113727611 | 113727622 | chr7: 113727611-113727622 | n/a | n/a |
| 7 | 127672078 | 127672112 | chr7: 127672078-127672112 | LRRC4 | Promoter |

TABLE 2-continued

Complete list of high methylated haplotype shared between matched primary tumor tissues and plasma for colon cancer (CRC) and lung cancer (LC) patients.

| Chr | Start | End | Coordinate | Symbol | Annotation |
|---|---|---|---|---|---|
| 7 | 127743728 | 127743766 | chr7: 127743728-127743766 | n/a | n/a |
| 7 | 130130739 | 130131267 | chr7: 130130739-130131267 | MESTIT1 | UTR5 |
| 7 | 130131358 | 130131518 | chr7: 130131358-130131518 | MEST | UTR5 |
| 7 | 149746006 | 149746019 | chr7: 149746006-149746019 | n/a | n/a |
| 7 | 150812726 | 150812750 | chr7: 150812726-150812750 | AGAP3 | Intron |
| 7 | 151216757 | 151216773 | chr7: 151216757-151216773 | RHEB | UTR5 |
| 7 | 153583591 | 153583622 | chr7: 153583591-153583622 | DPP6 | Promoter |
| 7 | 155247552 | 155247562 | chr7: 155247552-155247562 | EN2 | Promoter |
| 7 | 155595896 | 155595952 | chr7: 155595896-155595952 | SHH | Exon |
| 7 | 156400470 | 156400500 | chr7: 156400470-156400500 | n/a | n/a |
| 7 | 157486226 | 157486275 | chr7: 157486226-157486275 | PTPRN2 | Intron |
| 7 | 158938119 | 158938146 | chr7: 158938119-158938146 | VIPR2 | Promoter |
| 8 | 2585693 | 2585757 | chr8: 2585693-2585757 | n/a | n/a |
| 8 | 4851492 | 4851508 | chr8: 4851492-4851508 | CSMD1 | Promoter |
| 8 | 9009136 | 9009388 | chr8: 9009136-9009388 | PPP1R3B | Promoter |
| 8 | 23260741 | 23260788 | chr8: 23260741-23260788 | LOXL2 | UTR5 |
| 8 | 31497559 | 31497576 | chr8: 31497559-31497576 | NRG1 | Promoter |
| 8 | 37552122 | 37552160 | chr8: 37552122-37552160 | ZNF703 | Promoter |
| 8 | 37699481 | 37699558 | chr8: 37699481-37699558 | GPR124 | Exon |
| 8 | 38034584 | 38034641 | chr8: 38034584-38034641 | LSM1 | Promoter |
| 8 | 41166680 | 41166708 | chr8: 41166680-41166708 | SFRP1 | UTR5 |
| 8 | 49426959 | 49427414 | chr8: 49426959-49427414 | n/a | n/a |
| 8 | 54163561 | 54163585 | chr8: 54163561-54163585 | OPRK1 | Promoter |
| 8 | 54163604 | 54163694 | chr8: 54163604-54163694 | OPRK1 | UTR5 |
| 8 | 55380019 | 55380033 | chr8: 55380019-55380033 | n/a | n/a |
| 8 | 58055200 | 58055257 | chr8: 58055200-58055257 | n/a | n/a |
| 8 | 65493709 | 65493763 | chr8: 65493709-65493763 | BHLHE22 | Promoter |
| 8 | 67874080 | 67874104 | chr8: 67874080-67874104 | n/a | n/a |
| 8 | 72756057 | 72756082 | chr8: 72756057-72756082 | MSC | Promoter |
| 8 | 98290011 | 98290080 | chr8: 98290011-98290080 | TSPYL5 | UTR5 |
| 8 | 103750881 | 103750903 | chr8: 103750881-103750903 | n/a | n/a |
| 8 | 127568853 | 127569069 | chr8: 127568853-127569069 | FAM84B | Exon |
| 8 | 141108442 | 141109280 | chr8: 141108442-141109280 | TRAPPC9 | Intron |
| 8 | 144511400 | 144511448 | chr8: 144511400-144511448 | MAFA | Downstream |
| 8 | 145104394 | 145104454 | chr8: 145104394-145104454 | OPLAH | Downstream |
| 9 | 113865 | 113881 | chr9: 113865-113881 | n/a | n/a |
| 9 | 113884 | 113897 | chr9: 113884-113897 | n/a | n/a |
| 9 | 19788900 | 19788911 | chr9: 19788900-19788911 | SLC24A2 | Promoter |
| 9 | 25677605 | 25677627 | chr9: 25677605-25677627 | TUSC1 | UTR3 |
| 9 | 35689643 | 35689690 | chr9: 35689643-35689690 | TPM2 | Promoter |
| 9 | 38424066 | 38424081 | chr9: 38424066-38424081 | IGFBPL1 | Promoter |
| 9 | 89560709 | 89560739 | chr9: 89560709-89560739 | GAS1 | Exon |
| 9 | 95572080 | 95572086 | chr9: 95572080-95572086 | ANKRD19 | UTR5 |
| 9 | 99983989 | 99984041 | chr9: 99983989-99984041 | KIAA1529 | Enhancer |
| 9 | 101471709 | 101471724 | chr9: 101471709-101471724 | GABBR2 | Promoter |
| 9 | 101706293 | 101706314 | chr9: 101706293-101706314 | COL15A1 | UTR5 |
| 9 | 120507462 | 120507562 | chr9: 120507462-120507562 | n/a | n/a |
| 9 | 123656794 | 123657026 | chr9: 123656794-123657026 | PHF19 | Enhancer |
| 9 | 123657048 | 123657162 | chr9: 123657048-123657162 | PHF19 | Enhancer |
| 9 | 124888893 | 124889126 | chr9: 124888893-124889126 | n/a | n/a |
| 9 | 132382398 | 132382811 | chr9: 132382398-132382811 | C9orf50 | Promoter |
| 9 | 133536491 | 133536515 | chr9: 133536491-133536515 | PRDM12 | Promoter |
| 9 | 133536616 | 133536699 | chr9: 133536616-133536699 | PRDM12 | Promoter |
| 9 | 135462555 | 135462589 | chr9: 135462555-135462589 | BARHL1 | Intron |
| 9 | 137979579 | 137979590 | chr9: 137979579-137979590 | OLFM1 | Intron |
| 9 | 139964715 | 139964731 | chr9: 139964715-139964731 | C9orf140 | Promoter |
| 10 | 7708553 | 7708596 | chr10: 7708553-7708596 | ITIH5 | Promoter |
| 10 | 20104705 | 20104724 | chr10: 20104705-20104724 | PLXDC2 | Promoter |
| 10 | 25465355 | 25465408 | chr10: 25465355-25465408 | LOC100128811 | Promoter |
| 10 | 29698362 | 29698585 | chr10: 29698362-29698585 | LOC387647 | UTR5 |
| 10 | 71626579 | 71626666 | chr10: 71626579-71626666 | COL13A1 | Intron |
| 10 | 77158757 | 77158887 | chr10: 77158757-77158887 | C10orf41 | Promoter |
| 10 | 80898884 | 80899123 | chr10: 80898884-80899123 | ZMIZ1 | UTR5 |
| 10 | 81163306 | 81163339 | chr10: 81163306-81163339 | ZCCHC24 | Intron |
| 10 | 83634362 | 83634433 | chr10: 83634362-83634433 | NRG3 | Promoter |
| 10 | 88123205 | 88123264 | chr10: 88123205-88123264 | GRID1 | Intron |
| 10 | 101282028 | 101282143 | chr10: 101282028-101282143 | NKX2-3 | Enhancer |
| 10 | 102495446 | 102495452 | chr10: 102495446-102495452 | PAX2 | Enhancer |
| 10 | 102507681 | 102507717 | chr10: 102507681-102507717 | PAX2 | Intron |
| 10 | 105344583 | 105344617 | chr10: 105344583-105344617 | NEURL | Exon |
| 10 | 105452852 | 105452884 | chr10: 105452852-105452884 | SH3PXD2A | Intron |
| 10 | 105453074 | 105453169 | chr10: 105453074-105453169 | SH3PXD2A | Intron |
| 10 | 111216768 | 111216809 | chr10: 111216768-111216809 | n/a | n/a |
| 10 | 119301950 | 119302046 | chr10: 119301950-119302046 | EMX2 | UTR5 |
| 10 | 119311968 | 119311994 | chr10: 119311968-119311994 | EMX2OS | Enhancer |

TABLE 2-continued

Complete list of high methylated haplotype shared between matched primary tumor tissues and plasma for colon cancer (CRC) and lung cancer (LC) patients.

| Chr | Start | End | Coordinate | Symbol | Annotation |
|---|---|---|---|---|---|
| 10 | 119313192 | 119313239 | chr10: 119313192-119313239 | EMX2OS | Enhancer |
| 10 | 125732491 | 125732516 | chr10: 125732491-125732516 | n/a | n/a |
| 10 | 131767467 | 131767523 | chr10: 131767467-131767523 | EBF3 | Enhancer |
| 10 | 133999328 | 133999363 | chr10: 133999328-133999363 | DPYSL4 | Promoter |
| 10 | 134222564 | 134222659 | chr10: 134222564-134222659 | PWWP2B | UTR3 |
| 10 | 135090324 | 135090391 | chr10: 135090324-135090391 | ADAM8 | UTR5 |
| 11 | 397076 | 397141 | chr11: 397076-397141 | PKP3 | Exon |
| 11 | 518994 | 519003 | chr11: 518994-519003 | LRRC56 | Enhancer |
| 11 | 726322 | 726388 | chr11: 726322-726388 | EPS8L2 | Exon |
| 11 | 1874410 | 1874461 | chr11: 1874410-1874461 | LSP1 | Promoter |
| 11 | 2021030 | 2021337 | chr11: 2021030-2021337 | MIR675 | Promoter |
| 11 | 17297912 | 17298333 | chr11: 17297912-17298333 | NUCB2 | UTR5 |
| 11 | 17740909 | 17740930 | chr11: 17740909-17740930 | MYOD1 | Promoter |
| 11 | 24518517 | 24518550 | chr11: 24518517-24518550 | LUZP2 | Promoter |
| 11 | 35641254 | 35641291 | chr11: 35641254-35641291 | FJX1 | Exon |
| 11 | 47236054 | 47236189 | chr11: 47236054-47236189 | DDB2 | Promoter |
| 11 | 47611788 | 47611855 | chr11: 47611788-47611855 | C1QTNF4 | Exon |
| 11 | 60692224 | 60692379 | chr11: 60692224-60692379 | TMEM132A | Promoter |
| 11 | 61880088 | 61880140 | chr11: 61880088-61880140 | INCENP | Enhancer |
| 11 | 69589140 | 69589199 | chr11: 69589140-69589199 | FGF4 | Promoter |
| 11 | 69924935 | 69924948 | chr11: 69924935-69924948 | ANO1 | Promoter |
| 11 | 71951194 | 71951198 | chr11: 71951194-71951198 | PHOX2A | Exon |
| 11 | 72295582 | 72295589 | chr11: 72295582-72295589 | PDE2A | UTR3 |
| 11 | 72295726 | 72295758 | chr11: 72295726-72295758 | PDE2A | UTR3 |
| 11 | 72533078 | 72533338 | chr11: 72533078-72533338 | ATG16L2 | Intron |
| 11 | 79148648 | 79148661 | chr11: 79148648-79148661 | ODZ4 | UTR5 |
| 11 | 82443937 | 82443948 | chr11: 82443937-82443948 | FAM181B | Promoter |
| 11 | 100998291 | 100998355 | chr11: 100998291-100998355 | PGR | Exon |
| 11 | 109963265 | 109963348 | chr11: 109963265-109963348 | ZC3H12C | Promoter |
| 11 | 109964113 | 109964167 | chr11: 109964113-109964167 | ZC3H12C | UTR5 |
| 11 | 134146600 | 134146621 | chr11: 134146600-134146621 | GLB1L3 | UTR5 |
| 12 | 2163267 | 2163279 | chr12: 2163267-2163279 | CACNA1C | Promoter |
| 12 | 2800445 | 2800521 | chr12: 2800445-2800521 | CACNA1C | UTR3 |
| 12 | 3309861 | 3309888 | chr12: 3309861-3309888 | TSPAN9 | UTR5 |
| 12 | 7781181 | 7781237 | chr12: 7781181-7781237 | n/a | n/a |
| 12 | 9217328 | 9217429 | chr12: 9217328-9217429 | LOC144571 | Promoter |
| 12 | 29936643 | 29936653 | chr12: 29936643-29936653 | TMTC1 | UTR5 |
| 12 | 54764364 | 54764584 | chr12: 54764364-54764584 | ZNF385A | Intron |
| 12 | 57869148 | 57869420 | chr12: 57869148-57869420 | ARHGAP9 | Intron |
| 12 | 58025887 | 58025901 | chr12: 58025887-58025901 | B4GALNT1 | Exon |
| 12 | 58119853 | 58120184 | chr12: 58119853-58120184 | LOC100130776 | UTR5 |
| 12 | 58131738 | 58132045 | chr12: 58131738-58132045 | AGAP2 | UTR5 |
| 12 | 122016340 | 122016373 | chr12: 122016340-122016373 | KDM2B | Intron |
| 12 | 132195645 | 132195994 | chr12: 132195645-132195994 | SFRS8 | UTR5 |
| 13 | 19918950 | 19918983 | chr13: 19918950-19918983 | LOC100101938 | UTR3 |
| 13 | 20139192 | 20139253 | chr13: 20139192-20139253 | n/a | n/a |
| 13 | 20692669 | 20692685 | chr13: 20692669-20692685 | n/a | n/a |
| 13 | 25115907 | 25115943 | chr13: 25115907-25115943 | n/a | n/a |
| 13 | 26625786 | 26625915 | chr13: 26625786-26625915 | SHISA2 | Promoter |
| 13 | 48893192 | 48893246 | chr13: 48893192-48893246 | RB1 | Intron |
| 13 | 52703312 | 52703361 | chr13: 52703312-52703361 | NEK5 | Promoter |
| 13 | 100608204 | 100608226 | chr13: 100608204-100608226 | n/a | n/a |
| 13 | 109147798 | 109147937 | chr13: 109147798-109147937 | n/a | n/a |
| 13 | 109148352 | 109148477 | chr13: 109148352-109148477 | n/a | n/a |
| 13 | 110959180 | 110959184 | chr13: 110959180-110959184 | COL4A2 | Promoter |
| 13 | 112723104 | 112723110 | chr13: 112723104-112723110 | SOX1 | Exon |
| 13 | 113764991 | 113765210 | chr13: 113764991-113765210 | F7 | Intron |
| 13 | 114462331 | 114462426 | chr13: 114462331-114462426 | FAM70B | Promoter |
| 14 | 28733691 | 28733732 | chr14: 28733691-28733732 | n/a | n/a |
| 14 | 37051685 | 37051713 | chr14: 37051685-37051713 | NKX2-8 | UTR5 |
| 14 | 38091516 | 38091570 | chr14: 38091516-38091570 | n/a | n/a |
| 14 | 42077408 | 42077482 | chr14: 42077408-42077482 | LRFN5 | UTR5 |
| 14 | 48143559 | 48143579 | chr14: 48143559-48143579 | MDGA2 | Promoter |
| 14 | 77737169 | 77737210 | chr14: 77737169-77737210 | NGB | Promoter |
| 14 | 91720063 | 91720097 | chr14: 91720063-91720097 | GPR68 | UTR5 |
| 14 | 97499682 | 97499715 | chr14: 97499682-97499715 | n/a | n/a |
| 14 | 101925421 | 101925446 | chr14: 101925421-101925446 | n/a | n/a |
| 14 | 105640938 | 105641002 | chr14: 105640938-105641002 | NUDT14 | Intron |
| 14 | 105767212 | 105767276 | chr14: 105767212-105767276 | BRF1 | UTR5 |
| 15 | 23892769 | 23892883 | chr15: 23892769-23892883 | MAGEL2 | Promoter |
| 15 | 26107989 | 26108171 | chr15: 26107989-26108171 | ATP10A | Promoter |
| 15 | 26108184 | 26108248 | chr15: 26108184-26108248 | ATP10A | UTR5 |
| 15 | 27213029 | 27213059 | chr15: 27213029-27213059 | GABRG3 | Promoter |
| 15 | 29034062 | 29034076 | chr15: 29034062-29034076 | n/a | n/a |
| 15 | 29034154 | 29034183 | chr15: 29034154-29034183 | n/a | n/a |

TABLE 2-continued

Complete list of high methylated haplotype shared between matched primary tumor tissues and plasma for colon cancer (CRC) and lung cancer (LC) patients.

| Chr | Start | End | Coordinate | Symbol | Annotation |
|---|---|---|---|---|---|
| 15 | 33010242 | 33010280 | chr15: 33010242-33010280 | GREM1 | UTR5 |
| 15 | 35047291 | 35047296 | chr15: 35047291-35047296 | GJD2 | Promoter |
| 15 | 40583268 | 40583755 | chr15: 40583268-40583755 | PLCB2 | Intron |
| 15 | 47477259 | 47477276 | chr15: 47477259-47477276 | n/a | n/a |
| 15 | 56035589 | 56035677 | chr15: 56035589-56035677 | PRTG | Promoter |
| 15 | 65360274 | 65360278 | chr15: 65360274-65360278 | RASL12 | UTR5 |
| 15 | 70354770 | 70354890 | chr15: 70354770-70354890 | TLE3 | Intron |
| 15 | 74044709 | 74044798 | chr15: 74044709-74044798 | C15orf59 | Promoter |
| 15 | 79576092 | 79576118 | chr15: 79576092-79576118 | ANKRD34C | UTR5 |
| 15 | 79724688 | 79724701 | chr15: 79724688-79724701 | KIAA1024 | Promoter |
| 15 | 89148392 | 89148460 | chr15: 89148392-89148460 | MIR7-2 | Enhancer |
| 15 | 97491220 | 97491238 | chr15: 97491220-97491238 | n/a | n/a |
| 15 | 100386502 | 100386576 | chr15: 100386502-100386576 | n/a | n/a |
| 16 | 128297 | 128580 | chr16: 128297-128580 | MPG | UTR5 |
| 16 | 610097 | 610110 | chr16: 610097-610110 | C16orf11 | Promoter |
| 16 | 1203760 | 1203786 | chr16: 1203760-1203786 | CACNA1H | Promoter |
| 16 | 2009454 | 2009590 | chr16: 2009454-2009590 | NDUFB10 | UTR5 |
| 16 | 2317602 | 2317630 | chr16: 2317602-2317630 | RNPS1 | UTR5 |
| 16 | 28074226 | 28074311 | chr16: 28074226-28074311 | GSG1L | Promoter |
| 16 | 30572753 | 30572772 | chr16: 30572753-30572772 | ZNF764 | Promoter |
| 16 | 47177577 | 47177628 | chr16: 47177577-47177628 | NETO2 | UTR5 |
| 16 | 51185385 | 51185428 | chr16: 51185385-51185428 | SALL1 | Promoter |
| 16 | 67313433 | 67313443 | chr16: 67313433-67313443 | PLEKHG4 | UTR5 |
| 16 | 67687484 | 67687553 | chr16: 67687484-67687553 | RLTPR | Intron |
| 16 | 68269381 | 68269396 | chr16: 68269381-68269396 | ESRP2 | Promoter |
| 16 | 68679063 | 68679166 | chr16: 68679063-68679166 | CDH3 | UTR5 |
| 16 | 69419782 | 69420122 | chr16: 69419782-69420122 | TERF2 | UTR5 |
| 16 | 75284386 | 75284475 | chr16: 75284386-75284475 | BCAR1 | Intron |
| 16 | 79633394 | 79633613 | chr16: 79633394-79633613 | MAF | Exon |
| 16 | 86541944 | 86542182 | chr16: 86541944-86542182 | FOXF1 | Promoter |
| 16 | 88454809 | 88454843 | chr16: 88454809-88454843 | n/a | n/a |
| 16 | 88600767 | 88600893 | chr16: 88600767-88600893 | ZFPM1 | Exon |
| 16 | 90113989 | 90114077 | chr16: 90113989-90114077 | LOC100130015 | UTR5 |
| 17 | 3438996 | 3439015 | chr17: 3438996-3439015 | TRPV3 | Intron |
| 17 | 14205002 | 14205182 | chr17: 14205002-14205182 | MGC12916 | Promoter |
| 17 | 17399374 | 17399399 | chr17: 17399374-17399399 | RASD1 | Promoter |
| 17 | 18061388 | 18061524 | chr17: 18061388-18061524 | MYO15A | Intron |
| 17 | 37761831 | 37761946 | chr17: 37761831-37761946 | NEUROD2 | Exon |
| 17 | 43047732 | 43047918 | chr17: 43047732-43047918 | C1QL1 | Promoter |
| 17 | 43507012 | 43507098 | chr17: 43507012-43507098 | SH3D20 | Exon |
| 17 | 46621993 | 46622021 | chr17: 46621993-46622021 | HOXB2 | Promoter |
| 17 | 46641662 | 46641747 | chr17: 46641662-46641747 | HOXB3 | UTR5 |
| 17 | 46641966 | 46642036 | chr17: 46641966-46642036 | HOXB3 | UTR5 |
| 17 | 47574666 | 47574903 | chr17: 47574666-47574903 | NGFR | Intron |
| 17 | 56833042 | 56833161 | chr17: 56833042-56833161 | PPM1E | Promoter |
| 17 | 62774654 | 62774696 | chr17: 62774654-62774696 | LOC146880 | UTR3 |
| 17 | 74072736 | 74072749 | chr17: 74072736-74072749 | ZACN | Promoter |
| 17 | 74381072 | 74381119 | chr17: 74381072-74381119 | SPHK1 | UTR5 |
| 17 | 79455513 | 79455575 | chr17: 79455513-79455575 | n/a | n/a |
| 17 | 81057628 | 81057660 | chr17: 81057628-81057660 | n/a | n/a |
| 18 | 4455202 | 4455210 | chr18: 4455202-4455210 | n/a | n/a |
| 18 | 5891068 | 5891178 | chr18: 5891068-5891178 | TMEM200C | Promoter |
| 18 | 8706308 | 8706439 | chr18: 8706308-8706439 | KIAA0802 | Enhancer |
| 18 | 10726392 | 10726415 | chr18: 10726392-10726415 | FAM38B | Intron |
| 18 | 74332372 | 74332448 | chr18: 74332372-74332448 | n/a | n/a |
| 18 | 76740034 | 76740059 | chr18: 76740034-76740059 | SALL3 | Promoter |
| 18 | 77376899 | 77377025 | chr18: 77376899-77377025 | n/a | n/a |
| 19 | 1071232 | 1071353 | chr19: 1071232-1071353 | HMHA1 | Intron |
| 19 | 1450118 | 1450129 | chr19: 1450118-1450129 | APC2 | Promoter |
| 19 | 2576229 | 2576291 | chr19: 2576229-2576291 | GNG7 | UTR5 |
| 19 | 3404842 | 3405130 | chr19: 3404842-3405130 | NFIC | Intron |
| 19 | 3933421 | 3933495 | chr19: 3933421-3933495 | ITGB1BP3 | UTR5 |
| 19 | 6274084 | 6274159 | chr19: 6274084-6274159 | MLLT1 | Intron |
| 19 | 6744852 | 6744978 | chr19: 6744852-6744978 | TRIP10 | Exon |
| 19 | 10444873 | 10444951 | chr19: 10444873-10444951 | RAVER1 | Promoter |
| 19 | 10445195 | 10445607 | chr19: 10445195-10445607 | RAVER1 | Promoter |
| 19 | 10531599 | 10531608 | chr19: 10531599-10531608 | PDE4A | Promoter |
| 19 | 12306248 | 12306298 | chr19: 12306248-12306298 | n/a | n/a |
| 19 | 14584456 | 14584478 | chr19: 14584456-14584478 | PTGER1 | Exon |
| 19 | 16022797 | 16022848 | chr19: 16022797-16022848 | CYP4F2 | Enhancer |
| 19 | 16181371 | 16181533 | chr19: 16181371-16181533 | TPM4 | Intron |
| 19 | 16437563 | 16437597 | chr19: 16437563-16437597 | KLF2 | Intron |
| 19 | 17392927 | 17393042 | chr19: 17392927-17393042 | ANKLE1 | Promoter |
| 19 | 18303568 | 18304395 | chr19: 18303568-18304395 | MPV17L2 | UTR5 |
| 19 | 23653826 | 23653836 | chr19: 23653826-23653836 | n/a | n/a |

TABLE 2-continued

Complete list of high methylated haplotype shared between matched primary tumor tissues and plasma for colon cancer (CRC) and lung cancer (LC) patients.

| Chr | Start | End | Coordinate | Symbol | Annotation |
|---|---|---|---|---|---|
| 19 | 30017014 | 30017126 | chr19: 30017014-30017126 | VSTM2B | Promoter |
| 19 | 34113352 | 34113366 | chr19: 34113352-34113366 | CHST8 | UTR5 |
| 19 | 38042272 | 38042323 | chr19: 38042272-38042323 | ZNF540 | UTR5 |
| 19 | 39261605 | 39261612 | chr19: 39261605-39261612 | LGALS7 | UTR3 |
| 19 | 39798183 | 39798269 | chr19: 39798183-39798269 | LRFN1 | UTR3 |
| 19 | 40732582 | 40732618 | chr19: 40732582-40732618 | CNTD2 | UTR5 |
| 19 | 46974787 | 46974808 | chr19: 46974787-46974808 | PNMAL1 | UTR5 |
| 19 | 48946520 | 48946656 | chr19: 48946520-48946656 | GRWD1 | Promoter |
| 19 | 48983752 | 48983868 | chr19: 48983752-48983868 | CYTH2 | UTR3 |
| 19 | 52104699 | 52104735 | chr19: 52104699-52104735 | n/a | n/a |
| 19 | 54040763 | 54041012 | chr19: 54040763-54041012 | ZNF331 | UTR5 |
| 19 | 54412970 | 54412994 | chr19: 54412970-54412994 | CACNG7 | Promoter |
| 19 | 54483370 | 54483483 | chr19: 54483370-54483483 | MIR935 | Promoter |
| 19 | 57351416 | 57351756 | chr19: 57351416-57351756 | ZIM2 | UTR5 |
| 19 | 58858757 | 58858820 | chr19: 58858757-58858820 | A1BG | Exon |
| 19 | 58867719 | 58867836 | chr19: 58867719-58867836 | A1BG | Promoter |
| 20 | 1784445 | 1784482 | chr20: 1784445-1784482 | n/a | n/a |
| 20 | 2674280 | 2674284 | chr20: 2674280-2674284 | EBF4 | Promoter |
| 20 | 5296982 | 5297005 | chr20: 5296982-5297005 | PROKR2 | Promoter |
| 20 | 5484944 | 5485022 | chr20: 5484944-5485022 | LOC149837 | UTR3 |
| 20 | 5485089 | 5485267 | chr20: 5485089-5485267 | LOC149837 | UTR5 |
| 20 | 10647776 | 10647921 | chr20: 10647776-10647921 | JAG1 | Intron |
| 20 | 13201045 | 13201055 | chr20: 13201045-13201055 | ISM1 | Promoter |
| 20 | 22549193 | 22549242 | chr20: 22549193-22549242 | C20orf56 | UTR3 |
| 20 | 22562939 | 22562952 | chr20: 22562939-22562952 | C20orf56 | Promoter |
| 20 | 44639238 | 44639267 | chr20: 44639238-44639267 | MMP9 | Exon |
| 20 | 55841104 | 55841148 | chr20: 55841104-55841148 | BMP7 | Promoter |
| 20 | 55841151 | 55841254 | chr20: 55841151-55841254 | BMP7 | UTR5 |
| 20 | 57089850 | 57089875 | chr20: 57089850-57089875 | APCDD1L | UTR5 |
| 20 | 57464110 | 57464262 | chr20: 57464110-57464262 | GNAS | UTR5 |
| 20 | 59827735 | 59827770 | chr20: 59827735-59827770 | CDH4 | Promoter |
| 20 | 59827789 | 59827831 | chr20: 59827789-59827831 | CDH4 | Promoter |
| 20 | 60877547 | 60877638 | chr20: 60877547-60877638 | ADRM1 | Promoter |
| 21 | 28216583 | 28216627 | chr21: 28216583-28216627 | ADAMTS1 | Exon |
| 21 | 28217665 | 28217711 | chr21: 28217665-28217711 | ADAMTS1 | UTR5 |
| 21 | 28338515 | 28338535 | chr21: 28338515-28338535 | ADAMTS5 | Promoter |
| 21 | 32930369 | 32930388 | chr21: 32930369-32930388 | TIAM1 | UTR5 |
| 21 | 32931085 | 32931279 | chr21: 32931085-32931279 | TIAM1 | UTR5 |
| 21 | 32931284 | 32931321 | chr21: 32931284-32931321 | TIAM1 | UTR5 |
| 21 | 38630603 | 38630727 | chr21: 38630603-38630727 | DSCR3 | Intron |
| 21 | 40033433 | 40033449 | chr21: 40033433-40033449 | ERG | UTR5 |
| 22 | 17083312 | 17083542 | chr22: 17083312-17083542 | psiTPTE22 | UTR5 |
| 22 | 19137099 | 19137268 | chr22: 19137099-19137268 | GSC2 | Promoter |
| 22 | 19702409 | 19702465 | chr22: 19702409-19702465 | SEPT5 | Promoter |
| 22 | 21738255 | 21738732 | chr22: 21738255-21738732 | RIMBP3B | Promoter |
| 22 | 38349631 | 38350197 | chr22: 38349631-38350197 | POLR2F | UTR5 |
| 22 | 39572333 | 39572455 | chr22: 39572333-39572455 | n/a | n/a |
| 22 | 46423321 | 46423397 | chr22: 46423321-46423397 | n/a | n/a |
| 22 | 46476250 | 46476464 | chr22: 46476250-46476464 | LOC400931 | Enhancer |
| 22 | 46484636 | 46484829 | chr22: 46484636-46484829 | LOC400931 | UTR5 |
| 22 | 50706449 | 50706483 | chr22: 50706449-50706483 | MAPK11 | Intron |
| 22 | 51158653 | 51158710 | chr22: 51158653-51158710 | SHANK3 | Exon |
| 22 | 51158990 | 51159182 | chr22: 51158990-51159182 | SHANK3 | Exon |

TABLE 3a

Deconvolution of plasma samples by 10 normal tissues, LCT, and CCT

|  | Brain | CCT | Colon | Esophagus | Heart | Intestine | Kidney | LCT | Liver | Lung | Stomach | WB |
|---|---|---|---|---|---|---|---|---|---|---|---|---|
| CCP | 0.027 | 0.015 | 0.019 | 0.036 | 0.030 | 0.035 | 0.031 | 0.030 | 0.145 | 0.046 | 0.044 | 0.543 |
| NP | 0.015 | 0.002 | 0.002 | 0.001 | 0.037 | 0.010 | 0.013 | 0.010 | 0.056 | 0.044 | 0.003 | 0.808 |
| LCP | 0.045 | 0.013 | 0.057 | 0.046 | 0.047 | 0.041 | 0.048 | 0.035 | 0.095 | 0.044 | 0.042 | 0.488 |

Average values from only samples with WB > 0.3

TABLE 3b

Deconvolution for colon cancer plasma

| | Brain | CCT | Colon | Esophagus | Heart | Intestine | Kidney | LCT | Liver | Lung | Stomach | WB |
|---|---|---|---|---|---|---|---|---|---|---|---|---|
| UCSD.CRC.P.001 | 0.117 | 0.027 | 0.062 | 0.053 | 0.049 | 0.062 | 0.168 | 0.062 | 0.168 | 0.050 | 0.075 | 0.108 |
| UCSD.CRC.P.002 | 0.020 | 0.021 | 0.043 | 0.128 | 0.192 | 0.097 | 0.121 | 0.026 | 0.077 | 0.087 | 0.072 | 0.117 |
| UCSD.CRC.P.003 | 0.103 | 0.010 | 0.058 | 0.237 | 0.087 | 0.035 | 0.103 | 0.016 | 0.103 | 0.064 | 0.139 | 0.045 |
| UCSD.CRC.P.004 | 0.046 | 0.080 | 0.145 | 0.082 | 0.119 | 0.076 | 0.113 | 0.000 | 0.077 | 0.080 | 0.121 | 0.061 |
| UCSD.CRC.P.005 | 0.085 | 0.020 | 0.061 | 0.143 | 0.112 | 0.111 | 0.130 | 0.000 | 0.042 | 0.086 | 0.113 | 0.096 |
| UCSD.CRC.P.006 | 0.074 | 0.014 | 0.038 | 0.047 | 0.017 | 0.055 | 0.046 | 0.035 | 0.142 | 0.242 | 0.061 | 0.228 |
| UCSD.CRC.P.007 | 0.008 | 0.033 | 0.033 | 0.091 | 0.275 | 0.042 | 0.017 | 0.064 | 0.242 | 0.054 | 0.064 | 0.078 |
| UCSD.CRC.P.008 | 0.045 | 0.000 | 0.055 | 0.095 | 0.257 | 0.098 | 0.040 | 0.031 | 0.212 | 0.065 | 0.064 | 0.039 |
| UCSD.CRC.P.009 | 0.037 | 0.211 | 0.007 | 0.000 | 0.000 | 0.031 | 0.061 | 0.245 | 0.134 | 0.015 | 0.203 | 0.057 |
| UCSD.CRC.P.010 | 0.025 | 0.000 | 0.063 | 0.032 | 0.029 | 0.019 | 0.015 | 0.000 | 0.028 | 0.001 | 0.038 | 0.750 |
| UCSD.CRC.P.011 | 0.187 | 0.105 | 0.058 | 0.061 | 0.037 | 0.063 | 0.190 | 0.023 | 0.072 | 0.072 | 0.085 | 0.048 |
| UCSD.CRC.P.012 | 0.023 | 0.029 | 0.032 | 0.066 | 0.029 | 0.083 | 0.026 | 0.045 | 0.077 | 0.005 | 0.059 | 0.525 |
| UCSD.CRC.P.013 | 0.054 | 0.109 | 0.047 | 0.073 | 0.168 | 0.099 | 0.060 | 0.042 | 0.062 | 0.089 | 0.133 | 0.064 |
| UCSD.CRC.P.014 | 0.032 | 0.000 | 0.035 | 0.102 | 0.095 | 0.181 | 0.069 | 0.038 | 0.237 | 0.045 | 0.089 | 0.077 |
| UCSD.CRC.P.015 | 0.032 | 0.015 | 0.096 | 0.019 | 0.122 | 0.062 | 0.036 | 0.054 | 0.418 | 0.050 | 0.057 | 0.039 |
| UCSD.CRC.P.016 | 0.012 | 0.085 | 0.017 | 0.017 | 0.024 | 0.054 | 0.072 | 0.200 | 0.109 | 0.171 | 0.114 | 0.124 |
| UCSD.CRC.P.017 | 0.103 | 0.032 | 0.014 | 0.046 | 0.043 | 0.105 | 0.068 | 0.077 | 0.068 | 0.093 | 0.155 | 0.197 |
| UCSD.CRC.P.018 | 0.080 | 0.105 | 0.052 | 0.178 | 0.050 | 0.066 | 0.083 | 0.100 | 0.071 | 0.076 | 0.082 | 0.058 |
| UCSD.CRC.P.019 | 0.100 | 0.421 | 0.004 | 0.039 | 0.030 | 0.017 | 0.126 | 0.012 | 0.069 | 0.042 | 0.092 | 0.050 |
| UCSD.CRC.P.020 | 0.023 | 0.072 | 0.003 | 0.072 | 0.033 | 0.097 | 0.033 | 0.155 | 0.083 | 0.007 | 0.116 | 0.305 |
| UCSD.CRC.P.021 | 0.133 | 0.108 | 0.055 | 0.142 | 0.017 | 0.045 | 0.045 | 0.019 | 0.137 | 0.053 | 0.119 | 0.127 |
| UCSD.CRC.P.022 | 0.115 | 0.000 | 0.022 | 0.033 | 0.017 | 0.031 | 0.011 | 0.024 | 0.162 | 0.086 | 0.041 | 0.457 |
| UCSD.CRC.P.023 | 0.000 | 0.000 | 0.013 | 0.036 | 0.024 | 0.031 | 0.018 | 0.000 | 0.013 | 0.000 | 0.016 | 0.849 |
| UCSD.CRC.P.024 | 0.055 | 0.050 | 0.010 | 0.081 | 0.091 | 0.116 | 0.088 | 0.018 | 0.168 | 0.040 | 0.209 | 0.074 |
| UCSD.CRC.P.025 | 0.006 | 0.002 | 0.000 | 0.028 | 0.000 | 0.037 | 0.016 | 0.035 | 0.307 | 0.248 | 0.005 | 0.318 |
| UCSD.CRC.P.026 | 0.000 | 0.000 | 0.006 | 0.000 | 0.008 | 0.000 | 0.009 | 0.000 | 0.026 | 0.000 | 0.024 | 0.926 |
| UCSD.CRC.P.027 | 0.087 | 0.064 | 0.037 | 0.000 | 0.043 | 0.038 | 0.069 | 0.427 | 0.080 | 0.046 | 0.083 | 0.026 |
| UCSD.CRC.P.028 | 0.044 | 0.000 | 0.022 | 0.013 | 0.045 | 0.010 | 0.089 | 0.011 | 0.324 | 0.012 | 0.041 | 0.390 |
| UCSD.CRC.P.029 | 0.058 | 0.013 | 0.043 | 0.045 | 0.052 | 0.072 | 0.069 | 0.076 | 0.272 | 0.022 | 0.117 | 0.160 |
| UCSD.CRC.P.030 | 0.006 | 0.028 | 0.006 | 0.041 | 0.085 | 0.009 | 0.063 | 0.000 | 0.288 | 0.051 | 0.059 | 0.363 |

TABLE 3c

Deconvolution for lung cancer plasma

| | Brain | CCT | Colon | Esophagus | Heart | Intestine | Kidney | LCT | Liver | Lung | Stomach | WB |
|---|---|---|---|---|---|---|---|---|---|---|---|---|
| UCSD.LC.001 | 0.118 | 0.178 | 0.037 | 0.018 | 0.046 | 0.152 | 0.107 | 0.099 | 0.055 | 0.056 | 0.065 | 0.070 |
| UCSD.LC.002 | 0.234 | 0.084 | 0.049 | 0.037 | 0.087 | 0.053 | 0.049 | 0.077 | 0.151 | 0.081 | 0.068 | 0.029 |
| UCSD.LC.003 | 0.076 | 0.060 | 0.051 | 0.056 | 0.232 | 0.066 | 0.067 | 0.037 | 0.223 | 0.028 | 0.066 | 0.038 |
| UCSD.LC.004 | 0.023 | 0.054 | 0.030 | 0.077 | 0.079 | 0.028 | 0.131 | 0.000 | 0.212 | 0.102 | 0.074 | 0.190 |
| UCSD.LC.005 | 0.070 | 0.037 | 0.066 | 0.139 | 0.057 | 0.103 | 0.157 | 0.004 | 0.135 | 0.076 | 0.102 | 0.054 |
| UCSD.LC.006 | 0.115 | 0.017 | 0.073 | 0.149 | 0.066 | 0.064 | 0.065 | 0.022 | 0.112 | 0.104 | 0.088 | 0.126 |
| UCSD.LC.007 | 0.091 | 0.032 | 0.053 | 0.055 | 0.098 | 0.060 | 0.063 | 0.027 | 0.207 | 0.060 | 0.212 | 0.041 |
| UCSD.LC.008 | 0.052 | 0.022 | 0.059 | 0.117 | 0.098 | 0.083 | 0.139 | 0.015 | 0.080 | 0.078 | 0.089 | 0.167 |
| UCSD.LC.009 | 0.075 | 0.013 | 0.065 | 0.100 | 0.144 | 0.153 | 0.114 | 0.042 | 0.066 | 0.045 | 0.126 | 0.057 |
| UCSD.LC.010 | 0.051 | 0.058 | 0.220 | 0.066 | 0.098 | 0.016 | 0.062 | 0.089 | 0.063 | 0.045 | 0.091 | 0.141 |
| UCSD.LC.011 | 0.066 | 0.032 | 0.049 | 0.060 | 0.066 | 0.090 | 0.053 | 0.114 | 0.115 | 0.100 | 0.071 | 0.185 |
| UCSD.LC.012 | 0.045 | 0.037 | 0.028 | 0.010 | 0.022 | 0.022 | 0.087 | 0.020 | 0.180 | 0.027 | 0.064 | 0.458 |
| UCSD.LC.013 | 0.156 | 0.021 | 0.089 | 0.000 | 0.000 | 0.021 | 0.000 | 0.128 | 0.057 | 0.008 | 0.009 | 0.511 |
| UCSD.LC.014 | 0.040 | 0.235 | 0.037 | 0.129 | 0.037 | 0.055 | 0.195 | 0.000 | 0.118 | 0.045 | 0.079 | 0.029 |
| UCSD.LC.015 | 0.135 | 0.057 | 0.085 | 0.148 | 0.042 | 0.114 | 0.074 | 0.037 | 0.074 | 0.062 | 0.104 | 0.066 |
| UCSD.LC.016 | 0.239 | 0.055 | 0.039 | 0.109 | 0.070 | 0.055 | 0.125 | 0.049 | 0.085 | 0.094 | 0.024 | 0.055 |
| UCSD.LC.017 | 0.075 | 0.017 | 0.069 | 0.076 | 0.098 | 0.084 | 0.106 | 0.011 | 0.203 | 0.120 | 0.099 | 0.042 |
| UCSD.LC.018 | 0.051 | 0.028 | 0.145 | 0.187 | 0.088 | 0.091 | 0.149 | 0.013 | 0.039 | 0.053 | 0.130 | 0.026 |
| UCSD.LC.019 | 0.052 | 0.028 | 0.089 | 0.147 | 0.020 | 0.090 | 0.036 | 0.035 | 0.168 | 0.058 | 0.086 | 0.192 |
| UCSD.LC.020 | 0.010 | 0.010 | 0.041 | 0.052 | 0.138 | 0.005 | 0.061 | 0.015 | 0.036 | 0.058 | 0.016 | 0.558 |
| UCSD.LC.021 | 0.058 | 0.004 | 0.043 | 0.160 | 0.067 | 0.102 | 0.062 | 0.046 | 0.223 | 0.064 | 0.126 | 0.047 |
| UCSD.LC.022 | 0.064 | 0.024 | 0.041 | 0.039 | 0.096 | 0.042 | 0.066 | 0.000 | 0.086 | 0.049 | 0.072 | 0.420 |
| UCSD.LC.023 | 0.162 | 0.045 | 0.074 | 0.097 | 0.103 | 0.089 | 0.108 | 0.017 | 0.087 | 0.052 | 0.100 | 0.065 |
| UCSD.LC.025 | 0.031 | 0.000 | 0.039 | 0.049 | 0.066 | 0.085 | 0.078 | 0.071 | 0.208 | 0.077 | 0.075 | 0.221 |
| UCSD.LC.026 | 0.014 | 0.000 | 0.113 | 0.035 | 0.012 | 0.022 | 0.057 | 0.060 | 0.089 | 0.133 | 0.035 | 0.431 |
| UCSD.LC.027 | 0.168 | 0.000 | 0.036 | 0.107 | 0.104 | 0.074 | 0.044 | 0.023 | 0.120 | 0.175 | 0.119 | 0.031 |
| UCSD.LC.028 | 0.015 | 0.000 | 0.041 | 0.154 | 0.041 | 0.043 | 0.065 | 0.000 | 0.016 | 0.032 | 0.061 | 0.532 |
| UCSD.LC.029 | 0.011 | 0.000 | 0.045 | 0.030 | 0.020 | 0.128 | 0.002 | 0.019 | 0.203 | 0.000 | 0.036 | 0.506 |
| UCSD.LC.030 | 0.067 | 0.034 | 0.122 | 0.077 | 0.050 | 0.069 | 0.100 | 0.023 | 0.241 | 0.057 | 0.111 | 0.048 |

TABLE 3d

Deconvolution for normal plasma

|  | Brain | CCT | Colon | Esophagus | Heart | Intestine | Kidney | LCT | Liver | Lung | Stomach | WB |
|---|---|---|---|---|---|---|---|---|---|---|---|---|
| UCSD.NP.001 | 0.000 | 0.000 | 0.277 | 0.000 | 0.000 | 0.000 | 0.000 | 0.386 | 0.000 | 0.000 | 0.051 | 0.287 |
| UCSD.NP.002 | 0.000 | 0.000 | 0.191 | 0.213 | 0.105 | 0.036 | 0.000 | 0.000 | 0.355 | 0.000 | 0.055 | 0.046 |
| UCSD.NP.003 | 0.111 | 0.000 | 0.065 | 0.048 | 0.075 | 0.070 | 0.089 | 0.000 | 0.354 | 0.000 | 0.106 | 0.082 |
| UCSD.NP.004 | 0.000 | 0.000 | 0.047 | 0.107 | 0.071 | 0.059 | 0.067 | 0.491 | 0.000 | 0.000 | 0.095 | 0.062 |
| UCSD.NP.005 | 0.000 | 0.000 | 0.170 | 0.000 | 0.110 | 0.096 | 0.000 | 0.349 | 0.000 | 0.086 | 0.000 | 0.188 |
| UCSD.NP.006 | 0.000 | 0.000 | 0.000 | 0.000 | 0.023 | 0.000 | 0.000 | 0.000 | 0.005 | 0.000 | 0.000 | 0.973 |
| UCSD.NP.007 | 0.000 | 0.000 | 0.044 | 0.000 | 0.257 | 0.000 | 0.000 | 0.000 | 0.018 | 0.377 | 0.118 | 0.186 |
| UCSD.NP.008 | 0.000 | 0.000 | 0.016 | 0.000 | 0.230 | 0.000 | 0.000 | 0.000 | 0.359 | 0.322 | 0.073 | 0.000 |
| UCSD.NP.009 | 0.000 | 0.000 | 0.000 | 0.000 | 0.003 | 0.138 | 0.650 | 0.179 | 0.000 | 0.000 | 0.031 | 0.000 |
| UCSD.NP.010 | 0.000 | 0.011 | 0.000 | 0.000 | 0.000 | 0.122 | 0.000 | 0.039 | 0.000 | 0.000 | 0.000 | 0.828 |
| UCSD.NP.011 | 0.000 | 0.000 | 0.000 | 0.000 | 0.000 | 0.130 | 0.670 | 0.168 | 0.000 | 0.000 | 0.032 | 0.000 |
| UCSD.NP.012 | 0.000 | 0.000 | 0.081 | 0.027 | 0.301 | 0.000 | 0.000 | 0.000 | 0.061 | 0.389 | 0.141 | 0.000 |
| UCSD.NP.013 | 0.000 | 0.052 | 0.000 | 0.021 | 0.899 | 0.010 | 0.000 | 0.000 | 0.000 | 0.000 | 0.017 | 0.000 |
| UCSD.NP.014 | 0.000 | 0.000 | 0.000 | 0.000 | 0.021 | 0.048 | 0.751 | 0.124 | 0.004 | 0.000 | 0.052 | 0.000 |
| UCSD.NP.015 | 0.000 | 0.074 | 0.000 | 0.000 | 0.012 | 0.366 | 0.000 | 0.215 | 0.048 | 0.000 | 0.103 | 0.181 |
| UCSD.NP.016 | 0.000 | 0.000 | 0.000 | 0.000 | 0.022 | 0.049 | 0.759 | 0.112 | 0.006 | 0.000 | 0.053 | 0.000 |
| UCSD.NP.017 | 0.000 | 0.000 | 0.030 | 0.076 | 0.029 | 0.008 | 0.003 | 0.000 | 0.248 | 0.000 | 0.596 | 0.010 |
| UCSD.NP.018 | 0.000 | 0.000 | 0.028 | 0.037 | 0.240 | 0.000 | 0.000 | 0.000 | 0.012 | 0.573 | 0.109 | 0.000 |
| UCSD.NP.019 | 0.000 | 0.000 | 0.017 | 0.042 | 0.218 | 0.000 | 0.002 | 0.000 | 0.000 | 0.634 | 0.087 | 0.000 |
| UCSD.NP.020 | 0.000 | 0.000 | 0.033 | 0.056 | 0.081 | 0.036 | 0.036 | 0.000 | 0.036 | 0.000 | 0.692 | 0.030 |
| UCSD.NP.021 | 0.000 | 0.000 | 0.080 | 0.025 | 0.298 | 0.000 | 0.000 | 0.000 | 0.056 | 0.401 | 0.139 | 0.000 |
| UCSD.NP.022 | 0.000 | 0.069 | 0.000 | 0.000 | 0.029 | 0.386 | 0.000 | 0.236 | 0.067 | 0.000 | 0.114 | 0.099 |
| UCSD.NP.023 | 0.000 | 0.083 | 0.000 | 0.000 | 0.532 | 0.223 | 0.000 | 0.062 | 0.000 | 0.000 | 0.000 | 0.100 |
| UCSD.NP.024 | 0.000 | 0.000 | 0.021 | 0.082 | 0.093 | 0.054 | 0.035 | 0.000 | 0.462 | 0.000 | 0.075 | 0.177 |
| UCSD.NP.025 | 0.000 | 0.000 | 0.000 | 0.003 | 0.001 | 0.000 | 0.000 | 0.000 | 0.000 | 0.000 | 0.002 | 0.994 |
| UCSD.NP.026 | 0.000 | 0.000 | 0.000 | 0.000 | 0.000 | 0.000 | 0.380 | 0.120 | 0.000 | 0.000 | 0.000 | 0.501 |
| UCSD.NP.027 | 0.000 | 0.000 | 0.000 | 0.038 | 0.133 | 0.366 | 0.000 | 0.172 | 0.074 | 0.030 | 0.101 | 0.087 |
| UCSD.NP.028 | 0.000 | 0.000 | 0.000 | 0.000 | 0.000 | 0.000 | 0.000 | 0.000 | 0.451 | 0.000 | 0.000 | 0.549 |
| UCSD.NP.029 | 0.000 | 0.000 | 0.000 | 0.000 | 0.013 | 0.000 | 0.000 | 0.000 | 0.041 | 0.012 | 0.000 | 0.934 |
| UCSD.NP.030 | 0.000 | 0.000 | 0.000 | 0.076 | 0.035 | 0.034 | 0.021 | 0.018 | 0.096 | 0.000 | 0.700 | 0.020 |
| UCSD.NP.031 | 0.000 | 0.000 | 0.078 | 0.019 | 0.296 | 0.000 | 0.000 | 0.000 | 0.057 | 0.403 | 0.146 | 0.000 |
| UCSD.NP.032 | 0.000 | 0.000 | 0.000 | 0.154 | 0.012 | 0.011 | 0.000 | 0.000 | 0.157 | 0.000 | 0.655 | 0.011 |
| UCSD.NP.033 | 0.295 | 0.000 | 0.000 | 0.000 | 0.000 | 0.000 | 0.000 | 0.000 | 0.000 | 0.027 | 0.000 | 0.679 |
| UCSD.NP.034 | 0.000 | 0.008 | 0.000 | 0.000 | 0.007 | 0.000 | 0.000 | 0.000 | 0.063 | 0.000 | 0.000 | 0.922 |
| UCSD.NP.035 | 0.000 | 0.000 | 0.000 | 0.000 | 0.000 | 0.026 | 0.000 | 0.000 | 0.000 | 0.007 | 0.000 | 0.967 |
| UCSD.NP.036 | 0.000 | 0.000 | 0.038 | 0.000 | 0.000 | 0.000 | 0.000 | 0.056 | 0.000 | 0.000 | 0.000 | 0.905 |
| UCSD.NP.037 | 0.000 | 0.000 | 0.000 | 0.000 | 0.000 | 0.000 | 0.006 | 0.000 | 0.000 | 0.000 | 0.011 | 0.983 |
| UCSD.NP.038 | 0.000 | 0.000 | 0.000 | 0.000 | 0.200 | 0.000 | 0.000 | 0.000 | 0.223 | 0.309 | 0.041 | 0.228 |
| UCSD.NP.039 | 0.000 | 0.000 | 0.000 | 0.007 | 0.002 | 0.000 | 0.001 | 0.000 | 0.000 | 0.000 | 0.006 | 0.984 |
| UCSD.NP.040 | 0.000 | 0.000 | 0.028 | 0.092 | 0.227 | 0.158 | 0.061 | 0.000 | 0.077 | 0.000 | 0.301 | 0.056 |
| UCSD.NP.041 | 0.000 | 0.043 | 0.238 | 0.000 | 0.000 | 0.000 | 0.000 | 0.429 | 0.249 | 0.000 | 0.000 | 0.041 |
| UCSD.NP.042 | 0.000 | 0.000 | 0.149 | 0.033 | 0.281 | 0.000 | 0.000 | 0.000 | 0.052 | 0.362 | 0.122 | 0.000 |
| UCSD.NP.043 | 0.000 | 0.000 | 0.000 | 0.000 | 0.000 | 0.000 | 0.000 | 0.000 | 0.354 | 0.000 | 0.000 | 0.646 |
| UCSD.NP.044 | 0.000 | 0.000 | 0.000 | 0.000 | 0.082 | 0.000 | 0.000 | 0.000 | 0.000 | 0.135 | 0.000 | 0.783 |
| UCSD.NP.045 | 0.000 | 0.000 | 0.000 | 0.000 | 0.254 | 0.000 | 0.000 | 0.000 | 0.000 | 0.000 | 0.000 | 0.746 |
| UCSD.NP.046 | 0.000 | 0.000 | 0.069 | 0.006 | 0.288 | 0.000 | 0.000 | 0.000 | 0.047 | 0.399 | 0.131 | 0.059 |
| UCSD.NP.047 | 0.000 | 0.000 | 0.000 | 0.000 | 0.109 | 0.000 | 0.000 | 0.000 | 0.000 | 0.180 | 0.000 | 0.711 |
| UCSD.NP.048 | 0.000 | 0.000 | 0.000 | 0.000 | 0.000 | 0.000 | 0.042 | 0.000 | 0.000 | 0.000 | 0.000 | 0.958 |
| UCSD.NP.049 | 0.000 | 0.000 | 0.000 | 0.000 | 0.020 | 0.000 | 0.000 | 0.000 | 0.000 | 0.060 | 0.000 | 0.920 |
| UCSD.NP.050 | 0.000 | 0.000 | 0.000 | 0.000 | 0.099 | 0.346 | 0.000 | 0.232 | 0.072 | 0.000 | 0.081 | 0.170 |
| UCSD.NP.051 | 0.000 | 0.000 | 0.000 | 0.000 | 0.009 | 0.000 | 0.000 | 0.000 | 0.030 | 0.030 | 0.000 | 0.930 |
| UCSD.NP.052 | 0.000 | 0.000 | 0.091 | 0.087 | 0.239 | 0.005 | 0.146 | 0.000 | 0.010 | 0.220 | 0.201 | 0.000 |
| UCSD.NP.053 | 0.000 | 0.025 | 0.000 | 0.000 | 0.000 | 0.000 | 0.000 | 0.000 | 0.654 | 0.000 | 0.009 | 0.312 |
| UCSD.NP.054 | 0.049 | 0.017 | 0.000 | 0.000 | 0.000 | 0.193 | 0.000 | 0.146 | 0.000 | 0.068 | 0.000 | 0.528 |
| UCSD.NP.055 | 0.187 | 0.000 | 0.000 | 0.000 | 0.000 | 0.000 | 0.000 | 0.000 | 0.000 | 0.000 | 0.000 | 0.813 |
| UCSD.NP.056 | 0.000 | 0.000 | 0.000 | 0.007 | 0.002 | 0.000 | 0.002 | 0.000 | 0.000 | 0.000 | 0.005 | 0.984 |
| UCSD.NP.057 | 0.842 | 0.000 | 0.000 | 0.000 | 0.000 | 0.000 | 0.061 | 0.000 | 0.000 | 0.087 | 0.010 | 0.000 |
| UCSD.NP.058 | 0.000 | 0.000 | 0.000 | 0.000 | 0.093 | 0.000 | 0.000 | 0.000 | 0.000 | 0.178 | 0.000 | 0.729 |
| UCSD.NP.059 | 0.000 | 0.000 | 0.008 | 0.000 | 0.194 | 0.000 | 0.000 | 0.000 | 0.000 | 0.299 | 0.046 | 0.454 |
| UCSD.NP.060 | 0.034 | 0.000 | 0.000 | 0.000 | 0.000 | 0.000 | 0.000 | 0.000 | 0.000 | 0.000 | 0.000 | 0.966 |
| UCSD.NP.061 | 0.024 | 0.000 | 0.494 | 0.000 | 0.108 | 0.048 | 0.015 | 0.000 | 0.106 | 0.000 | 0.172 | 0.032 |
| UCSD.NP.062 | 0.000 | 0.000 | 0.000 | 0.000 | 0.142 | 0.000 | 0.000 | 0.000 | 0.000 | 0.221 | 0.014 | 0.622 |
| UCSD.NP.063 | 0.000 | 0.000 | 0.000 | 0.000 | 0.000 | 0.026 | 0.005 | 0.009 | 0.000 | 0.000 | 0.000 | 0.959 |
| UCSD.NP.064 | 0.000 | 0.000 | 0.370 | 0.000 | 0.044 | 0.000 | 0.000 | 0.528 | 0.007 | 0.000 | 0.021 | 0.030 |
| UCSD.NP.065 | 0.000 | 0.000 | 0.000 | 0.000 | 0.182 | 0.000 | 0.000 | 0.000 | 0.000 | 0.000 | 0.000 | 0.818 |
| UCSD.NP.066 | 0.000 | 0.112 | 0.000 | 0.000 | 0.000 | 0.031 | 0.000 | 0.001 | 0.795 | 0.000 | 0.041 | 0.021 |
| UCSD.NP.067 | 0.000 | 0.000 | 0.000 | 0.000 | 0.000 | 0.000 | 0.000 | 0.000 | 0.000 | 0.000 | 0.026 | 0.974 |
| UCSD.NP.068 | 0.000 | 0.000 | 0.000 | 0.000 | 0.000 | 0.000 | 0.054 | 0.000 | 0.103 | 0.000 | 0.000 | 0.843 |
| UCSD.NP.069 | 0.000 | 0.000 | 0.000 | 0.000 | 0.066 | 0.000 | 0.000 | 0.000 | 0.031 | 0.166 | 0.000 | 0.737 |
| UCSD.NP.070 | 0.000 | 0.000 | 0.010 | 0.000 | 0.000 | 0.000 | 0.000 | 0.000 | 0.021 | 0.000 | 0.000 | 0.969 |
| UCSD.NP.071 | 0.000 | 0.000 | 0.082 | 0.027 | 0.300 | 0.000 | 0.000 | 0.000 | 0.064 | 0.387 | 0.140 | 0.000 |
| UCSD.NP.072 | 0.000 | 0.000 | 0.000 | 0.000 | 0.000 | 0.000 | 0.000 | 0.000 | 0.311 | 0.000 | 0.000 | 0.689 |
| UCSD.NP.073 | 0.000 | 0.000 | 0.000 | 0.000 | 0.121 | 0.000 | 0.000 | 0.000 | 0.000 | 0.200 | 0.003 | 0.675 |
| UCSD.NP.074 | 0.000 | 0.000 | 0.000 | 0.012 | 0.018 | 0.000 | 0.000 | 0.000 | 0.000 | 0.025 | 0.000 | 0.945 |
| UCSD.NP.075 | 0.000 | 0.000 | 0.000 | 0.000 | 0.021 | 0.000 | 0.000 | 0.000 | 0.000 | 0.031 | 0.000 | 0.948 |

TABLE 4a

Differentially methylated MHB regions between colon cancer tissues (CCT) and normal plasma.

| Chrom | Start | End | q-value | Cancer.exp | Normal.exp | Weight |
|---|---|---|---|---|---|---|
| chr1 | 110693161 | 110693212 | 2.07E−06 | 4.11E−01 | 9.35E−04 | 9.98E−01 |
| chr3 | 187676563 | 187676644 | 3.69E−16 | 3.66E−01 | 6.60E−04 | 9.98E−01 |
| chr2 | 225266234 | 225266263 | 1.96E−04 | 5.49E−01 | 7.05E−02 | 8.86E−01 |
| chr7 | 391332 | 391394 | 4.29E−07 | 5.12E−01 | 2.80E−02 | 9.48E−01 |
| chr1 | 78957190 | 78957314 | 5.73E−05 | 3.36E−01 | 2.73E−03 | 9.92E−01 |
| chr9 | 86152595 | 86152671 | 7.83E−11 | 6.14E−01 | 2.95E−04 | 1.00E+00 |
| chr10 | 73496013 | 73496122 | 2.04E−16 | 3.55E−01 | 2.30E−02 | 9.39E−01 |
| chr7 | 104581511 | 104581826 | 2.49E−07 | 5.81E−01 | 6.48E−02 | 9.00E−01 |
| chr8 | 17509194 | 17509223 | 9.03E−12 | 5.46E−01 | 3.56E−02 | 9.39E−01 |
| chr20 | 23029535 | 23029655 | 1.68E−19 | 4.42E−01 | 3.67E−03 | 9.92E−01 |
| chr16 | 29164276 | 29164303 | 1.91E−04 | 6.68E−01 | 1.71E−01 | 7.96E−01 |
| chr7 | 64030120 | 64030307 | 1.93E−08 | 3.13E−01 | 1.07E−03 | 9.97E−01 |
| chr21 | 47971700 | 47971722 | 7.52E−05 | 6.37E−01 | 9.40E−02 | 8.71E−01 |
| chr1 | 19251999 | 19252025 | 8.87E−06 | 7.39E−01 | 2.08E−01 | 7.80E−01 |
| chr19 | 18113497 | 18113578 | 6.77E−06 | 5.71E−01 | 4.65E−02 | 9.25E−01 |
| chr4 | 2814121 | 2814173 | 1.66E−09 | 3.71E−01 | 7.82E−03 | 9.79E−01 |
| chr5 | 169931353 | 169931389 | 3.79E−04 | 3.20E−01 | 2.99E−03 | 9.91E−01 |
| chr8 | 97157926 | 97157941 | 2.07E−10 | 3.50E−01 | 2.73E−04 | 9.99E−01 |
| chr2 | 232186706 | 232186761 | 7.37E−05 | 7.07E−01 | 1.17E−01 | 8.58E−01 |
| chr17 | 40822613 | 40822653 | 7.50E−06 | 5.25E−01 | 1.05E−01 | 8.34E−01 |
| chr1 | 154375706 | 154375773 | 5.38E−05 | 4.17E−01 | 1.67E−02 | 9.61E−01 |
| chr2 | 219738569 | 219738577 | 1.03E−04 | 3.86E−01 | 6.54E−02 | 8.55E−01 |
| chr11 | 19735331 | 19735420 | 7.10E−04 | 3.33E−01 | 3.74E−03 | 9.89E−01 |
| chr2 | 109834010 | 109834148 | 1.14E−04 | 4.17E−01 | 4.07E−02 | 9.11E−01 |
| chr14 | 94254076 | 94254092 | 8.05E−17 | 5.27E−01 | 2.20E−02 | 9.60E−01 |
| chr17 | 74141537 | 74141566 | 1.36E−17 | 4.39E−01 | 1.43E−02 | 9.68E−01 |
| chr21 | 44819099 | 44819123 | 4.56E−09 | 4.21E−01 | 4.98E−02 | 8.94E−01 |
| chr16 | 30621003 | 30621081 | 8.06E−04 | 3.33E−01 | 6.27E−05 | 1.00E+00 |
| chr12 | 108169217 | 108169314 | 1.06E−06 | 3.43E−01 | 9.73E−03 | 9.72E−01 |
| chr3 | 183903549 | 183903707 | 4.15E−04 | 5.73E−01 | 4.67E−02 | 9.25E−01 |
| chr1 | 145039361 | 145039649 | 1.81E−04 | 3.39E−01 | 1.70E−03 | 9.95E−01 |
| chr13 | 43148866 | 43148914 | 5.73E−04 | 3.33E−01 | 3.62E−04 | 9.99E−01 |
| chr7 | 49813424 | 49813437 | 4.97E−10 | 5.38E−01 | 5.44E−02 | 9.08E−01 |
| chr8 | 38757858 | 38757899 | 5.02E−17 | 3.53E−01 | 1.47E−02 | 9.60E−01 |
| chr8 | 142276522 | 142276533 | 8.84E−14 | 4.36E−01 | 1.94E−02 | 9.57E−01 |
| chr10 | 114136302 | 114136365 | 1.74E−06 | 4.50E−01 | 8.45E−03 | 9.82E−01 |
| chr4 | 122301928 | 122301963 | 8.37E−08 | 5.00E−01 | 3.37E−03 | 9.93E−01 |
| chr1 | 12123521 | 12123556 | 9.44E−04 | 3.38E−01 | 1.85E−04 | 9.99E−01 |
| chr19 | 30016411 | 30016441 | 7.98E−08 | 6.67E−01 | 2.05E−03 | 9.97E−01 |
| chr4 | 17767383 | 17767525 | 1.96E−04 | 7.11E−01 | 4.31E−02 | 9.43E−01 |
| chr14 | 74707404 | 74707425 | 2.24E−05 | 4.26E−01 | 6.81E−04 | 9.98E−01 |
| chr1 | 225655011 | 225655039 | 1.76E−08 | 5.56E−01 | 2.22E−02 | 9.62E−01 |
| chr4 | 111553898 | 111553914 | 3.01E−07 | 6.67E−01 | 1.81E−02 | 9.74E−01 |
| chr19 | 3179842 | 3179904 | 4.49E−04 | 3.85E−01 | 4.09E−02 | 9.04E−01 |
| chr10 | 123923869 | 123923887 | 1.59E−12 | 4.61E−01 | 2.60E−02 | 9.47E−01 |
| chr21 | 46334450 | 46334460 | 4.07E−06 | 5.85E−01 | 1.06E−01 | 8.46E−01 |
| chr2 | 70057016 | 70057043 | 3.09E−04 | 4.66E−01 | 6.67E−02 | 8.75E−01 |
| chr17 | 40822041 | 40822061 | 1.97E−05 | 6.32E−01 | 1.43E−01 | 8.15E−01 |
| chr2 | 25425395 | 25425417 | 5.46E−04 | 6.06E−01 | 1.72E−01 | 7.79E−01 |
| chr16 | 68028052 | 68028131 | 2.17E−10 | 4.37E−01 | 3.45E−02 | 9.27E−01 |
| chr2 | 177016618 | 177016669 | 1.63E−04 | 3.67E−01 | 1.44E−02 | 9.62E−01 |
| chr16 | 88769941 | 88770131 | 3.03E−10 | 4.42E−01 | 6.08E−03 | 9.86E−01 |
| chr11 | 123301152 | 123301245 | 1.81E−05 | 3.83E−01 | 6.85E−05 | 1.00E+00 |
| chr3 | 192126690 | 192126712 | 9.40E−04 | 3.99E−01 | 4.97E−02 | 8.89E−01 |
| chr9 | 133536748 | 133536768 | 5.96E−07 | 3.92E−01 | 1.82E−03 | 9.95E−01 |
| chr1 | 9764850 | 9764871 | 2.36E−05 | 5.61E−01 | 5.82E−02 | 9.06E−01 |
| chr3 | 48520626 | 48520665 | 6.96E−06 | 3.83E−01 | 2.73E−02 | 9.33E−01 |
| chr17 | 13504776 | 13504797 | 1.79E−06 | 4.26E−01 | 9.32E−03 | 9.79E−01 |
| chr7 | 32110082 | 32110100 | 2.27E−06 | 4.38E−01 | 1.28E−02 | 9.72E−01 |
| chr13 | 109793395 | 109793413 | 8.19E−04 | 4.28E−01 | 7.93E−02 | 8.44E−01 |
| chr17 | 36734910 | 36734967 | 2.53E−08 | 3.70E−01 | 4.52E−03 | 9.88E−01 |
| chr20 | 37356313 | 37356330 | 9.86E−07 | 4.05E−01 | 0.00E+00 | 1.00E+00 |
| chr17 | 59482675 | 59482690 | 1.55E−04 | 3.60E−01 | 2.63E−02 | 9.32E−01 |
| chr19 | 40871656 | 40871678 | 2.77E−05 | 4.00E−01 | 5.21E−02 | 8.85E−01 |
| chr10 | 38383097 | 38383309 | 5.65E−04 | 3.33E−01 | 0.00E+00 | 1.00E+00 |
| chr6 | 31527706 | 31527920 | 8.63E−06 | 5.79E−01 | 5.17E−02 | 9.18E−01 |
| chr7 | 4248707 | 4248866 | 4.90E−07 | 4.23E−01 | 4.92E−02 | 8.96E−01 |
| chr17 | 72462820 | 72462912 | 4.98E−07 | 3.71E−01 | 1.52E−02 | 9.61E−01 |
| chr5 | 2740503 | 2740527 | 2.56E−09 | 5.68E−01 | 2.80E−03 | 9.95E−01 |
| chr8 | 54163561 | 54163586 | 2.32E−07 | 3.25E−01 | 4.56E−03 | 9.86E−01 |
| chr1 | 203643083 | 203643220 | 1.35E−05 | 4.44E−01 | 1.84E−02 | 9.60E−01 |
| chr15 | 59397205 | 59397420 | 5.93E−06 | 5.03E−01 | 8.37E−05 | 1.00E+00 |
| chr11 | 69920045 | 69920065 | 4.11E−09 | 5.94E−01 | 4.04E−02 | 9.36E−01 |
| chr19 | 55766296 | 55766320 | 2.26E−04 | 3.54E−01 | 3.13E−02 | 9.19E−01 |
| chr8 | 55379351 | 55379448 | 4.82E−05 | 3.05E−01 | 3.35E−03 | 9.89E−01 |

TABLE 4a-continued

Differentially methylated MHB regions between colon cancer tissues (CCT) and normal plasma.

| Chrom | Start | End | q-value | Cancer.exp | Normal.exp | Weight |
|---|---|---|---|---|---|---|
| chr4 | 1195837 | 1195893 | 3.91E−06 | 4.05E−01 | 5.45E−03 | 9.87E−01 |
| chr8 | 103136001 | 103136031 | 6.36E−04 | 6.67E−01 | 7.57E−02 | 8.98E−01 |
| chr19 | 23253315 | 23253335 | 2.38E−04 | 3.51E−01 | 3.86E−02 | 9.01E−01 |
| chr11 | 64107477 | 64107619 | 7.34E−07 | 6.59E−01 | 5.80E−02 | 9.19E−01 |
| chr3 | 27769863 | 27770001 | 2.45E−04 | 3.44E−01 | 5.70E−03 | 9.84E−01 |
| chr11 | 107328048 | 107328380 | 3.75E−08 | 6.67E−01 | 3.48E−03 | 9.95E−01 |
| chr7 | 158938119 | 158938147 | 9.53E−07 | 5.18E−01 | 8.18E−03 | 9.84E−01 |
| chr8 | 97158006 | 97158018 | 2.13E−13 | 3.56E−01 | 9.96E−04 | 9.97E−01 |
| chr12 | 115103838 | 115103858 | 9.69E−04 | 4.00E−01 | 1.08E−02 | 9.74E−01 |
| chr1 | 226924888 | 226924924 | 8.06E−11 | 3.06E−01 | 2.56E−03 | 9.92E−01 |
| chr4 | 142053481 | 142053783 | 7.48E−05 | 3.66E−01 | 3.79E−04 | 9.99E−01 |
| chr7 | 150329304 | 150329321 | 1.42E−05 | 3.40E−01 | 9.41E−03 | 9.73E−01 |
| chr19 | 30018006 | 30018051 | 9.22E−06 | 5.29E−01 | 1.82E−02 | 9.67E−01 |
| chr1 | 181287633 | 181287642 | 4.86E−07 | 4.57E−01 | 3.60E−02 | 9.27E−01 |
| chr14 | 85998084 | 85998139 | 9.36E−08 | 3.71E−01 | 1.51E−02 | 9.61E−01 |
| chr14 | 58332805 | 58332827 | 1.66E−08 | 3.46E−01 | 1.56E−03 | 9.95E−01 |
| chr20 | 37303000 | 37303007 | 1.89E−10 | 3.74E−01 | 1.79E−03 | 9.95E−01 |
| chr10 | 130832367 | 130832381 | 2.29E−04 | 3.86E−01 | 6.27E−02 | 8.60E−01 |
| chr7 | 155556566 | 155556600 | 4.72E−07 | 4.60E−01 | 5.61E−02 | 8.91E−01 |
| chr8 | 142413012 | 142413121 | 2.98E−05 | 3.14E−01 | 1.42E−02 | 9.57E−01 |
| chr2 | 37880456 | 37880503 | 1.37E−04 | 6.04E−01 | 8.98E−02 | 8.71E−01 |
| chr16 | 68390618 | 68390663 | 1.88E−04 | 3.82E−01 | 5.70E−02 | 8.70E−01 |
| chr4 | 111554064 | 111554077 | 9.68E−05 | 6.94E−01 | 3.40E−02 | 9.53E−01 |
| chr17 | 75525139 | 75525180 | 3.85E−07 | 4.23E−01 | 6.74E−04 | 9.98E−01 |
| chr2 | 236574688 | 236574774 | 1.46E−06 | 5.08E−01 | 4.47E−03 | 9.91E−01 |
| chr11 | 1779926 | 1779973 | 4.88E−06 | 4.04E−01 | 4.30E−02 | 9.04E−01 |
| chr20 | 34189501 | 34189792 | 1.30E−06 | 4.64E−01 | 1.35E−04 | 1.00E+00 |
| chr2 | 220313356 | 220313384 | 8.74E−10 | 3.57E−01 | 1.08E−02 | 9.71E−01 |
| chr3 | 196367690 | 196367895 | 1.55E−23 | 4.37E−01 | 5.65E−03 | 9.87E−01 |
| chr5 | 171605385 | 171605414 | 5.13E−04 | 4.87E−01 | 3.74E−02 | 9.29E−01 |
| chr9 | 37903889 | 37903895 | 2.18E−07 | 3.37E−01 | 3.02E−02 | 9.18E−01 |
| chr19 | 58446423 | 58446430 | 3.81E−08 | 3.27E−01 | 9.55E−03 | 9.72E−01 |
| chr8 | 56852201 | 56852233 | 5.19E−04 | 4.61E−01 | 5.51E−02 | 8.93E−01 |
| chr8 | 98290011 | 98290081 | 4.79E−09 | 3.28E−01 | 4.05E−04 | 9.99E−01 |
| chr7 | 28449954 | 28449970 | 5.94E−04 | 3.33E−01 | 1.22E−03 | 9.96E−01 |
| chr16 | 51184771 | 51184886 | 4.57E−05 | 4.04E−01 | 1.87E−02 | 9.56E−01 |
| chr11 | 117186061 | 117186115 | 1.02E−06 | 5.21E−01 | 2.79E−03 | 9.95E−01 |
| chr2 | 133403686 | 133403797 | 5.38E−05 | 4.17E−01 | 6.77E−02 | 8.60E−01 |
| chr13 | 28498448 | 28498613 | 1.28E−08 | 3.31E−01 | 3.90E−03 | 9.88E−01 |
| chr19 | 9517624 | 9517738 | 1.44E−05 | 3.18E−01 | 7.66E−03 | 9.76E−01 |
| chr13 | 58205958 | 58206058 | 1.30E−08 | 6.25E−01 | 2.51E−03 | 9.96E−01 |
| chr8 | 97157855 | 97157878 | 5.77E−04 | 3.25E−01 | 5.11E−03 | 9.85E−01 |
| chr12 | 124950719 | 124950776 | 8.41E−05 | 5.91E−01 | 6.21E−02 | 9.05E−01 |
| chr12 | 5997166 | 5997213 | 4.42E−05 | 4.69E−01 | 4.88E−02 | 9.06E−01 |
| chr20 | 59827586 | 59827624 | 2.66E−08 | 5.32E−01 | 1.44E−02 | 9.74E−01 |
| chr11 | 46367940 | 46367974 | 6.13E−04 | 4.06E−01 | 4.36E−02 | 9.03E−01 |
| chr9 | 95821885 | 95821901 | 6.73E−14 | 4.20E−01 | 1.20E−02 | 9.72E−01 |
| chr5 | 150326192 | 150326312 | 8.47E−05 | 6.67E−01 | 5.16E−02 | 9.28E−01 |
| chr12 | 68043432 | 68043502 | 7.15E−04 | 3.33E−01 | 1.53E−03 | 9.95E−01 |
| chr9 | 134465995 | 134466015 | 2.07E−05 | 6.18E−01 | 5.18E−02 | 9.23E−01 |
| chr5 | 132158827 | 132158843 | 1.33E−04 | 3.64E−01 | 6.29E−02 | 8.53E−01 |
| chr5 | 3606576 | 3606611 | 2.32E−06 | 5.51E−01 | 3.77E−02 | 9.36E−01 |
| chr20 | 56247297 | 56247315 | 4.58E−06 | 4.67E−01 | 4.68E−02 | 9.09E−01 |
| chr19 | 13125032 | 13125104 | 2.45E−08 | 5.10E−01 | 9.97E−03 | 9.81E−01 |
| chr9 | 132891110 | 132891134 | 2.12E−04 | 4.00E−01 | 2.67E−02 | 9.37E−01 |
| chr13 | 95364358 | 95364385 | 4.34E−09 | 6.65E−01 | 8.16E−03 | 9.88E−01 |
| chr12 | 43946100 | 43946110 | 3.65E−07 | 3.08E−01 | 7.33E−03 | 9.77E−01 |
| chr22 | 23558969 | 23559146 | 4.14E−16 | 7.27E−01 | 3.67E−02 | 9.52E−01 |
| chr7 | 156797101 | 156797116 | 3.91E−04 | 3.41E−01 | 1.50E−02 | 9.58E−01 |
| chr12 | 124941370 | 124941476 | 1.29E−07 | 5.15E−01 | 3.26E−02 | 9.41E−01 |
| chr1 | 62106961 | 62107137 | 2.69E−04 | 1.00E+00 | 1.56E−01 | 8.65E−01 |
| chr7 | 70596957 | 70596971 | 3.20E−08 | 3.51E−01 | 3.16E−03 | 9.91E−01 |
| chr9 | 21031614 | 21031726 | 3.97E−04 | 3.40E−01 | 4.44E−04 | 9.99E−01 |
| chr6 | 32813530 | 32813577 | 2.53E−08 | 6.16E−01 | 4.71E−02 | 9.29E−01 |
| chr8 | 140714721 | 140714739 | 1.88E−04 | 3.75E−01 | 1.97E−02 | 9.50E−01 |
| chr16 | 68318872 | 68318933 | 7.09E−23 | 4.58E−01 | 1.58E−02 | 9.67E−01 |
| chr12 | 12163189 | 12163248 | 1.45E−06 | 4.16E−01 | 1.72E−02 | 9.60E−01 |
| chr20 | 31215990 | 31216058 | 3.23E−06 | 4.93E−01 | 9.67E−02 | 8.36E−01 |
| chr17 | 78238406 | 78238540 | 4.68E−08 | 4.89E−01 | 3.60E−02 | 9.31E−01 |
| chr8 | 22547919 | 22547980 | 8.90E−04 | 4.65E−01 | 1.03E−01 | 8.19E−01 |
| chr9 | 2159888 | 2159931 | 3.16E−06 | 3.25E−01 | 1.23E−02 | 9.64E−01 |
| chr4 | 85419917 | 85419951 | 5.74E−04 | 3.94E−01 | 5.63E−02 | 8.75E−01 |
| chr12 | 108169078 | 108169144 | 6.83E−07 | 3.38E−01 | 7.19E−04 | 9.98E−01 |
| chr7 | 45068249 | 45068308 | 3.69E−16 | 4.85E−01 | 2.03E−02 | 9.60E−01 |
| chr2 | 177016575 | 177016595 | 1.35E−07 | 3.21E−01 | 1.31E−02 | 9.61E−01 |

TABLE 4a-continued

Differentially methylated MHB regions between colon cancer tissues (CCT) and normal plasma.

| Chrom | Start | End | q-value | Cancer.exp | Normal.exp | Weight |
|---|---|---|---|---|---|---|
| chr3 | 9595511 | 9595532 | 1.10E−06 | 3.73E−01 | 2.02E−03 | 9.95E−01 |
| chr6 | 90894747 | 90894799 | 3.15E−05 | 4.60E−01 | 6.88E−02 | 8.70E−01 |
| chr19 | 41641865 | 41641879 | 5.23E−05 | 5.00E−01 | 2.98E−02 | 9.44E−01 |
| chr12 | 66276079 | 66276191 | 2.18E−09 | 4.36E−01 | 7.66E−03 | 9.83E−01 |
| chr20 | 61638096 | 61638108 | 3.92E−06 | 7.08E−01 | 7.34E−02 | 9.06E−01 |
| chr7 | 155250669 | 155250691 | 1.25E−05 | 3.78E−01 | 8.29E−03 | 9.79E−01 |
| chr2 | 39187231 | 39187239 | 3.25E−08 | 3.73E−01 | 3.18E−02 | 9.21E−01 |
| chr5 | 116283745 | 116283908 | 4.84E−06 | 4.18E−01 | 2.02E−02 | 9.54E−01 |
| chr7 | 152622786 | 152622794 | 1.88E−08 | 5.37E−01 | 2.33E−03 | 9.96E−01 |
| chr5 | 170735618 | 170735626 | 1.34E−10 | 3.75E−01 | 2.41E−03 | 9.94E−01 |
| chr20 | 41817998 | 41818052 | 9.73E−09 | 3.40E−01 | 1.10E−02 | 9.69E−01 |
| chr10 | 31074290 | 31074303 | 1.39E−04 | 3.70E−01 | 6.01E−03 | 9.84E−01 |
| chr13 | 112726560 | 112726579 | 2.92E−07 | 4.21E−01 | 1.11E−02 | 9.74E−01 |
| chr21 | 45577522 | 45577578 | 9.07E−07 | 4.20E−01 | 3.57E−02 | 9.22E−01 |
| chr7 | 102066465 | 102066505 | 4.06E−18 | 4.54E−01 | 8.68E−03 | 9.81E−01 |
| chr17 | 27912311 | 27912415 | 6.05E−07 | 4.28E−01 | 5.00E−02 | 8.95E−01 |
| chr17 | 80358785 | 80358913 | 9.03E−04 | 5.27E−01 | 9.93E−02 | 8.42E−01 |
| chr1 | 169637173 | 169637186 | 2.32E−04 | 8.33E−01 | 1.18E−01 | 8.76E−01 |
| chr2 | 139537698 | 139537710 | 7.21E−06 | 4.70E−01 | 1.74E−03 | 9.96E−01 |
| chr6 | 10391058 | 10391093 | 8.03E−07 | 5.17E−01 | 3.30E−02 | 9.40E−01 |
| chr17 | 76886714 | 76886754 | 6.50E−04 | 4.76E−01 | 1.20E−01 | 7.99E−01 |
| chr12 | 7068301 | 7068310 | 3.54E−07 | 6.40E−01 | 6.66E−02 | 9.06E−01 |
| chr14 | 70014828 | 70014873 | 3.96E−05 | 3.74E−01 | 9.82E−04 | 9.97E−01 |
| chr10 | 118031044 | 118031062 | 1.85E−05 | 3.05E−01 | 2.50E−03 | 9.92E−01 |
| chr16 | 49518429 | 49518453 | 1.01E−04 | 4.44E−01 | 4.09E−02 | 9.16E−01 |
| chr7 | 71801464 | 71801484 | 1.03E−07 | 3.16E−01 | 1.18E−02 | 9.64E−01 |
| chr9 | 117693070 | 117693110 | 1.28E−08 | 6.67E−01 | 1.75E−02 | 9.74E−01 |
| chr5 | 173315775 | 173315832 | 9.76E−04 | 3.33E−01 | 3.86E−04 | 9.99E−01 |
| chr14 | 103568958 | 103569000 | 9.32E−09 | 4.90E−01 | 1.09E−02 | 9.78E−01 |
| chr7 | 100946173 | 100946190 | 4.32E−06 | 4.36E−01 | 6.45E−02 | 8.71E−01 |
| chr19 | 8656804 | 8656818 | 6.75E−05 | 3.51E−01 | 3.08E−02 | 9.19E−01 |
| chr9 | 139741469 | 139741493 | 2.81E−04 | 5.28E−01 | 1.73E−01 | 7.53E−01 |
| chr12 | 51717855 | 51717865 | 8.67E−11 | 3.52E−01 | 7.87E−03 | 9.78E−01 |
| chr5 | 142785053 | 142785165 | 2.93E−04 | 3.89E−01 | 8.72E−03 | 9.78E−01 |
| chr8 | 41559482 | 41559550 | 5.14E−56 | 9.93E−01 | 1.34E−03 | 9.99E−01 |
| chr6 | 20320223 | 20320368 | 3.75E−04 | 8.33E−01 | 8.84E−02 | 9.04E−01 |
| chr6 | 27114547 | 27114655 | 9.26E−05 | 3.85E−01 | 7.12E−02 | 8.44E−01 |
| chr19 | 17439683 | 17439702 | 3.00E−07 | 3.15E−01 | 5.19E−03 | 9.84E−01 |
| chr5 | 176858541 | 176858704 | 1.44E−05 | 4.04E−01 | 5.84E−02 | 8.74E−01 |
| chr9 | 92099055 | 92099114 | 5.71E−14 | 5.04E−01 | 8.57E−03 | 9.83E−01 |
| chr7 | 24324675 | 24324683 | 1.26E−04 | 3.64E−01 | 2.16E−02 | 9.44E−01 |
| chr1 | 221050180 | 221050273 | 1.23E−11 | 3.91E−01 | 1.73E−02 | 9.58E−01 |
| chr5 | 2748507 | 2748516 | 2.48E−13 | 5.26E−01 | 2.01E−02 | 9.63E−01 |
| chr6 | 143858815 | 143858914 | 2.44E−04 | 3.36E−01 | 2.30E−02 | 9.36E−01 |
| chr22 | 47070535 | 47070641 | 1.03E−16 | 5.93E−01 | 1.10E−02 | 9.82E−01 |
| chr19 | 3672066 | 3672080 | 6.98E−09 | 3.34E−01 | 2.99E−02 | 9.18E−01 |
| chr15 | 90357499 | 90357521 | 6.18E−04 | 3.87E−01 | 2.77E−02 | 9.33E−01 |
| chr9 | 127258187 | 127258274 | 1.07E−16 | 6.99E−01 | 2.86E−02 | 9.61E−01 |
| chr7 | 2271925 | 2272011 | 9.71E−04 | 3.33E−01 | 2.25E−04 | 9.99E−01 |
| chr7 | 71801154 | 71801190 | 5.87E−06 | 3.50E−01 | 9.54E−03 | 9.73E−01 |
| chr7 | 156797306 | 156797346 | 1.32E−04 | 3.89E−01 | 1.19E−02 | 9.70E−01 |
| chr15 | 70550975 | 70551061 | 1.30E−08 | 4.91E−01 | 3.19E−02 | 9.39E−01 |
| chr19 | 49973605 | 49973632 | 1.23E−05 | 5.00E−01 | 1.69E−02 | 9.67E−01 |
| chr10 | 26505199 | 26505213 | 2.88E−08 | 4.72E−01 | 1.34E−03 | 9.97E−01 |
| chr2 | 129037557 | 129037569 | 2.16E−05 | 6.21E−01 | 1.42E−01 | 8.14E−01 |
| chr2 | 46579092 | 46579122 | 7.41E−12 | 3.22E−01 | 6.32E−03 | 9.81E−01 |
| chr7 | 1959874 | 1959887 | 2.04E−16 | 5.51E−01 | 1.27E−02 | 9.77E−01 |
| chr13 | 24839234 | 24839455 | 2.35E−08 | 5.83E−01 | 4.57E−02 | 9.27E−01 |
| chr12 | 22486913 | 22486995 | 8.05E−04 | 3.33E−01 | 0.00E+00 | 1.00E+00 |
| chr1 | 112058209 | 112058223 | 1.03E−05 | 3.84E−01 | 5.20E−02 | 8.81E−01 |
| chr9 | 134148683 | 134148714 | 2.91E−09 | 3.94E−01 | 2.23E−02 | 9.47E−01 |
| chr8 | 132054036 | 132054055 | 2.21E−07 | 3.37E−01 | 1.44E−02 | 9.59E−01 |
| chr10 | 133110551 | 133110580 | 3.64E−05 | 5.00E−01 | 3.25E−03 | 9.94E−01 |
| chr1 | 207842657 | 207842691 | 1.96E−06 | 3.65E−01 | 3.29E−02 | 9.17E−01 |
| chr3 | 195313667 | 195313820 | 3.08E−07 | 6.86E−01 | 8.41E−02 | 8.91E−01 |
| chr6 | 43612899 | 43612908 | 5.34E−07 | 3.10E−01 | 3.73E−03 | 9.88E−01 |
| chr2 | 219827596 | 219827660 | 6.20E−04 | 3.47E−01 | 4.28E−03 | 9.88E−01 |
| chr16 | 85296061 | 85296086 | 7.72E−10 | 4.69E−01 | 2.30E−02 | 9.53E−01 |
| chr3 | 65342371 | 65342384 | 6.53E−04 | 6.51E−01 | 1.73E−01 | 7.90E−01 |
| chr16 | 50308403 | 50308417 | 2.47E−11 | 6.25E−01 | 3.88E−02 | 9.42E−01 |
| chr2 | 182322264 | 182322274 | 3.20E−08 | 3.13E−01 | 1.08E−02 | 9.67E−01 |
| chr1 | 145562949 | 145562967 | 5.95E−07 | 4.17E−01 | 6.64E−04 | 9.98E−01 |
| chr4 | 6697966 | 6698085 | 3.52E−04 | 5.07E−01 | 1.53E−01 | 7.68E−01 |
| chr8 | 128929859 | 128929964 | 3.28E−09 | 5.76E−01 | 4.10E−03 | 9.93E−01 |
| chr19 | 16197083 | 16197146 | 6.00E−13 | 5.41E−01 | 2.90E−02 | 9.49E−01 |

TABLE 4a-continued

Differentially methylated MHB regions between colon cancer tissues (CCT) and normal plasma.

| Chrom | Start | End | q-value | Cancer.exp | Normal.exp | Weight |
|---|---|---|---|---|---|---|
| chr1 | 27160026 | 27160126 | 2.07E−08 | 4.50E−01 | 4.34E−02 | 9.12E−01 |
| chr6 | 127440662 | 127440735 | 4.13E−04 | 3.66E−01 | 3.15E−02 | 9.21E−01 |
| chr7 | 81417609 | 81417823 | 9.42E−07 | 9.21E−01 | 9.84E−02 | 9.03E−01 |
| chr19 | 55485208 | 55485344 | 4.56E−05 | 5.15E−01 | 7.33E−02 | 8.75E−01 |
| chr5 | 140871224 | 140871238 | 5.56E−06 | 6.46E−01 | 8.89E−02 | 8.79E−01 |
| chr6 | 20024224 | 20024319 | 1.83E−17 | 4.53E−01 | 1.49E−02 | 9.68E−01 |
| chr11 | 8290108 | 8290126 | 1.97E−07 | 3.31E−01 | 1.86E−03 | 9.94E−01 |
| chr7 | 56355663 | 56355674 | 8.20E−05 | 3.59E−01 | 5.34E−02 | 8.71E−01 |
| chr11 | 111411737 | 111411788 | 8.26E−08 | 3.18E−01 | 6.09E−04 | 9.98E−01 |
| chr11 | 119580472 | 119580588 | 1.30E−04 | 3.43E−01 | 3.90E−02 | 8.98E−01 |
| chr16 | 31488816 | 31488849 | 5.30E−04 | 4.28E−01 | 5.63E−02 | 8.84E−01 |
| chr12 | 131464602 | 131464618 | 2.56E−10 | 7.08E−01 | 2.99E−02 | 9.59E−01 |
| chr10 | 133528489 | 133528587 | 4.09E−05 | 6.23E−01 | 8.32E−02 | 8.82E−01 |
| chr19 | 29284698 | 29284703 | 9.80E−06 | 4.54E−01 | 2.27E−02 | 9.52E−01 |
| chr19 | 13215304 | 13215327 | 7.35E−10 | 3.38E−01 | 3.02E−02 | 9.18E−01 |
| chr4 | 2814877 | 2814968 | 4.30E−06 | 7.29E−01 | 6.81E−02 | 9.15E−01 |
| chr10 | 7708862 | 7708891 | 9.37E−06 | 3.66E−01 | 2.67E−03 | 9.93E−01 |
| chr8 | 132052589 | 132052738 | 4.46E−09 | 6.09E−01 | 8.27E−03 | 9.87E−01 |
| chr8 | 142339677 | 142339715 | 4.70E−06 | 3.91E−01 | 2.72E−02 | 9.35E−01 |
| chr9 | 87905314 | 87905325 | 1.01E−06 | 3.99E−01 | 4.55E−02 | 8.98E−01 |
| chr13 | 109793272 | 109793287 | 2.49E−09 | 3.29E−01 | 1.25E−02 | 9.63E−01 |
| chr1 | 1476095 | 1476154 | 2.66E−06 | 4.24E−01 | 2.04E−03 | 9.95E−01 |
| chr1 | 170630065 | 170630080 | 5.31E−09 | 5.10E−01 | 3.25E−02 | 9.40E−01 |
| chr10 | 43578285 | 43578402 | 5.83E−08 | 3.56E−01 | 2.92E−02 | 9.24E−01 |
| chr21 | 38597974 | 38598066 | 7.35E−05 | 4.06E−01 | 4.48E−02 | 9.01E−01 |
| chr2 | 105480382 | 105480390 | 4.87E−06 | 4.69E−01 | 3.29E−02 | 9.34E−01 |
| chr13 | 112726834 | 112726848 | 2.66E−06 | 4.95E−01 | 9.77E−03 | 9.81E−01 |
| chr17 | 8090935 | 8091039 | 6.78E−04 | 3.18E−01 | 1.61E−04 | 9.99E−01 |
| chr13 | 43149103 | 43149114 | 9.10E−06 | 4.17E−01 | 2.58E−03 | 9.94E−01 |
| chr16 | 29160257 | 29160326 | 2.13E−13 | 6.15E−01 | 2.26E−02 | 9.65E−01 |
| chr4 | 174450772 | 174450785 | 1.01E−05 | 3.16E−01 | 5.93E−03 | 9.82E−01 |
| chr11 | 70672834 | 70672890 | 1.16E−05 | 5.29E−01 | 7.20E−02 | 8.80E−01 |
| chr12 | 39539256 | 39539268 | 2.15E−07 | 4.42E−01 | 2.31E−03 | 9.95E−01 |
| chr14 | 48143617 | 48143641 | 7.10E−10 | 7.50E−01 | 2.38E−03 | 9.97E−01 |
| chr8 | 898406 | 898416 | 1.12E−05 | 5.80E−01 | 5.73E−02 | 9.10E−01 |
| chr20 | 22557745 | 22557769 | 8.90E−05 | 3.33E−01 | 6.63E−03 | 9.81E−01 |
| chr19 | 3180080 | 3180104 | 2.78E−07 | 4.22E−01 | 1.17E−02 | 9.73E−01 |
| chr6 | 14739326 | 14739369 | 6.29E−05 | 8.66E−01 | 2.02E−01 | 8.11E−01 |
| chr18 | 20888061 | 20888186 | 7.97E−04 | 3.33E−01 | 8.28E−03 | 9.76E−01 |
| chr6 | 43613038 | 43613046 | 6.73E−06 | 5.18E−01 | 6.17E−03 | 9.88E−01 |
| chr19 | 2085137 | 2085160 | 6.66E−08 | 3.72E−01 | 2.62E−02 | 9.34E−01 |
| chr3 | 67706421 | 67706705 | 1.65E−12 | 5.16E−01 | 1.30E−02 | 9.75E−01 |
| chr19 | 46997441 | 46997466 | 1.91E−07 | 6.67E−01 | 1.86E−02 | 9.73E−01 |
| chr21 | 38069675 | 38069705 | 4.64E−05 | 3.52E−01 | 2.42E−03 | 9.93E−01 |
| chr7 | 24324036 | 24324045 | 1.69E−08 | 3.17E−01 | 1.30E−02 | 9.60E−01 |
| chr17 | 70112343 | 70112463 | 3.75E−13 | 4.69E−01 | 8.02E−03 | 9.83E−01 |
| chr2 | 119602826 | 119602837 | 2.45E−06 | 3.89E−01 | 1.97E−02 | 9.52E−01 |
| chr14 | 91580279 | 91580507 | 6.16E−08 | 5.00E−01 | 5.73E−03 | 9.89E−01 |
| chr20 | 52825234 | 52825333 | 6.17E−05 | 3.61E−01 | 2.59E−03 | 9.93E−01 |
| chr7 | 71800926 | 71800934 | 2.65E−07 | 3.50E−01 | 3.51E−03 | 9.90E−01 |
| chr14 | 70756090 | 70756120 | 1.04E−10 | 3.79E−01 | 2.14E−02 | 9.47E−01 |
| chr19 | 681393 | 681413 | 3.32E−06 | 3.32E−01 | 2.75E−02 | 9.23E−01 |
| chr2 | 242140582 | 242140589 | 2.73E−07 | 6.87E−01 | 1.12E−01 | 8.59E−01 |
| chr8 | 134510944 | 134511107 | 6.83E−08 | 4.05E−01 | 9.85E−03 | 9.76E−01 |
| chr9 | 136710340 | 136710362 | 1.05E−14 | 4.34E−01 | 1.48E−02 | 9.67E−01 |
| chr15 | 31658049 | 31658168 | 1.22E−06 | 5.00E−01 | 1.27E−03 | 9.97E−01 |
| chr20 | 62199474 | 62199549 | 7.05E−06 | 4.58E−01 | 4.94E−02 | 9.03E−01 |
| chr12 | 4647687 | 4648274 | 2.79E−04 | 3.33E−01 | 6.67E−04 | 9.98E−01 |
| chr13 | 102568657 | 102568663 | 3.55E−08 | 3.20E−01 | 6.51E−03 | 9.80E−01 |
| chr9 | 71789124 | 71789541 | 1.00E−09 | 3.43E−01 | 6.53E−04 | 9.98E−01 |
| chr12 | 45444497 | 45444506 | 1.32E−07 | 4.20E−01 | 2.63E−03 | 9.94E−01 |
| chr7 | 73443734 | 73443767 | 7.98E−06 | 5.35E−01 | 1.86E−02 | 9.66E−01 |
| chr19 | 1068467 | 1068484 | 1.53E−12 | 4.70E−01 | 2.04E−02 | 9.58E−01 |
| chr14 | 103740485 | 103740496 | 2.57E−09 | 3.25E−01 | 8.69E−03 | 9.74E−01 |
| chr11 | 91958384 | 91958465 | 3.83E−06 | 3.18E−01 | 4.60E−03 | 9.86E−01 |
| chr12 | 121530481 | 121530644 | 3.67E−08 | 9.17E−01 | 6.58E−02 | 8.78E−01 |
| chr10 | 13701335 | 13701356 | 1.20E−10 | 4.23E−01 | 4.02E−02 | 9.13E−01 |
| chr1 | 33219502 | 33219520 | 5.33E−07 | 4.01E−01 | 4.21E−02 | 9.05E−01 |
| chr18 | 13137599 | 13137680 | 6.56E−04 | 3.33E−01 | 9.90E−03 | 9.71E−01 |
| chr13 | 58204132 | 58204154 | 1.24E−06 | 5.45E−01 | 1.82E−02 | 9.68E−01 |
| chr8 | 66864145 | 66864243 | 2.33E−16 | 6.82E−01 | 1.40E−02 | 9.80E−01 |
| chr7 | 45067930 | 45067978 | 1.82E−06 | 5.63E−01 | 2.75E−02 | 9.53E−01 |
| chr16 | 216025 | 216056 | 2.33E−07 | 5.27E−01 | 2.38E−04 | 1.00E+00 |
| chr6 | 166582771 | 166582783 | 2.09E−05 | 3.52E−01 | 1.44E−02 | 9.61E−01 |
| chr19 | 54464269 | 54464480 | 3.86E−05 | 3.89E−01 | 9.87E−03 | 9.75E−01 |

TABLE 4a-continued

Differentially methylated MHB regions between colon cancer tissues (CCT) and normal plasma.

| Chrom | Start | End | q-value | Cancer.exp | Normal.exp | Weight |
|---|---|---|---|---|---|---|
| chr20 | 10199369 | 10199501 | 4.84E−04 | 3.33E−01 | 6.32E−04 | 9.98E−01 |
| chr10 | 96990630 | 96990718 | 7.76E−07 | 4.81E−01 | 4.94E−03 | 9.90E−01 |
| chr6 | 151004402 | 151004610 | 6.41E−18 | 6.22E−01 | 3.29E−02 | 9.50E−01 |
| chr8 | 57025563 | 57025929 | 1.79E−08 | 4.37E−01 | 7.51E−04 | 9.98E−01 |
| chr11 | 65408444 | 65408551 | 3.34E−09 | 4.28E−01 | 2.10E−02 | 9.53E−01 |
| chr11 | 130271850 | 130271875 | 3.99E−04 | 5.33E−01 | 8.38E−02 | 8.64E−01 |
| chr7 | 644366 | 644393 | 8.83E−04 | 3.67E−01 | 5.83E−02 | 8.63E−01 |
| chr4 | 7651988 | 7652061 | 2.29E−06 | 6.15E−01 | 3.25E−02 | 9.50E−01 |
| chr1 | 47900111 | 47900152 | 2.16E−06 | 5.11E−01 | 5.26E−02 | 9.07E−01 |
| chr13 | 99064107 | 99064184 | 7.02E−06 | 4.36E−01 | 1.79E−02 | 9.61E−01 |
| chr2 | 119916553 | 119916571 | 1.67E−10 | 4.55E−01 | 3.37E−03 | 9.93E−01 |
| chr16 | 54967319 | 54967361 | 3.49E−12 | 5.52E−01 | 1.20E−02 | 9.79E−01 |
| chr20 | 44037518 | 44037624 | 5.37E−11 | 4.80E−01 | 5.82E−02 | 8.92E−01 |
| chr4 | 8263785 | 8263806 | 8.13E−04 | 4.40E−01 | 1.04E−01 | 8.09E−01 |
| chr16 | 2317671 | 2317694 | 2.75E−04 | 4.83E−01 | 7.04E−02 | 8.73E−01 |
| chr10 | 22542557 | 22542582 | 2.43E−06 | 6.13E−01 | 4.71E−02 | 9.29E−01 |
| chr12 | 123518638 | 123518773 | 3.48E−06 | 3.24E−01 | 2.29E−02 | 9.34E−01 |
| chr6 | 20024500 | 20024569 | 1.60E−04 | 5.75E−01 | 8.49E−02 | 8.71E−01 |
| chr13 | 25744912 | 25744924 | 1.93E−08 | 3.81E−01 | 7.69E−03 | 9.80E−01 |
| chr2 | 96987068 | 96987098 | 5.17E−06 | 4.44E−01 | 9.26E−04 | 9.98E−01 |
| chr2 | 144694722 | 144694809 | 3.36E−07 | 4.51E−01 | 1.80E−04 | 1.00E+00 |
| chr19 | 22605150 | 22605168 | 6.83E−04 | 3.48E−01 | 2.12E−02 | 9.43E−01 |
| chr8 | 24813563 | 24813599 | 7.79E−04 | 4.00E−01 | 6.58E−03 | 9.84E−01 |
| chr13 | 30423680 | 30423763 | 4.02E−04 | 3.33E−01 | 5.14E−04 | 9.98E−01 |
| chr11 | 62212143 | 62212195 | 1.18E−08 | 3.59E−01 | 7.04E−03 | 9.81E−01 |
| chr13 | 21050140 | 21050156 | 1.56E−06 | 3.90E−01 | 1.94E−02 | 9.53E−01 |
| chr15 | 84115968 | 84116104 | 2.79E−05 | 3.08E−01 | 1.96E−04 | 9.99E−01 |
| chr14 | 69260675 | 69260712 | 1.03E−04 | 4.00E−01 | 1.26E−02 | 9.69E−01 |
| chr6 | 27655609 | 27656143 | 6.86E−05 | 4.99E−01 | 3.74E−02 | 9.30E−01 |
| chr1 | 228195435 | 228195456 | 6.08E−05 | 7.33E−01 | 7.09E−02 | 9.12E−01 |
| chr5 | 5140453 | 5140465 | 4.25E−04 | 3.74E−01 | 2.57E−02 | 9.36E−01 |
| chr13 | 109148187 | 109148195 | 5.08E−11 | 3.76E−01 | 1.20E−03 | 9.97E−01 |
| chr9 | 132586568 | 132586652 | 2.77E−04 | 3.33E−01 | 3.97E−04 | 9.99E−01 |
| chr10 | 126300538 | 126300694 | 7.36E−07 | 4.40E−01 | 4.38E−02 | 9.09E−01 |
| chr6 | 37534044 | 37534257 | 2.23E−05 | 3.80E−01 | 5.34E−03 | 9.86E−01 |
| chr17 | 33700564 | 33700621 | 1.68E−08 | 6.67E−01 | 1.15E−02 | 9.83E−01 |
| chr11 | 111411876 | 111412047 | 1.58E−08 | 5.98E−01 | 2.19E−04 | 1.00E+00 |
| chr1 | 26616292 | 26616311 | 2.23E−08 | 7.14E−01 | 3.35E−02 | 9.55E−01 |
| chr11 | 66326731 | 66326743 | 4.66E−04 | 3.87E−01 | 3.13E−02 | 9.25E−01 |
| chr5 | 122422290 | 122422309 | 1.28E−09 | 4.98E−01 | 3.23E−02 | 9.39E−01 |
| chr5 | 44388581 | 44388799 | 2.39E−06 | 5.04E−01 | 2.62E−03 | 9.95E−01 |
| chr22 | 20078423 | 20078511 | 8.12E−05 | 5.99E−01 | 1.44E−01 | 8.06E−01 |
| chr2 | 220313255 | 220313272 | 1.28E−07 | 3.85E−01 | 3.21E−02 | 9.23E−01 |
| chr11 | 67205095 | 67205113 | 2.14E−04 | 5.55E−01 | 8.17E−02 | 8.72E−01 |
| chr16 | 29675880 | 29675899 | 1.18E−07 | 5.85E−01 | 4.11E−02 | 9.34E−01 |
| chr4 | 5053572 | 5053596 | 7.98E−04 | 3.13E−01 | 6.27E−03 | 9.80E−01 |
| chr9 | 14346053 | 14346085 | 1.57E−11 | 4.32E−01 | 2.77E−02 | 9.40E−01 |
| chr6 | 22147356 | 22147383 | 7.87E−04 | 5.06E−01 | 1.21E−01 | 8.06E−01 |
| chr19 | 11708610 | 11708736 | 9.24E−04 | 3.34E−01 | 2.52E−04 | 9.99E−01 |
| chr14 | 75981561 | 75981659 | 2.83E−07 | 3.18E−01 | 9.15E−03 | 9.72E−01 |
| chr16 | 66621433 | 66621441 | 1.69E−08 | 5.77E−01 | 5.34E−02 | 9.15E−01 |
| chr7 | 153749755 | 153749802 | 1.13E−07 | 3.77E−01 | 8.69E−03 | 9.77E−01 |
| chr8 | 55371721 | 55371728 | 8.96E−08 | 3.39E−01 | 1.02E−02 | 9.71E−01 |
| chr14 | 105528116 | 105528216 | 2.15E−05 | 4.04E−01 | 3.21E−02 | 9.26E−01 |
| chr22 | 19711226 | 19711257 | 6.48E−16 | 3.61E−01 | 4.03E−03 | 9.89E−01 |
| chr17 | 643532 | 643598 | 6.39E−07 | 9.52E−01 | 7.22E−02 | 9.30E−01 |
| chr6 | 1625110 | 1625384 | 2.40E−11 | 5.84E−01 | 1.12E−02 | 9.81E−01 |
| chr5 | 178422156 | 178422206 | 4.68E−04 | 3.69E−01 | 4.56E−02 | 8.90E−01 |
| chr22 | 30662059 | 30662077 | 1.31E−07 | 4.30E−01 | 3.86E−02 | 9.18E−01 |
| chr20 | 46044275 | 46044343 | 1.68E−06 | 5.60E−01 | 4.31E−02 | 9.28E−01 |
| chr16 | 88767062 | 88767096 | 1.38E−12 | 6.54E−01 | 9.07E−04 | 9.99E−01 |
| chr14 | 60952393 | 60952405 | 1.04E−07 | 3.85E−01 | 7.13E−03 | 9.82E−01 |
| chr2 | 8715562 | 8715637 | 4.34E−09 | 7.06E−01 | 4.17E−02 | 9.44E−01 |
| chr18 | 2847848 | 2847923 | 4.36E−04 | 3.33E−01 | 2.20E−03 | 9.93E−01 |
| chr12 | 45444152 | 45444203 | 2.50E−05 | 4.17E−01 | 1.83E−02 | 9.58E−01 |
| chr8 | 145900685 | 145900715 | 3.40E−06 | 5.08E−01 | 6.76E−02 | 8.83E−01 |
| chr7 | 107643271 | 107643389 | 7.67E−04 | 3.13E−01 | 4.56E−04 | 9.99E−01 |
| chr6 | 137244466 | 137244484 | 1.17E−08 | 3.48E−01 | 1.89E−03 | 9.95E−01 |
| chr4 | 37585982 | 37585993 | 2.98E−07 | 3.86E−01 | 6.66E−02 | 8.53E−01 |
| chr12 | 2030316 | 2030331 | 5.79E−15 | 4.57E−01 | 1.73E−02 | 9.63E−01 |
| chr10 | 134827218 | 134827246 | 6.49E−06 | 3.69E−01 | 1.80E−02 | 9.53E−01 |
| chr6 | 26722714 | 26722740 | 3.16E−08 | 6.67E−01 | 4.21E−04 | 9.99E−01 |
| chr7 | 644133 | 644190 | 4.24E−07 | 4.04E−01 | 3.96E−02 | 9.11E−01 |
| chr5 | 49736943 | 49736950 | 3.36E−05 | 3.75E−01 | 2.09E−04 | 9.99E−01 |
| chr4 | 3387340 | 3387383 | 3.25E−08 | 3.19E−01 | 1.68E−02 | 9.50E−01 |

TABLE 4a-continued

Differentially methylated MHB regions between colon cancer tissues (CCT) and normal plasma.

| Chrom | Start | End | q-value | Cancer.exp | Normal.exp | Weight |
|---|---|---|---|---|---|---|
| chr5 | 158532301 | 158532330 | 7.76E−04 | 6.67E−01 | 6.03E−02 | 9.17E−01 |
| chr1 | 119543104 | 119543128 | 2.91E−06 | 3.13E−01 | 2.34E−03 | 9.93E−01 |
| chr22 | 42095558 | 42095578 | 6.66E−04 | 4.25E−01 | 4.76E−02 | 8.99E−01 |
| chr22 | 37881408 | 37881495 | 3.45E−09 | 3.90E−01 | 1.83E−02 | 9.55E−01 |
| chr19 | 908886 | 908901 | 7.92E−04 | 3.57E−01 | 5.16E−02 | 8.74E−01 |
| chr1 | 224804868 | 224804896 | 3.31E−06 | 3.45E−01 | 8.41E−03 | 9.76E−01 |
| chr21 | 27945586 | 27945599 | 1.13E−13 | 3.14E−01 | 8.73E−03 | 9.73E−01 |
| chr6 | 150285766 | 150285775 | 3.77E−05 | 3.40E−01 | 5.25E−03 | 9.85E−01 |
| chr11 | 47416527 | 47416633 | 3.84E−08 | 5.75E−01 | 4.61E−02 | 9.26E−01 |
| chr16 | 55365257 | 55365267 | 3.14E−05 | 3.27E−01 | 1.45E−02 | 9.58E−01 |
| chr17 | 79420888 | 79420920 | 2.11E−09 | 4.24E−01 | 2.06E−02 | 9.54E−01 |
| chr13 | 37248265 | 37248280 | 3.46E−08 | 4.58E−01 | 1.50E−02 | 9.68E−01 |
| chr19 | 1467151 | 1467183 | 1.87E−06 | 3.27E−01 | 3.97E−03 | 9.88E−01 |
| chr14 | 106328280 | 106328426 | 9.09E−04 | 3.33E−01 | 2.49E−03 | 9.93E−01 |
| chr20 | 55965241 | 55965253 | 5.53E−10 | 3.29E−01 | 1.04E−02 | 9.69E−01 |
| chr3 | 16883944 | 16884162 | 4.70E−08 | 4.83E−01 | 3.09E−02 | 9.40E−01 |
| chr21 | 45577764 | 45577826 | 1.09E−06 | 6.30E−01 | 3.40E−02 | 9.49E−01 |
| chr6 | 170581003 | 170581096 | 1.39E−12 | 3.34E−01 | 1.64E−02 | 9.53E−01 |
| chr1 | 1564676 | 1564690 | 2.23E−04 | 6.21E−01 | 1.11E−01 | 8.49E−01 |
| chr4 | 1397570 | 1397650 | 4.86E−06 | 3.16E−01 | 1.04E−02 | 9.68E−01 |
| chr19 | 3179929 | 3179985 | 9.47E−15 | 5.51E−01 | 2.15E−02 | 9.62E−01 |
| chr19 | 51951770 | 51951911 | 2.51E−06 | 4.51E−01 | 2.43E−02 | 9.49E−01 |
| chr8 | 687582 | 687636 | 1.73E−06 | 4.98E−01 | 1.22E−03 | 9.98E−01 |
| chr1 | 6086599 | 6086652 | 6.50E−04 | 3.94E−01 | 4.47E−02 | 8.98E−01 |
| chr10 | 106401933 | 106401941 | 2.13E−05 | 4.01E−01 | 3.34E−02 | 9.23E−01 |
| chr3 | 239683 | 239720 | 2.25E−05 | 5.71E−01 | 3.28E−02 | 9.46E−01 |
| chr17 | 73839230 | 73839273 | 6.56E−06 | 9.52E−01 | 1.25E−01 | 8.84E−01 |
| chr1 | 221050478 | 221050491 | 8.96E−04 | 3.91E−01 | 6.61E−02 | 8.55E−01 |
| chr11 | 1332237 | 1332286 | 5.34E−04 | 5.06E−01 | 6.97E−02 | 8.79E−01 |
| chr2 | 73928331 | 73928354 | 1.10E−06 | 5.11E−01 | 5.85E−02 | 8.97E−01 |
| chr1 | 3077720 | 3077741 | 6.84E−05 | 4.70E−01 | 4.09E−02 | 9.20E−01 |
| chr2 | 47206751 | 47206855 | 3.65E−06 | 6.23E−01 | 9.86E−02 | 8.63E−01 |
| chr9 | 29214375 | 29214383 | 3.37E−05 | 3.61E−01 | 4.00E−03 | 9.89E−01 |
| chr14 | 85997836 | 85997946 | 5.16E−07 | 3.48E−01 | 2.85E−03 | 9.92E−01 |
| chr22 | 43627412 | 43627566 | 3.71E−05 | 3.52E−01 | 3.99E−03 | 9.89E−01 |
| chr9 | 71788636 | 71788870 | 4.33E−08 | 3.07E−01 | 9.42E−04 | 9.97E−01 |
| chr20 | 21492917 | 21492931 | 4.43E−05 | 3.88E−01 | 2.56E−02 | 9.38E−01 |
| chr5 | 45696095 | 45696108 | 5.24E−10 | 4.60E−01 | 8.05E−03 | 9.83E−01 |
| chr3 | 123242028 | 123242130 | 7.00E−05 | 5.00E−01 | 2.80E−02 | 9.47E−01 |
| chr21 | 44819374 | 44819432 | 2.06E−06 | 6.48E−01 | 4.71E−02 | 9.32E−01 |
| chr2 | 220313472 | 220313492 | 2.04E−16 | 4.88E−01 | 2.99E−03 | 9.94E−01 |
| chr13 | 23733902 | 23733940 | 4.44E−05 | 3.91E−01 | 2.28E−03 | 9.94E−01 |
| chr8 | 35093160 | 35093180 | 2.20E−08 | 3.10E−01 | 8.25E−03 | 9.74E−01 |
| chr7 | 32338303 | 32338342 | 4.92E−07 | 4.92E−01 | 1.92E−03 | 9.96E−01 |
| chr14 | 50829747 | 50830001 | 3.10E−04 | 4.57E−01 | 2.06E−02 | 9.57E−01 |
| chr2 | 5813752 | 5813893 | 3.13E−05 | 3.24E−01 | 1.74E−02 | 9.49E−01 |
| chr17 | 73839499 | 73839523 | 1.41E−09 | 4.75E−01 | 8.65E−03 | 9.82E−01 |
| chr16 | 12997270 | 12997416 | 2.81E−04 | 3.47E−01 | 4.97E−03 | 9.86E−01 |
| chr7 | 2774625 | 2774646 | 1.17E−05 | 5.44E−01 | 9.90E−02 | 8.46E−01 |
| chr20 | 62200085 | 62200109 | 1.92E−05 | 5.81E−01 | 1.07E−01 | 8.44E−01 |
| chr2 | 8723890 | 8723900 | 8.38E−04 | 5.80E−01 | 8.54E−02 | 8.72E−01 |
| chr19 | 38886138 | 38886154 | 2.50E−05 | 4.26E−01 | 5.02E−02 | 8.95E−01 |
| chr6 | 1620159 | 1620204 | 1.76E−09 | 3.11E−01 | 3.46E−03 | 9.89E−01 |
| chr2 | 99439256 | 99439395 | 6.54E−12 | 3.56E−01 | 7.40E−04 | 9.98E−01 |
| chr6 | 163670668 | 163670704 | 1.36E−07 | 4.46E−01 | 3.55E−02 | 9.26E−01 |
| chr6 | 20024352 | 20024422 | 4.34E−08 | 3.57E−01 | 2.60E−02 | 9.32E−01 |
| chr3 | 38081466 | 38081537 | 7.06E−05 | 6.67E−01 | 3.53E−02 | 9.50E−01 |
| chr10 | 7452356 | 7452391 | 3.84E−07 | 6.35E−01 | 2.72E−03 | 9.96E−01 |
| chr9 | 117266875 | 117266928 | 5.04E−07 | 3.74E−01 | 3.04E−02 | 9.25E−01 |
| chr12 | 7060734 | 7060909 | 2.53E−04 | 3.29E−01 | 1.40E−02 | 9.59E−01 |
| chr19 | 10870440 | 10870451 | 2.31E−07 | 3.18E−01 | 1.55E−02 | 9.54E−01 |
| chr20 | 3653597 | 3653644 | 8.22E−05 | 3.77E−01 | 5.74E−04 | 9.98E−01 |
| chr3 | 47051337 | 47051366 | 3.72E−06 | 4.49E−01 | 1.82E−02 | 9.61E−01 |
| chr16 | 56313147 | 56313258 | 7.19E−08 | 5.55E−01 | 8.26E−02 | 8.70E−01 |
| chr8 | 65282679 | 65282693 | 4.30E−12 | 3.39E−01 | 6.09E−03 | 9.82E−01 |
| chr7 | 3134380 | 3134520 | 7.69E−05 | 6.69E−01 | 1.25E−01 | 8.43E−01 |
| chr12 | 6664477 | 6664942 | 1.86E−11 | 3.38E−01 | 1.42E−03 | 9.96E−01 |
| chr8 | 54792994 | 54793073 | 7.78E−04 | 3.22E−01 | 8.14E−03 | 9.75E−01 |
| chr1 | 77333197 | 77333207 | 4.46E−06 | 3.25E−01 | 7.63E−03 | 9.77E−01 |
| chr20 | 49158144 | 49158301 | 5.89E−04 | 6.49E−01 | 1.04E−01 | 8.61E−01 |
| chr15 | 79382228 | 79382307 | 2.92E−04 | 3.20E−01 | 8.81E−03 | 9.73E−01 |
| chr5 | 92907787 | 92907881 | 1.16E−05 | 4.53E−01 | 1.78E−02 | 9.62E−01 |
| chr1 | 146369387 | 146369494 | 5.36E−05 | 6.67E−01 | 8.52E−02 | 8.87E−01 |
| chr11 | 123355219 | 123355301 | 1.34E−05 | 3.97E−01 | 6.22E−02 | 8.65E−01 |
| chr1 | 229568006 | 229568012 | 1.28E−08 | 3.49E−01 | 8.86E−03 | 9.75E−01 |

TABLE 4a-continued

Differentially methylated MHB regions between colon cancer tissues (CCT) and normal plasma.

| Chrom | Start | End | q-value | Cancer.exp | Normal.exp | Weight |
|---|---|---|---|---|---|---|
| chr19 | 48918187 | 48918247 | 1.48E−06 | 4.28E−01 | 1.01E−02 | 9.77E−01 |
| chr19 | 42703701 | 42703778 | 8.19E−05 | 4.86E−01 | 4.96E−02 | 9.07E−01 |
| chr14 | 75800718 | 75800727 | 6.11E−04 | 4.17E−01 | 2.90E−02 | 9.35E−01 |
| chr4 | 76860974 | 76861103 | 2.44E−04 | 3.33E−01 | 1.53E−03 | 9.95E−01 |
| chr13 | 110357693 | 110357853 | 1.33E−04 | 3.68E−01 | 1.92E−02 | 9.50E−01 |
| chr20 | 61885738 | 61885787 | 1.29E−04 | 3.33E−01 | 3.10E−02 | 9.15E−01 |
| chr20 | 62199644 | 62199673 | 3.69E−16 | 3.68E−01 | 1.60E−02 | 9.58E−01 |
| chr9 | 132650733 | 132650800 | 1.81E−12 | 3.44E−01 | 2.01E−02 | 9.45E−01 |
| chr2 | 45232449 | 45232493 | 2.46E−05 | 4.83E−01 | 2.27E−02 | 9.55E−01 |
| chr4 | 134072180 | 134072187 | 4.01E−04 | 3.99E−01 | 3.52E−02 | 9.19E−01 |
| chr6 | 20320098 | 20320141 | 2.23E−05 | 5.83E−01 | 9.09E−02 | 8.65E−01 |
| chr13 | 109793301 | 109793322 | 3.09E−04 | 5.05E−01 | 5.32E−02 | 9.05E−01 |
| chr8 | 121021099 | 121021235 | 2.99E−07 | 5.14E−01 | 2.89E−02 | 9.47E−01 |
| chr19 | 3688173 | 3688181 | 1.21E−05 | 5.17E−01 | 7.75E−02 | 8.70E−01 |
| chr17 | 46749238 | 46749330 | 3.19E−07 | 4.89E−01 | 1.35E−02 | 9.73E−01 |
| chr10 | 101089443 | 101089462 | 6.37E−08 | 3.92E−01 | 1.62E−03 | 9.96E−01 |
| chr7 | 4848865 | 4848900 | 2.46E−08 | 3.62E−01 | 2.40E−02 | 9.38E−01 |
| chr17 | 4389757 | 4389831 | 2.21E−08 | 6.67E−01 | 8.98E−03 | 9.87E−01 |
| chr10 | 6094775 | 6094827 | 3.21E−08 | 3.57E−01 | 4.55E−02 | 8.87E−01 |
| chr22 | 50319330 | 50319373 | 7.12E−10 | 6.37E−01 | 3.88E−02 | 9.43E−01 |
| chr8 | 8654900 | 8654936 | 2.75E−07 | 5.07E−01 | 4.60E−02 | 9.17E−01 |
| chr11 | 70864168 | 70864186 | 8.09E−04 | 4.67E−01 | 3.92E−02 | 9.23E−01 |
| chr3 | 194118678 | 194118738 | 2.87E−09 | 4.69E−01 | 2.16E−03 | 9.95E−01 |
| chr4 | 104641038 | 104641088 | 1.12E−06 | 4.28E−01 | 1.91E−03 | 9.96E−01 |
| chr22 | 40796311 | 40796475 | 1.68E−18 | 6.09E−01 | 1.07E−02 | 9.83E−01 |
| chr1 | 221049959 | 221050007 | 1.23E−06 | 5.30E−01 | 4.38E−02 | 9.24E−01 |
| chr8 | 67873654 | 67873665 | 5.20E−04 | 3.82E−01 | 5.98E−02 | 8.65E−01 |
| chr11 | 63637374 | 63637410 | 1.66E−09 | 3.58E−01 | 1.54E−02 | 9.59E−01 |
| chr9 | 36458494 | 36458734 | 7.27E−12 | 4.67E−01 | 2.69E−02 | 9.45E−01 |
| chr8 | 142276277 | 142276297 | 3.08E−11 | 5.17E−01 | 4.18E−02 | 9.25E−01 |
| chr7 | 1552786 | 1552837 | 1.45E−04 | 3.84E−01 | 4.44E−02 | 8.96E−01 |
| chr3 | 133661417 | 133661556 | 2.91E−13 | 3.68E−01 | 2.48E−02 | 9.37E−01 |
| chr2 | 67625058 | 67625155 | 9.95E−04 | 3.33E−01 | 7.73E−03 | 9.77E−01 |
| chr15 | 64244503 | 64244684 | 3.63E−09 | 5.45E−01 | 7.20E−02 | 8.83E−01 |
| chr1 | 57888963 | 57889003 | 8.31E−05 | 5.00E−01 | 2.32E−02 | 9.56E−01 |
| chr6 | 132722899 | 132722939 | 3.55E−06 | 5.14E−01 | 5.03E−03 | 9.90E−01 |
| chr8 | 98290100 | 98290333 | 5.19E−07 | 4.92E−01 | 4.52E−03 | 9.91E−01 |
| chr2 | 109855158 | 109855264 | 1.22E−06 | 4.06E−01 | 2.56E−02 | 9.41E−01 |
| chr11 | 65408370 | 65408410 | 4.85E−05 | 4.04E−01 | 5.45E−02 | 8.81E−01 |
| chr19 | 4916881 | 4917023 | 8.52E−08 | 3.55E−01 | 2.71E−02 | 9.29E−01 |
| chr2 | 239335984 | 239336031 | 3.79E−05 | 3.29E−01 | 1.84E−03 | 9.94E−01 |
| chr17 | 46619163 | 46619183 | 1.00E−06 | 4.34E−01 | 1.36E−02 | 9.70E−01 |
| chr17 | 79134306 | 79134315 | 3.45E−04 | 3.33E−01 | 6.19E−03 | 9.82E−01 |
| chr8 | 41166324 | 41166334 | 2.39E−06 | 3.51E−01 | 4.22E−02 | 8.93E−01 |
| chr8 | 494278 | 494286 | 1.09E−07 | 3.19E−01 | 8.84E−03 | 9.73E−01 |
| chr13 | 25745208 | 25745232 | 3.28E−07 | 3.74E−01 | 1.56E−02 | 9.60E−01 |
| chr8 | 687326 | 687341 | 3.48E−07 | 3.36E−01 | 3.08E−03 | 9.91E−01 |
| chr14 | 73181172 | 73181203 | 1.06E−09 | 5.24E−01 | 3.07E−02 | 9.45E−01 |
| chr6 | 20024006 | 20024141 | 2.60E−08 | 5.71E−01 | 5.05E−02 | 9.19E−01 |
| chr7 | 138780361 | 138780396 | 3.52E−06 | 3.76E−01 | 7.03E−02 | 8.42E−01 |
| chr7 | 155246087 | 155246111 | 5.14E−04 | 3.33E−01 | 8.55E−03 | 9.75E−01 |
| chr1 | 119530576 | 119530606 | 2.47E−08 | 4.16E−01 | 9.57E−03 | 9.77E−01 |
| chr16 | 85936479 | 85936599 | 1.14E−04 | 4.24E−01 | 4.78E−02 | 8.99E−01 |
| chr7 | 45039481 | 45039607 | 8.08E−04 | 3.33E−01 | 1.27E−04 | 1.00E+00 |
| chr22 | 44391923 | 44391940 | 1.76E−07 | 5.42E−01 | 7.15E−02 | 8.84E−01 |
| chr5 | 135266182 | 135266207 | 7.63E−09 | 3.18E−01 | 3.92E−03 | 9.88E−01 |
| chr6 | 42335118 | 42335231 | 3.72E−08 | 4.31E−01 | 3.88E−02 | 9.17E−01 |
| chr12 | 29936617 | 29936632 | 3.31E−04 | 3.53E−01 | 5.09E−02 | 8.74E−01 |
| chr7 | 70597943 | 70597953 | 1.18E−08 | 3.42E−01 | 2.35E−02 | 9.36E−01 |
| chr6 | 126112458 | 126112707 | 6.93E−04 | 3.33E−01 | 4.55E−03 | 9.87E−01 |
| chr8 | 25203033 | 25203231 | 2.57E−06 | 9.33E−01 | 6.59E−02 | 9.34E−01 |
| chr2 | 131797613 | 131797636 | 2.63E−11 | 3.58E−01 | 2.87E−02 | 9.26E−01 |
| chr13 | 112723104 | 112723111 | 1.22E−06 | 3.35E−01 | 1.37E−02 | 9.61E−01 |
| chr1 | 229567768 | 229567822 | 1.50E−05 | 5.89E−01 | 4.39E−02 | 9.31E−01 |
| chr10 | 11212536 | 11212603 | 8.90E−08 | 4.49E−01 | 2.76E−02 | 9.42E−01 |
| chr15 | 74658177 | 74658190 | 4.08E−07 | 4.26E−01 | 1.06E−03 | 9.98E−01 |
| chr2 | 237416280 | 237416327 | 1.85E−04 | 3.33E−01 | 3.27E−02 | 9.11E−01 |
| chr12 | 115109842 | 115109855 | 7.17E−14 | 4.31E−01 | 1.72E−02 | 9.62E−01 |
| chr22 | 39148239 | 39148256 | 7.94E−04 | 3.80E−01 | 3.62E−02 | 9.13E−01 |
| chr19 | 50058236 | 50058275 | 1.06E−05 | 3.46E−01 | 4.48E−02 | 8.85E−01 |
| chr6 | 37551119 | 37551243 | 1.16E−06 | 8.06E−01 | 8.25E−02 | 9.07E−01 |
| chr7 | 36679543 | 36679660 | 2.97E−04 | 4.79E−01 | 9.14E−02 | 8.40E−01 |
| chr1 | 1118430 | 1118437 | 3.47E−13 | 6.30E−01 | 3.08E−02 | 9.53E−01 |
| chr16 | 54967023 | 54967077 | 4.46E−09 | 6.76E−01 | 1.08E−02 | 9.84E−01 |
| chr17 | 16570355 | 16570361 | 6.01E−04 | 4.97E−01 | 1.51E−01 | 7.67E−01 |

TABLE 4a-continued

Differentially methylated MHB regions between colon cancer tissues (CCT) and normal plasma.

| Chrom | Start | End | q-value | Cancer.exp | Normal.exp | Weight |
|---|---|---|---|---|---|---|
| chr6 | 166976776 | 166976796 | 7.60E−05 | 4.65E−01 | 8.63E−02 | 8.44E−01 |
| chr8 | 57026038 | 57026118 | 7.09E−23 | 8.86E−01 | 3.66E−03 | 9.96E−01 |
| chr19 | 41119578 | 41119638 | 2.01E−04 | 3.57E−01 | 1.11E−03 | 9.97E−01 |
| chr8 | 127568853 | 127569070 | 9.32E−04 | 4.16E−01 | 2.62E−02 | 9.41E−01 |
| chr2 | 66672481 | 66672520 | 8.77E−12 | 3.23E−01 | 1.74E−02 | 9.49E−01 |
| chr9 | 134128101 | 134128135 | 2.83E−18 | 4.42E−01 | 5.26E−03 | 9.88E−01 |
| chr6 | 133562773 | 133562790 | 5.91E−09 | 6.67E−01 | 2.38E−03 | 9.96E−01 |
| chr12 | 41086129 | 41086227 | 1.86E−09 | 6.63E−01 | 2.39E−03 | 9.96E−01 |
| chr3 | 129694365 | 129694378 | 1.80E−07 | 3.98E−01 | 1.99E−03 | 9.95E−01 |
| chr22 | 46367952 | 46367968 | 2.53E−08 | 3.22E−01 | 4.24E−03 | 9.87E−01 |
| chr6 | 17962707 | 17962816 | 3.67E−05 | 3.45E−01 | 4.31E−02 | 8.89E−01 |
| chr16 | 54970335 | 54970379 | 1.79E−09 | 3.10E−01 | 4.58E−03 | 9.85E−01 |
| chr19 | 37742927 | 37742978 | 5.47E−07 | 4.50E−01 | 2.20E−02 | 9.53E−01 |
| chr5 | 45696035 | 45696048 | 1.19E−07 | 3.42E−01 | 1.72E−02 | 9.52E−01 |
| chr2 | 239140304 | 239140340 | 1.20E−05 | 3.13E−01 | 2.90E−03 | 9.91E−01 |
| chr2 | 220349250 | 220349265 | 7.57E−08 | 6.67E−01 | 3.87E−04 | 9.99E−01 |
| chr7 | 102715190 | 102715298 | 1.57E−04 | 3.67E−01 | 1.44E−02 | 9.62E−01 |
| chr15 | 79382801 | 79382824 | 6.68E−04 | 3.47E−01 | 2.70E−03 | 9.92E−01 |
| chr6 | 3752576 | 3752604 | 7.33E−04 | 3.33E−01 | 2.13E−03 | 9.94E−01 |
| chr14 | 67955224 | 67955250 | 2.41E−05 | 4.57E−01 | 6.28E−02 | 8.79E−01 |
| chr10 | 11207159 | 11207259 | 2.57E−08 | 4.54E−01 | 5.02E−04 | 9.99E−01 |
| chr19 | 3179353 | 3179432 | 3.37E−09 | 5.34E−01 | 2.26E−02 | 9.59E−01 |
| chr11 | 67171082 | 67171115 | 6.93E−05 | 6.65E−01 | 1.49E−01 | 8.17E−01 |
| chr9 | 95728320 | 95728335 | 8.40E−11 | 3.15E−01 | 6.35E−03 | 9.80E−01 |
| chr21 | 44819309 | 44819337 | 2.01E−10 | 4.87E−01 | 5.37E−02 | 9.01E−01 |
| chr19 | 47152996 | 47153006 | 1.79E−08 | 4.92E−01 | 3.17E−02 | 9.39E−01 |
| chr1 | 149223680 | 149223845 | 3.59E−04 | 3.33E−01 | 6.77E−03 | 9.80E−01 |
| chr11 | 63974228 | 63974540 | 7.17E−13 | 5.04E−01 | 9.13E−03 | 9.82E−01 |
| chr20 | 3653378 | 3653398 | 1.02E−12 | 4.55E−01 | 9.84E−03 | 9.79E−01 |
| chr7 | 2758845 | 2758885 | 4.20E−04 | 6.25E−01 | 8.22E−02 | 8.84E−01 |
| chr2 | 198063780 | 198063957 | 1.05E−05 | 4.24E−01 | 4.26E−02 | 9.09E−01 |
| chr19 | 19571691 | 19571731 | 1.02E−10 | 3.44E−01 | 2.02E−02 | 9.45E−01 |
| chr6 | 166970525 | 166970559 | 6.04E−04 | 3.33E−01 | 8.25E−03 | 9.76E−01 |
| chr8 | 97506696 | 97507459 | 1.06E−09 | 4.29E−01 | 2.07E−04 | 1.00E+00 |
| chr17 | 21415130 | 21415142 | 1.30E−06 | 7.23E−01 | 8.87E−02 | 8.91E−01 |
| chr13 | 109792984 | 109792996 | 5.24E−07 | 3.45E−01 | 2.80E−02 | 9.25E−01 |
| chr3 | 50312991 | 50313021 | 1.89E−10 | 3.16E−01 | 7.01E−03 | 9.78E−01 |
| chr22 | 47070183 | 47070285 | 2.86E−09 | 3.75E−01 | 2.54E−02 | 9.37E−01 |
| chr14 | 70654420 | 70654435 | 2.18E−08 | 6.67E−01 | 1.50E−03 | 9.98E−01 |
| chr13 | 25745075 | 25745153 | 6.52E−07 | 3.13E−01 | 6.84E−04 | 9.98E−01 |
| chr19 | 37498702 | 37498719 | 6.82E−07 | 3.95E−01 | 2.68E−02 | 9.36E−01 |
| chr9 | 134148582 | 134148640 | 3.05E−19 | 6.79E−01 | 9.44E−03 | 9.86E−01 |
| chr4 | 1210659 | 1210715 | 7.42E−16 | 4.74E−01 | 1.36E−02 | 9.72E−01 |
| chr4 | 1210785 | 1210901 | 1.09E−05 | 4.87E−01 | 2.80E−02 | 9.46E−01 |
| chr9 | 1045544 | 1045552 | 2.57E−04 | 3.75E−01 | 1.25E−02 | 9.68E−01 |
| chr12 | 115109640 | 115109662 | 1.71E−13 | 5.53E−01 | 2.10E−02 | 9.64E−01 |
| chr13 | 28498832 | 28498881 | 5.02E−08 | 4.38E−01 | 7.14E−03 | 9.84E−01 |
| chr6 | 85483796 | 85483914 | 4.12E−05 | 3.46E−01 | 2.47E−02 | 9.33E−01 |
| chr12 | 115109783 | 115109814 | 2.69E−06 | 5.32E−01 | 4.73E−02 | 9.18E−01 |
| chr19 | 39826266 | 39826272 | 6.52E−20 | 4.91E−01 | 6.18E−03 | 9.88E−01 |
| chr7 | 156798241 | 156798342 | 9.72E−04 | 3.33E−01 | 2.90E−04 | 9.99E−01 |
| chr1 | 91183790 | 91184000 | 4.36E−10 | 4.55E−01 | 4.86E−03 | 9.89E−01 |
| chr7 | 2672631 | 2672761 | 1.11E−04 | 4.05E−01 | 2.50E−03 | 9.94E−01 |
| chr7 | 156795190 | 156795205 | 1.01E−05 | 3.93E−01 | 4.41E−02 | 8.99E−01 |
| chr8 | 28637012 | 28637063 | 4.74E−05 | 6.42E−01 | 1.63E−01 | 7.97E−01 |
| chr13 | 25320305 | 25320319 | 4.63E−09 | 3.42E−01 | 2.22E−03 | 9.94E−01 |
| chr8 | 86350666 | 86350689 | 1.38E−04 | 3.85E−01 | 2.72E−02 | 9.34E−01 |
| chr12 | 51718198 | 51718251 | 1.92E−06 | 6.90E−01 | 1.05E−01 | 8.68E−01 |
| chr6 | 117086335 | 117086374 | 1.36E−09 | 5.62E−01 | 1.21E−02 | 9.79E−01 |
| chr15 | 96904744 | 96904779 | 2.79E−10 | 3.39E−01 | 2.01E−02 | 9.44E−01 |
| chr13 | 112758478 | 112758496 | 2.98E−05 | 5.00E−01 | 5.11E−03 | 9.90E−01 |
| chr17 | 17295442 | 17295619 | 7.27E−12 | 4.01E−01 | 1.59E−02 | 9.62E−01 |
| chr16 | 28996532 | 28996602 | 9.67E−07 | 5.09E−01 | 3.23E−02 | 9.40E−01 |
| chr13 | 112758807 | 112758835 | 4.04E−08 | 3.10E−01 | 5.53E−03 | 9.82E−01 |
| chr14 | 99706032 | 99706158 | 1.18E−04 | 3.69E−01 | 2.88E−02 | 9.28E−01 |
| chr14 | 36987163 | 36987184 | 9.34E−11 | 3.42E−01 | 6.76E−03 | 9.81E−01 |
| chr2 | 43398069 | 43398085 | 2.49E−11 | 4.51E−01 | 4.46E−02 | 9.10E−01 |
| chr6 | 90504290 | 90504359 | 1.81E−06 | 7.29E−01 | 1.66E−01 | 8.14E−01 |
| chr13 | 28503165 | 28503235 | 9.87E−04 | 3.76E−01 | 3.78E−02 | 9.09E−01 |
| chr3 | 154797891 | 154798152 | 1.40E−06 | 3.28E−01 | 1.28E−04 | 1.00E+00 |
| chr6 | 28367069 | 28367128 | 9.50E−13 | 6.30E−01 | 9.85E−03 | 9.85E−01 |
| chr1 | 40974762 | 40974913 | 1.66E−04 | 3.33E−01 | 1.10E−03 | 9.97E−01 |
| chr22 | 50319158 | 50319194 | 3.73E−04 | 6.52E−01 | 1.15E−01 | 8.50E−01 |
| chr12 | 115103722 | 115103767 | 7.11E−09 | 3.86E−01 | 1.94E−02 | 9.52E−01 |
| chr5 | 122435250 | 122435295 | 9.37E−06 | 4.75E−01 | 3.19E−03 | 9.93E−01 |

TABLE 4a-continued

Differentially methylated MHB regions between colon cancer tissues (CCT) and normal plasma.

| Chrom | Start | End | q-value | Cancer.exp | Normal.exp | Weight |
|---|---|---|---|---|---|---|
| chr10 | 134599210 | 134599245 | 4.40E−05 | 3.37E−01 | 2.06E−03 | 9.94E−01 |
| chr7 | 117854567 | 117854818 | 1.23E−05 | 5.35E−01 | 2.16E−02 | 9.61E−01 |
| chr15 | 96890743 | 96890812 | 7.68E−10 | 3.52E−01 | 1.92E−02 | 9.48E−01 |
| chr11 | 45114836 | 45114845 | 8.70E−07 | 5.36E−01 | 6.09E−02 | 8.98E−01 |
| chr1 | 151811102 | 151811203 | 1.24E−08 | 3.25E−01 | 7.38E−04 | 9.98E−01 |
| chr7 | 633049 | 633101 | 6.28E−10 | 4.28E−01 | 2.77E−02 | 9.39E−01 |
| chr4 | 148402315 | 148402431 | 3.63E−05 | 4.18E−01 | 5.27E−03 | 9.88E−01 |
| chr3 | 50313747 | 50313762 | 1.37E−12 | 4.38E−01 | 9.92E−03 | 9.78E−01 |
| chr6 | 42072513 | 42072527 | 5.78E−08 | 3.21E−01 | 1.58E−03 | 9.95E−01 |
| chr1 | 32237851 | 32237877 | 5.70E−10 | 6.67E−01 | 9.60E−04 | 9.99E−01 |
| chr11 | 60718854 | 60718885 | 8.52E−08 | 3.54E−01 | 3.38E−03 | 9.91E−01 |
| chr4 | 5894624 | 5894634 | 1.68E−04 | 4.60E−01 | 5.81E−02 | 8.88E−01 |
| chr2 | 105478832 | 105478873 | 2.70E−05 | 3.94E−01 | 6.33E−03 | 9.84E−01 |
| chr15 | 96890847 | 96890880 | 5.34E−04 | 3.33E−01 | 1.03E−02 | 9.70E−01 |
| chr9 | 101822013 | 101822096 | 1.36E−04 | 4.60E−01 | 6.09E−02 | 8.83E−01 |
| chr11 | 65661484 | 65661564 | 1.68E−08 | 3.69E−01 | 1.70E−02 | 9.56E−01 |
| chr5 | 177989059 | 177989077 | 2.47E−11 | 5.23E−01 | 3.12E−02 | 9.44E−01 |
| chr1 | 40781681 | 40781778 | 3.33E−04 | 3.33E−01 | 3.30E−03 | 9.90E−01 |
| chr13 | 28498910 | 28498956 | 3.03E−09 | 3.33E−01 | 2.40E−03 | 9.93E−01 |
| chr14 | 52294765 | 52294902 | 1.93E−08 | 5.15E−01 | 3.38E−02 | 9.38E−01 |
| chr3 | 47029500 | 47029628 | 1.24E−04 | 3.57E−01 | 2.57E−02 | 9.33E−01 |
| chr7 | 151328862 | 151328895 | 6.68E−05 | 3.76E−01 | 0.00E+00 | 1.00E+00 |
| chr19 | 55553070 | 55553087 | 6.55E−16 | 6.19E−01 | 3.45E−02 | 9.47E−01 |
| chr17 | 40822427 | 40822434 | 5.35E−05 | 6.03E−01 | 1.03E−01 | 8.54E−01 |
| chr19 | 3178517 | 3178545 | 2.45E−17 | 4.00E−01 | 1.59E−02 | 9.62E−01 |
| chr11 | 76299657 | 76299682 | 3.10E−06 | 7.94E−01 | 5.62E−02 | 9.34E−01 |
| chr13 | 29106898 | 29106944 | 4.99E−06 | 3.15E−01 | 1.04E−02 | 9.68E−01 |
| chr20 | 3653265 | 3653330 | 3.02E−11 | 3.49E−01 | 1.03E−02 | 9.71E−01 |
| chr2 | 102187418 | 102187570 | 1.31E−04 | 6.28E−01 | 1.22E−01 | 8.37E−01 |
| chr11 | 32355271 | 32355288 | 4.37E−08 | 3.56E−01 | 1.54E−03 | 9.96E−01 |
| chr1 | 2706134 | 2706161 | 1.10E−07 | 3.08E−01 | 3.31E−03 | 9.89E−01 |
| chr16 | 58497351 | 58497369 | 1.26E−04 | 4.61E−01 | 5.66E−02 | 8.91E−01 |
| chr17 | 56409588 | 56409742 | 1.53E−04 | 4.96E−01 | 5.48E−02 | 9.00E−01 |
| chr6 | 50787949 | 50787984 | 4.81E−09 | 4.53E−01 | 3.52E−02 | 9.28E−01 |
| chr20 | 61992292 | 61992315 | 5.29E−09 | 3.92E−01 | 1.86E−03 | 9.95E−01 |
| chr16 | 68390251 | 68390361 | 7.18E−17 | 4.71E−01 | 2.22E−02 | 9.55E−01 |
| chr22 | 19710841 | 19710855 | 3.13E−06 | 3.94E−01 | 4.28E−03 | 9.89E−01 |
| chr13 | 109793122 | 109793152 | 6.05E−04 | 3.08E−01 | 2.56E−02 | 9.92E−01 |
| chr1 | 4715727 | 4715734 | 6.53E−06 | 6.02E−01 | 3.67E−02 | 9.43E−01 |
| chr16 | 88496790 | 88496819 | 2.91E−04 | 3.40E−01 | 3.41E−02 | 9.09E−01 |
| chr8 | 105478845 | 105478857 | 7.40E−10 | 3.48E−01 | 1.02E−02 | 9.72E−01 |
| chr11 | 67204881 | 67205042 | 6.69E−04 | 3.75E−01 | 5.62E−02 | 8.70E−01 |
| chr10 | 12223668 | 12223715 | 4.13E−08 | 4.51E−01 | 7.50E−02 | 8.57E−01 |
| chr5 | 169724354 | 169724470 | 2.48E−04 | 4.26E−01 | 3.10E−02 | 9.32E−01 |

TABLE 4b

Differentially methylated MHB regions between lung cancer tissues (LCT) and normal plasma.

| Chrom | Start | End | q-value | Cancer.exp | Normal.exp | Weight |
|---|---|---|---|---|---|---|
| chr3 | 187676563 | 187676644 | 1.78E−18 | 3.70E−01 | 6.60E−04 | 9.98E−01 |
| chr7 | 391332 | 391394 | 2.80E−05 | 4.15E−01 | 2.80E−02 | 9.37E−01 |
| chr8 | 11565988 | 11565997 | 9.49E−06 | 3.59E−01 | 3.91E−02 | 9.02E−01 |
| chr7 | 104581511 | 104581826 | 4.32E−09 | 6.73E−01 | 6.48E−02 | 9.12E−01 |
| chr7 | 5371156 | 5371187 | 7.04E−10 | 4.23E−01 | 1.16E−02 | 9.73E−01 |
| chr21 | 38080525 | 38080550 | 9.91E−07 | 3.67E−01 | 7.82E−03 | 9.79E−01 |
| chr8 | 17509194 | 17509223 | 2.08E−12 | 6.94E−01 | 3.56E−02 | 9.51E−01 |
| chr5 | 140207807 | 140207820 | 1.13E−10 | 5.27E−01 | 5.73E−02 | 9.02E−01 |
| chr20 | 62369207 | 62369221 | 5.29E−06 | 4.11E−01 | 0.00E+00 | 1.00E+00 |
| chr17 | 79406164 | 79406253 | 6.94E−09 | 4.67E−01 | 8.66E−02 | 8.44E−01 |
| chr16 | 29164276 | 29164303 | 5.35E−05 | 7.19E−01 | 1.71E−01 | 8.08E−01 |
| chr2 | 177017367 | 177017378 | 1.11E−05 | 5.37E−01 | 4.78E−03 | 9.91E−01 |
| chr21 | 47971700 | 47971722 | 6.33E−05 | 6.49E−01 | 9.40E−02 | 8.73E−01 |
| chr1 | 218098391 | 218098398 | 7.78E−07 | 3.22E−01 | 1.47E−02 | 9.56E−01 |
| chr1 | 19251999 | 19252025 | 1.40E−06 | 7.94E−01 | 2.08E−01 | 7.92E−01 |
| chr8 | 96085373 | 96085420 | 6.00E−07 | 7.50E−01 | 7.16E−02 | 9.13E−01 |
| chr19 | 18113497 | 18113578 | 1.06E−05 | 6.39E−01 | 4.65E−02 | 9.32E−01 |
| chr3 | 65342396 | 65342412 | 4.86E−09 | 3.34E−01 | 3.36E−02 | 9.09E−01 |
| chr14 | 105640730 | 105640770 | 2.39E−05 | 5.71E−01 | 6.76E−02 | 8.94E−01 |
| chr15 | 96865945 | 96865955 | 3.15E−06 | 3.85E−01 | 7.33E−03 | 9.81E−01 |

TABLE 4b-continued

Differentially methylated MHB regions between lung cancer tissues (LCT) and normal plasma.

| Chrom | Start | End | q-value | Cancer.exp | Normal.exp | Weight |
|---|---|---|---|---|---|---|
| chr12 | 125039261 | 125039301 | 4.07E−08 | 4.82E−01 | 2.69E−02 | 9.47E−01 |
| chr2 | 112124096 | 112124151 | 7.06E−08 | 5.36E−01 | 3.50E−02 | 9.39E−01 |
| chr2 | 232186706 | 232186761 | 4.03E−05 | 6.99E−01 | 1.17E−01 | 8.57E−01 |
| chr4 | 2814622 | 2814718 | 5.99E−04 | 3.94E−01 | 4.03E−02 | 9.07E−01 |
| chr2 | 171570261 | 171570269 | 8.68E−09 | 3.71E−01 | 1.07E−02 | 9.72E−01 |
| chr3 | 138663980 | 138664002 | 4.72E−08 | 3.89E−01 | 7.93E−03 | 9.80E−01 |
| chr22 | 36773395 | 36773570 | 2.26E−08 | 4.53E−01 | 3.57E−02 | 9.27E−01 |
| chr17 | 40822613 | 40822653 | 5.50E−01 | 4.87E−01 | 1.05E−01 | 8.23E−01 |
| chr19 | 12306143 | 12306166 | 1.34E−04 | 3.85E−01 | 4.09E−03 | 9.89E−01 |
| chr22 | 20783998 | 20784048 | 2.77E−09 | 3.56E−01 | 5.28E−02 | 8.71E−01 |
| chr1 | 154375706 | 154375773 | 5.12E−13 | 6.97E−01 | 1.67E−02 | 9.77E−01 |
| chr17 | 76127253 | 76127408 | 1.33E−22 | 5.19E−01 | 1.32E−02 | 9.75E−01 |
| chr1 | 45009127 | 45009259 | 4.98E−04 | 5.01E−01 | 1.03E−01 | 8.30E−01 |
| chr18 | 72916692 | 72916705 | 3.71E−04 | 5.30E−01 | 9.87E−02 | 8.43E−01 |
| chr2 | 109834010 | 109834148 | 1.32E−05 | 5.00E−01 | 4.07E−02 | 9.25E−01 |
| chr4 | 8082086 | 8082177 | 1.19E−05 | 5.85E−01 | 1.48E−01 | 7.98E−01 |
| chr6 | 41515921 | 41515938 | 3.84E−08 | 3.06E−01 | 2.81E−03 | 9.91E−01 |
| chr19 | 10624949 | 10624963 | 3.00E−07 | 3.35E−01 | 8.91E−03 | 9.74E−01 |
| chr14 | 94254076 | 94254092 | 1.90E−08 | 3.55E−01 | 2.20E−02 | 9.42E−01 |
| chr16 | 31488890 | 31488912 | 1.14E−06 | 5.07E−01 | 4.44E−02 | 9.19E−01 |
| chr17 | 74141537 | 74141566 | 1.61E−14 | 3.84E−01 | 1.43E−02 | 9.64E−01 |
| chr21 | 44819099 | 44819123 | 2.08E−11 | 5.22E−01 | 4.98E−02 | 9.13E−01 |
| chr15 | 27136915 | 27136924 | 3.07E−04 | 3.89E−01 | 3.66E−02 | 9.14E−01 |
| chr6 | 10393363 | 10393497 | 3.04E−04 | 7.22E−01 | 9.25E−02 | 8.86E−01 |
| chr2 | 73147431 | 73147444 | 3.25E−06 | 4.33E−01 | 1.05E−02 | 9.76E−01 |
| chr19 | 48946520 | 48946657 | 1.80E−05 | 3.24E−01 | 1.39E−03 | 9.96E−01 |
| chr5 | 50694887 | 50694985 | 1.26E−04 | 3.83E−01 | 8.31E−03 | 9.79E−01 |
| chr8 | 38757858 | 38757899 | 2.69E−14 | 3.74E−01 | 1.47E−02 | 9.62E−01 |
| chr9 | 126785062 | 126785097 | 2.43E−05 | 5.00E−01 | 6.59E−03 | 9.87E−01 |
| chr8 | 142276522 | 142276533 | 5.10E−10 | 4.30E−01 | 1.94E−02 | 9.57E−01 |
| chr16 | 88758463 | 88758479 | 1.78E−11 | 8.05E−01 | 1.47E−02 | 9.82E−01 |
| chr10 | 114136302 | 114136365 | 8.24E−11 | 5.72E−01 | 8.45E−03 | 9.85E−01 |
| chr11 | 67804601 | 67804688 | 2.54E−05 | 3.32E−01 | 5.21E−03 | 9.85E−01 |
| chr2 | 160761118 | 160761165 | 2.90E−08 | 5.97E−01 | 0.00E+00 | 1.00E+00 |
| chr9 | 127265806 | 127265816 | 4.03E−06 | 4.42E−01 | 1.61E−02 | 9.65E−01 |
| chr1 | 151870591 | 151870681 | 6.08E−04 | 8.44E−01 | 2.31E−01 | 7.85E−01 |
| chr21 | 37757965 | 37758006 | 5.82E−04 | 3.33E−01 | 1.27E−03 | 9.96E−01 |
| chr19 | 3179842 | 3179904 | 9.81E−04 | 3.67E−01 | 4.09E−02 | 9.00E−01 |
| chr5 | 110406515 | 110406530 | 8.65E−10 | 3.81E−01 | 3.67E−02 | 9.12E−01 |
| chr19 | 58629492 | 58629522 | 1.39E−04 | 3.66E−01 | 4.52E−02 | 8.90E−01 |
| chr21 | 46334450 | 46334460 | 3.21E−05 | 5.04E−01 | 1.06E−01 | 8.26E−01 |
| chr4 | 184828032 | 184828058 | 6.44E−15 | 3.83E−01 | 6.36E−03 | 9.84E−01 |
| chr12 | 64784380 | 64784575 | 1.47E−10 | 5.89E−01 | 6.57E−04 | 9.99E−01 |
| chr2 | 70057016 | 70057043 | 3.20E−06 | 5.84E−01 | 6.67E−02 | 8.97E−01 |
| chr17 | 40822041 | 40822061 | 4.17E−05 | 6.03E−01 | 1.43E−01 | 8.08E−01 |
| chr2 | 25425395 | 25425417 | 3.58E−05 | 7.18E−01 | 1.72E−01 | 8.07E−01 |
| chr16 | 68028052 | 68028131 | 2.34E−12 | 5.09E−01 | 3.45E−02 | 9.37E−01 |
| chr2 | 177016618 | 177016669 | 3.62E−04 | 3.58E−01 | 1.44E−02 | 9.61E−01 |
| chr16 | 88769941 | 88770131 | 2.70E−07 | 3.11E−01 | 6.08E−03 | 9.81E−01 |
| chr3 | 48520626 | 48520665 | 3.50E−14 | 6.36E−01 | 2.73E−02 | 9.59E−01 |
| chr3 | 170137672 | 170137687 | 6.55E−07 | 5.19E−01 | 5.62E−03 | 9.89E−01 |
| chr14 | 73712647 | 73712670 | 4.07E−07 | 3.61E−01 | 5.16E−03 | 9.86E−01 |
| chr17 | 59482675 | 59482690 | 1.11E−04 | 4.21E−01 | 2.63E−02 | 9.41E−01 |
| chr11 | 69229767 | 69229875 | 8.65E−07 | 4.01E−01 | 5.93E−02 | 8.71E−01 |
| chr7 | 4248707 | 4248866 | 2.55E−07 | 5.66E−01 | 4.92E−02 | 9.20E−01 |
| chr2 | 66666590 | 66666648 | 1.13E−10 | 3.44E−01 | 7.08E−03 | 9.80E−01 |
| chr8 | 145900816 | 145901119 | 3.14E−20 | 4.38E−01 | 1.22E−02 | 9.73E−01 |
| chr5 | 139227605 | 139227613 | 5.76E−04 | 3.33E−01 | 1.59E−03 | 9.95E−01 |
| chr17 | 72462820 | 72462912 | 5.48E−08 | 3.35E−01 | 1.52E−02 | 9.57E−01 |
| chr2 | 235055127 | 235055264 | 6.84E−04 | 6.67E−01 | 6.33E−02 | 9.13E−01 |
| chr5 | 2740503 | 2740527 | 6.31E−07 | 3.19E−01 | 2.80E−03 | 9.91E−01 |
| chr17 | 1588162 | 1588384 | 8.00E−04 | 3.33E−01 | 8.14E−05 | 1.00E+00 |
| chr5 | 3600942 | 3600993 | 2.60E−11 | 4.95E−01 | 2.38E−03 | 9.95E−01 |
| chr2 | 129492325 | 129492360 | 7.82E−10 | 4.17E−01 | 2.83E−02 | 9.37E−01 |
| chr3 | 44063876 | 44063942 | 7.92E−05 | 3.69E−01 | 2.83E−02 | 9.29E−01 |
| chr11 | 69920045 | 69920065 | 2.23E−11 | 6.87E−01 | 4.04E−02 | 9.44E−01 |
| chr19 | 55766296 | 55766320 | 3.46E−06 | 4.63E−01 | 3.13E−02 | 9.37E−01 |
| chr2 | 239755874 | 239755896 | 5.19E−07 | 4.11E−01 | 2.82E−02 | 9.36E−01 |
| chr12 | 62584918 | 62584946 | 1.95E−04 | 3.57E−01 | 5.97E−03 | 9.84E−01 |
| chr6 | 157557373 | 157557415 | 9.37E−07 | 3.55E−01 | 1.69E−03 | 9.95E−01 |
| chr19 | 58868331 | 58868347 | 8.87E−06 | 4.91E−01 | 1.11E−01 | 8.16E−01 |
| chr12 | 115103838 | 115103858 | 4.15E−08 | 5.28E−01 | 1.08E−02 | 9.80E−01 |
| chr7 | 150329304 | 150329321 | 3.02E−06 | 3.87E−01 | 9.41E−03 | 9.76E−01 |
| chr6 | 29521498 | 29521580 | 2.88E−08 | 3.76E−01 | 2.16E−03 | 9.94E−01 |
| chr3 | 184504534 | 184504593 | 1.14E−06 | 4.37E−01 | 3.32E−02 | 9.29E−01 |

TABLE 4b-continued

Differentially methylated MHB regions between lung cancer tissues (LCT) and normal plasma.

| Chrom | Start | End | q-value | Cancer.exp | Normal.exp | Weight |
|---|---|---|---|---|---|---|
| chr6 | 45631538 | 45631561 | 1.78E−09 | 4.37E−01 | 1.35E−03 | 9.97E−01 |
| chr6 | 137814560 | 137814567 | 2.67E−08 | 3.32E−01 | 2.44E−02 | 9.31E−01 |
| chr2 | 220313636 | 220313657 | 5.91E−09 | 4.57E−01 | 5.31E−03 | 9.89E−01 |
| chr12 | 111099505 | 111099564 | 8.70E−09 | 5.20E−01 | 1.34E−02 | 9.75E−01 |
| chr10 | 130832367 | 130832381 | 4.88E−05 | 4.15E−01 | 6.27E−02 | 8.69E−01 |
| chr7 | 155556566 | 155556600 | 8.23E−10 | 6.17E−01 | 5.61E−02 | 9.17E−01 |
| chr20 | 62473619 | 62473818 | 3.02E−06 | 7.50E−01 | 6.71E−02 | 9.18E−01 |
| chr6 | 27835219 | 27835269 | 1.85E−06 | 3.44E−01 | 6.72E−03 | 9.81E−01 |
| chr6 | 158411773 | 158411853 | 2.67E−08 | 8.08E−01 | 1.75E−01 | 8.22E−01 |
| chr8 | 142413012 | 142413121 | 1.55E−08 | 5.00E−01 | 1.42E−02 | 9.72E−01 |
| chr5 | 1878568 | 1878601 | 5.87E−05 | 4.16E−01 | 3.34E−02 | 9.26E−01 |
| chr12 | 113675732 | 113675977 | 4.20E−04 | 5.67E−01 | 7.33E−02 | 8.85E−01 |
| chr16 | 68390618 | 68390663 | 1.58E−04 | 4.09E−01 | 5.70E−02 | 8.78E−01 |
| chr20 | 22562975 | 22562988 | 3.53E−05 | 6.56E−01 | 5.58E−02 | 9.22E−01 |
| chr17 | 44847184 | 44847220 | 1.20E−04 | 5.04E−01 | 1.07E−01 | 8.26E−01 |
| chr16 | 50715337 | 50715362 | 2.27E−05 | 5.83E−01 | 5.81E−02 | 9.09E−01 |
| chr2 | 19556014 | 19556079 | 3.21E−06 | 4.09E−01 | 6.03E−02 | 8.72E−01 |
| chr4 | 107774 | 107793 | 3.69E−04 | 3.42E−01 | 4.92E−03 | 9.86E−01 |
| chr17 | 79315001 | 79315013 | 1.43E−08 | 5.28E−01 | 2.49E−02 | 9.55E−01 |
| chr13 | 19918950 | 19918984 | 2.81E−07 | 3.96E−01 | 2.96E−02 | 9.30E−01 |
| chr15 | 57072647 | 57072802 | 1.03E−05 | 8.20E−01 | 1.26E−01 | 8.67E−01 |
| chr6 | 45631260 | 45631269 | 6.27E−09 | 3.54E−01 | 3.37E−03 | 9.91E−01 |
| chr11 | 1779926 | 1779973 | 3.24E−06 | 4.44E−01 | 4.30E−02 | 9.12E−01 |
| chr17 | 44846986 | 44847044 | 7.65E−06 | 3.85E−01 | 5.77E−02 | 8.70E−01 |
| chr16 | 50308506 | 50308653 | 1.06E−05 | 6.67E−01 | 4.90E−02 | 9.32E−01 |
| chr2 | 220313356 | 220313384 | 8.12E−12 | 4.40E−01 | 1.08E−02 | 9.76E−01 |
| chr3 | 196367690 | 196367895 | 4.42E−16 | 3.92E−01 | 5.65E−03 | 9.86E−01 |
| chr5 | 171605385 | 171605414 | 4.30E−05 | 4.69E−01 | 3.74E−02 | 9.26E−01 |
| chr9 | 37903889 | 37903895 | 2.04E−10 | 4.45E−01 | 3.02E−02 | 9.36E−01 |
| chr5 | 172659760 | 172659766 | 1.65E−09 | 5.74E−01 | 8.65E−03 | 9.85E−01 |
| chr19 | 3369814 | 3369834 | 1.95E−05 | 4.64E−01 | 7.57E−02 | 8.60E−01 |
| chr3 | 128211534 | 128211604 | 4.81E−06 | 4.33E−01 | 3.14E−02 | 9.32E−01 |
| chr2 | 133403686 | 133403797 | 1.24E−06 | 5.08E−01 | 6.77E−02 | 8.82E−01 |
| chr5 | 3594724 | 3594745 | 6.75E−06 | 5.00E−01 | 2.09E−02 | 9.60E−01 |
| chr8 | 61764645 | 61764655 | 6.49E−04 | 5.04E−01 | 1.40E−01 | 7.83E−01 |
| chr8 | 145106961 | 145106989 | 5.57E−05 | 3.89E−01 | 2.20E−02 | 9.46E−01 |
| chr17 | 79450423 | 79450451 | 1.04E−04 | 4.18E−01 | 8.46E−02 | 8.31E−01 |
| chr2 | 45231787 | 45231831 | 1.06E−05 | 4.20E−01 | 1.79E−02 | 9.59E−01 |
| chr14 | 52534718 | 52534943 | 6.22E−04 | 3.33E−01 | 2.25E−03 | 9.93E−01 |
| chr12 | 5997166 | 5997213 | 1.87E−05 | 4.83E−01 | 4.88E−02 | 9.08E−01 |
| chr15 | 96886880 | 96886915 | 7.19E−04 | 5.00E−01 | 5.04E−02 | 9.08E−01 |
| chr22 | 50050779 | 50050844 | 1.32E−06 | 4.67E−01 | 7.48E−02 | 8.62E−01 |
| chr17 | 36105480 | 36105490 | 1.07E−06 | 3.29E−01 | 7.20E−03 | 9.79E−01 |
| chr22 | 46367343 | 46367373 | 1.39E−08 | 4.42E−01 | 8.10E−03 | 9.82E−01 |
| chr22 | 19753445 | 19753480 | 6.98E−07 | 3.17E−01 | 9.14E−03 | 9.72E−01 |
| chr9 | 95821885 | 95821901 | 4.75E−17 | 4.25E−01 | 1.20E−02 | 9.73E−01 |
| chr10 | 77167577 | 77167584 | 2.17E−07 | 3.47E−01 | 4.30E−04 | 9.99E−01 |
| chr16 | 28505658 | 28505862 | 7.74E−15 | 3.98E−01 | 2.18E−02 | 9.48E−01 |
| chr7 | 121950428 | 121950564 | 1.32E−06 | 3.47E−01 | 1.15E−02 | 9.68E−01 |
| chr6 | 107956258 | 107956267 | 4.29E−11 | 3.91E−01 | 2.30E−02 | 9.44E−01 |
| chr8 | 10588991 | 10589016 | 3.90E−13 | 3.27E−01 | 8.12E−03 | 9.76E−01 |
| chr9 | 110350145 | 110350159 | 5.33E−05 | 4.62E−01 | 9.62E−02 | 8.28E−01 |
| chr9 | 134465995 | 134466015 | 4.92E−05 | 5.38E−01 | 5.18E−02 | 9.12E−01 |
| chr8 | 145901158 | 145901388 | 1.52E−11 | 6.37E−01 | 3.42E−02 | 9.49E−01 |
| chr15 | 74832704 | 74833132 | 8.57E−04 | 3.33E−01 | 1.42E−03 | 9.96E−01 |
| chr6 | 30431723 | 30431770 | 3.39E−11 | 7.14E−01 | 9.37E−03 | 9.87E−01 |
| chr5 | 3606576 | 3606611 | 1.00E−04 | 4.21E−01 | 3.77E−02 | 9.18E−01 |
| chr20 | 56247297 | 56247315 | 1.93E−08 | 5.30E−01 | 4.68E−02 | 9.19E−01 |
| chr5 | 76373633 | 76373641 | 9.52E−06 | 3.73E−01 | 5.07E−02 | 8.80E−01 |
| chr17 | 68164684 | 68164749 | 2.93E−04 | 5.00E−01 | 2.80E−02 | 9.47E−01 |
| chr13 | 79181662 | 79181784 | 1.22E−05 | 6.39E−01 | 4.53E−02 | 9.34E−01 |
| chr6 | 1384169 | 1384189 | 1.20E−06 | 4.57E−01 | 2.20E−02 | 9.54E−01 |
| chr22 | 23558969 | 23559146 | 3.12E−04 | 3.87E−01 | 3.67E−02 | 9.13E−01 |
| chr5 | 3600677 | 3600690 | 2.47E−12 | 3.26E−01 | 1.04E−02 | 9.69E−01 |
| chr17 | 73749653 | 73749685 | 1.44E−09 | 3.09E−01 | 4.38E−03 | 9.86E−01 |
| chr4 | 24801685 | 24801698 | 1.75E−13 | 3.88E−01 | 6.79E−03 | 9.83E−01 |
| chr10 | 77167421 | 77167439 | 5.92E−06 | 3.92E−01 | 4.57E−02 | 8.96E−01 |
| chr4 | 111543271 | 111543299 | 4.88E−05 | 4.03E−01 | 4.87E−03 | 9.88E−01 |
| chr17 | 73483828 | 73483897 | 2.89E−10 | 3.47E−01 | 1.46E−02 | 9.60E−01 |
| chr12 | 124941370 | 124941476 | 1.77E−04 | 3.93E−01 | 3.26E−02 | 9.23E−01 |
| chr22 | 24181054 | 24181071 | 7.17E−07 | 4.84E−01 | 2.29E−02 | 9.55E−01 |
| chr19 | 23185803 | 23185818 | 7.63E−04 | 3.47E−01 | 1.35E−02 | 9.62E−01 |
| chr2 | 73114219 | 73114237 | 2.09E−06 | 4.40E−01 | 3.28E−02 | 9.31E−01 |
| chr16 | 68318872 | 68318933 | 5.46E−18 | 3.84E−01 | 1.58E−02 | 9.60E−01 |
| chr20 | 31215990 | 31216058 | 4.38E−10 | 7.35E−01 | 9.67E−02 | 8.84E−01 |

TABLE 4b-continued

Differentially methylated MHB regions between lung cancer tissues (LCT) and normal plasma.

| Chrom | Start | End | q-value | Cancer.exp | Normal.exp | Weight |
|---|---|---|---|---|---|---|
| chr20 | 21486625 | 21486638 | 6.78E−04 | 3.37E−01 | 1.34E−02 | 9.62E−01 |
| chr6 | 117869097 | 117869149 | 9.80E−07 | 6.53E−01 | 8.17E−02 | 8.89E−01 |
| chr5 | 177210046 | 177210086 | 2.14E−08 | 6.67E−01 | 1.74E−02 | 9.74E−01 |
| chr16 | 56669343 | 56669402 | 4.45E−11 | 3.35E−01 | 1.28E−02 | 9.63E−01 |
| chr9 | 124982160 | 124982166 | 2.60E−11 | 3.65E−01 | 1.32E−02 | 9.65E−01 |
| chr1 | 9910785 | 9910800 | 2.92E−05 | 6.74E−01 | 1.20E−01 | 8.49E−01 |
| chr8 | 22547919 | 22547980 | 1.22E−05 | 5.76E−01 | 1.03E−01 | 8.48E−01 |
| chr21 | 38077472 | 38077482 | 5.22E−11 | 3.18E−01 | 2.52E−03 | 9.92E−01 |
| chr4 | 2801307 | 2801417 | 2.43E−05 | 6.33E−01 | 5.75E−02 | 9.17E−01 |
| chr2 | 10471620 | 10471684 | 1.69E−14 | 3.91E−01 | 2.08E−02 | 9.50E−01 |
| chr1 | 179713235 | 179713255 | 1.10E−08 | 3.63E−01 | 2.14E−02 | 9.44E−01 |
| chr7 | 45068249 | 45068308 | 1.41E−10 | 3.33E−01 | 2.03E−02 | 9.43E−01 |
| chr2 | 177016575 | 177016595 | 7.60E−06 | 3.48E−01 | 1.31E−02 | 9.64E−01 |
| chr1 | 109633869 | 109633984 | 4.97E−04 | 3.33E−01 | 4.50E−03 | 9.87E−01 |
| chr12 | 66276079 | 66276191 | 3.58E−06 | 3.37E−01 | 7.66E−03 | 9.78E−01 |
| chr1 | 246745796 | 246745918 | 5.00E−05 | 7.93E−01 | 2.06E−01 | 7.94E−01 |
| chr21 | 35321105 | 35321239 | 8.41E−04 | 3.33E−01 | 7.56E−03 | 9.78E−01 |
| chr17 | 36666183 | 36666252 | 1.94E−13 | 3.79E−01 | 1.76E−02 | 9.56E−01 |
| chr1 | 161039226 | 161039378 | 3.02E−04 | 4.05E−01 | 5.05E−02 | 8.89E−01 |
| chr11 | 114010500 | 114010527 | 2.54E−07 | 5.11E−01 | 1.20E−01 | 8.10E−01 |
| chr19 | 55765372 | 55765427 | 4.24E−08 | 3.53E−01 | 5.98E−03 | 9.83E−01 |
| chr3 | 5061424 | 5061583 | 3.40E−04 | 5.22E−01 | 8.07E−02 | 8.66E−01 |
| chr7 | 102066465 | 102066505 | 1.89E−13 | 4.22E−01 | 8.68E−03 | 9.80E−01 |
| chr17 | 27912311 | 27912415 | 6.66E−10 | 4.04E−01 | 5.00E−02 | 8.90E−01 |
| chr17 | 80358785 | 80358913 | 3.51E−04 | 5.81E−01 | 9.93E−02 | 8.54E−01 |
| chr1 | 169637173 | 169637186 | 3.30E−04 | 8.33E−01 | 1.18E−01 | 8.76E−01 |
| chr12 | 22094366 | 22094373 | 7.59E−09 | 3.72E−01 | 2.13E−02 | 9.46E−01 |
| chr6 | 10391058 | 10391093 | 1.93E−04 | 4.86E−01 | 3.30E−02 | 9.37E−01 |
| chr19 | 4108798 | 4108818 | 2.16E−04 | 5.96E−01 | 9.90E−02 | 8.58E−01 |
| chr1 | 78512134 | 78512213 | 6.75E−04 | 3.47E−01 | 1.55E−02 | 9.57E−01 |
| chr2 | 105459552 | 105459571 | 1.32E−05 | 3.20E−01 | 6.70E−03 | 9.79E−01 |
| chr13 | 28498669 | 28498711 | 1.21E−06 | 3.35E−01 | 4.67E−03 | 9.86E−01 |
| chr17 | 76886714 | 76886754 | 1.27E−04 | 5.30E−01 | 1.20E−01 | 8.16E−01 |
| chr7 | 155595704 | 155595716 | 1.75E−05 | 4.20E−01 | 7.48E−02 | 8.49E−01 |
| chr4 | 186560264 | 186560311 | 4.04E−06 | 3.95E−01 | 3.89E−02 | 9.10E−01 |
| chr19 | 49338972 | 49339092 | 2.41E−05 | 5.02E−01 | 1.74E−03 | 9.97E−01 |
| chr5 | 54527322 | 54527355 | 4.00E−06 | 3.75E−01 | 3.64E−03 | 9.90E−01 |
| chr17 | 59482595 | 59482615 | 5.63E−09 | 3.23E−01 | 2.20E−02 | 9.36E−01 |
| chr8 | 141849327 | 141849357 | 6.86E−08 | 7.37E−01 | 6.36E−02 | 9.21E−01 |
| chr17 | 1960955 | 1960972 | 7.77E−05 | 4.36E−01 | 8.82E−02 | 8.32E−01 |
| chr6 | 42072312 | 42072322 | 1.24E−06 | 3.51E−01 | 2.83E−03 | 9.92E−01 |
| chr3 | 170137395 | 170137413 | 1.94E−08 | 4.11E−01 | 1.00E−02 | 9.76E−01 |
| chr17 | 7287595 | 7287642 | 2.52E−04 | 4.10E−01 | 2.09E−02 | 9.51E−01 |
| chr14 | 103568958 | 103569000 | 1.27E−05 | 3.86E−01 | 1.09E−02 | 9.73E−01 |
| chr2 | 71116046 | 71116096 | 1.97E−09 | 3.11E−01 | 2.26E−04 | 9.99E−01 |
| chr8 | 142046260 | 142046307 | 6.96E−23 | 4.62E−01 | 1.10E−02 | 9.77E−01 |
| chr12 | 51717855 | 51717865 | 2.91E−13 | 4.38E−01 | 7.87E−03 | 9.82E−01 |
| chr2 | 177030210 | 177030276 | 3.93E−09 | 3.23E−01 | 2.26E−03 | 9.93E−01 |
| chr9 | 138999207 | 138999217 | 5.27E−08 | 3.93E−01 | 2.42E−02 | 9.42E−01 |
| chr6 | 27114547 | 27114655 | 4.10E−06 | 4.50E−01 | 7.12E−02 | 8.63E−01 |
| chr5 | 176858541 | 176858704 | 6.13E−05 | 3.82E−01 | 5.84E−02 | 8.67E−01 |
| chr9 | 92099055 | 92099114 | 4.20E−12 | 3.95E−01 | 8.57E−03 | 9.79E−01 |
| chr2 | 71116232 | 71116257 | 9.65E−10 | 3.18E−01 | 2.33E−03 | 9.93E−01 |
| chr6 | 100895678 | 100895697 | 3.33E−11 | 3.61E−01 | 9.92E−03 | 9.73E−01 |
| chr5 | 132158710 | 132158741 | 1.04E−07 | 4.24E−01 | 5.06E−02 | 8.93E−01 |
| chr17 | 33815330 | 33815432 | 1.51E−06 | 4.03E−01 | 3.10E−03 | 9.92E−01 |
| chr6 | 26123664 | 26123979 | 3.92E−06 | 4.44E−01 | 1.92E−04 | 1.00E+00 |
| chr7 | 24324675 | 24324683 | 5.83E−06 | 4.17E−01 | 2.16E−02 | 9.51E−01 |
| chr1 | 221050180 | 221050273 | 2.00E−07 | 3.21E−01 | 1.73E−02 | 9.49E−01 |
| chr5 | 2748507 | 2748516 | 1.13E−09 | 3.44E−01 | 2.01E−02 | 9.45E−01 |
| chr7 | 3134644 | 3134670 | 1.87E−05 | 5.31E−01 | 6.62E−02 | 8.89E−01 |
| chr16 | 55362634 | 55362703 | 3.10E−14 | 3.68E−01 | 1.34E−02 | 9.65E−01 |
| chr22 | 47070535 | 47070641 | 8.91E−19 | 6.30E−01 | 1.10E−02 | 9.83E−01 |
| chr12 | 96564033 | 96564157 | 7.95E−06 | 6.65E−01 | 1.53E−01 | 8.13E−01 |
| chr19 | 3672066 | 3672080 | 1.72E−14 | 4.49E−01 | 2.99E−02 | 9.38E−01 |
| chr12 | 111845175 | 111845270 | 9.62E−10 | 4.32E−01 | 4.87E−02 | 8.99E−01 |
| chr7 | 100465077 | 100465161 | 6.37E−05 | 3.08E−01 | 7.24E−03 | 9.77E−01 |
| chr3 | 15314976 | 15315000 | 6.16E−04 | 8.61E−01 | 2.36E−01 | 7.85E−01 |
| chr3 | 186490345 | 186490366 | 2.87E−05 | 4.72E−01 | 1.83E−02 | 9.63E−01 |
| chr9 | 127258187 | 127258274 | 1.55E−12 | 4.75E−01 | 2.86E−02 | 9.43E−01 |
| chr7 | 156797306 | 156797346 | 2.76E−05 | 4.79E−01 | 1.19E−02 | 9.76E−01 |
| chr19 | 14089841 | 14089870 | 5.49E−04 | 3.85E−01 | 6.06E−02 | 8.64E−01 |
| chr10 | 134046101 | 134046188 | 5.32E−10 | 3.87E−01 | 2.63E−02 | 9.36E−01 |
| chr4 | 3304775 | 3304980 | 1.63E−05 | 5.79E−01 | 3.69E−02 | 9.40E−01 |
| chr2 | 129037557 | 129037569 | 1.39E−05 | 6.98E−01 | 1.42E−01 | 8.31E−01 |

TABLE 4b-continued

Differentially methylated MHB regions between lung cancer tissues (LCT) and normal plasma.

| Chrom | Start | End | q-value | Cancer.exp | Normal.exp | Weight |
|---|---|---|---|---|---|---|
| chr7 | 1959874 | 1959887 | 3.73E−14 | 3.58E−01 | 1.27E−02 | 9.66E−01 |
| chr6 | 26216260 | 26216306 | 9.79E−04 | 3.33E−01 | 5.18E−04 | 9.98E−01 |
| chr22 | 50986956 | 50986986 | 2.70E−08 | 3.27E−01 | 1.02E−02 | 9.70E−01 |
| chr1 | 112058209 | 112058223 | 1.41E−07 | 4.88E−01 | 5.20E−02 | 9.04E−01 |
| chr22 | 19510978 | 19511029 | 5.11E−09 | 3.18E−01 | 4.50E−04 | 9.99E−01 |
| chr11 | 639650 | 639673 | 8.45E−07 | 3.32E−01 | 1.25E−03 | 9.96E−01 |
| chr2 | 71134585 | 71134608 | 1.74E−09 | 3.81E−01 | 5.34E−03 | 9.86E−01 |
| chr6 | 43612899 | 43612908 | 1.19E−07 | 3.75E−01 | 3.73E−03 | 9.90E−01 |
| chr18 | 13641703 | 13641723 | 5.87E−05 | 4.62E−01 | 8.62E−02 | 8.43E−01 |
| chr16 | 85296061 | 85296086 | 5.83E−07 | 4.38E−01 | 2.30E−02 | 9.50E−01 |
| chr16 | 50308403 | 50308417 | 5.12E−08 | 4.96E−01 | 3.88E−02 | 9.27E−01 |
| chr19 | 2252604 | 2252633 | 1.77E−08 | 3.14E−01 | 1.01E−02 | 9.69E−01 |
| chr2 | 176948107 | 176948120 | 1.78E−09 | 4.05E−01 | 9.65E−03 | 9.77E−01 |
| chr2 | 66673634 | 66673719 | 9.71E−06 | 4.40E−01 | 2.95E−02 | 9.37E−01 |
| chr19 | 16197083 | 16197146 | 1.06E−14 | 4.42E−01 | 2.90E−02 | 9.38E−01 |
| chr7 | 139553288 | 139553487 | 9.78E−06 | 4.81E−01 | 8.12E−02 | 8.56E−01 |
| chr3 | 128210683 | 128210713 | 6.79E−09 | 3.10E−01 | 5.29E−03 | 9.83E−01 |
| chr2 | 162280538 | 162280561 | 9.52E−06 | 3.82E−01 | 2.47E−02 | 9.39E−01 |
| chr15 | 70767238 | 70767293 | 3.17E−05 | 3.38E−01 | 1.22E−02 | 9.65E−01 |
| chr1 | 27160026 | 27160126 | 1.21E−06 | 4.16E−01 | 4.34E−02 | 9.05E−01 |
| chr3 | 184405603 | 184405680 | 5.42E−12 | 3.81E−01 | 1.36E−02 | 9.65E−01 |
| chr19 | 58220236 | 58220403 | 6.79E−09 | 4.90E−01 | 2.92E−03 | 9.94E−01 |
| chr9 | 99639697 | 99639735 | 1.16E−06 | 3.84E−01 | 3.91E−03 | 9.90E−01 |
| chr20 | 57224759 | 57224776 | 2.24E−08 | 5.00E−01 | 2.33E−03 | 9.95E−01 |
| chr8 | 99961491 | 99961523 | 7.30E−05 | 3.99E−01 | 3.46E−02 | 9.20E−01 |
| chr5 | 92908162 | 92908213 | 3.04E−10 | 4.59E−01 | 4.24E−03 | 9.91E−01 |
| chr5 | 157346588 | 157346611 | 1.33E−04 | 5.51E−01 | 9.27E−02 | 8.56E−01 |
| chr19 | 13210490 | 13210503 | 1.73E−17 | 4.84E−01 | 8.76E−03 | 9.82E−01 |
| chr5 | 140871224 | 140871238 | 1.16E−05 | 6.25E−01 | 8.89E−02 | 8.75E−01 |
| chr6 | 20024224 | 20024319 | 1.55E−27 | 5.62E−01 | 1.49E−02 | 9.74E−01 |
| chr4 | 186560344 | 186560355 | 6.39E−05 | 3.58E−01 | 3.22E−02 | 9.17E−01 |
| chr9 | 971674 | 971703 | 3.57E−08 | 4.07E−01 | 1.71E−02 | 9.60E−01 |
| chr11 | 44340718 | 44340785 | 6.21E−05 | 3.13E−01 | 1.19E−02 | 9.63E−01 |
| chr19 | 35505322 | 35505399 | 1.68E−06 | 8.67E−01 | 1.14E−01 | 8.84E−01 |
| chr8 | 145104394 | 145104455 | 5.65E−09 | 6.61E−01 | 2.24E−03 | 9.97E−01 |
| chr16 | 31488816 | 31488849 | 1.16E−04 | 4.59E−01 | 5.63E−02 | 8.91E−01 |
| chr12 | 131464602 | 131464618 | 7.53E−07 | 5.53E−01 | 2.99E−02 | 9.49E−01 |
| chr12 | 47701048 | 47701077 | 3.17E−08 | 4.59E−01 | 5.69E−02 | 8.90E−01 |
| chr12 | 115138274 | 115138280 | 7.75E−06 | 3.78E−01 | 4.41E−02 | 8.95E−01 |
| chr1 | 112058303 | 112058337 | 1.91E−06 | 3.19E−01 | 1.43E−02 | 9.57E−01 |
| chr17 | 7287359 | 7287475 | 4.51E−06 | 3.11E−01 | 7.76E−03 | 9.76E−01 |
| chr7 | 156799150 | 156799168 | 2.16E−07 | 3.62E−01 | 1.38E−02 | 9.63E−01 |
| chr19 | 13215304 | 13215327 | 1.47E−10 | 3.85E−01 | 3.02E−02 | 9.27E−01 |
| chr3 | 196367554 | 196367677 | 6.53E−13 | 5.40E−01 | 1.73E−02 | 9.69E−01 |
| chr11 | 67186574 | 67186616 | 5.15E−05 | 4.45E−01 | 4.76E−02 | 9.03E−01 |
| chr17 | 35299478 | 35299512 | 6.24E−04 | 3.96E−01 | 4.70E−02 | 8.94E−01 |
| chr9 | 87905314 | 87905325 | 2.86E−13 | 5.79E−01 | 4.55E−02 | 9.27E−01 |
| chr13 | 109793272 | 109793287 | 2.83E−11 | 3.16E−01 | 1.25E−02 | 9.62E−01 |
| chr17 | 47816851 | 47816941 | 4.67E−11 | 5.31E−01 | 3.06E−02 | 9.45E−01 |
| chr1 | 170630065 | 170630080 | 1.01E−06 | 4.08E−01 | 3.25E−02 | 9.26E−01 |
| chr5 | 180230752 | 180230844 | 1.58E−04 | 3.25E−01 | 1.79E−02 | 9.48E−01 |
| chr8 | 38627595 | 38627699 | 6.68E−04 | 3.33E−01 | 7.09E−03 | 9.79E−01 |
| chr21 | 38597974 | 38598066 | 1.66E−07 | 6.26E−01 | 4.48E−02 | 9.33E−01 |
| chr20 | 24759511 | 24759539 | 8.74E−12 | 3.26E−01 | 2.22E−02 | 9.36E−01 |
| chr1 | 47899663 | 47899729 | 1.11E−09 | 4.20E−01 | 4.39E−02 | 9.05E−01 |
| chr2 | 73147905 | 73147942 | 7.49E−09 | 4.59E−01 | 1.10E−03 | 9.98E−01 |
| chr6 | 152631073 | 152631120 | 4.98E−04 | 4.33E−01 | 1.08E−01 | 8.00E−01 |
| chr9 | 137663233 | 137663244 | 2.27E−07 | 8.13E−01 | 7.45E−02 | 9.16E−01 |
| chr8 | 898406 | 898416 | 2.44E−05 | 5.51E−01 | 5.73E−02 | 9.06E−01 |
| chr20 | 22557745 | 22557769 | 3.71E−06 | 4.34E−01 | 6.63E−03 | 9.85E−01 |
| chr19 | 3180080 | 3180104 | 6.72E−13 | 3.96E−01 | 1.17E−02 | 9.71E−01 |
| chr19 | 3369701 | 3369714 | 2.94E−04 | 3.86E−01 | 6.95E−02 | 8.47E−01 |
| chr2 | 10471490 | 10471518 | 1.87E−05 | 4.11E−01 | 3.32E−02 | 9.25E−01 |
| chr3 | 67706421 | 67706705 | 3.76E−21 | 4.93E−01 | 1.30E−02 | 9.74E−01 |
| chr11 | 20618888 | 20618918 | 7.45E−04 | 3.75E−01 | 1.64E−02 | 9.58E−01 |
| chr2 | 63282949 | 63282956 | 6.75E−09 | 3.31E−01 | 3.88E−03 | 9.88E−01 |
| chr21 | 38069675 | 38069705 | 3.68E−06 | 3.55E−01 | 2.42E−03 | 9.93E−01 |
| chr2 | 119602826 | 119602837 | 1.92E−06 | 4.21E−01 | 1.97E−02 | 9.55E−01 |
| chr8 | 22398142 | 22398178 | 4.91E−06 | 5.45E−01 | 2.24E−02 | 9.61E−01 |
| chr19 | 46319060 | 46319085 | 1.23E−06 | 6.90E−01 | 8.18E−02 | 8.94E−01 |
| chr7 | 105319545 | 105319563 | 2.55E−05 | 5.84E−01 | 5.15E−02 | 9.19E−01 |
| chr14 | 70756090 | 70756120 | 4.49E−11 | 3.87E−01 | 2.14E−02 | 9.48E−01 |
| chr2 | 242140582 | 242140589 | 1.62E−04 | 5.30E−01 | 1.12E−01 | 8.25E−01 |
| chr15 | 65689324 | 65689361 | 2.30E−04 | 3.75E−01 | 3.57E−02 | 9.13E−01 |
| chr19 | 1132141 | 1132179 | 5.08E−05 | 3.93E−01 | 2.87E−02 | 9.32E−01 |

TABLE 4b-continued

Differentially methylated MHB regions between lung cancer tissues (LCT) and normal plasma.

| Chrom | Start | End | q-value | Cancer.exp | Normal.exp | Weight |
|---|---|---|---|---|---|---|
| chr8 | 101661869 | 101661916 | 5.00E−04 | 3.33E−01 | 4.99E−03 | 9.85E−01 |
| chr8 | 134510944 | 134511107 | 1.72E−08 | 4.17E−01 | 9.85E−03 | 9.77E−01 |
| chr9 | 136710340 | 136710362 | 7.64E−17 | 4.27E−01 | 1.48E−02 | 9.66E−01 |
| chr20 | 62199474 | 62199549 | 5.19E−05 | 4.27E−01 | 4.94E−02 | 8.96E−01 |
| chr15 | 78632860 | 78633002 | 4.41E−04 | 3.33E−01 | 7.41E−03 | 9.78E−01 |
| chr12 | 121530481 | 121530644 | 9.49E−08 | 6.00E−01 | 9.17E−02 | 8.67E−01 |
| chr10 | 13701335 | 13701356 | 5.10E−10 | 4.18E−01 | 4.02E−02 | 9.12E−01 |
| chr8 | 61764675 | 61764770 | 9.93E−05 | 7.12E−01 | 1.62E−01 | 8.15E−01 |
| chr3 | 195488911 | 195488924 | 5.58E−05 | 3.17E−01 | 1.23E−02 | 9.63E−01 |
| chr1 | 200842879 | 200842912 | 6.99E−05 | 5.09E−01 | 3.64E−02 | 9.33E−01 |
| chr3 | 24536601 | 24536664 | 3.17E−05 | 3.25E−01 | 7.85E−03 | 9.76E−01 |
| chr10 | 21789267 | 21789303 | 1.68E−06 | 4.11E−01 | 4.30E−03 | 9.90E−01 |
| chr8 | 66864145 | 66864243 | 1.03E−16 | 5.13E−01 | 1.40E−02 | 9.73E−01 |
| chr7 | 45067930 | 45067978 | 2.72E−16 | 8.50E−01 | 2.75E−02 | 9.69E−01 |
| chr5 | 37834828 | 37834844 | 4.04E−08 | 3.28E−01 | 1.46E−02 | 9.57E−01 |
| chr6 | 166582771 | 166582783 | 4.20E−04 | 3.22E−01 | 1.44E−02 | 9.57E−01 |
| chr15 | 76635175 | 76635200 | 2.75E−09 | 3.15E−01 | 2.22E−03 | 9.93E−01 |
| chr19 | 57182975 | 57183010 | 4.12E−07 | 4.54E−01 | 7.38E−03 | 9.84E−01 |
| chr8 | 84051808 | 84052120 | 1.59E−04 | 3.55E−01 | 4.31E−02 | 8.92E−01 |
| chr4 | 85418694 | 85418729 | 1.11E−08 | 3.45E−01 | 5.22E−03 | 9.85E−01 |
| chr12 | 125039318 | 125039343 | 9.92E−04 | 3.91E−01 | 5.70E−02 | 8.73E−01 |
| chr2 | 66673956 | 66673991 | 2.04E−04 | 5.39E−01 | 9.85E−02 | 8.45E−01 |
| chr6 | 151004402 | 151004610 | 9.19E−13 | 4.51E−01 | 3.29E−02 | 9.32E−01 |
| chr1 | 6054866 | 6054949 | 1.28E−05 | 4.51E−01 | 4.24E−02 | 9.14E−01 |
| chr17 | 46691788 | 46691802 | 2.77E−08 | 5.83E−01 | 2.92E−04 | 9.99E−01 |
| chr11 | 65408444 | 65408551 | 4.29E−11 | 5.41E−01 | 2.10E−02 | 9.63E−01 |
| chr12 | 115103886 | 115103900 | 1.27E−23 | 3.69E−01 | 1.83E−03 | 9.95E−01 |
| chr11 | 130271850 | 130271875 | 2.00E−04 | 5.73E−01 | 8.38E−02 | 8.72E−01 |
| chr8 | 22409072 | 22409160 | 2.06E−04 | 5.56E−01 | 4.93E−02 | 9.18E−01 |
| chr5 | 72715504 | 72715573 | 1.58E−08 | 4.21E−01 | 1.48E−02 | 9.66E−01 |
| chr18 | 46307700 | 46307753 | 5.34E−06 | 3.83E−01 | 6.43E−02 | 8.56E−01 |
| chr17 | 40441433 | 40441470 | 3.71E−13 | 4.62E−01 | 9.83E−03 | 9.79E−01 |
| chr13 | 26625651 | 26625662 | 7.65E−04 | 3.33E−01 | 6.37E−03 | 9.81E−01 |
| chr1 | 157164679 | 157164693 | 2.77E−06 | 4.02E−01 | 3.69E−02 | 9.16E−01 |
| chr11 | 15134983 | 15135110 | 8.60E−04 | 4.93E−01 | 6.85E−02 | 8.78E−01 |
| chr20 | 44037518 | 44037624 | 6.73E−16 | 6.65E−01 | 5.82E−02 | 9.20E−01 |
| chr12 | 49627611 | 49627624 | 3.73E−04 | 7.93E−01 | 2.23E−01 | 7.80E−01 |
| chr4 | 8263785 | 8263806 | 6.39E−04 | 4.65E−01 | 1.04E−01 | 8.17E−01 |
| chr9 | 126776168 | 126776183 | 2.84E−08 | 4.29E−01 | 7.07E−03 | 9.84E−01 |
| chr16 | 85644561 | 85644674 | 8.30E−04 | 3.33E−01 | 8.82E−04 | 9.97E−01 |
| chr10 | 22542557 | 22542582 | 3.45E−06 | 5.81E−01 | 4.71E−02 | 9.25E−01 |
| chr6 | 106434088 | 106434131 | 1.94E−13 | 3.33E−01 | 9.45E−04 | 9.97E−01 |
| chr13 | 112707953 | 112708006 | 6.09E−06 | 3.18E−01 | 7.61E−03 | 9.77E−01 |
| chr12 | 49689395 | 49689400 | 5.07E−13 | 4.45E−01 | 2.60E−02 | 9.45E−01 |
| chr19 | 18760938 | 18760989 | 5.44E−05 | 4.69E−01 | 1.06E−01 | 8.15E−01 |
| chr12 | 123518638 | 123518773 | 3.09E−08 | 5.40E−01 | 2.29E−02 | 9.59E−01 |
| chr17 | 14203010 | 14203043 | 4.56E−04 | 3.33E−01 | 6.05E−03 | 9.82E−01 |
| chr16 | 86321477 | 86321575 | 1.67E−06 | 4.58E−01 | 3.66E−02 | 9.26E−01 |
| chr21 | 38081090 | 38081187 | 3.33E−15 | 7.28E−01 | 8.76E−04 | 9.99E−01 |
| chr17 | 1960261 | 1960274 | 3.34E−09 | 5.56E−01 | 1.35E−02 | 9.76E−01 |
| chr6 | 20024500 | 20024569 | 4.22E−05 | 6.27E−01 | 8.49E−02 | 8.81E−01 |
| chr19 | 38705029 | 38705203 | 2.18E−04 | 4.26E−01 | 4.58E−02 | 9.03E−01 |
| chr14 | 73712457 | 73712489 | 5.67E−09 | 4.72E−01 | 1.85E−02 | 9.62E−01 |
| chr3 | 186685648 | 186685718 | 5.86E−06 | 5.25E−01 | 6.56E−02 | 8.89E−01 |
| chr9 | 98111682 | 98111739 | 4.95E−07 | 3.32E−01 | 6.94E−04 | 9.98E−01 |
| chr6 | 43192429 | 43192519 | 5.70E−07 | 7.64E−01 | 3.74E−02 | 9.53E−01 |
| chr2 | 45029881 | 45029891 | 2.09E−07 | 3.64E−01 | 1.09E−02 | 9.71E−01 |
| chr7 | 105319436 | 105319486 | 3.03E−08 | 3.21E−01 | 1.55E−02 | 9.54E−01 |
| chr17 | 56565349 | 56565374 | 2.46E−04 | 4.73E−01 | 7.89E−02 | 8.57E−01 |
| chr13 | 21050140 | 21050156 | 1.78E−08 | 4.15E−01 | 1.94E−02 | 9.55E−01 |
| chr10 | 11704590 | 11704643 | 2.22E−06 | 4.40E−01 | 6.40E−02 | 8.73E−01 |
| chr8 | 143813256 | 143813294 | 5.40E−05 | 3.74E−01 | 1.92E−02 | 9.51E−01 |
| chr12 | 52627050 | 52627068 | 1.16E−05 | 5.33E−01 | 3.87E−02 | 9.32E−01 |
| chr6 | 27655609 | 27656143 | 1.40E−04 | 4.64E−01 | 3.74E−02 | 9.25E−01 |
| chr7 | 129781353 | 129781457 | 5.91E−11 | 3.51E−01 | 5.57E−03 | 9.84E−01 |
| chr16 | 85344383 | 85344563 | 8.47E−06 | 3.90E−01 | 5.91E−02 | 8.69E−01 |
| chr1 | 36788051 | 36788066 | 3.37E−04 | 6.67E−01 | 1.78E−01 | 7.89E−01 |
| chr10 | 126300538 | 126300694 | 4.40E−09 | 6.00E−01 | 4.38E−02 | 9.32E−01 |
| chr2 | 242785210 | 242785261 | 2.72E−07 | 5.37E−01 | 1.92E−03 | 9.96E−01 |
| chr7 | 42267805 | 42267822 | 7.40E−07 | 3.55E−01 | 2.20E−03 | 9.94E−01 |
| chr5 | 122422290 | 122422309 | 6.93E−09 | 4.33E−01 | 3.23E−02 | 9.31E−01 |
| chr12 | 52115509 | 52115548 | 7.49E−09 | 3.44E−01 | 1.67E−02 | 9.54E−01 |
| chr10 | 131757046 | 131757057 | 6.65E−06 | 3.37E−01 | 8.49E−03 | 9.75E−01 |
| chr8 | 57026239 | 57026410 | 1.93E−08 | 3.28E−01 | 4.56E−03 | 9.86E−01 |
| chr22 | 20078423 | 20078511 | 6.16E−06 | 6.86E−01 | 1.44E−01 | 8.27E−01 |

TABLE 4b-continued

Differentially methylated MHB regions between lung cancer tissues (LCT) and normal plasma.

| Chrom | Start | End | q-value | Cancer.exp | Normal.exp | Weight |
|---|---|---|---|---|---|---|
| chr2 | 220313255 | 220313272 | 4.03E−08 | 3.68E−01 | 3.21E−02 | 9.20E−01 |
| chr11 | 67205095 | 67205113 | 3.79E−07 | 7.63E−01 | 8.17E−02 | 9.03E−01 |
| chr14 | 37136001 | 37136019 | 9.85E−06 | 4.30E−01 | 2.22E−02 | 9.51E−01 |
| chr16 | 29675880 | 29675899 | 4.12E−06 | 4.79E−01 | 4.11E−02 | 9.21E−01 |
| chr9 | 14346053 | 14346085 | 4.08E−17 | 5.81E−01 | 2.77E−02 | 9.55E−01 |
| chr16 | 66621433 | 66621441 | 2.35E−09 | 6.75E−01 | 5.34E−02 | 9.27E−01 |
| chr3 | 128210809 | 128210826 | 6.33E−04 | 4.86E−01 | 4.03E−02 | 9.23E−01 |
| chr8 | 55371721 | 55371728 | 4.25E−07 | 3.40E−01 | 1.02E−02 | 9.71E−01 |
| chr10 | 22624363 | 22624510 | 1.05E−07 | 3.33E−01 | 2.06E−04 | 9.99E−01 |
| chr22 | 20785437 | 20785462 | 1.26E−08 | 3.66E−01 | 1.84E−04 | 9.99E−01 |
| chr5 | 42952051 | 42952113 | 2.23E−05 | 4.92E−01 | 3.72E−02 | 9.30E−01 |
| chr9 | 1045691 | 1045747 | 2.51E−04 | 4.08E−01 | 3.90E−02 | 9.13E−01 |
| chr5 | 177379756 | 177379834 | 2.91E−04 | 1.00E+00 | 2.08E−01 | 8.28E−01 |
| chr1 | 225655594 | 225655619 | 4.66E−05 | 4.43E−01 | 2.76E−02 | 9.41E−01 |
| chr3 | 184504253 | 184504484 | 6.14E−10 | 5.79E−01 | 3.15E−02 | 9.48E−01 |
| chr22 | 19711226 | 19711257 | 3.96E−10 | 7.14E−01 | 4.03E−03 | 9.94E−01 |
| chr12 | 110236002 | 110236058 | 8.63E−04 | 4.97E−01 | 3.84E−02 | 9.28E−01 |
| chr10 | 106401268 | 106401303 | 4.47E−04 | 3.77E−01 | 3.02E−02 | 9.26E−01 |
| chr18 | 19756867 | 19756897 | 2.80E−07 | 3.80E−01 | 3.11E−02 | 9.24E−01 |
| chr22 | 30662059 | 30662077 | 6.90E−07 | 4.11E−01 | 3.86E−02 | 9.14E−01 |
| chr10 | 105344492 | 105344526 | 2.12E−07 | 3.88E−01 | 5.35E−03 | 9.86E−01 |
| chr20 | 46044275 | 46044343 | 2.36E−05 | 4.75E−01 | 4.31E−02 | 9.17E−01 |
| chr16 | 88767062 | 88767096 | 1.34E−09 | 4.25E−01 | 9.07E−04 | 9.98E−01 |
| chr14 | 60952393 | 60952405 | 6.09E−06 | 4.61E−01 | 7.13E−03 | 9.85E−01 |
| chr2 | 8715562 | 8715637 | 5.45E−06 | 5.34E−01 | 4.17E−02 | 9.28E−01 |
| chr7 | 2757237 | 2757317 | 1.64E−04 | 3.73E−01 | 6.19E−02 | 8.58E−01 |
| chr8 | 145900685 | 145900715 | 8.83E−08 | 5.91E−01 | 6.76E−02 | 8.97E−01 |
| chr3 | 128765137 | 128765158 | 1.05E−04 | 4.28E−01 | 5.16E−02 | 8.92E−01 |
| chr6 | 137244466 | 137244484 | 7.76E−08 | 3.36E−01 | 1.89E−03 | 9.94E−01 |
| chr6 | 170581242 | 170581310 | 2.46E−10 | 5.39E−01 | 2.58E−02 | 9.54E−01 |
| chr4 | 103790673 | 103790911 | 2.67E−07 | 6.67E−01 | 7.22E−05 | 1.00E+00 |
| chr4 | 37585982 | 37585993 | 9.95E−14 | 5.31E−01 | 6.66E−02 | 8.88E−01 |
| chr12 | 2030316 | 2030331 | 1.86E−14 | 4.37E−01 | 1.73E−02 | 9.62E−01 |
| chr22 | 39147922 | 39148082 | 4.71E−06 | 3.96E−01 | 1.43E−02 | 9.65E−01 |
| chr19 | 18770323 | 18770328 | 3.19E−04 | 4.00E−01 | 5.61E−02 | 8.77E−01 |
| chr16 | 56672432 | 56672464 | 2.32E−04 | 4.80E−01 | 2.86E−02 | 9.44E−01 |
| chr5 | 37834847 | 37834913 | 7.29E−05 | 4.37E−01 | 2.96E−02 | 9.37E−01 |
| chr6 | 27832225 | 27832236 | 2.55E−04 | 3.67E−01 | 2.26E−02 | 9.42E−01 |
| chr5 | 72677925 | 72677938 | 2.97E−09 | 3.99E−01 | 2.66E−02 | 9.38E−01 |
| chr5 | 134386305 | 134386316 | 3.59E−06 | 3.38E−01 | 2.43E−03 | 9.93E−01 |
| chr3 | 138664166 | 138664281 | 5.46E−05 | 5.81E−01 | 2.87E−02 | 9.53E−01 |
| chr6 | 1393814 | 1393833 | 7.38E−10 | 4.27E−01 | 1.51E−02 | 9.66E−01 |
| chr5 | 92908827 | 92908853 | 4.44E−05 | 6.67E−01 | 3.43E−02 | 9.51E−01 |
| chr19 | 4374698 | 4374799 | 6.90E−07 | 5.17E−01 | 9.54E−02 | 8.44E−01 |
| chr22 | 37881408 | 37881495 | 4.03E−13 | 4.79E−01 | 1.83E−02 | 9.63E−01 |
| chr12 | 7284161 | 7284199 | 2.20E−04 | 5.37E−01 | 3.59E−02 | 9.37E−01 |
| chr20 | 56194053 | 56194195 | 7.05E−07 | 3.39E−01 | 2.48E−02 | 9.32E−01 |
| chr11 | 47416527 | 47416633 | 2.70E−07 | 5.00E−01 | 4.61E−02 | 9.16E−01 |
| chr16 | 11327169 | 11327181 | 1.05E−04 | 5.04E−01 | 5.02E−02 | 9.09E−01 |
| chr2 | 162280416 | 162280438 | 9.67E−04 | 3.59E−01 | 2.67E−02 | 9.31E−01 |
| chr17 | 36718317 | 36718336 | 5.27E−07 | 3.49E−01 | 1.43E−02 | 9.61E−01 |
| chr14 | 102555012 | 102555047 | 2.08E−17 | 6.89E−01 | 1.60E−02 | 9.77E−01 |
| chr19 | 16482409 | 16482500 | 6.18E−07 | 3.27E−01 | 1.56E−02 | 9.54E−01 |
| chr5 | 72678105 | 72678117 | 1.78E−08 | 4.18E−01 | 2.73E−02 | 9.39E−01 |
| chr2 | 118593925 | 118593956 | 1.39E−04 | 3.60E−01 | 1.81E−02 | 9.52E−01 |
| chr19 | 36247848 | 36247862 | 2.78E−12 | 4.57E−01 | 1.49E−02 | 9.68E−01 |
| chr21 | 45577764 | 45577826 | 8.01E−07 | 6.26E−01 | 3.40E−02 | 9.49E−01 |
| chr18 | 77199431 | 77199443 | 2.12E−09 | 4.78E−01 | 4.53E−02 | 9.13E−01 |
| chr7 | 632944 | 632992 | 5.74E−04 | 5.05E−01 | 9.13E−02 | 8.47E−01 |
| chr6 | 170581003 | 170581096 | 4.18E−11 | 3.19E−01 | 1.64E−02 | 9.51E−01 |
| chr1 | 1564676 | 1564690 | 6.52E−05 | 6.73E−01 | 1.11E−01 | 8.59E−01 |
| chr19 | 3179929 | 3179985 | 9.94E−18 | 4.80E−01 | 2.15E−02 | 9.57E−01 |
| chr8 | 687582 | 687636 | 7.09E−06 | 4.90E−01 | 1.22E−03 | 9.98E−01 |
| chr3 | 47122364 | 47122371 | 1.86E−04 | 1.00E+00 | 3.51E−01 | 7.40E−01 |
| chr9 | 96715493 | 96715509 | 1.50E−08 | 3.83E−01 | 5.39E−03 | 9.86E−01 |
| chr1 | 221050478 | 221050491 | 9.83E−04 | 4.24E−01 | 6.61E−02 | 8.65E−01 |
| chr2 | 219738428 | 219738541 | 2.68E−10 | 3.04E−01 | 5.43E−04 | 9.98E−01 |
| chr2 | 73928331 | 73928354 | 2.38E−06 | 5.81E−01 | 5.85E−02 | 9.09E−01 |
| chr16 | 85095505 | 85095535 | 2.38E−04 | 8.33E−01 | 1.39E−01 | 8.57E−01 |
| chr2 | 47206751 | 47206855 | 2.92E−08 | 7.65E−01 | 9.86E−02 | 8.86E−01 |
| chr3 | 186490394 | 186490603 | 2.13E−05 | 4.22E−01 | 1.49E−02 | 9.66E−01 |
| chr20 | 21492917 | 21492931 | 1.71E−05 | 3.40E−01 | 2.56E−02 | 9.30E−01 |
| chr5 | 45696095 | 45696108 | 2.15E−09 | 3.50E−01 | 8.05E−03 | 9.78E−01 |
| chr21 | 44819374 | 44819432 | 5.77E−05 | 5.13E−01 | 4.71E−02 | 9.16E−01 |
| chr1 | 200842812 | 200842842 | 4.08E−09 | 4.93E−01 | 3.95E−02 | 9.26E−01 |

TABLE 4b-continued

Differentially methylated MHB regions between lung cancer tissues (LCT) and normal plasma.

| Chrom | Start | End | q-value | Cancer.exp | Normal.exp | Weight |
|---|---|---|---|---|---|---|
| chr2 | 220313472 | 220313492 | 1.71E−14 | 3.99E−01 | 2.99E−03 | 9.93E−01 |
| chr9 | 134128181 | 134128299 | 2.18E−09 | 6.25E−01 | 1.31E−02 | 9.79E−01 |
| chr9 | 96713741 | 96713787 | 2.78E−05 | 3.96E−01 | 1.28E−02 | 9.69E−01 |
| chr17 | 75231575 | 75231615 | 3.46E−06 | 3.95E−01 | 1.28E−02 | 9.69E−01 |
| chr17 | 73839499 | 73839523 | 3.40E−10 | 6.60E−01 | 8.65E−03 | 9.87E−01 |
| chr10 | 118900000 | 118900044 | 2.78E−07 | 3.85E−01 | 8.75E−03 | 9.78E−01 |
| chr17 | 3814755 | 3814785 | 8.76E−07 | 3.79E−01 | 2.69E−02 | 9.34E−01 |
| chr18 | 11948030 | 11948038 | 8.74E−12 | 5.24E−01 | 3.45E−02 | 9.38E−01 |
| chr20 | 62200085 | 62200109 | 1.57E−05 | 6.19E−01 | 1.07E−01 | 8.52E−01 |
| chr4 | 102711896 | 102711974 | 3.50E−06 | 4.00E−01 | 3.42E−02 | 9.21E−01 |
| chr19 | 38886138 | 38886154 | 9.69E−11 | 6.95E−01 | 5.02E−02 | 9.33E−01 |
| chr4 | 81189711 | 81189729 | 5.42E−10 | 3.67E−01 | 1.25E−02 | 9.67E−01 |
| chr6 | 1620159 | 1620204 | 1.80E−11 | 3.09E−01 | 3.46E−03 | 9.89E−01 |
| chr14 | 74981388 | 74981406 | 4.39E−07 | 4.44E−01 | 1.46E−02 | 9.68E−01 |
| chr9 | 5841793 | 5841956 | 8.50E−06 | 5.20E−01 | 6.28E−02 | 8.92E−01 |
| chr7 | 27197885 | 27197933 | 7.44E−06 | 5.00E−01 | 3.43E−02 | 9.36E−01 |
| chr6 | 166970726 | 166970758 | 3.17E−04 | 3.63E−01 | 6.28E−02 | 8.53E−01 |
| chr6 | 163670668 | 163670704 | 1.04E−08 | 4.62E−01 | 3.55E−02 | 9.29E−01 |
| chr13 | 79182034 | 79182044 | 1.84E−08 | 3.68E−01 | 1.59E−02 | 9.59E−01 |
| chr6 | 20024352 | 20024422 | 2.85E−11 | 4.82E−01 | 2.60E−02 | 9.49E−01 |
| chr15 | 99993103 | 99993143 | 4.02E−05 | 4.33E−01 | 8.52E−02 | 8.36E−01 |
| chr3 | 148336056 | 148336126 | 4.03E−04 | 4.44E−01 | 4.12E−02 | 9.15E−01 |
| chr3 | 38081466 | 38081537 | 6.00E−07 | 7.88E−01 | 3.53E−02 | 9.57E−01 |
| chr7 | 156796586 | 156796676 | 3.68E−06 | 4.53E−01 | 1.55E−03 | 9.97E−01 |
| chr16 | 56313147 | 56313258 | 8.53E−05 | 4.20E−01 | 8.26E−02 | 8.36E−01 |
| chr1 | 155265254 | 155265284 | 8.52E−05 | 3.47E−01 | 3.08E−02 | 9.19E−01 |
| chr9 | 69197259 | 69197281 | 1.39E−04 | 4.56E−01 | 1.14E−01 | 8.00E−01 |
| chr7 | 3134380 | 3134520 | 4.96E−05 | 6.92E−01 | 1.25E−01 | 8.47E−01 |
| chr16 | 86613029 | 86613062 | 1.75E−05 | 3.55E−01 | 8.16E−03 | 9.78E−01 |
| chr22 | 19711923 | 19711938 | 3.15E−05 | 4.44E−01 | 2.46E−02 | 9.48E−01 |
| chr16 | 54324380 | 54324392 | 7.32E−06 | 3.70E−01 | 9.13E−03 | 9.76E−01 |
| chr20 | 43945282 | 43945292 | 2.51E−06 | 3.42E−01 | 3.14E−02 | 9.16E−01 |
| chr11 | 123355219 | 123355301 | 3.66E−07 | 4.78E−01 | 6.22E−02 | 8.85E−01 |
| chr7 | 149487306 | 149487319 | 1.16E−04 | 6.15E−01 | 4.45E−02 | 9.32E−01 |
| chr7 | 27209526 | 27209582 | 2.14E−08 | 3.02E−01 | 6.59E−04 | 9.98E−01 |
| chr6 | 19692010 | 19692112 | 1.87E−05 | 3.58E−01 | 2.68E−02 | 9.30E−01 |
| chr2 | 43020374 | 43020394 | 1.67E−07 | 4.38E−01 | 6.83E−03 | 9.85E−01 |
| chr3 | 157824208 | 157824217 | 3.09E−06 | 3.25E−01 | 2.11E−03 | 9.94E−01 |
| chr19 | 23254232 | 23254336 | 2.70E−07 | 4.44E−01 | 3.97E−02 | 9.18E−01 |
| chr2 | 69064579 | 69064611 | 1.60E−04 | 4.61E−01 | 4.45E−02 | 9.12E−01 |
| chr20 | 62199644 | 62199673 | 8.34E−19 | 5.12E−01 | 1.60E−02 | 9.70E−01 |
| chr6 | 20320098 | 20320141 | 2.19E−05 | 5.24E−01 | 9.09E−02 | 8.52E−01 |
| chr8 | 121021099 | 121021235 | 6.37E−10 | 6.44E−01 | 2.89E−02 | 9.57E−01 |
| chr8 | 57069774 | 57069786 | 8.00E−10 | 3.24E−01 | 5.67E−03 | 9.83E−01 |
| chr21 | 46902922 | 46902964 | 5.56E−04 | 6.01E−01 | 1.36E−01 | 8.16E−01 |
| chr17 | 36666562 | 36666605 | 5.63E−09 | 4.16E−01 | 5.53E−03 | 9.87E−01 |
| chr19 | 3688173 | 3688181 | 3.58E−06 | 5.02E−01 | 7.75E−02 | 8.66E−01 |
| chr7 | 139876374 | 139876418 | 2.37E−04 | 5.00E−01 | 4.02E−02 | 9.26E−01 |
| chr9 | 87905154 | 87905186 | 4.51E−04 | 5.16E−01 | 4.44E−02 | 9.21E−01 |
| chr8 | 10588937 | 10588948 | 9.19E−13 | 6.06E−01 | 1.99E−03 | 9.97E−01 |
| chr6 | 100901494 | 100901618 | 1.48E−05 | 4.66E−01 | 7.50E−02 | 8.61E−01 |
| chr11 | 1332088 | 1332114 | 4.20E−04 | 6.27E−01 | 1.76E−01 | 7.81E−01 |
| chr10 | 6094775 | 6094827 | 6.74E−10 | 4.20E−01 | 4.55E−02 | 9.02E−01 |
| chr22 | 50319330 | 50319373 | 5.31E−11 | 5.65E−01 | 3.88E−02 | 9.36E−01 |
| chr8 | 8654900 | 8654936 | 1.41E−07 | 4.79E−01 | 4.60E−02 | 9.12E−01 |
| chr3 | 194118678 | 194118738 | 1.32E−05 | 3.26E−01 | 2.16E−03 | 9.93E−01 |
| chr22 | 40796311 | 40796475 | 4.96E−13 | 6.13E−01 | 1.07E−02 | 9.83E−01 |
| chr1 | 221049959 | 221050007 | 8.05E−04 | 3.52E−01 | 4.38E−02 | 8.89E−01 |
| chr11 | 63637374 | 63637410 | 8.65E−10 | 3.30E−01 | 1.54E−02 | 9.55E−01 |
| chr9 | 36458494 | 36458734 | 2.10E−11 | 4.02E−01 | 2.69E−02 | 9.37E−01 |
| chr8 | 142276277 | 142276297 | 1.64E−09 | 5.06E−01 | 4.18E−02 | 9.24E−01 |
| chr7 | 1552786 | 1552837 | 2.77E−06 | 5.42E−01 | 4.44E−02 | 9.24E−01 |
| chr3 | 133661417 | 133661556 | 1.52E−13 | 3.89E−01 | 2.48E−02 | 9.40E−01 |
| chr15 | 64244503 | 64244684 | 6.72E−13 | 6.85E−01 | 7.20E−02 | 9.05E−01 |
| chr4 | 184828385 | 184828403 | 6.43E−06 | 3.74E−01 | 5.40E−02 | 8.74E−01 |
| chr8 | 98290100 | 98290333 | 4.63E−04 | 3.59E−01 | 4.52E−03 | 9.88E−01 |
| chr14 | 38080503 | 38080552 | 1.33E−09 | 3.71E−01 | 2.16E−02 | 9.45E−01 |
| chr13 | 31480961 | 31480979 | 5.67E−04 | 3.61E−01 | 5.41E−02 | 8.69E−01 |
| chr11 | 67171584 | 67171666 | 3.87E−08 | 3.65E−01 | 1.59E−02 | 9.58E−01 |
| chr12 | 22094594 | 22094657 | 3.92E−08 | 3.77E−01 | 1.52E−02 | 9.61E−01 |
| chr11 | 65408370 | 65408410 | 2.33E−11 | 7.04E−01 | 5.45E−02 | 9.28E−01 |
| chr18 | 13641584 | 13641601 | 2.56E−04 | 3.68E−01 | 6.46E−02 | 8.51E−01 |
| chr19 | 4916881 | 4917023 | 1.31E−09 | 4.65E−01 | 2.71E−02 | 9.45E−01 |
| chr1 | 210391015 | 210391076 | 2.04E−04 | 8.33E−01 | 2.28E−01 | 7.85E−01 |
| chr14 | 38080557 | 38080579 | 1.56E−04 | 4.78E−01 | 8.62E−02 | 8.47E−01 |

TABLE 4b-continued

Differentially methylated MHB regions between lung cancer tissues (LCT) and normal plasma.

| Chrom | Start | End | q-value | Cancer.exp | Normal.exp | Weight |
|---|---|---|---|---|---|---|
| chr17 | 46619163 | 46619183 | 1.23E−21 | 4.90E−01 | 1.36E−02 | 9.73E−01 |
| chr12 | 52652454 | 52652489 | 9.69E−11 | 3.65E−01 | 4.24E−03 | 9.89E−01 |
| chr2 | 171786280 | 171786350 | 1.69E−06 | 5.00E−01 | 1.06E−02 | 9.79E−01 |
| chr2 | 66667886 | 66667913 | 2.02E−09 | 3.92E−01 | 2.72E−02 | 9.35E−01 |
| chr3 | 197840391 | 197840554 | 1.17E−07 | 4.83E−01 | 1.61E−02 | 9.68E−01 |
| chr17 | 62774587 | 62774620 | 1.06E−05 | 3.95E−01 | 6.01E−02 | 8.68E−01 |
| chr11 | 2847667 | 2847695 | 6.03E−04 | 4.29E−01 | 3.50E−02 | 9.25E−01 |
| chr2 | 19561301 | 19561322 | 3.77E−05 | 4.72E−01 | 3.90E−02 | 9.24E−01 |
| chr5 | 132161708 | 132161721 | 2.11E−18 | 3.78E−01 | 2.62E−02 | 9.35E−01 |
| chr3 | 127469356 | 127469468 | 6.90E−04 | 4.17E−01 | 7.37E−02 | 8.50E−01 |
| chr4 | 24801800 | 24801810 | 4.87E−05 | 3.89E−01 | 3.08E−02 | 9.27E−01 |
| chr14 | 73181172 | 73181203 | 1.91E−09 | 5.13E−01 | 3.07E−02 | 9.44E−01 |
| chr6 | 20024006 | 20024141 | 1.45E−09 | 6.50E−01 | 5.05E−02 | 9.28E−01 |
| chr3 | 170137456 | 170137470 | 1.86E−09 | 3.67E−01 | 5.69E−03 | 9.85E−01 |
| chr9 | 96715356 | 96715374 | 7.45E−06 | 3.39E−01 | 2.65E−02 | 9.27E−01 |
| chr9 | 139090266 | 139090459 | 2.60E−04 | 3.38E−01 | 1.05E−03 | 9.97E−01 |
| chr22 | 44391923 | 44391940 | 1.10E−04 | 4.22E−01 | 7.15E−02 | 8.55E−01 |
| chr1 | 145562732 | 145562809 | 8.46E−09 | 3.95E−01 | 1.05E−02 | 9.74E−01 |
| chr19 | 6753492 | 6753523 | 1.12E−08 | 4.54E−01 | 3.22E−02 | 9.34E−01 |
| chr4 | 8202378 | 8202403 | 3.87E−04 | 4.70E−01 | 8.39E−02 | 8.49E−01 |
| chr5 | 115298830 | 115298848 | 2.94E−12 | 5.62E−01 | 1.42E−03 | 9.97E−01 |
| chr2 | 105459597 | 105459623 | 1.08E−04 | 3.24E−01 | 6.49E−03 | 9.80E−01 |
| chr9 | 139716146 | 139716160 | 9.16E−08 | 6.29E−01 | 1.08E−01 | 8.54E−01 |
| chr6 | 42335118 | 42335231 | 4.31E−06 | 3.39E−01 | 3.88E−02 | 8.97E−01 |
| chr3 | 122296676 | 122296709 | 8.84E−06 | 3.69E−01 | 1.35E−02 | 9.65E−01 |
| chr2 | 131797613 | 131797636 | 8.87E−10 | 3.60E−01 | 2.87E−02 | 9.26E−01 |
| chr10 | 94822392 | 94822422 | 6.90E−10 | 3.57E−01 | 1.20E−02 | 9.68E−01 |
| chr13 | 50701694 | 50701724 | 2.33E−11 | 3.64E−01 | 6.83E−03 | 9.82E−01 |
| chr13 | 100630745 | 100630775 | 4.05E−05 | 3.67E−01 | 7.75E−03 | 9.79E−01 |
| chr10 | 11212536 | 11212603 | 5.61E−07 | 3.63E−01 | 2.76E−02 | 9.29E−01 |
| chr9 | 129377680 | 129377714 | 2.85E−10 | 3.07E−01 | 5.94E−04 | 9.98E−01 |
| chr15 | 74658177 | 74658190 | 1.28E−07 | 4.13E−01 | 1.06E−03 | 9.97E−01 |
| chr2 | 25500296 | 25500316 | 4.07E−04 | 4.30E−01 | 5.83E−02 | 8.81E−01 |
| chr10 | 102986952 | 102986973 | 2.98E−04 | 3.75E−01 | 2.61E−02 | 9.35E−01 |
| chr21 | 44819226 | 44819239 | 2.77E−05 | 6.30E−01 | 8.77E−02 | 8.78E−01 |
| chr12 | 115109842 | 115109855 | 4.44E−09 | 3.63E−01 | 1.72E−02 | 9.55E−01 |
| chr22 | 39148239 | 39148256 | 1.93E−05 | 5.06E−01 | 3.62E−02 | 9.33E−01 |
| chr20 | 43726616 | 43726631 | 3.72E−04 | 4.38E−01 | 4.98E−02 | 8.98E−01 |
| chr19 | 50058236 | 50058275 | 2.29E−13 | 5.75E−01 | 4.48E−02 | 9.28E−01 |
| chr15 | 96903029 | 96903092 | 2.06E−05 | 6.64E−01 | 5.67E−02 | 9.21E−01 |
| chr4 | 94755870 | 94755918 | 2.12E−08 | 3.41E−01 | 2.31E−02 | 9.37E−01 |
| chr6 | 37551119 | 37551243 | 1.05E−06 | 6.51E−01 | 8.25E−02 | 8.88E−01 |
| chr7 | 36679543 | 36679660 | 2.83E−04 | 4.77E−01 | 9.14E−02 | 8.39E−01 |
| chr11 | 123066909 | 123066942 | 4.87E−04 | 3.11E−01 | 4.72E−03 | 9.85E−01 |
| chr17 | 16570355 | 16570361 | 1.81E−05 | 6.09E−01 | 1.51E−01 | 8.01E−01 |
| chr6 | 166976776 | 166976796 | 1.34E−05 | 5.02E−01 | 8.63E−02 | 8.53E−01 |
| chr4 | 16084937 | 16084953 | 5.58E−06 | 3.80E−01 | 4.31E−02 | 8.98E−01 |
| chr3 | 151936218 | 151936283 | 2.48E−05 | 6.28E−01 | 1.05E−01 | 8.57E−01 |
| chr12 | 114878759 | 114878791 | 1.42E−08 | 3.23E−01 | 1.02E−02 | 9.69E−01 |
| chr2 | 220299635 | 220299643 | 2.68E−08 | 3.31E−01 | 3.76E−03 | 9.89E−01 |
| chr21 | 38076854 | 38076871 | 1.16E−06 | 3.28E−01 | 1.72E−02 | 9.50E−01 |
| chr2 | 157186445 | 157186485 | 1.12E−05 | 5.66E−01 | 1.01E−01 | 8.48E−01 |
| chr11 | 65661646 | 65661754 | 4.06E−04 | 4.26E−01 | 5.66E−02 | 8.83E−01 |
| chr9 | 134128101 | 134128135 | 4.95E−09 | 3.78E−01 | 5.26E−03 | 9.86E−01 |
| chr3 | 129694365 | 129694378 | 1.06E−07 | 3.41E−01 | 1.99E−03 | 9.94E−01 |
| chr2 | 233925180 | 233925317 | 2.36E−13 | 3.65E−01 | 1.38E−02 | 9.63E−01 |
| chr17 | 17415395 | 17415403 | 1.49E−04 | 6.37E−01 | 1.14E−01 | 8.48E−01 |
| chr9 | 1045788 | 1045818 | 8.55E−08 | 3.44E−01 | 1.52E−02 | 9.58E−01 |
| chr4 | 16085139 | 16085180 | 4.96E−05 | 3.04E−01 | 1.03E−03 | 9.97E−01 |
| chr6 | 157970252 | 157970307 | 4.22E−09 | 5.22E−01 | 1.07E−02 | 9.80E−01 |
| chr21 | 38081477 | 38081492 | 6.68E−09 | 3.17E−01 | 8.98E−03 | 9.72E−01 |
| chr19 | 16482519 | 16482633 | 8.91E−19 | 3.02E−01 | 5.29E−04 | 9.98E−01 |
| chr18 | 18823158 | 18823243 | 1.48E−04 | 3.70E−01 | 3.26E−03 | 9.91E−01 |
| chr7 | 158362709 | 158362731 | 2.24E−08 | 3.85E−01 | 1.28E−02 | 9.68E−01 |
| chr1 | 178455974 | 178456004 | 2.91E−04 | 3.38E−01 | 2.46E−02 | 9.32E−01 |
| chr2 | 27301795 | 27301826 | 6.09E−06 | 6.96E−01 | 1.10E−01 | 8.64E−01 |
| chr13 | 79170266 | 79170271 | 5.04E−07 | 3.10E−01 | 2.99E−03 | 9.90E−01 |
| chr10 | 121277212 | 121277385 | 3.51E−04 | 4.03E−01 | 4.23E−02 | 9.05E−01 |
| chr13 | 79170302 | 79170323 | 8.63E−06 | 5.10E−01 | 1.16E−02 | 9.78E−01 |
| chr16 | 68676460 | 68676466 | 1.56E−05 | 3.66E−01 | 2.69E−02 | 9.32E−01 |
| chr17 | 1960297 | 1960323 | 6.24E−04 | 5.38E−01 | 6.90E−02 | 8.86E−01 |
| chr2 | 25384521 | 25384555 | 3.92E−08 | 5.00E−01 | 7.83E−02 | 8.65E−01 |
| chr19 | 3179353 | 3179432 | 1.23E−21 | 7.94E−01 | 2.26E−02 | 9.72E−01 |
| chr2 | 43397997 | 43398041 | 3.50E−04 | 3.91E−01 | 6.99E−02 | 8.49E−01 |
| chr11 | 134202273 | 134202302 | 2.01E−04 | 3.33E−01 | 1.32E−03 | 9.96E−01 |

TABLE 4b-continued

Differentially methylated MHB regions between lung cancer tissues (LCT) and normal plasma.

| Chrom | Start | End | q-value | Cancer.exp | Normal.exp | Weight |
|---|---|---|---|---|---|---|
| chr21 | 44819309 | 44819337 | 2.25E−09 | 4.32E−01 | 5.37E−02 | 8.89E−01 |
| chr19 | 47152996 | 47153006 | 5.84E−05 | 3.87E−01 | 3.17E−02 | 9.24E−01 |
| chr3 | 128211282 | 128211310 | 2.87E−08 | 3.73E−01 | 1.07E−02 | 9.72E−01 |
| chr11 | 63974228 | 63974540 | 5.83E−09 | 3.10E−01 | 9.13E−03 | 9.71E−01 |
| chr5 | 115152519 | 115152539 | 4.81E−06 | 5.17E−01 | 6.13E−04 | 9.99E−01 |
| chr7 | 56242832 | 56242853 | 7.21E−04 | 3.94E−01 | 5.09E−02 | 8.86E−01 |
| chr5 | 172370231 | 172370335 | 1.56E−05 | 5.50E−01 | 9.01E−02 | 8.59E−01 |
| chr4 | 102711857 | 102711879 | 4.93E−07 | 3.23E−01 | 1.62E−02 | 9.52E−01 |
| chr1 | 203032620 | 203032687 | 1.94E−05 | 6.52E−01 | 6.82E−02 | 9.05E−01 |
| chr5 | 176023813 | 176023852 | 3.71E−07 | 6.67E−01 | 2.31E−02 | 9.67E−01 |
| chr4 | 158143143 | 158143233 | 4.15E−04 | 3.33E−01 | 1.51E−03 | 9.95E−01 |
| chr2 | 119611407 | 119611447 | 1.42E−06 | 3.13E−01 | 8.30E−03 | 9.74E−01 |
| chr3 | 192125879 | 192125900 | 2.69E−04 | 4.18E−01 | 2.92E−02 | 9.35E−01 |
| chr18 | 9404557 | 9404633 | 1.79E−09 | 3.57E−01 | 3.34E−02 | 9.15E−01 |
| chr1 | 47899900 | 47899973 | 3.19E−07 | 4.06E−01 | 5.61E−02 | 8.79E−01 |
| chr14 | 105527019 | 105527137 | 8.63E−10 | 3.28E−01 | 1.18E−02 | 9.65E−01 |
| chr3 | 50312991 | 50313021 | 2.27E−21 | 5.56E−01 | 7.01E−03 | 9.88E−01 |
| chr22 | 47070183 | 47070285 | 9.36E−16 | 5.14E−01 | 2.54E−02 | 9.53E−01 |
| chr14 | 27065959 | 27066053 | 6.38E−04 | 4.31E−01 | 5.19E−02 | 8.92E−01 |
| chr7 | 27197712 | 27197726 | 3.37E−05 | 4.24E−01 | 1.53E−02 | 9.65E−01 |
| chr16 | 2317491 | 2317523 | 6.22E−14 | 5.26E−01 | 3.55E−02 | 9.37E−01 |
| chr7 | 557581 | 557595 | 1.30E−10 | 7.50E−01 | 1.08E−02 | 9.86E−01 |
| chr9 | 134148582 | 134148640 | 3.73E−14 | 5.69E−01 | 9.44E−03 | 9.84E−01 |
| chr14 | 38066924 | 38066944 | 9.06E−09 | 3.65E−01 | 1.99E−02 | 9.48E−01 |
| chr4 | 1210659 | 1210715 | 5.63E−18 | 4.84E−01 | 1.36E−02 | 9.73E−01 |
| chr4 | 1210785 | 1210901 | 5.66E−05 | 5.03E−01 | 2.80E−02 | 9.47E−01 |
| chr3 | 181438113 | 181438133 | 2.31E−10 | 9.35E−01 | 7.17E−02 | 9.29E−01 |
| chr2 | 63284055 | 63284066 | 2.24E−05 | 4.13E−01 | 8.01E−03 | 9.81E−01 |
| chr10 | 13390041 | 13390139 | 8.83E−04 | 5.51E−01 | 7.01E−02 | 8.87E−01 |
| chr18 | 11947874 | 11947897 | 9.55E−07 | 4.40E−01 | 2.68E−02 | 9.43E−01 |
| chr9 | 6645173 | 6645184 | 6.65E−04 | 4.67E−01 | 6.59E−02 | 8.76E−01 |
| chr8 | 142414178 | 142414227 | 2.36E−05 | 6.39E−01 | 4.76E−02 | 9.31E−01 |
| chr13 | 28498832 | 28498881 | 5.00E−08 | 3.99E−01 | 7.14E−03 | 9.82E−01 |
| chr11 | 63774985 | 63775047 | 3.55E−05 | 3.14E−01 | 5.80E−03 | 9.82E−01 |
| chr7 | 87228807 | 87228922 | 2.54E−07 | 5.27E−01 | 1.88E−02 | 9.66E−01 |
| chr11 | 128609074 | 128609245 | 9.64E−05 | 3.72E−01 | 3.64E−02 | 9.11E−01 |
| chr22 | 47070690 | 47070785 | 3.33E−04 | 6.89E−01 | 9.78E−02 | 8.76E−01 |
| chr13 | 96294381 | 96294499 | 2.52E−09 | 3.29E−01 | 5.24E−03 | 9.84E−01 |
| chr5 | 179507584 | 179507627 | 1.78E−04 | 5.75E−01 | 8.02E−02 | 8.78E−01 |
| chr8 | 28637012 | 28637063 | 5.18E−07 | 7.88E−01 | 1.63E−01 | 8.28E−01 |
| chr10 | 79380018 | 79380032 | 1.83E−07 | 1.00E+00 | 1.47E−01 | 8.72E−01 |
| chr12 | 51718198 | 51718251 | 2.70E−07 | 7.57E−01 | 1.05E−01 | 8.78E−01 |
| chr7 | 155259609 | 155259665 | 2.94E−08 | 3.81E−01 | 1.55E−03 | 9.96E−01 |
| chr12 | 52652502 | 52652523 | 5.67E−12 | 4.31E−01 | 7.01E−03 | 9.84E−01 |
| chr12 | 125053451 | 125053464 | 4.82E−05 | 3.43E−01 | 5.20E−03 | 9.85E−01 |
| chr2 | 97428602 | 97428718 | 5.20E−07 | 4.57E−01 | 4.71E−02 | 9.07E−01 |
| chr17 | 17295442 | 17295619 | 1.03E−16 | 5.55E−01 | 1.59E−02 | 9.72E−01 |
| chr16 | 28996532 | 28996602 | 2.14E−04 | 3.75E−01 | 3.23E−02 | 9.21E−01 |
| chr16 | 2317602 | 2317631 | 4.83E−06 | 3.77E−01 | 4.62E−02 | 8.91E−01 |
| chr7 | 95402297 | 95402335 | 1.36E−06 | 4.19E−01 | 7.12E−04 | 9.98E−01 |
| chr17 | 15244821 | 15244853 | 1.52E−04 | 3.20E−01 | 1.14E−02 | 9.66E−01 |
| chr3 | 192126077 | 192126114 | 2.45E−08 | 3.16E−01 | 4.81E−03 | 9.85E−01 |
| chr2 | 43398069 | 43398085 | 1.25E−09 | 3.89E−01 | 4.46E−02 | 8.97E−01 |
| chr12 | 124877816 | 124877872 | 7.30E−08 | 1.00E+00 | 1.23E−01 | 8.90E−01 |
| chr1 | 208132616 | 208132726 | 3.42E−08 | 3.04E−01 | 1.18E−03 | 9.96E−01 |
| chr17 | 61512658 | 61512683 | 1.25E−10 | 3.96E−01 | 1.75E−02 | 9.58E−01 |
| chr19 | 42071605 | 42071726 | 7.47E−04 | 3.70E−01 | 3.07E−02 | 9.23E−01 |
| chr10 | 101292552 | 101292646 | 8.64E−05 | 3.61E−01 | 1.65E−03 | 9.95E−01 |
| chr5 | 137795191 | 137795306 | 9.26E−06 | 5.07E−01 | 4.49E−02 | 9.19E−01 |
| chr22 | 50319158 | 50319194 | 5.63E−04 | 6.23E−01 | 1.15E−01 | 8.44E−01 |
| chr12 | 115103722 | 115103767 | 3.73E−17 | 4.94E−01 | 1.94E−02 | 9.62E−01 |
| chr12 | 123131513 | 123131635 | 2.56E−04 | 5.00E−01 | 3.05E−02 | 9.42E−01 |
| chr13 | 114875997 | 114876008 | 1.30E−05 | 3.91E−01 | 4.49E−02 | 8.97E−01 |
| chr17 | 79134237 | 79134248 | 2.42E−06 | 4.99E−01 | 3.71E−02 | 9.31E−01 |
| chr3 | 129295780 | 129295896 | 6.74E−09 | 6.11E−01 | 4.42E−02 | 9.33E−01 |
| chr10 | 102881084 | 102881114 | 2.40E−08 | 3.06E−01 | 5.53E−03 | 9.82E−01 |
| chr15 | 96890743 | 96890812 | 7.95E−14 | 6.41E−01 | 1.92E−02 | 9.71E−01 |
| chr2 | 219847214 | 219847286 | 3.27E−06 | 5.00E−01 | 0.00E+00 | 1.00E+00 |
| chr10 | 6213930 | 6214079 | 5.67E−05 | 5.83E−01 | 5.20E−02 | 9.18E−01 |
| chr11 | 45114836 | 45114845 | 7.51E−11 | 7.75E−01 | 6.09E−02 | 9.27E−01 |
| chr4 | 81952496 | 81952527 | 1.08E−05 | 4.33E−01 | 5.67E−02 | 8.84E−01 |
| chr4 | 159091800 | 159091863 | 1.51E−04 | 4.09E−01 | 6.40E−02 | 8.65E−01 |
| chr19 | 16197202 | 16197336 | 2.39E−04 | 4.71E−01 | 6.04E−02 | 8.86E−01 |
| chr10 | 122708551 | 122708626 | 4.00E−06 | 3.59E−01 | 1.37E−03 | 9.96E−01 |
| chr7 | 633049 | 633101 | 5.38E−07 | 3.63E−01 | 2.77E−02 | 9.29E−01 |

TABLE 4b-continued

Differentially methylated MHB regions between lung cancer tissues (LCT) and normal plasma.

| Chrom | Start | End | q-value | Cancer.exp | Normal.exp | Weight |
|---|---|---|---|---|---|---|
| chr14 | 105531892 | 105532022 | 4.98E−04 | 5.08E−01 | 4.31E−02 | 9.22E−01 |
| chr3 | 50313747 | 50313762 | 1.35E−22 | 5.09E−01 | 9.92E−03 | 9.81E−01 |
| chr6 | 42072513 | 42072527 | 4.31E−04 | 3.39E−01 | 1.58E−03 | 9.95E−01 |
| chr11 | 88242385 | 88242459 | 4.29E−08 | 4.12E−01 | 6.93E−03 | 9.83E−01 |
| chr1 | 32237851 | 32237877 | 3.37E−04 | 3.33E−01 | 9.60E−04 | 9.97E−01 |
| chr15 | 41795065 | 41795089 | 1.38E−06 | 3.63E−01 | 2.37E−02 | 9.39E−01 |
| chr18 | 46298176 | 46298192 | 3.78E−05 | 8.79E−01 | 2.60E−01 | 7.72E−01 |
| chr5 | 1495316 | 1495431 | 2.09E−12 | 6.25E−01 | 4.74E−02 | 9.29E−01 |
| chr3 | 138679355 | 138679366 | 7.38E−07 | 3.57E−01 | 5.73E−03 | 9.84E−01 |
| chr5 | 134880200 | 134880327 | 1.16E−06 | 4.87E−01 | 2.63E−03 | 9.95E−01 |
| chr2 | 66666698 | 66666809 | 2.72E−06 | 6.67E−01 | 1.20E−02 | 9.82E−01 |
| chr6 | 42072328 | 42072373 | 3.87E−10 | 5.14E−01 | 7.48E−03 | 9.86E−01 |
| chr9 | 101822013 | 101822096 | 2.70E−09 | 7.30E−01 | 6.09E−02 | 9.23E−01 |
| chr6 | 19691985 | 19692003 | 3.43E−10 | 3.18E−01 | 5.76E−03 | 9.82E−01 |
| chr5 | 177989059 | 177989077 | 4.41E−10 | 5.37E−01 | 3.12E−02 | 9.45E−01 |
| chr2 | 177014492 | 177014518 | 6.48E−08 | 3.57E−01 | 2.05E−02 | 9.46E−01 |
| chr19 | 55553070 | 55553087 | 3.65E−14 | 4.87E−01 | 3.45E−02 | 9.34E−01 |
| chr17 | 40822427 | 40822434 | 2.19E−05 | 6.55E−01 | 1.03E−01 | 8.64E−01 |
| chr19 | 3178517 | 3178545 | 1.09E−16 | 3.70E−01 | 1.59E−02 | 9.59E−01 |
| chr10 | 124910708 | 124910730 | 9.40E−06 | 3.87E−01 | 3.09E−03 | 9.92E−01 |
| chr13 | 29106180 | 29106363 | 9.39E−07 | 6.50E−01 | 3.71E−02 | 9.46E−01 |
| chr9 | 126135891 | 126135950 | 3.10E−05 | 4.01E−01 | 1.60E−03 | 9.96E−01 |
| chr17 | 56409588 | 56409742 | 2.12E−07 | 6.50E−01 | 5.48E−02 | 9.22E−01 |
| chr6 | 50787949 | 50787984 | 3.26E−05 | 4.40E−01 | 3.52E−02 | 9.26E−01 |
| chr16 | 2286867 | 2286879 | 3.18E−06 | 3.23E−01 | 2.11E−02 | 9.39E−01 |
| chr7 | 129425931 | 129426013 | 2.12E−07 | 4.15E−01 | 3.15E−02 | 9.30E−01 |
| chr16 | 68390251 | 68390361 | 3.65E−19 | 4.71E−01 | 2.22E−02 | 9.55E−01 |
| chr22 | 19710841 | 19710855 | 2.14E−05 | 4.05E−01 | 4.28E−03 | 9.90E−01 |
| chr1 | 1148346 | 1148354 | 1.67E−04 | 4.74E−01 | 5.68E−02 | 8.93E−01 |
| chr16 | 88496790 | 88496819 | 1.25E−05 | 5.00E−01 | 3.41E−02 | 9.36E−01 |
| chr8 | 134094859 | 134094975 | 2.26E−05 | 5.05E−01 | 1.37E−01 | 7.86E−01 |
| chr5 | 138850540 | 138850606 | 5.90E−20 | 4.59E−01 | 1.74E−02 | 9.63E−01 |
| chr12 | 6882964 | 6882984 | 2.49E−07 | 4.76E−01 | 6.43E−02 | 8.81E−01 |
| chr7 | 155246915 | 155246940 | 5.33E−06 | 4.07E−01 | 2.30E−02 | 9.47E−01 |
| chr10 | 12223668 | 12223715 | 2.97E−07 | 4.35E−01 | 7.50E−02 | 8.53E−01 |
| chr22 | 20783780 | 20783802 | 2.62E−09 | 3.73E−01 | 8.99E−03 | 9.76E−01 |

TABLE 5a

The sets of cancer specific markers derived from MARS based features selection on training data sets

| Chrom | Start | End |
|---|---|---|
| chr10 | 103454457 | 103454477 |
| chr10 | 104352036 | 104352196 |
| chr10 | 10847503 | 10847691 |
| chr10 | 27702716 | 27702729 |
| chr10 | 30110010 | 30110051 |
| chr11 | 106698602 | 106698622 |
| chr11 | 121395074 | 121395118 |
| chr11 | 2020027 | 2020065 |
| chr11 | 33929206 | 33929320 |
| chr11 | 36145336 | 36145373 |
| chr11 | 47416330 | 47416377 |
| chr1 | 156087833 | 156087873 |
| chr1 | 16159932 | 16159950 |
| chr11 | 62139527 | 62139609 |
| chr11 | 62370212 | 62370238 |
| chr1 | 201509291 | 201509346 |
| chr1 | 207921424 | 207921528 |
| chr12 | 110033418 | 110033548 |
| chr12 | 25537415 | 25537441 |
| chr1 | 245970850 | 245970891 |
| chr12 | 52438106 | 52438159 |
| chr12 | 52889045 | 52889173 |
| chr12 | 54332947 | 54332963 |
| chr12 | 54473544 | 54473561 |
| chr12 | 6901902 | 6901997 |
| chr12 | 96564033 | 96564157 |
| chr13 | 19918783 | 19918794 |
| chr13 | 20370973 | 20371021 |
| chr13 | 34253491 | 34253585 |
| chr14 | 64130579 | 64130727 |
| chr14 | 91818657 | 91818672 |
| chr14 | 98190804 | 98190884 |
| chr15 | 58734402 | 58734645 |
| chr15 | 86298535 | 86298604 |
| chr16 | 69961433 | 69961449 |
| chr17 | 17295442 | 17295619 |
| chr17 | 21415130 | 21415142 |
| chr17 | 26173343 | 26173438 |
| chr17 | 37211873 | 37211969 |
| chr17 | 64948116 | 64948158 |
| chr17 | 74526150 | 74526161 |
| chr17 | 75143193 | 75143219 |
| chr17 | 76875977 | 76875998 |
| chr18 | 72916692 | 72916705 |
| chr19 | 1169117 | 1169138 |
| chr19 | 16178526 | 16178600 |
| chr1 | 92946665 | 92946768 |
| chr19 | 3403636 | 3403711 |
| chr19 | 3403810 | 3403840 |
| chr19 | 47496561 | 47496586 |
| chr19 | 50931391 | 50931435 |
| chr19 | 52880780 | 52880980 |
| chr19 | 58220626 | 58220669 |
| chr20 | 30816216 | 30816330 |
| chr20 | 34391305 | 34391406 |
| chr20 | 41153703 | 41153752 |

TABLE 5a-continued

The sets of cancer specific markers derived from MARS based features selection on training data sets

| Chrom | Start | End |
|---|---|---|
| chr2 | 101926462 | 101926479 |
| chr2 | 111141088 | 111141148 |
| chr2 | 11884471 | 11884591 |
| chr21 | 35197108 | 35197284 |
| chr2 | 197040996 | 197041007 |
| chr2 | 202945219 | 202945279 |
| chr2 | 232348683 | 232348704 |
| chr2 | 232745254 | 232745369 |
| chr22 | 37942946 | 37942985 |
| chr22 | 38104696 | 38104738 |
| chr22 | 39148367 | 39148393 |
| chr2 | 242195200 | 242195217 |
| chr22 | 42815670 | 42815694 |
| chr22 | 45692585 | 45692725 |
| chr22 | 46022276 | 46022300 |
| chr2 | 25138739 | 25138897 |
| chr2 | 36717718 | 36717897 |
| chr2 | 46219462 | 46219480 |
| chr2 | 48776047 | 48776154 |
| chr2 | 66673054 | 66673077 |
| chr2 | 85637199 | 85637376 |
| chr2 | 99155846 | 99155916 |
| chr3 | 126645737 | 126645771 |
| chr3 | 141098240 | 141098373 |
| chr3 | 18284952 | 18285049 |
| chr3 | 184056458 | 184056470 |
| chr3 | 52250610 | 52250789 |
| chr4 | 1195669 | 1195719 |
| chr4 | 177420126 | 177420335 |
| chr4 | 186808246 | 186808296 |
| chr4 | 6697966 | 6698085 |
| chr4 | 8727069 | 8727091 |
| chr5 | 138730608 | 138730648 |
| chr5 | 139725539 | 139725550 |
| chr5 | 156570589 | 156570747 |
| chr5 | 176831296 | 176831309 |
| chr6 | 107012070 | 107012253 |
| chr6 | 108984666 | 108984700 |
| chr6 | 133523044 | 133523327 |
| chr6 | 149805994 | 149806024 |
| chr6 | 158411773 | 158411853 |
| chr6 | 159128335 | 159128361 |
| chr6 | 163767808 | 163767820 |
| chr6 | 170585982 | 170586062 |
| chr6 | 170589857 | 170589872 |
| chr6 | 21246436 | 21246559 |
| chr6 | 37533092 | 37533142 |
| chr6 | 43192429 | 43192519 |
| chr6 | 43650729 | 43650959 |
| chr6 | 43894465 | 43894595 |
| chr6 | 43939175 | 43939212 |
| chr6 | 71874735 | 71874758 |
| chr7 | 100549051 | 100549245 |
| chr7 | 100875668 | 100875696 |
| chr7 | 101884716 | 101884822 |
| chr7 | 140096553 | 140096723 |
| chr7 | 157071940 | 157071954 |
| chr7 | 17139387 | 17139535 |
| chr7 | 33176934 | 33177005 |
| chr7 | 36320659 | 36320695 |
| chr7 | 39393611 | 39393625 |
| chr7 | 41428132 | 41428227 |
| chr7 | 56183788 | 56183856 |
| chr7 | 601463 | 601503 |
| chr7 | 614586 | 614611 |
| chr7 | 64019659 | 64019780 |
| chr7 | 75018128 | 75018144 |
| chr8 | 125766626 | 125766669 |
| chr8 | 131076680 | 131076724 |
| chr9 | 116327621 | 116327718 |
| chr9 | 130517759 | 130517991 |
| chr9 | 130955063 | 130955167 |
| chr9 | 95964149 | 95964200 |
| chr10 | 81004561 | 81004609 |
| chr1 | 162442502 | 162442619 |
| chr1 | 212415595 | 212415691 |
| chr1 | 235062685 | 235062859 |
| chr15 | 77286562 | 77286576 |
| chr16 | 17499260 | 17499310 |
| chr16 | 78636379 | 78636435 |
| chr17 | 16873955 | 16874009 |
| chr17 | 41669725 | 41669744 |
| chr17 | 45786237 | 45786298 |
| chr1 | 8400056 | 8400143 |
| chr19 | 49839124 | 49839203 |
| chr19 | 7723032 | 7723142 |
| chr20 | 57425892 | 57425937 |
| chr20 | 62200085 | 62200109 |
| chr2 | 174890243 | 174890269 |
| chr2 | 5836838 | 5836852 |
| chr3 | 196347229 | 196347361 |
| chr4 | 68411077 | 68411095 |
| chr6 | 155434075 | 155434119 |
| chr6 | 2999401 | 2999433 |
| chr7 | 50850278 | 50850660 |
| chr14 | 28485394 | 28485506 |
| chr19 | 55766296 | 55766320 |
| chr22 | 46480824 | 46480971 |

TABLE 5b

The sets of tissue specific markers derived from MARS based features selection on training data sets

| Chrom | Start | End |
|---|---|---|
| chr10 | 12526101 | 12526198 |
| chr10 | 134062557 | 134062567 |
| chr10 | 2992831 | 2992986 |
| chr10 | 71250913 | 71251031 |
| chr10 | 894133 | 894176 |
| chr11 | 10529517 | 10529548 |
| chr11 | 10580059 | 10580207 |
| chr11 | 117454728 | 117454907 |
| chr11 | 125840213 | 125840218 |
| chr11 | 126226966 | 126226994 |
| chr11 | 20626148 | 20626166 |
| chr1 | 120906033 | 120906056 |
| chr11 | 2828703 | 2828805 |
| chr1 | 154978354 | 154978371 |
| chr11 | 61467518 | 61467601 |
| chr1 | 164545706 | 164545781 |
| chr11 | 66871960 | 66871973 |
| chr1 | 168687549 | 168687721 |
| chr1 | 172291575 | 172291727 |
| chr11 | 85423851 | 85424008 |
| chr11 | 91958190 | 91958214 |
| chr1 | 19249130 | 19249147 |
| chr11 | 94600637 | 94600757 |
| chr1 | 20821827 | 20821848 |
| chr12 | 121164886 | 121164929 |
| chr12 | 123352751 | 123352815 |
| chr12 | 124905745 | 124905758 |
| chr1 | 219786354 | 219786374 |
| chr12 | 214138 | 214168 |
| chr1 | 24468442 | 24468457 |
| chr1 | 25257913 | 25257952 |
| chr12 | 58131153 | 58131181 |
| chr12 | 63157011 | 63157117 |
| chr12 | 6336078 | 6336124 |
| chr12 | 63828393 | 63828590 |
| chr12 | 65813665 | 65813787 |
| chr12 | 69440660 | 69440851 |
| chr12 | 92793926 | 92794091 |
| chr13 | 24575928 | 24576139 |
| chr13 | 75981727 | 75981971 |
| chr1 | 37941197 | 37941228 |

TABLE 5b-continued

The sets of tissue specific markers derived from MARS based features selection on training data sets

| Chrom | Start | End |
|---|---|---|
| chr1 | 4045074 | 4045329 |
| chr1 | 41898133 | 41898168 |
| chr14 | 24078834 | 24078895 |
| chr14 | 35319476 | 35319527 |
| chr14 | 55170355 | 55170479 |
| chr14 | 62403215 | 62403374 |
| chr14 | 64130579 | 64130727 |
| chr14 | 65708245 | 65708394 |
| chr14 | 73279457 | 73279546 |
| chr14 | 75683126 | 75683335 |
| chr14 | 77089391 | 77089627 |
| chr14 | 78108418 | 78108650 |
| chr15 | 23892535 | 23892608 |
| chr15 | 31850650 | 31850711 |
| chr15 | 61497667 | 61497716 |
| chr15 | 66998995 | 66999028 |
| chr15 | 67179342 | 67179441 |
| chr15 | 67356599 | 67356824 |
| chr15 | 68136062 | 68136196 |
| chr15 | 70488068 | 70488255 |
| chr15 | 76268973 | 76269064 |
| chr15 | 90727362 | 90727449 |
| chr16 | 11749588 | 11749704 |
| chr16 | 12510137 | 12510244 |
| chr16 | 1544949 | 1545020 |
| chr16 | 16244310 | 16244423 |
| chr16 | 67687178 | 67687277 |
| chr16 | 69516112 | 69516139 |
| chr16 | 71560275 | 71560421 |
| chr16 | 75279686 | 75279773 |
| chr16 | 84967640 | 84967652 |
| chr16 | 86965384 | 86965400 |
| chr16 | 88096279 | 88096362 |
| chr17 | 16924593 | 16924617 |
| chr17 | 17473311 | 17473523 |
| chr17 | 25821621 | 25821649 |
| chr17 | 29469666 | 29469741 |
| chr17 | 43483074 | 43483225 |
| chr17 | 43506900 | 43506997 |
| chr17 | 71538984 | 71539080 |
| chr17 | 79456619 | 79456772 |
| chr17 | 950579 | 950597 |
| chr18 | 13447880 | 13447894 |
| chr18 | 14458513 | 14458531 |
| chr18 | 45058265 | 45058273 |
| chr18 | 5489107 | 5489117 |
| chr18 | 74499570 | 74499587 |
| chr18 | 74665755 | 74665892 |
| chr19 | 14673070 | 14673115 |
| chr19 | 18131156 | 18131182 |
| chr19 | 2291605 | 2291625 |
| chr19 | 33879823 | 33879853 |
| chr19 | 35505322 | 35505399 |
| chr19 | 35630532 | 35630541 |
| chr19 | 53088342 | 53088389 |
| chr1 | 9563349 | 9563412 |
| chr19 | 58629652 | 58629666 |
| chr20 | 17731262 | 17731276 |
| chr20 | 32336264 | 32336332 |
| chr20 | 3732686 | 3732700 |
| chr20 | 3732852 | 3732883 |
| chr20 | 47421687 | 47421875 |
| chr20 | 50352688 | 50352798 |
| chr20 | 62200085 | 62200109 |
| chr20 | 62959294 | 62959302 |
| chr20 | 8880040 | 8880231 |
| chr2 | 106048152 | 106048370 |
| chr2 | 109788225 | 109788402 |
| chr2 | 110798982 | 110799019 |
| chr2 | 14375315 | 14375355 |
| chr21 | 44781718 | 44781727 |
| chr2 | 175739843 | 175739898 |
| chr22 | 20237340 | 20237395 |
| chr2 | 231277281 | 231277433 |
| chr22 | 32475876 | 32475936 |
| chr22 | 34095314 | 34095472 |
| chr2 | 236611862 | 236611872 |
| chr22 | 38484978 | 38484992 |
| chr22 | 45887405 | 45887583 |
| chr22 | 46476111 | 46476156 |
| chr22 | 46786620 | 46786697 |
| chr22 | 50343067 | 50343097 |
| chr22 | 50985445 | 50985457 |
| chr2 | 39472294 | 39472340 |
| chr2 | 86248350 | 86248380 |
| chr2 | 97305261 | 97305286 |
| chr3 | 106937697 | 106937906 |
| chr3 | 113160421 | 113160434 |
| chr3 | 122459452 | 122459655 |
| chr3 | 128712749 | 128712769 |
| chr3 | 130098135 | 130098295 |
| chr3 | 170965322 | 170965449 |
| chr3 | 195356987 | 195357011 |
| chr3 | 29320866 | 29320988 |
| chr3 | 38012448 | 38012522 |
| chr3 | 51965036 | 51965246 |
| chr4 | 1244005 | 1244024 |
| chr4 | 129556483 | 129556502 |
| chr4 | 151504097 | 151504165 |
| chr4 | 169561292 | 169561324 |
| chr4 | 185722597 | 185722644 |
| chr4 | 2257619 | 2257679 |
| chr4 | 26755387 | 26755468 |
| chr4 | 965678 | 965736 |
| chr5 | 10624799 | 10624898 |
| chr5 | 164830490 | 164830637 |
| chr5 | 170041185 | 170041290 |
| chr5 | 5140660 | 5140708 |
| chr5 | 95198558 | 95198771 |
| chr6 | 115682789 | 115682877 |
| chr6 | 135642658 | 135642719 |
| chr6 | 139858289 | 139858355 |
| chr6 | 150623168 | 150623365 |
| chr6 | 155434075 | 155434119 |
| chr6 | 169351059 | 169351075 |
| chr6 | 170574715 | 170574763 |
| chr6 | 21246436 | 21246559 |
| chr6 | 24981775 | 24981874 |
| chr6 | 3136197 | 3136313 |
| chr6 | 42213769 | 42213962 |
| chr6 | 47427927 | 47427990 |
| chr7 | 100875668 | 100875696 |
| chr7 | 102963572 | 102963623 |
| chr7 | 151290079 | 151290342 |
| chr7 | 1577891 | 1577924 |
| chr7 | 47419767 | 47419848 |
| chr8 | 126645983 | 126646069 |
| chr8 | 129040440 | 129040473 |
| chr8 | 129103440 | 129103463 |
| chr8 | 141523764 | 141523791 |
| chr8 | 142189542 | 142189581 |
| chr8 | 143408017 | 143408047 |
| chr8 | 144361314 | 144361344 |
| chr8 | 144361364 | 144361393 |
| chr8 | 145654572 | 145654583 |
| chr8 | 27530948 | 27530986 |
| chr8 | 41979371 | 41979431 |
| chr8 | 53070170 | 53070416 |
| chr8 | 8230665 | 8230840 |
| chr9 | 116356861 | 116357046 |
| chr9 | 130517759 | 130517991 |
| chr9 | 130860588 | 130860681 |
| chr9 | 130877668 | 130877724 |
| chr9 | 134455414 | 134455516 |
| chr9 | 136921088 | 136921169 |
| chr9 | 138904160 | 138904187 |
| chr9 | 140188472 | 140188494 |
| chr9 | 6788700 | 6788803 |
| chr9 | 86064195 | 86064250 |
| chr10 | 10840659 | 10840699 |

TABLE 5b-continued

The sets of tissue specific markers derived from MARS based features selection on training data sets

| Chrom | Start | End |
|---|---|---|
| chr10 | 135174002 | 135174025 |
| chr10 | 6254206 | 6254244 |
| chr10 | 75647560 | 75647648 |
| chr10 | 77109265 | 77109419 |
| chr10 | 80919230 | 80919249 |
| chr1 | 151870591 | 151870681 |
| chr1 | 156261302 | 156261327 |
| chr11 | 64740009 | 64740016 |
| chr1 | 205449277 | 205449449 |
| chr12 | 123402308 | 123402427 |
| chr1 | 2164204 | 2164384 |
| chr14 | 106774181 | 106774432 |
| chr14 | 65681455 | 65681535 |
| chr1 | 47039258 | 47039357 |
| chr14 | 91818657 | 91818672 |
| chr15 | 79082104 | 79082154 |
| chr1 | 6515867 | 6515873 |
| chr16 | 78636379 | 78636435 |
| chr17 | 17415395 | 17415403 |
| chr17 | 19429425 | 19429525 |
| chr17 | 8371613 | 8371640 |
| chr1 | 8433676 | 8433790 |
| chr19 | 1169117 | 1169138 |
| chr19 | 13823667 | 13823731 |
| chr19 | 22610862 | 22610883 |
| chr20 | 50073805 | 50073870 |
| chr20 | 57417351 | 57417392 |
| chr20 | 60760760 | 60760972 |
| chr21 | 30612916 | 30613022 |
| chr21 | 34399242 | 34399284 |
| chr21 | 45705693 | 45705715 |
| chr21 | 47581404 | 47581439 |
| chr2 | 158694393 | 158694462 |
| chr2 | 161348608 | 161348781 |
| chr2 | 219124246 | 219124271 |
| chr2 | 219147468 | 219147621 |
| chr3 | 123118882 | 123119159 |
| chr3 | 13828799 | 13828855 |
| chr3 | 48540230 | 48540315 |
| chr4 | 154460014 | 154460117 |
| chr4 | 19929150 | 19929272 |
| chr4 | 54889382 | 54889454 |
| chr5 | 112538998 | 112539022 |
| chr5 | 1725410 | 1725419 |
| chr5 | 17366324 | 17366430 |
| chr5 | 66564412 | 66564447 |
| chr7 | 158890101 | 158890118 |
| chr7 | 79875750 | 79875982 |
| chr8 | 22447199 | 22447304 |
| chr8 | 81279608 | 81279654 |
| chr9 | 102213820 | 102213912 |
| chr9 | 95964655 | 95964697 |
| chr10 | 104840711 | 104840824 |
| chr10 | 3917268 | 3917367 |
| chr11 | 120418670 | 120418806 |
| chr11 | 57199801 | 57200049 |
| chr12 | 126978451 | 126978675 |
| chr1 | 28431421 | 28431512 |
| chr13 | 107869633 | 107869814 |
| chr14 | 34504893 | 34504986 |
| chr16 | 23303806 | 23303916 |
| chr17 | 38708456 | 38708524 |
| chr19 | 1221753 | 1221771 |
| chr19 | 48983562 | 48983583 |
| chr19 | 57412139 | 57412201 |
| chr22 | 20237221 | 20237247 |
| chr22 | 29866375 | 29866425 |
| chr2 | 237581359 | 237581546 |
| chr22 | 38148519 | 38148762 |
| chr3 | 58103818 | 58103844 |
| chr3 | 65940157 | 65940167 |
| chr3 | 88312669 | 88312786 |
| chr4 | 113634382 | 113634491 |
| chr4 | 187071070 | 187071120 |
| chr4 | 2904348 | 2904411 |
| chr4 | 68411077 | 68411095 |
| chr5 | 149994824 | 149994881 |
| chr6 | 57607668 | 57607879 |
| chr8 | 10559717 | 10559846 |
| chr9 | 132658755 | 132658787 |
| chr1 | 2077786 | 2077884 |
| chr13 | 21900491 | 21900523 |
| chr15 | 79342608 | 79342818 |
| chr17 | 46697530 | 46697565 |
| chr18 | 60050875 | 60051139 |
| chr2 | 187482101 | 187482155 |
| chr3 | 194014878 | 194014894 |
| chr9 | 129511230 | 129511375 |
| chr9 | 78871348 | 78871392 |
| chr10 | 121578130 | 121578169 |
| chr10 | 88729962 | 88730008 |
| chr15 | 23115150 | 23115163 |
| chr22 | 37942946 | 37942985 |
| chr3 | 126645737 | 126645771 |
| chr5 | 170041887 | 170042039 |
| chr6 | 31869020 | 31869031 |
| chr11 | 128558360 | 128558418 |
| chr14 | 93565785 | 93565854 |
| chr10 | 30327101 | 30327236 |
| chr10 | 6183283 | 6183437 |
| chr10 | 30110010 | 30110051 |
| chr17 | 45786237 | 45786298 |
| chr3 | 13063400 | 13063494 |
| chr2 | 105990523 | 105990613 |

The disclosures of all references listed herein, including the following references, are incorporated by reference herein in their entireties:

REFERENCES

1. EP Patent No. 2,258,871
2. EP Patent No. 2,643,479
3. U.S. Pat. No. 8,026,067
4. U.S. Pat. No. 8,110,361
5. U.S. Pat. No. 8,288,100
6. U.S. Pat. No. 8,293,470
7. U.S. Pat. No. 8,586,313
8. U.S. Pat. No. 9,096,906
9. WO 2015/116837
10. Accession GSE79279, Gene Expression Omnibus (GEO)
11. The ENCODE Project Consortium. An integrated encyclopedia of DNA elements in the human genome. Nature 489:57-74 (2012).
12. Bernstein et al. The NIH Roadmap Epigenomics Mapping Consortium. Nat Biotechnol 28:1045-1048 (2010).
13. Blattler et al. Global loss of DNA methylation uncovers intronic enhancers in genes showing expression changes. Genome Biol 15:469 (2014).
14. Chen et al. Loss of 5-hydroxymethylcytosine is linked to gene body hypermethylation in kidney cancer. Cell Res 26:103-118 (2016).
15. Diep et al. Library-free methylation sequencing with bisulfite padlock probes. Nat Methods. 9(3):270-272 (2012).
16. Dixon et al. Topological domains in mammalian genomes identified by analysis of chromatin interactions. Nature 485:376-380 (2012).

17. Friedman Multivariate Adaptive Regression Splines. Ann. Of Stat. 19(1): 1-67 (1991).
18. Gong et al. DeconRNASeq: a statistical framework for deconvolution of heterogeneous tissue samples based on mRNA-Seq data. Bioinformatics 29:1083-1085 (2013).
19. Guelen et al. Domain organization of human chromosomes revealed by mapping of nuclear lamina interactions. Nature 453:948-951 (2008).
20. Guo et al. Single-cell methylome landscapes of mouse embryonic stem cells and early embryos analyzed using reduced representation bisulfite sequencing. Genome Res 23:2126-2135 (2013).
21. Hansen et al. Increased methylation variation in epigenetic domains across cancer types. Nat Genet 43:768-775 (2011).
22. Heyn et al. Distinct DNA methylomes of newborns and centenarians. Proc Natl Acad Sci USA 109:10522-10527 (2012).
23. Heyn et al. Epigenomic analysis detects aberrant super-enhancer DNA methylation in human cancer. Genome Biol 17:11 (2016).
24. Houseman et al. DNA methylation arrays as surrogate measures of cell mixture distribution. BMC Bioinformatics 13:86 (2012).
25. Houseman et al. Reference-free deconvolution of DNA methylation data and mediation by cell composition effects. BMC Bioinformatics 17:259 (2016).
26. Irizarry et al. The human colon cancer methylome shows similar hypo- and hypermethylation at conserved tissue-specific CpG island shores. Nat Genet 41:178-186 (2009).
27. Johansson et al. Targeted resequencing of candidate genes using selector probes. Nucleic Acids Res. 39(2): e8 (2011).
28. Johnson et al. Adjusting batch effects in microarray expression data using empirical Bayes methods. Biostatistics 8:118-127 (2007).
29. Jones, P. A. & Martienssen, R. A blueprint for a Human Epigenome Project: the AACR Human Epigenome Workshop. Cancer Res 65:11241-11246 (2005).
30. Komori et al. Application of microdroplet PCR for large-scale targeted bisulfite sequencing. Genome Res. 21(10):1738-1745 (2011).
31. Landan et al. Epigenetic polymorphism and the stochastic formation of differentially methylated regions in normal and cancerous tissues. Nat Genet. 44(11): 1207-1214 (2012).
32. Landau et al. Locally disordered methylation forms the basis of intratumor methylome variation in chronic lymphocytic leukemia. Cancer Cell 26:813-825 (2014).
33. Lehmann-Werman et al. Identification of tissue-specific cell death using methylation patterns of circulating DNA. Proc Natl Acad Sci USA 113, E1826-1834 (2016).
34. Leung et al. Integrative analysis of haplotype-resolved epigenomes across human tissues. Nature 518:350-354 (2015).
35. Lokk et al. DNA methylome profiling of human tissues identifies global and tissue-specific methylation patterns. Genome Biology 15(4):r54 (2014).
36. Meissner et al. Reduced representation bisulfite sequencing for comparative high-resolution DNA methylation analysis. Nucleic Acids Res. 33(18):5868-5877 (2005).
37. Mitsui et al. The homeoprotein Nanog is required for maintenance of pluripotency in mouse epiblast and ES cells. Cell 113:631-642 (2003).
38. Papageorgiou et al. Fetal-specific DNA methylation ratio permits noninvasive prenatal diagnosis of trisomy 21. Nat Med. 17(4):510-513 (2011).
39. Pujadas et al. Regulated noise in the epigenetic landscape of development and disease. Cell 148:1123-1131 (2012).
40. Saito et al. Linkage disequilibrium analysis of allelic heterogeneity in DNA methylation. Epigenetics 10:1093-1098 (2015).
41. Schultz et al. Human body epigenome maps reveal noncanonical DNA methylation variation. Nature 523: 212-216 (2015).
42. Shao et al. Deciphering the heterogeneity in DNA methylation patterns during stem cell differentiation and reprogramming BMC Genomics 15:978 (2014).
43. Shoemaker et al. Allele-specific methylation is prevalent and is contributed by CpG-SNPs in the human genome. Genome Res 20:883-889 (2010).
44. Shu et al. Induction of pluripotency in mouse somatic cells with lineage specifiers. Cell 153:963-975 (2013).
45. Slatkin Linkage disequilibrium—understanding the evolutionary past and mapping the medical future. Nat Rev Genet 9:477-485 (2008).
46. Snyder et al. Cell-free DNA Comprises an In Vivo Nucleosome Footprint that Informs Its Tissues-Of-Origin. Cell 164:57-68 (2016).
47. Sun et al. Plasma DNA tissue mapping by genome-wide methylation sequencing for noninvasive prenatal, cancer, and transplantation assessments. Proc Natl Acad Sci USA 112, E5503-5512 (2015).
48. Takai et al. Comprehensive analysis of CpG islands in human chromosomes 21 and 22. Proc Natl Acad Sci USA 99:3740-3745 (2002).
49. Wen, B., Wu, H., Shinkai, Y., Irizarry, R. A. & Feinberg, A. P. Large histone H3 lysine 9 dimethylated chromatin blocks distinguish differentiated from embryonic stem cells. Nat Genet 41:246-250 (2009).
50. Wigler et al. The somatic replication of DNA methylation. Cell 24:33-40 (1981).
51. Williams et al. TET1 and hydroxymethylcytosine in transcription and DNA methylation fidelity. Nature 473:343-348 (2011).
52. Xie, H. et al. Genome-wide quantitative assessment of variation in DNA methylation patterns. Nucleic Acids Res. 39(10):4099-4108 (2011).
53. Xie, W. et al. Epigenomic analysis of multilineage differentiation of human embryonic stem cells. Cell 153:1134-1148 (2013).
54. Ziller et al. Charting a dynamic DNA methylation landscape of the human genome. Nature 500:477-481 (2013).

What is claimed is:

1. A method for detecting the presence of one or more nucleic acids indicative of a health condition, tissue of origin, germ layer of origin or organ of origin in a mixture of nucleic acids comprising:
performing methylation analysis on a sample comprising a plurality of nucleic acids, wherein performing methylation analysis comprises analyzing at least 15,000 methylation haplotype blocks, each methylation haplotype block comprising a plurality of potential methylation haplotypes indicative of the health condition, tissue of origin, germ layer of origin, or organ of origin, and determining a methylation haplotype load (MHL)

of the methylation haplotype blocks, wherein said MHL comprises the normalized fraction of methylated haplotypes at different lengths;

calculating a group specific index (GSI) using the MHL;

determining based on the GSI and MHL whether said sample includes the presence of one or more nucleic acids indicative of a health condition, tissue of origin, germ layer of origin, organ of origin or any combination thereof by comparing the determined MHL with an MHL of a corresponding nucleic acid derived from a control which does not have the health condition or is not derived from the tissue of origin, germ layer of origin, or organ of origin, wherein said methylation haplotype blocks comprise a plurality of methylation sites for which the methylation status of adjacent methylation sites is coordinated, wherein said methylation haplotype blocks are determined across a whole genome; and detecting the presence of one or more nucleic acids indicative of a health condition, tissue of origin, germ layer of origin or organ of origin.

2. The method of claim 1, wherein said methylation analysis is performed on a sample comprising cell-free DNA.

3. The method of claim 1, wherein the sample is a blood sample and said methylation analysis is performed on cell-free DNA in the blood sample.

4. The method of claim 1, wherein said health condition is a tumor.

5. The method of claim 4, further comprising determining whether said sample includes a plurality of methylation haplotype blocks indicative of the presence of one or more nucleic acids indicative of a normal tissue or normal organ corresponding to the tissue or organ of origin of said tumor.

6. The method of claim 5, further comprising quantifying the level of said methylation haplotype blocks indicative of the presence of a tumor in said sample and quantifying the level of said methylation haplotype blocks indicative of the presence of one or more nucleic acids indicative of a normal tissue or normal organ corresponding to the tissue or organ of origin of said tumor in said sample.

7. The method of claim 1, wherein said health condition is fetal aneuploidy.

8. The method of claim 1, wherein said sample is a blood sample.

9. The method of claim 1, further comprising quantitating the level of said one or more nucleic acids indicative of a health condition, tissue of origin, organ of origin or any combination thereof in said sample.

10. The method of claim 1, wherein said methylation analysis is performed using a technique selected from the group consisting of bisulfite methylation analysis, reduced representation bisulfite sequencing, WGBS, BSPP, microdroplet PCR, selector probe based methods, and MeDiP.

11. The method of claim 1, further comprising determining a unmethylated haplotype load for each methylation haplotype block, wherein said unmethylated haplotype load comprises the normalized fraction of unmethylated haplotypes of different lengths.

12. The method of claim 1, wherein said methylation haplotype blocks have a minimum of 3 CpGs per block.

13. The method of claim 1, further comprising quantifying the level of said methylation haplotype blocks indicative of the presence of one or more nucleic acids indicative of a health condition, tissue of origin, germ layer of origin, organ of origin or any combination thereof in said sample.

14. The method of claim 1, wherein the $r^2$ value of each adjacent methylation site is no less than 0.3 in the methylation haplotype blocks.

15. The method of claim 1, wherein said at least 15,000 methylation haplotype blocks comprises at least 2 methylation haplotype blocks from those provided in any one of Tables 1a, 1b, 4a, and/or 4b, wherein chromosome position numbering is in reference to human genome assembly GRCh37/hg19, and wherein:

Table 1a consists of the following methylation haplotype blocks:

| | | | |
|---|---|---|---|
| chr19:5894163:5894242 | chr13:110918379:110918481 | chr3:69061666:69061765 | chr2:218722958:218723051 |
| chr16:521904:521925 | chr17:2011086:2011131 | chr6:2382649:2382767 | chr9:132476798:132476839 |
| chr2:43295338:43295363 | chr9:7984790:7984898 | chr12:63124047:63124109 | chr19:13108902:13109094 |
| chr2:69345847:69345875 | chr18:20682264:20682338 | chr14:73025645:73025673 | chr6:155398687:155398778 |
| chr2:8360246:8360318 | chr7:104978120:104978212 | chr15:25813912:25814131 | chr10:35256271:35256338 |
| chr2:110103840:110103879 | chr5:166634253:166634335 | chr21:40044046:40044198 | chr4:15429515:15429573 |
| chr10:73767213:73767231 | chr18:56534875:56534925 | chr19:38526875:38526924 | chr8:67405522:67405594 |
| chr21:39450802:39450857 | chr3:187988060:187988137 | chr2:67488351:67488376 | chr16:1533917:1533944 |
| chr8:23201701:23201725 | chr10:121438397:121438569 | chr17:117230:117455 | chr10:63797212:63797266 |
| chr8:96706051:96706130 | chr19:39182926:39182945 | chr4:3703023:3703043 | chr12:125242958:125242996 |
| chr10:17281034:17281085 | chr13:99667976:99668059 | chr18:73882379:73882586 | chr21:33835784:33836018 |
| chr18:9535925:9535962 | chr7:127584205:127584527 | chr16:77465342:77465471 | chr8:134194805:134194894 |
| chr1:196373497:196373569 | chr11:35651590:35651804 | chr14:91750605:91750669 | chr1:53992643:53992661 |
| chr7:73314135:73314205 | chr11:103407665:103407717 | chr11:44028454:44028472 | chr2:72058564:72058590 |
| chr5:168192470:168192555 | chr7:135433499:135433541 | chr2:9377096:9377111 | chr17:47768524:47768612 |
| chr14:83966994:83967047 | chr1:23098725:23098744 | chr20:62166877:62166882 | chr7:70868724:70868738 |
| chr10:14012644:14012740 | chr1:3494166:3494235 | chr15:81384367:81384382 | chr7:1135787:1135880 |
| chr16:4420959:4421041 | chr2:2107292:2107346 | chr12:106246647:106246707 | chr11:69981466:69981483 |
| chr2:8360333:8360384 | chr8:101427557:101427651 | chr2:79807509:79807533 | chr10:44406319:44406371 |
| chr1:2899575:2899616 | chr10:14016066:14016097 | chr7:39793986:39794185 | chr17:62321657:62321769 |
| chr19:41932380:41932387 | chr11:10647667:10647725 | chr17:12553963:12554077 | chr9:16276328:16276511 |
| chr22:232087015:232087102 | chr16:75278952:75279001 | chr3:194961215:194961310 | chr22:26150622:26150652 |
| chr17:738931:738960 | chr9:124089044:124089101 | chr5:176884349:176884370 | chr13:111173782:111173824 |
| chr17:48243247:48243305 | chr17:21185776:21185831 | chr4:24732341:24732420 | chr9:132465990:132466044 |
| chr19:768642:768715 | chr3:11178498:11179102 | chr22:20186181:20186409 | chr9:137601605:137601641 |
| chr2:38460795:38460935 | chr17:57925734:57925805 | chr3:123397265:123397302 | chr12:2378226:2378306 |
| chr6:57123002:57123073 | chr20:16106391:16106635 | chr1:212734867:212734967 | chr6:3868913:3868926 |
| chr1:243368706:243368788 | chr2:241536131:241536192 | chr9:89882438:89882551 | chr13:110956979:110957046 |
| chr16:73086441:73086558 | chr5:76714624:76714674 | chr6:150848318:150848392 | chr3:10619418:10619432 |
| chr6:1702288:1702366 | chr8:42521965:42522125 | chr15:61073748:61073811 | chr16:73454450:73454527 |
| chr10:45676961:45677042 | chr11:36003464:36003500 | chr3:126720886:126721050 | chr15:63305915:63305934 |
| chr12:20700689:20700721 | chr20:23251275:23251362 | chr21:25397216:25397285 | chr7:4734422:4734577 |

-continued

| | | | |
|---|---|---|---|
| chr12:20254130:20254176 | chr1:168578476:168578512 | chr2:8143877:8143939 | chr10:121006525:121006629 |
| chr2:3496911:3496968 | chr20:50186917:50186939 | chr16:82336047:82336082 | chr8:144951293:144951312 |
| chr11:69235366:69235449 | chr3:49556866:49557077 | chr9:738321:738429 | chr2:223917511:223917627 |
| chr17:38605979:38605996 | chr10:131324082:131324193 | chr5:77843468:77843772 | chr16:72892847:72892919 |
| chr8:10001048:10001097 | chr1:205780103:205780116 | chr5:65165845:65165992 | chr15:88525288:88525358 |
| chr11:44994687:44994725 | chr1:42003200:42003221 | chr16:1037729:1037750 | chr18:76680559:76680740 |
| chr2:110861027:110861197 | chr11:2730324:2730441 | chr9:36566815:36566887 | chr16:79785861:79785893 |
| chr3:64702129:64702144 | chr5:156988163:156988221 | chr1:2900163:2900177 | chr13:113257964:113257997 |
| chr7:73389579:73389642 | chr19:6744481:6744634 | chr2:218805147:218805216 | chr15:62851448:62851528 |
| chr10:14013737:14013765 | chr20:56472461:56472592 | chr16:88976144:88976169 | chr17:47651712:47651734 |
| chr3:4458679:4458863 | chr6:1624318:1624399 | chr1:32220068:32220206 | chr15:94039831:94039861 |
| chr7:703821:703897 | chr12:106517592:106517795 | chr20:49983123:49983144 | chr12:108788025:108788069 |
| chr13:101302763:101302821 | chr6:44195262:44195347 | chr7:30947529:30947552 | chr11:63823800:63823819 |
| chr19:16178379:16178427 | chr19:39182585:39182856 | chr2:97572877:97572933 | chr5:106553748:106553861 |
| chr7:73389660:73389669 | chr10:126104092:126104263 | chr5:111890374:111890446 | chr12:43135893:43136097 |
| chr2:43492333:43492418 | chr2:66528170:66528286 | chr10:50346525:50346634 | chr1:20081194:20081286 |
| chr14:93113577:93113776 | chr22:19971912:19971946 | chr10:100151545:100151593 | chr3:73560709:73560905 |
| chr22:40845219:40845265 | chr21:47403346:47403426 | chr20:48651408:48651539 | chr3:123836445:123836611 |
| chr1:115610338:115610366 | chr16:87234734:87234896 | chr5:138440901:138441072 | chr1:7603622:7603720 |
| chr6:131312703:131312868 | chr2:38611005:38611050 | chr13:40090279:40090501 | chr6:158464875:158465035 |
| chr16:81520175:81520330 | chr2:12677328:12677416 | chr8:22516977:22517039 | chr6:131958144:131958342 |
| chr20:19474573:19474667 | chr9:101749596:101749621 | chr12:125332183:125332213 | chr15:67458370:67458404 |
| chr1:244217148:244217329 | chr9:92300357:92300439 | chr8:30658350:30658451 | chr8:22458256:22458378 |
| chr16:49822649:49822660 | chr14:76461726:76461806 | chr10:10312643:10312797 | chr7:94025305:94025363 |
| chr1:202170004:202170040 | chr6:159624504:159624617 | chr22:44484948:44485088 | chr6:16431273:16431391 |
| chr3:8562700:8562922 | chr4:57909186:57909239 | chr2:138721303:138721318 | chr20:56523021:56523183 |
| chr8:1187134:1187185 | chr21:40195044:40195130 | chr16:16161126:16161243 | chr5:50219227:50219301 |
| chr15:54832956:54833002 | chr1:2899714:2899770 | chr2:97019386:97019473 | chr21:47403142:47403214 |
| chr11:3168353:3168372 | chr1:9384754:9384813 | chr20:24568297:24568342 | chr9:136801147:136801304 |
| chr12:116864174:116864293 | chr16:57149767:57149848 | chr19:15360079:15360255 | chr18:9535708:9535902 |
| chr17:31128334:31128406 | chr2:1656844:1657056 | chr22:44756580:44756669 | chr18:9809125:9809169 |
| chr2:72162546:72162581 | chr15:68777293:68777315 | chr22:29726826:29726886 | chr4:101089727: 101089795 |
| chr9:137553753:137553885 | chr6:164506404:164506437 | chr18:59685565:59685607 | chr20:60833682:60833702 |
| chr16:66957496:66957553 | chr2:218722879:218722891 | chr5:168477679:168477730 | chr2:66528452:66528529 |
| chr6:169568133:169568353 | chr9:137536001:137536060 | chr20:50187002:50187064 | chr20:22707146:22707191 |
| chr8:133466185:133466297 | chr13:106439974:106440058 | chr18:46468631:46468643 | chr10:44776635:44776761 |
| chr12:124774360:124774380 | chr3:123132072:123132158 | chr4:159011359:159011402 | chr3:52869083:52869162 |
| chr19:3466975:3467064 | chr14:105802382:105802561 | chr1:3446617:3446738 | chr9:129155547:129155601 |
| chr9:98829531:98829605 | chr18:7607703:7607797 | chr5:170910865:170910881 | chr1:11039869:11039880 |
| chr17:37279963:37280015 | chr1:2868537:2868570 | chr5:101493402:101493492 | chr16:4461722:4462177 |
| chr9:116247804:116247934 | chr19:1081908:1081925 | chr19:18782908:18783006 | chr5:173252378:173252404 |
| chr1:87223214:87223344 | chr7:3322236:3322467 | chr4:169765695:169765832 | chr9:124042382: 124042419 |
| chr11:66138099:66138125 | chr19:10464320:10464378 | chr11:12182856:12182943 | chr18:56719116:56719243 |
| chr5:142533336:142533503 | chr12:125106220:125106281 | chr3:98988954:98989145 | chr11:11425708:11425747 |
| chr7:4065672:4065679 | chr2:242668092:242668152 | chr2:28958706:28958762 | chr12:52056721:52056773 |
| chr17:73831565:73831633 | chr15:26050364:26050411 | chr17:77069737:77069835 | chr1:39847630:39847734 |
| chr16:1373394:1373461 | chr16:1033828:1033849 | chr15:101912443:101912517 | chr12:114327643:114328085 |
| chr17:40477211:40477303 | chr15:92573244:92573323 | chr12:124959289:124959504 | chr16:27256643:27256871 |
| chr6:165341974:165342035 | chr16:29206978:29207023 | chr11:122205905:122205985 | chr13:111830279:111830297 |
| chr18:58648459:58648474 | chr10:50155412:50155484 | chr21:39903689:39903803 | chr19:49804030:49804037 |
| chr10:3928761:3928829 | chr4:7844482:7844728 | chr11:75269142:75269197 | chr11:133371858:133371874 |
| chr15:67457875:67458134 | chr5:177799176:177799310 | chr20:10616067:10616113 | chr10:105378386:105378436 |
| chr19:10233053:10233111 | chr7:71563965:71564049 | chr9:73539583:73539651 | chr2:21500056:21500255 |
| chr18:74171483:74171505 | chr18:77398817:77398865 | chr6:12349194:12349298 | chr14:69419282:69419313 |
| chr22:49409034:49409082 | chr19:15361966:15362035 | chr7:6291930:6292069 | chr10:80913511:80913602 |
| chr21:40047317:40047326 | chr1:156111362:156111379 | chr2:1820169:1820243 | chr14:69203310:69203388 |
| chr1:34451152:34451164 | chr4:141207852:141207918 | chr8:25936821:25936871 | chr16:29706207:29706243 |
| chr9:136357330:136357347 | chr19:7580118:7580276 | chr11:10715379:10715450 | chr8:49493773:49493912 |
| chr9:116681630:116681838 | chr19:7580118:7580276 | chr20:35169310:35169362 | chr10:13869492:13869597 |
| chr7:5011476:5011523 | chr2:238322615:238322681 | chr9:127047244:127047277 | chr17:75724157:75724205 |
| chr16:87261081:87261131 | chr11:4726406:4726437 | chr12:124925719:124925860 | chr7:105134734:105134810 |
| chr5:172194371:172194450 | chr16:1243486:1243578 | chr6:157039978:157040028 | chr10:78157310:78157339 |
| chr19:32450501:32450625 | chr9:101749649:101749733 | chr12:54071769:54071918 | chr21:13155773:213155827 |
| chr15:79052333:79052347 | chr11:12184939:12185109 | chr16:4001865:4002028 | chr17:12453277:12453304 |
| chr12:116756805:116756874 | chr15:26047396:26047413 | chr18:13542218:13542473 | chr11:130358485:130358572 |
| chr12:2457684:2457778 | chr1:204401170:204401223 | chr3:71213389:71213444 | chr19:3536938:3536990 |
| chr13:36273480:36273646 | chr1:59986591:59986617 | chr14:91622695:91622754 | chr5:172030681:172030738 |
| chr2:145764662:145764766 | chr17:43188128:43188157 | chr5:78115075:78115276 | chr1:24429671:24429689 |
| chr4:140968580:140968766 | chr13:24658482:24658536 | chr22:30737410:30737507 | chr3:128098054:128098098 |
| chr7:158890050:158890132 | chr5:168168241:168168258 | chr2:109788226:109788430 | chr15:67142607:67142698 |
| chr3:71586325:71586633 | chr1:55909399:55909463 | chr9:112841248:112841282 | chr17:64536087:64536138 |
| chr3:125819901:125819917 | chr2:20001248:20001401 | chr5:95194167:95194199 | chr4:77598869:77598976 |
| chr18:76551153:76551172 | chr22:45907965:45908083 | chr11:113513456:113513577 | chr10:10965036:10965181 |
| chr22:29347978:29348075 | chr8:21499839:21499917 | chr7:41956427:41956582 | chr2:223917632:223917948 |
| chr2:11526450:11526505 | chr1:203526848:203526898 | chr10:31108592:31108620 | chr1:61742965:61742988 |
| chr14:91765021:91765059 | chr6:148561802:148561903 | chr17:1038460:1038480 | chr14:21292114:21292310 |
| chr2:10544929:10545012 | chr2:21676719:21676761 | chr5:158230112:158230269 | chr2:46564649:46564698 |
| chr2:217839781:217839805 | chr21:30502731:30502809 | chr11:75444671:75444686 | chr9:109561663:109561825 |
| chr12:109179149:109179194 | chr15:71621595:71621649 | chr12:116746846:116746866 | chr10:112395034:112395067 |

-continued

| | | | |
|---|---|---|---|
| chr1:226128702:226128727 | chr2:25078720:25078801 | chr9:97535350:97535437 | chr7:73406549:73406623 |
| chr7:40240562:40240640 | chr6:2355526:2355693 | chr18:10376914:10377078 | chr19:13176607:13176640 |
| chr14:75039798:75039894 | chr19:1136134:1136202 | chr11:1552850:1552939 | chr4:166300973:166301086 |
| chr20:56721581:56721650 | chr5:141628696:141628776 | chr18:76551122:76551148 | chr16:1559867:1559928 |
| chr8:6652013:6652077 | chr14:89895046:89895080 | chr9:133734023:133734044 | chr1:85069466:85069782 |
| chr16:1146322:1146337 | chr19:38485266:38485425 | chr5:136955094:136955232 | chr2:8360458:8360518 |
| chr10:15667379:15667446 | chr21:47530618:47530659 | chr19:42528857:42528937 | chr12:116008258:116008282 |
| chr15:89560186:89560238 | chr17:42875273:42875297 | chr17:77993088:77993180 | chr9:132456706:132456716 |
| chr7:4707844:4707866 | chr20:50368876:50368956 | chr9:139466646:139466672 | chr10:10686890:10686959 |
| chr5:151082200:151082218 | chr7:75595987:75596208 | chr4:129440877:129440895 | chr11:46740703:46740795 |
| chr3:193715471:193715560 | chr9:80384641:80384724 | chr2:135118406:135118696 | chr22:37419994:37420244 |
| chr9:93727370:93727392 | chr10:123901799:123901843 | chr8:1895423:1895593 | chr21:47512230:47512291 |
| chr8:97596962:97597040 | chr13:98082290:98082421 | chr16:89900228:89900472 | chr15:36169148:36169197 |
| chr21:44484510:44485019 | chr19:33674931:33674961 | chr18:53533397:53533431 | chr14:65147082:65147109 |
| chr3:8279761:8279814 | chr16:88195380:88195408 | chr8:1734515:1734583 | chr16:49867825:49867955 |
| chr16:73454353:73454372 | chr17:8584339:8584382 | chr5:146783414:146783535 | chr9:116464320:116464372 |
| chr3:14279072:14279273 | chr11:44729854:44729898 | chr10:129721163:129721395 | chr13:110953976:110954153 |
| chr6:168498836:168498871 | chr3:129899423:129899521 | chr16:88976512:88976545 | chr15:68236450:68236481 |
| chr4:173973114:173973166 | chr17:14047988:14048092 | chr17:12534611:12534640 | chr3:122803555:122803707 |
| chr9:74431770:74431840 | chr22:32976039:32976101 | chr8:124552202:124552287 | chr11:130735452:130735480 |
| chr12:2396495:2396507 | chr11:57184788:57184846 | chr5:4983978:4984033 | chr10:73608417:73608452 |
| chr13:109807772:109807837 | chr22:43079771:43079865 | chr4:2589345:2589376 | chr13:111013814:111013913 |
| chr8:145019179:145019191 | chr1:32045230:32045272 | chr14:23318984:23319004 | chr12:92290560:92290631 |
| chr12:109182282:109182346 | chr2:242775475:242775494 | chr3:125978692:125978717 | chr16:14503474:14503520 |
| chr8:23201626:23201644 | chr1:2899810:2899955 | chr7:137668500:137668714 | chr6:49615634:49615896 |
| chr11:171326156:171326309 | chr22:47331564:47331659 | chr22:29707734:29707797 | chr8:130499865:130499936 |
| chr3:30538064:30538174 | chr6:37046101:37046167 | chr6:168811258:168811288 | chr10:50216911:50217019 |
| chr16:68857417:68857469 | chr4:36056662:36056826 | chr11:48086058:48086140 | chr12:20503508:20503619 |
| chr17:60774267:60774330 | chr2:1566219:1566233 | chr1:32581854:32581901 | chr4:7287509:7287534 |
| chr7:64020677:64020788 | chr1:3282806:3282902 | chr10:63817039:63817096 | chr13:80511183:80511242 |
| chr1:201748589:201748658 | chr12:2749661:2749704 | chr10:104679620:104679676 | chr11:12166090:12166124 |
| chr19:18783073:18783151 | chr7:73119356:73119403 | chr18:72913820:72914028 | chr22:38864829:38864862 |
| chr13:112161714:112161827 | chr21:44690743:44690783 | chr18:8381961:8382108 | chr2:39945836:39946013 |
| chr11:117070485:117070493 | chr14:104018772:104018857 | chr2:43691730:43692049 | chr3:71289392:71289422 |
| chr7:128468433:128468462 | chr2:46893583:46893684 | chr16:66260739:66260808 | chr2:1689778:1689882 |
| chr1:2188830:2188947 | chr14:95875180:95875232 | chr1:3314034:3314111 | chr15:67471125:67471172 |
| chr8:143695065:143695081 | chr15:27573948:27574019 | chr15:47732211:47732323 | chr13:114076193:114076253 |
| chr6:71790637:71790777 | chr20:46756899:46756983 | chr16:88228206:88228258 | chr3:4468948:4469000 |
| chr7:73406729:73406811 | chr2:46531085:46531128 | chr7:75595743:75595885 | chr13:114064797:114064981 |
| chr12:1584268:1584438 | chr1:217203173:217203214 | chr17:77302405:77302421 | chr16:75520052:75520187 |
| chr2:1657462:1657556 | chr18:71442341:71442413 | chr7:133043576:133043707 | chr2:86452555:86452614 |
| chr2:121677850:121677924 | chr7:151133987:151134097 | chr22:31640170:31640177 | chr16:65105398:65105960 |
| chr13:99104177:99104223 | chr2:144282564:144282630 | chr1:25916675:25916756 | chr2:235286886:235286969 |
| chr6:23004460:23004497 | chr3:188624320:188624396 | chr1:184120477:184120508 | chr10:3182566:3182624 |
| chr7:33758956:33759144 | chr16:4092830:4092845 | chr5:131713182:131713241 | chr4:129445552:129445744 |
| chr11:65326863:65326909 | chr9:136437866:136437930 | chr14:75019600:75019659 | chr16:49750543:49750635 |
| chr3:134052418:134052557 | chr1:61657038:61657079 | chr16:16088347:16088528 | chr1:150164178:150164217 |
| chr16:1038028:1038079 | chr8:142420181:142420195 | chr7:1135687:1135764 | chr13:114797349:114797404 |
| chr7:25810506:25810570 | chr8:69783211:69783254 | chr2:98775072:98775082 | chr13:47824530:47824646 |
| chr11:19601607:19601696 | chr17:37833823:37833848 | chr10:5605504:5605530 | chr11:115882971:115883000 |
| chr3:54746711:54746836 | chr11:12255071:12255245 | chr14:92391559:92391578 | chr18:77398729:77398773 |
| chr3:126720805:126720813 | chr15:100708207:100708246 | chr8:20834957:20835064 | chr1:3282991:3283074 |
| chr21:46453929:46453954 | chr16:51868437:51868468 | chr7:73414105:73414180 | chr17:15416725:15416832 |
| chr4:6773182:6773272 | chr17:46343933:46343974 | chr3:114225764:114225848 | chr11:12098290:12098375 |
| chr15:149980976:149980972 | chr10:30110183:30110189 | chr19:47242589:47242709 | chr9:13444156:13444186 |
| chr5:77830138:77830190 | chr8:70846160:70846211 | chr3:41042033:41042081 | chr7:135430783:135430838 |
| chr10:80339365:80339515 | chr7:132037792:132037854 | chr19:57429326:57429374 | chr3:25927064:25927249 |
| chr17:12989679:12989753 | chr16:49686581:49686695 | chr7:41735421:41735459 | chr5:65124029:65124117 |
| chr10:114344929:114344989 | chr17:30821748:30821864 | chr11:10886639:10886702 | chr11:12455168:12455287 |
| chr2:36719487:36719574 | chr20:24631061:24631099 | chr10:664325:664473 | chr2:33295587:33295754 |
| chr14:75446146:75446254 | chr18:74172210:74172240 | chr5:38469431:38469488 | chr2:240386966:240387067 |
| chr11:133895052:133895366 | chr6:41419353:41419617 | chr16:15237718:15237812 | chr12:2411116:2411340 |
| chr11:62370671:62370715 | chr17:78002601:78002654 | chr19:4571622:4571663 | chr22:46302183:46302264 |
| chr5:52897443:52897563 | chr2:99427338:99427414 | chr7:139458285:139458300 | chr15:148851569:148851626 |
| chr11:130545528:130545623 | chr1:156271781:156271977 | chr9:116967656:116967726 | chr6:170491419:170491447 |
| chr2:217405801:217405854 | chr15:56208850:56209086 | chr16:19656482:19656576 | chr2:116891317:116891376 |
| chr6:169018100:169018147 | chr19:16178499:16178673 | chr16:12865231:12865387 | chr3:20108380:20108465 |
| chr17:75598600:75598659 | chr9:126081436:126081458 | chr6:3766566:3766739 | chr9:132156886:132156911 |
| chr10:45675475:45675491 | chr5:156988956:156989239 | chr15:60705703:60705745 | chr11:76290294:76290405 |
| chr18:53074420:53074508 | chr8:23201483:23201545 | chr1:85070440:85070481 | chr22:45945164:45945215 |
| chr2:54199164:54199243 | chr17:12554165:12554199 | chr13:99622769:99622853 | chr2:42279054:42279101 |
| chr5:168451596:168451712 | chr7:2500197:2500212 | chr2:197962437:197962594 | chr3:58151255:58151409 |
| chr2:241185226:241185267 | chr11:114167495:114167693 | chr8:70180168:70180286 | chr8:30073333:30073369 |
| chr7:70120035:70120076 | chr12:123579604:123579635 | chr7:141768483:141768503 | chr9:15250121:15250232 |
| chr10:30109892:30109931 | chr5:36569776:36569815 | chr10:102642706:102642787 | chr17:17780294:17780370 |
| chr7:2951480:2951552 | chr9:101721017:101721046 | chr11:19837610:19837706 | chr13:39969110:39969133 |
| chr16:79166842:79167002 | chr11:7507122:7507225 | chr16:2176909:2176936 | chr22:31502874:31502905 |
| chr1:3464719:3464876 | chr16:66737688:66737762 | chr15:99414209:99414271 | chr19:31125579:31125600 |
| chr13:110775448:110775493 | chr19:46286747:46286876 | chr1:3459917:3459985 | chr14:84557314:84557472 |

-continued

| | | | |
|---|---|---|---|
| chr20:19272195:19272440 | chr2:107381544:107381755 | chr17:60830341:60830394 | chr21:43514198:43514493 |
| chr1:9386783:9386877 | chr17:74736513:74736621 | chr13:53608851:53608955 | chr18:22307046:22307231 |
| chr6:41549109:41549179 | chr13:39205072:39205118 | chr7:143504126:143504224 | chr8:21916771:21916803 |
| chr11:63826186:63826257 | chr9:92277644:92277734 | chr14:93530866:93530975 | chr8:22498729:22498809 |
| chr1:3286118:3286163 | chr7:465066:465102 | chr2:9375605:9375853 | chr20:30318764:30318781 |
| chr16:88279603:88279618 | chr4:41157591:41157674 | chr17:2870919:2870940 | chr6:136257638:136257678 |
| chr3:187769246:187769343 | chr10:131694575:131694682 | chr5:158018853:158018897 | chr8:25250313:25250341 |
| chr2:121298318:121298336 | chr2:109788545:109788604 | chr13:112271255:112271317 | chr1:41272962:41273105 |
| chr10:87796214:87796244 | chr9:285924:285974 | chr11:3183785:3183815 | chr9:97771885:97771906 |
| chr11:111784374:111784426 | chr1:9431472:9431636 | chr12:131430753:131430967 | chr13:113695160:113695394 |
| chr16:49686422:49686568 | chr18:77246357:77246388 | chr14:80052309:80052328 | chr2:20380163:20380252 |
| chr10:711379:711694 | chr16:66652537:66652773 | chr16:79943780:79943836 | chr16:19863013:19863115 |
| chr4:71941315:71941425 | chr19:3466761:3466827 | chr17:55498598:55498641 | chr8:125677517:125677565 |
| chr13:52304379:52304567 | chr2:1565960:1566095 | chr4:39530807:39530904 | chr7:127670761:127670841 |
| chr10:10336914:10336945 | chr12:123963634:123963661 | chr19:35629398:35629459 | chr6:168195164:168195233 |
| chr15:99498725:99498811 | chr13:21572143:21572171 | chr10:30743560:30743638 | chr15:85493580:85493683 |
| chr15:88153699:88153769 | chr14:52373819:52373891 | chr2:1656489:1656558 | chr22:43031651:43031853 |
| chr5:149980623:149980743 | chr1:9436026:9436361 | chr10:65831088:65831186 | chr13:113496626:113496879 |
| chr15:47765811:47765900 | chr15:100851337:100851552 | chr21:35718410:35718483 | chr16:14489990:14490064 |
| chr15:36894077:36894154 | chr10:13801406:13801461 | chr1:3474045:3474120 | chr6:57042660:57042734 |
| chr3:73414820:73414881 | chr12:47491451:47491535 | chr18:77246010:77246208 | chr3:46941526:46941607 |
| chr10:44197884:44197884 | chr12:57197704:57197758 | chr2:234390268:234390333 | chr20:35987305:35987352 |
| chr18:60387698:60387879 | chr17:77460860:77460869 | chr7:73309532:73309575 | chr16:14401759:14401838 |
| chr20:17822381:17822534 | chr7:143169791:143169807 | chr1:183013562:183013626 | chr1:14469003:14469067 |
| chr13:31470063:31470114 | chr15:92462388:92462506 | chr16:70725685:70726085 | chr20:56534156:56534196 |
| chr2:66074251:66074308 | chr10:11733400:11733428 | chr1:154401741:154401879 | chr9:132236150:132236184 |
| chr9:131398646:131398694 | chr6:1867570:1867643 | chr4:36166725:36166900 | chr1:3050597:3050633 |
| chr1:234594452:234594635 | chr13:113698994:113699050 | chr9:96366610:96366664 | chr7:37524088:37524305 |
| chr11:19778332:19778414 | chr12:77624317:77624349 | chr9:95371219:95371367 | chr13:111024166:111024198 |
| chr6:155593701:155593747 | chr2:12461342:12461469 | chr10:13999112:13999167 | chr12:6202364:6202394 |
| chr5:1542556:1542597 | chr11:12352080:12352113 | chr9:137535735:137535830 | chr17:2116086:2116211 |
| chr17:2362969:2363062 | chr18:72063318:72063459 | chr7:94025970:94026143 | chr7:4647117:4647169 |
| chr10:131488146:131488308 | chr21:44162140:44162220 | chr20:46475609:46475683 | chr5:55821161:55821181 |
| chr16:86461393:86461510 | chr13:99023307:99023384 | chr12:94580545:94580701 | chr7:2666687:2666748 |
| chr13:111024091:111024104 | chr1:179322741:179322768 | chr1:160877880:160877935 | chr22:45914756:45914798 |
| chr10:105879872:105879934 | chr9:126927295:126927337 | chr10:104380407:104380589 | chr16:20624541:20624773 |
| chr2:216299024:216299143 | chr6:85592864:85592982 | chr22:28191297:28191348 | chr2:237551381:237551403 |
| chr2:206620645:206620696 | chr8:106155638:106155841 | chr4:99981639:99981676 | chr3:31363948:31364089 |
| chr6:90708046:90708215 | chr13:23951893:23951910 | chr12:58287209:58287324 | chr2:71927938:71927991 |
| chr1:3460222:3460269 | chr22:27501587:27501648 | chr6:168975596:168975609 | chr16:80972085:80972168 |
| chr16:88096861:88096956 | chr1:7728694:7728716 | chr14:104178824:104178840 | chr19:49673692:49673775 |
| chr7:159004650:159004678 | chr9:137554083:137554352 | chr9:87051327:87051398 | chr2:236843445:236843509 |
| chr8:22443383:22443437 | chr18:53074062:53074313 | chr11:4212243:4212284 | chr1:15751369:15751446 |
| chr20:35169012:35169055 | chr16:72892761:72892801 | chr5:125720663:125720715 | chr5:73045778:73045803 |
| chr19:39889822:39889941 | chr10:44339266:44339451 | chr21:33570835:33570867 | chr6:128738839:128739002 |
| chr10:129721730:129721745 | chr10:126724009:126724099 | chr7:1578135:1578254 | chr4:85725549:85725639 |
| chr4:120636770:120636877 | chr9:73204687:73204768 | chr16:15239066:15239131 | chr3:176622338:176622418 |
| chr5:141628521:141628586 | chr22:31440272:31440362 | chr4:119711755:119711864 | chr5:172926847:172926905 |
| chr5:59792001:59792053 | chr20:44457872:44457929 | chr21:40459773:40459854 | chr16:85240886:85240936 |
| chr6:14925566:14925731 | chr16:79751767:79751800 | chr11:61655771:61655827 | chr19:15324808:15324820 |
| chr3:148729585:148729652 | chr1:22658835:22658882 | chr1:2286708:2286716 | chr10:16636258:16636309 |
| chr5:117889340:117889421 | chr2:8389473:8389584 | chr6:3749643:3749718 | chr17:79394818:79394831 |
| chr18:74918812:74918906 | chr7:98719280:98719357 | chr5:71805380:71805534 | chr19:4373886:4374073 |
| chr19:2523639:2523852 | chr1:203526708:203526778 | chr8:88927532:88927575 | chr22:27641211:27641248 |
| chr2:218692718:218692749 | chr5:53742361:53742402 | chr1:24437962:24437971 | chr11:1418459:1418562 |
| chr7:70133955:70134155 | chr2:1820467:1820494 | chr5:158232314:158232393 | chr7:151511780:151511833 |
| chr14:37504457:37504520 | chr15:69841259:69841298 | chr12:52938468:52938505 | chr15:68677027:68677109 |
| chr2:121371664:121371708 | chr20:61013114:61013193 | chr3:101230854:101230960 | chr6:157470211:157470320 |
| chr1:203491536:203491617 | chr15:76470078:76470143 | chr7:156160942:156161041 | chr19:18567964:18568032 |
| chr11:114237690:114237718 | chr7:70480615:70480687 | chr1:32054262:32054281 | chr4:183152531:183152684 |
| chr13:111000221:111000344 | chr9:116362067:116362205 | chr16:3843446:3843552 | chr2:218800243:218800316 |
| chr18:12646025:12646103 | chr3:48732676:48732782 | chr15:41316602:41316676 | chr2:239367426:239367504 |
| chr11:64631168:64631193 | chr10:103406210:103406384 | chr16:82668011:82668094 | chr13:33163751:33163849 |
| chr7:1135564:1135633 | chr7:30885459:30885500 | chr9:82195114:82195183 | chr6:5068481:5068499 |
| chr5:158945587:158945820 | chr15:92509445:92509609 | chr10:31108828:31108849 | chr1:42091868:42091905 |
| chr18:46353742:46353814 | chr15:84361392:84361425 | chr10:121006638:121006679 | chr7:134374786:134374800 |
| chr2:137330457:137330466 | chr2:238322190:238322513 | chr2:240421723:240421775 | chr16:15916856:15916909 |
| chr5:77844053:77844099 | chr3:196910630:196910640 | chr10:3616894:3616970 | chr8:41061579:41061651 |
| chr5:177694377:177694398 | chr20:50187210:50187265 | chr10:17275675:17275857 | chr10:30400645:30400733 |
| chr20:35168933:35168988 | chr2:48710712:48710871 | chr3:105448599:105448786 | chr8:30421070:30421152 |
| chr3:70048580:70048701 | chr18:34366845:34366901 | chr2:12597916:12598117 | chr8:139613769:139613920 |
| chr11:12097899:12098112 | chr21:43147530:43147588 | chr8:49059786:49059859 | chr10:114760378:114760459 |
| chr2:20055744:20055772 | chr11:36037604:36037621 | chr11:19952720:19952784 | chr5:167361642:167361742 |
| chr1:10614315:10614356 | chr6:160257580:160257599 | chr2:129936106:129936152 | chr2:220634112:220634129 |
| chr10:14012441:14012468 | chr15:66914008:66914032 | chr20:10620456:10620662 | chr1:3157480:3157571 |
| chr12:111707943:111708004 | chr10:134881126:134881168 | chr5:176515821:176515829 | chr3:177545779:177546015 |
| chr1:3460137:3460182 | chr7:7032037:7032089 | chr11:93869233:93869339 | chr8:54866663:54866734 |
| chr20:17830926:17830968 | chr10:13881755:13881845 | chr7:30951682:30951741 | chr2:65804282:65804447 |
| chr9:133895273:133895401 | chr6:11214781:11215022 | chr7:70096103:70096122 | chr20:35943041:35943225 |

-continued chr16:68386106:68386174
chr7:2719029:2719102
chr2:174060123:174060220
chr11:12136324:12136406
chr2:42226193:42226234
chr22:33313719:33313805
chr11:126033028:126033048
chr11:1418719:1418773
chr22:31489110:31489197
chr11:45260506:45260585
chr2:47040392:47040486
chr3:186819136:186819178
chr3:9153801:9153977
chr8:73559260:73559345
chr16:29142419:29142508
chr1:9410453:9410468
chr21:47512644:47512690
chr9:16247410:16247417
chr18:46309140:46309233
chr3:66413019:66413233
chr20:10641514:10641548
chr10:17280749:17280762
chr7:5592713:5592836
chr14:23318835:23318857
chr7:42779397:42779584
chr1:61914656:61914841
chr19:13962429:13962502
chr4:76270190:76270273
chr10:81915105:81915176
chr11:94573359:94573509
chr11:44729756:44729789
chr7:73424958:73425002
chr8:141960637:141960714
chr3:3452386:3452438
chr2:101402810:101403044
chr8:77316559:77316617
chr2:240733175:240733324
chr15:26135862:26136025
chr2:107193220:107193348
chr20:39392677:39392771
chr1:3314113:3314144
chr8:141057820:141057872
chr10:5660858:5660911
chr5:8696414:8696485
chr13:45289725:45289758
chr7:37039869:37039998
chr12:32293438:32293717
chr5:2515778:2515802
chr10:10336989:10337032
chr9:72012687:72012707
chr6:88976284:88976404
chr17:30001481:30001529
chr16:80752918:80753020
chr11:130283367:130283389
chr6:72928691:72928785
chr11:10714431:10714466
chr19:18783185:18783216
chr16:61245717:61245888
chr19:129517613:129517699
chr9:124615315:124615387
chr6:15455978:15456143
chr5:137727491:137727661
chr13:13560010:13560122
chr1:16346068:16346121
chr10:711944:712088
chr22:49412171:49412287
chr2:40355055:40355244
chr22:29146593:29146625
chr16:14418702:14418748
chr21:42496716:42496736
chr2:1820299:1820400
chr13:111922451:111922625
chr17:158207285:158207423
chr14:75086815:75086860
chr6:45784561:45784755
chr12:98869058:98869255
chr17:39680190:39680212
chr2:3473947:3474025
chr6:16725500:16725574 chr14:76446554:76446750
chr12:124004371:124004416
chr1:112400108:112400129
chr15:74496556:74496593
chr10:126749370:126749418
chr13:49528296:49528490
chr7:135440322:135440342
chr10:16869686:16869746
chr21:32532775:32532824
chr9:97682657:97682800
chr20:49982779:49982992
chr16:19872075:19872241
chr9:92300116:92300178
chr6:37045638:37045671
chr1:225838270:225838425
chr2:5701195:5701296
chr1:19740620:19740711
chr21:44161774:44161828
chr6:143434808:143435073
chr10:121040981:121041031
chr6:154795868:154796097
chr2:233105800:233105832
chr1:2006023:2006038
chr1:241912764:241912999
chr1:80251396:80251438
chr8:89270337:89270374
chr8:22458405:22458469
chr5:107754120:107754132
chr3:194493573:194493711
chr5:158224572:158224690
chr2:20262560:20262730
chr19:3460058:3460132
chr9:92503363:92503383
chr18:46375226:46375356
chr20:17850931:17851022
chr19:2186543:2186661
chr9:97682842:97683006
chr6:158460945:158461070
chr9:2816879:2817023
chr1:183187558:183187637
chr12:121344919:121344964
chr20:35169120:35169198
chr15:86185647:86185814
chr16:84617788:84617843
chr17:43926509:43926525
chr8:30420219:30420335
chr6:16541787:16541933
chr17:78999585:78999726
chr10:16759844:16759898
chr14:95875024:95875083
chr21:34192080:34192208
chr21:46454122:46454165
chr18:13436078:13436235
chr10:130094981:130095001
chr6:169178590:169178637
chr15:58815128:58815195
chr2:67487963:67487997
chr18:72913659:72913731
chr22:23624534:23624645
chr12:2494075:2494199
chr17:55663160:55663251
chr2:65543343:65543411
chr20:56305784:56305798
chr18:43097228:43097251
chr9:98829385:98829459
chr9:98812048:98812090
chr12:93521229:93521358
chr10:3146921:3146961
chr19:28609319:28609354
chr13:113698901:113698952
chr2:216298546:216298643
chr1:2991642:2991733
chr17:76858155:76858303
chr17:19390397:19390458
chr4:1205974:1206025
chr11:11606063:11606090
chr7:22757575:22757624
chr11:19752027:19752292
chr9:97587850:97588035 chr9:92716323:92716482
chr7:111599315:111599369
chr2:27136976:27137029
chr7:608326:608527
chr9:97684443:97684562
chr5:66944023:66944179
chr2:190701403:190701607
chr22:40673658:40673728
chr14:92366261:92366344
chr7:75640653:75640744
chr16:73059129:73059169
chr9:129155111:129155328
chr2:183292642:183292828
chr5:172123630:172123730
chr3:47613082:47613088
chr10:105408583:105408600
chr5:2387936:2388031
chr5:2729492:2729508
chr20:41766979:41766991
chr3:184409648:184409750
chr10:88493041:88493164
chr12:132270440:132270682
chr22:44756989:44757220
chr14:68831611:68831749
chr14:92367927:92368071
chr12:2411416:2411598
chr22:18049263:18049365
chr10:14065428:14065473
chr7:111977285:111977345
chr1:27445356:27445391
chr1:7074131:7074170
chr17:15313380:15313443
chr12:102820870:102820961
chr17:71936239:71936248
chr13:22665786:22665867
chr16:85187520:85187614
chr8:6442958:6443017
chr14:91107941:91108028
chr8:25806426:25806443
chr16:85620451:85620532
chr21:43951304:43951331
chr12:94581206:94581313
chr10:134527606:134527777
chr22:26143790:26143817
chr7:4296052:4296381
chr3:134034372:134034636
chr10:28111467:28111604
chr17:79391325:79391366
chr14:96520629:96520665
chr2:18699763:18699825
chr21:17442467:17442664
chr14:90042589:90042653
chr6:158509133:158509238
chr8:141629654:141629773
chr16:85196321:85196364
chr1:203525849:203525916
chr16:521619:521899
chr17:38612725:38612772
chr15:81605401:81605471
chr9:135994555:135994742
chr17:79543666:79544106
chr17:79012377:79012405
chr21:45968533:45968547
chr21:42619547:42619640
chr20:19830589:19830718
chr10:14712906:14712935
chr2:145465753:145465804
chr5:59504641:59504726
chr6:4613067:4613243
chr18:11269160:11269181
chr9:84113892:84113906
chr16:85418413:85418592
chr20:17817173:17817268
chr18:77398686:77398709
chr1:2005083:2005710
chr2:44502707:44502779
chr9:132743907:132744043
chr8:30343080:30343196 chr19:1254191:1254317
chr8:8699113:8699285
chr16:51610883:51611016
chr10:131744697:131744726
chr13:110147363:110147475
chr5:134583058:134583072
chr1:27891699:27891725
chr2:47234673:47234721
chr6:74965618:74965651
chr4:7911612:7911672
chr19:5059366:5059423
chr13:24192625:24192669
chr11:27536140:27536237
chr5:116066604:116066649
chr11:7508112:7508197
chr6:166879764:166879786
chr6:168068881:168068949
chr11:113424086:113424149
chr5:151059157:151059183
chr22:43821384:43821428
chr3:53807276:53807287
chr17:62167638:62167728
chr8:123860971:123861059
chr11:68894912:68894969
chr16:16098416:16098605
chr5:55193804:55193902
chr10:84118577:84118605
chr1:226852160:226852233
chr19:36180754:36180817
chr20:31144652:31144702
chr16:79296157:79296186
chr22:19863472:19863495
chr12:105021929:105021960
chr15:56209215:56209303
chr15:29261980:29262074
chr7:132087715:132087737
chr2:151333241:151333340
chr19:6485754:6485800
chr13:31272143:31272303
chr4:166301164:166301272
chr2:121603185:121603207
chr6:45530885:45530911
chr14:94447303:94447348
chr1:242948252:242948360
chr19:49481383:49481409
chr10:52905224:52905373
chr8:25867146:25867194
chr15:101912644:101912745
chr4:40847393:40847513
chr17:70442942:70443022
chr6:86060972:86061154
chr17:17448903:17448931
chr5:134577993:134578042
chr10:126644018:126644097
chr9:132248466:132248663
chr3:149310847:149311097
chr21:46549535:46549556
chr8:97399458:97399485
chr10:134976229:134976248
chr17:40672856:40672864
chr6:29706041:29706152
chr12:93708655:93708836
chr7:4231044:4231126
chr10:104883494:104883599
chr3:134115902:134115909
chr10:81182412:81182519
chr12:43129874:43129987
chr2:23568298:23568404
chr9:13485157:13485208
chr1:170677495:170677579
chr7:79027073:79027118
chr6:4351916:4351953
chr8:13371792:13371850
chr10:3366176:3366407
chr7:137669463:137669576
chr9:124535135:124535408
chr6:122273295:122273448

-continued

| | | | |
|---|---|---|---|
| chr3:123419686:123419782 | chr2:375931:375958 | chr14:56056039:56056048 | chr10:30932923:30932972 |
| chr5:78099270:78099340 | chr17:71773282:71773397 | chr1:6445478:6445510 | chr8:102457944:102457961 |
| chr4:82057849:82058045 | chr12:128807935:128807959 | chr1:10168307:10168493 | chr6:89871857:89871883 |
| chr7:73465618:73465668 | chr13:23732081:23732140 | chr3:11645230:11645368 | chr11:40301875:40301907 |
| chr7:30818374:30818439 | chr3:59003065:59003100 | chr4:13415653:13415732 | chr2:100241347:100241372 |
| chr4:88461671:88461843 | chr1:157984204:157984269 | chr7:33732757:33732843 | chr6:43464262:43464281 |
| chr1:3459727:3459820 | chr7:55112569:55112635 | chr3:9289465:9289502 | chr11:2871840:2871864 |
| chr12:109179337:109179529 | chr20:17830714:17830792 | chr14:76445973:76446021 | chr13:53617306:53617318 |
| chr14:51237067:51237132 | chr4:95331866:95332202 | chr3:72640590:72640767 | chr12:2482078:2482201 |
| chr3:141151136:141151212 | chr3:122692837:122692868 | chr7:67319367:67319425 | chr1:172114039:172114125 |
| chr1:203541608:203541617 | chr16:2177303:2177329 | chr2:159950921:159951154 | chr2:216299434:216299546 |
| chr18:3622294:3622340 | chr15:85826138:85826201 | chr2:10545557:10545645 | chr13:27254470:27254486 |
| chr1:3459875:3459893 | chr14:76461910:76462138 | chr13:110874293:110874360 | chr2:38387148:38387190 |
| chr12:52938381:52938412 | chr5:155755991:155756019 | chr10:74677129:74677157 | chr9:137426232:137426270 |
| chr4:5736721:5736775 | chr4:57922136:57922184 | chr12:124948015:124948049 | chr1:19778768:19779073 |
| chr1:39933015:39933081 | chr9:15401524:15401532 | chr17:72445156:72445231 | chr2:20834577:20834625 |
| chr19:16178735:16178766 | chr19:3603394:3603412 | chr15:26076118:26076279 | chr19:12732552:12732570 |
| chr20:57473842:57473881 | chr19:47316636:47316653 | chr7:100761027:100761057 | chr5:134605567:134605740 |
| chr12:123738593:123738662 | chr11:76360139:76360318 | chr10:5587760:5587894 | chr11:1929407:1929484 |
| chr16:88677685:88677878 | chr10:729913:729968 | chr2:217544422:217544603 | chr7:140048950:140049086 |
| chr1:3142374:3142411 | chr11:114003718:114003831 | chr2:1743862:1743888 | chr6:73086674:73086828 |
| chr7:57565015:57565070 | chr17:75775848:75775881 | chr19:2513246:2513267 | chr1:62353776:62353847 |
| chr10:134527781:134527839 | chr12:116737894:116737988 | chr9:110501886:110502051 | chr3:16707220:16707260 |
| chr10:30083908:30083982 | chr21:44694448:44694461 | chr12:66025456:66025636 | chr15:99050082:99050108 |
| chr2:72366403:72366433 | chr5:167372652:167372700 | chr19:45323868:45323940 | chr17:60706523:60706581 |
| chr4:24732279:24732305 | chr10:61408493:61408669 | chr5:141225844:141225865 | chr15:67142417:67142575 |
| chr17:75861540:75861581 | chr5:156989353:156989478 | chr17:79026865:79026951 | chr20:56576504:56576598 |
| chr7:66935160:66935181 | chr8:97419822:97419867 | chr1:16625787:16625849 | chr19:5036492:5036562 |
| chr14:69410822:69410995 | chr8:22516858:22516919 | chr2:238321665:238321816 | chr20:25030492:25030618 |
| chr5:175119757:175119816 | chr6:38237680:38237861 | chr5:148345506:148345687 | chr6:1766006:1766029 |
| chr16:86965611:86965651 | chr1:37773917:37773943 | chr1:172113662:172113921 | chr18:72839832:72839844 |
| chr5:52658535:52658625 | chr7:95818174:95818283 | chr4:7369242:7369265 | chr15:99995054:99995113 |
| chr5:109775450:109775504 | chr7:73428567:73428618 | chr1:11979065:11979214 | chr12:130612543:130612596 |
| chr5:73234564:73234688 | chr13:114632959:114633003 | chr16:585886:585937 | chr6:37648587:37648654 |
| chr2:161777367:161777468 | chr1:59912018:59912049 | chr4:124707773:124707972 | chr12:124984979:124985033 |
| chr13:33922144:33922332 | chr2:109941286:109941359 | chr8:109355301:109355329 | |
| chr7:120164933:120164963 | chr1:168054694:168054754 | chr12:107799287:107799331 | |

Table 1b consists of the following methylation haplotype blocks

| | | |
|---|---|---|
| chr5:122422637:122422689 | chr2:45240094:45240129 | chr2:177037468:177037632 |
| chr16:88293071:88293119 | chr3:23653540:23653753 | chr10:5489561:5489690 |
| chr14:91790551:91790559 | chr2:66810478:66810502 | chr12:54400441:54400545 |
| chr7:560607:560650 | chr11:64509762:64509801 | chr21:36901623:36901692 |
| chr18:34823918:34823977 | chr5:72676020:72676058 | chr2:241395207:241395347 |
| chr5:122422972:122423004 | chr7:25892505:25892545 | chr1:145440313:145440506 |
| chr18:52613464:52613527 | chr15:96897012:96897055 | chr14:105126561:105126572 |
| chr4:174440618:174440652 | chr10:126407964:126408032 | chr8:102506473:102506597 |
| chr6:6000351:6000385 | chr1:47909185:47909226 | chr13:95354223:95354262 |
| chr6:85476611:85476636 | chr7:157479397:157479515 | chr22:43659543:43659642 |
| chr2:66810606:66810640 | chr5:72597625:72597716 | chr2:10231429:10231487 |
| chr16:73098764:73098784 | chr9:97431689:97431863 | chr5:72676905:72676924 |
| chr1:3310806:3310814 | chr8:99961971:99962204 | chr19:19571777:19571806 |
| chr8:99961711:99961827 | chr5:81652981:81653357 | chr17:32705890:32705981 |
| chr7:154720589:154720672 | chr12:54088920:54088960 | chr15:53098366:53098407 |
| chr5:122423184:122423204 | chr8:99951082:99951152 | chr10:123355655:123355837 |
| chr8:97165649:97165702 | chr4:15412389:15412548 | chr20:3053093:3053103 |
| chr2:45231186:45231227 | chr15:41217790:41217801 | chr1:170635953:170635964 |
| chr17:59532637:59532659 | chr17:48206061:48206096 | chr5:20041646:20041789 |
| chr5:122422007: 122422064 | chr2:45231539:45231586 | chr20:39319423:39319447 |
| chr11:2114366:2114498 | chr9:98785107:98785147 | chr7:27194521:27194570 |
| chr6:6000008:6000046 | chr4:1194418:1194505 | chr10:119300620:119300704 |
| chr5:72731939:72731975 | chr15:74426581:74426618 | chr8:99962451:99962688 |
| chr8:71287244:71287415 | chr17:17628486:17628493 | chr15:53087876:53087895 |
| chr6:39966947:39967010 | chr12:30976279:30976313 | chr9:139740765:139740775 |
| chr15:96909551:96909595 | chr16:86968517:86968564 | chr14:105944278:105944310 |
| chr7:560864:560875 | chr16:86959129:86959213 | chr9:102587733:102587805 |
| chr15:53087377:53087420 | chr11:110581348:110581376 | chr16:81030772:81030844 |
| chr7:560685:560695 | chr17:17628638:17628722 | chr2:89166335:89166578 |
| chr6:159655065:159655082 | chr16:51669186:51669276 | chr8:99951364:99951421 |
| chr5:122422161:122422184 | chr10:119972986:119973016 | chr8:76316319:76316353 |
| chr1:27848198:27848263 | chr13:28000468:28000558 | chr12:54408685:54408713 |
| chr7:561160:561184 | chr8:99954669:99954686 | chr9:136567964:136567975 |
| chr8:99959774:99959900 | chr18:60173469:60173666 | chr5:72526768:72526786 |
| chr16:73098734:73098753 | chr10:105452540:105452576 | chr2:66809772:66809852 |

-continued

| | | |
|---|---|---|
| chr3:73620624:73620814 | chr16:89005381:89005398 | chr2:96814448:96814515 |
| chr4:24801971:24802055 | chr6:168533689:168533704 | chr5:38368165:38368317 |
| chr19:13209981:13210007 | chr8:80740825:80740880 | chr1:110610678:110610715 |
| chr2:177004040:177004111 | chr19:2240088:2240161 | chr12:54440712:54440753 |
| chr17:55520634:55520788 | chr12:115251376:115251453 | chr5:122421804:122421820 |
| chr7:560782:560796 | chr18:12287438:12287452 | chr7:19149999:19150182 |
| chr5:158532062:158532093 | chr20:39320779:39320848 | chr19:13124365:13124391 |
| chr7:5336543:5336571 | chr12:54807242:54807336 | chr12:118314033:118314075 |

Table 4a consists of the following methylation haplotype blocks:

| | | | |
|---|---|---|---|
| chr1:110693161:110693212 | chr10:31074290:31074303 | chr8:24813563:24813599 | chr15:64244503:64244684 |
| chr3:187676563:187676644 | chr13:112726560:112726579 | chr13:30423680:30423763 | chr1:57888963:57889003 |
| chr2:225266234:225266263 | chr21:45577522:45577578 | chr11:62212143:62212195 | chr6:132722899:132722939 |
| chr7:391332:391394 | chr7:102066465:102066505 | chr13:21050140:21050156 | chr8:98290100:98290333 |
| chr1:78957190:78957314 | chr17:27912311:27912415 | chr15:84115968:84116104 | chr2:109855158:109855264 |
| chr9:86152595:86152671 | chr17:80358785:80358913 | chr14:69260675:69260712 | chr11:65408370:65408410 |
| chr10:73496013:73496122 | chr1:169637173:169637186 | chr6:27655609:27656143 | chr19:4916881:4917023 |
| chr7:104581511:104581826 | chr2:139537698:139537710 | chr1:228195435:228195456 | chr2:239335984:239336031 |
| chr8:17509194:17509223 | chr6:10391058:10391093 | chr5:5140453:5140465 | chr17:46619163:46619183 |
| chr20:23029535:23029655 | chr17:76886714:76886754 | chr13:109148187:109148195 | chr17:79134306:79134315 |
| chr16:29164276:29164303 | chr12:7068301:7068310 | chr9:132586568:132586652 | chr8:41166324:41166334 |
| chr7:64030120:64030307 | chr14:70014828:70014873 | chr10:126300538:126300694 | chr8:494278:494286 |
| chr21:47971700:47971722 | chr10:118031044:118031062 | chr6:37534044:37534257 | chr13:25745208:25745232 |
| chr1:19251999:19252025 | chr16:49518429:49518453 | chr17:33700564:33700621 | chr8:687326:687341 |
| chr19:18113497:18113578 | chr7:71801464:71801484 | chr11:111411876:111412047 | chr14:73181172:73181203 |
| chr4:2814121:2814173 | chr9:117693070:117693110 | chr1:26616292:26616311 | chr6:20024006:20024141 |
| chr5:169931353:169931389 | chr5:173315775:173315832 | chr11:66326731:66326743 | chr7:138780361:138780396 |
| chr8:97157926:97157941 | chr14:103568958:103569000 | chr5:122422290:122422309 | chr7:155246087:155246111 |
| chr2:232186706:232186761 | chr7:100946173:100946190 | chr5:44388581:44388799 | chr1:119530576:119530606 |
| chr17:40822613:40822653 | chr19:8656804:8656818 | chr2:220078423:220078511 | chr6:85936479:85936599 |
| chr1:154375706:154375773 | chr9:139741469:139741493 | chr2:220313255:220313272 | chr7:45039481:45039607 |
| chr2:219738569:219738577 | chr12:51717855:51717865 | chr11:67205095:67205113 | chr22:44391923:44391940 |
| chr11:19735331:19735420 | chr5:142785053:142785165 | chr16:29675880:29675899 | chr5:135266182:135266207 |
| chr2:109834010:109834148 | chr8:41559482:41559550 | chr4:5053572:5053596 | chr6:42335118:42335231 |
| chr14:94254076:94254092 | chr6:20320223:20320368 | chr9:14346053:14346085 | chr12:29936617:29936632 |
| chr17:74141537:74141566 | chr6:27114547:27114655 | chr6:22147356:22147383 | chr7:70597943:70597953 |
| chr21:44819099:44819123 | chr19:17439683:17439702 | chr19:11708610:11708736 | chr6:126112458:126112707 |
| chr16:30621003:30621081 | chr14:75981561:176858704 | chr14:75981561:75981659 | chr8:25203033:25203231 |
| chr12:108169217:108169314 | chr9:92099055:92099114 | chr16:66621433:66621441 | chr2:131797613:131797636 |
| chr3:183903549:183903707 | chr7:24324675:24324683 | chr7:153749755:153749802 | chr13:112723104:112723111 |
| chr1:145039361:145039649 | chr1:221050180:221050273 | chr8:55371721:55371728 | chr1:229567768:229567822 |
| chr13:43148866:43148914 | chr5:2748507:2748516 | chr14:105528116:105528216 | chr10:11212536:11212603 |
| chr7:49813424:49813437 | chr6:143858815:143858914 | chr22:19711226:19711257 | chr15:74658177:74658190 |
| chr8:38757858:38757899 | chr22:47070535:47070641 | chr17:643532:643598 | chr2:237416280:237416327 |
| chr8:142276522:142276533 | chr19:3672066:3672080 | chr6:1625110:1625384 | chr12:115109842:115109855 |
| chr10:114136302:114136365 | chr15:90357499:90357521 | chr5:178422156:178422206 | chr22:39148239:39148256 |
| chr4:122301928:122301963 | chr9:127258187:127258274 | chr22:30662059:30662077 | chr19:50058236:50058275 |
| chr1:12123521:12123556 | chr7:2271925:2272011 | chr20:46044275:46044343 | chr6:37551119:37551243 |
| chr19:30016411:30016441 | chr7:71801154:71801190 | chr16:88767062:88767096 | chr7:36679543:36679660 |
| chr4:17767383:17767525 | chr7:156797306:156797346 | chr14:60952393:60952405 | chr1:1118430:1118437 |
| chr14:74707404:74707425 | chr15:70550975:70551061 | chr2:8715562:8715637 | chr16:54967023:54967077 |
| chr1:225655011:225655039 | chr19:49973605:49973632 | chr18:2847848:2847923 | chr17:16570355:16570361 |
| chr4:111553898:111553914 | chr10:26505199:26505213 | chr12:45444152:45444203 | chr6:166976776:166976796 |
| chr19:3179842:3179904 | chr2:129037557:129037569 | chr8:145900685:145900715 | chr8:57026038:57026118 |
| chr10:123923869:123923887 | chr2:46579092:46579122 | chr7:107643271:107643389 | chr19:41119578:41119638 |
| chr21:46334450:46334460 | chr7:1959874:1959887 | chr6:137244466:137244484 | chr8:127568853:127569070 |
| chr2:70057016:70057043 | chr13:24839234:24839455 | chr4:37585982:37585993 | chr2:66672481:66672520 |
| chr17:40822041:40822061 | chr12:22486913:22486995 | chr12:2030316:2030331 | chr9:134128101:134128135 |
| chr2:25425395:25425417 | chr1:112058209:112058223 | chr10:134827218:134827246 | chr6:133562773:133562790 |
| chr16:68028052:68028131 | chr9:134148683:134148714 | chr6:26722714:26722740 | chr12:41086129:41086227 |
| chr2:177016618:177016669 | chr8:132054036:132054055 | chr7:644133:644190 | chr3:129694365:129694378 |
| chr16:88769941:88770131 | chr10:133110551:133110580 | chr5:49736943:49736950 | chr22:46367952:46367968 |
| chr11:123301152:123301245 | chr1:207842657:207842691 | chr4:3387340:3387383 | chr6:17962707:17962816 |
| chr3:192126690:192126712 | chr3:195313667:195313820 | chr5:158532301:158532330 | chr16:54970335:54970379 |
| chr9:133536748:133536768 | chr6:43612899:43612908 | chr1:119543104:119543128 | chr19:37742927:37742978 |
| chr1:9764850:9764871 | chr2:219827596:219827660 | chr22:42095558:42095578 | chr5:45696035:45696048 |
| chr3:48520626:48520665 | chr16:85296061:85296086 | chr22:37881408:37881495 | chr2:239140304:239140340 |
| chr17:13504776:13504797 | chr3:65342371:65342384 | chr19:908886:908901 | chr2:220349250:220349265 |
| chr7:32110082:32110100 | chr16:50308403:50308417 | chr1:224804868:224804896 | chr7:102715190:102715298 |
| chr13:109793395:109793413 | chr2:182322264:182322274 | chr21:27945586:27945599 | chr15:79382801:79382824 |
| chr17:36734910:36734967 | chr1:145562949:145562967 | chr6:150285766:150285775 | chr6:3752576:3752604 |
| chr20:37356313:37356330 | chr4:6697966:6698085 | chr11:47416527:47416633 | chr14:67955224:67955250 |
| chr17:59482675:59482690 | chr8:128929859:128929964 | chr16:55365257:55365267 | chr10:11207159:11207259 |
| chr19:40871656:40871678 | chr19:16197083:16197146 | chr17:79420888:79420920 | chr19:3179353:3179432 |

-continued chr10:38383097:38383309
chr6:31527706:31527920
chr7:4248707:4248866
chr17:72462820:72462912
chr5:2740503:2740527
chr8:54163561:54163586
chr1:203643083:203643220
chr15:59397205:59397420
chr11:69920045:69920065
chr19:55766296:55766320
chr8:55379351:55379448
chr4:1195837:1195893
chr8:103136001:103136031
chr19:23253315:23253335
chr11:64107477:64107619
chr3:27769863:27770001
chr11:107328048:107328380
chr7:158938119:158938147
chr8:97158006:97158018
chr12:115103838:115103858
chr1:226924888:226924924
chr4:142053481:142053783
chr7:150329304:150329321
chr19:30018006:30018051
chr1:181287633:181287642
chr14:85998084:85998139
chr14:58332805:58332827
chr20:37303000:37303007
chr10:130832367:130832381
chr7:155556566:155556600
chr8:142413012:142413121
chr2:37880456:37880503
chr16:68390618:68390663
chr4:111554064:111554077
chr17:75525139:75525180
chr2:236574688:236574774
chr11:1779926:1779973
chr20:34189501:34189792
chr2:220313356:220313384
chr3:196367690:196367895
chr5:171605385:171605414
chr9:37903889:37903895
chr19:58446423:58446430
chr8:56852201:56852233
chr9:98290011:98290081
chr7:28449954:28449970
chr16:51184771:51184886
chr11:117186061:117186115
chr2:133403686:133403797
chr13:28498448:28498613
chr19:9517624:9517738
chr13:58205958:58206058
chr8:97157855:97157878
chr12:124950719:124950776
chr2:5997166:5997236
chr20:59827586:59827624
chr11:46367940:46367974
chr9:95821885:95821901
chr5:150326192:150326312
chr2:68043432:68043502
chr9:134465995:134466015
chr5:132158827:132158843
chr5:3606576:3606611
chr20:56247297:56247315
chr19:13125032:13125104
chr9:132891110:132891134
chr13:95364358:95364385
chr12:43946100:43946115
chr22:23558969:23559146
chr7:156797101:156797116
chr2:124941370:124941476
chr1:62106961:62107137
chr7:70596957:70596971
chr9:21031614:21031726
chr6:32813530:32813577
chr8:140714721:140714739
chr16:68318872:68318933
chr2:12163189:12163248
chr20:31215990:31216058 chr1:27160026:27160126
chr6:127440662:127440735
chr7:81417609:81417823
chr19:55485208:55485344
chr5:140871224:140871238
chr6:20024224:20024319
chr11:8290108:8290126
chr7:56355663:56355674
chr11:111411737:111411788
chr11:119580472:119580588
chr16:31488816:31488849
chr12:131464602:131464618
chr10:133528489:133528587
chr19:29284698:29284703
chr19:13215304:13215327
chr4:2814877:2814968
chr10:7708862:7708891
chr8:132052589:132052738
chr8:142339677:142339715
chr9:87905314:87905325
chr13:109793272:109793287
chr1:1476095:1476154
chr1:170630065:170630080
chr10:43578285:43578402
chr21:38597974:38598066
chr2:105480382:105480390
chr13:112726834:112726848
chr17:8090935:8091039
chr13:43149103:43149114
chr16:29160257:29160326
chr4:174450772:174450785
chr11:70672834:70672890
chr12:39539256:39539268
chr14:48143617:48143641
chr8:898406:898416
chr20:22557745:22557769
chr19:3180080:3180104
chr6:14739326:14739369
chr18:20888061:20888186
chr6:43613038:43613046
chr19:2085137:2085160
chr3:67706421:67706705
chr19:46997441:46997466
chr21:38069675:38069705
chr7:24324036:24324045
chr17:70112343:70112463
chr2:119602826:119602837
chr14:91580279:91580507
chr20:52825234:52825333
chr7:71800926:71800934
chr14:70756090:70756120
chr19:681393:681413
chr2:242140582:242140589
chr8:134510944:134511107
chr9:136710340:136710362
chr15:31658049:31658168
chr20:62199474:62199549
chr12:4647687:4648274
chr13:102568657:102568663
chr9:71789124:71789541
chr12:45444497:45444506
chr7:73443734:73443767
chr19:1068467:1068484
chr14:103740485:103740496
chr11:91958384:91958465
chr12:121530481:121530644
chr10:13701335:13701356
chr1:33219502:33219520
chr18:13137599:13137680
chr13:58204132:58204154
chr8:66864145:66864243
chr7:45067930:45067978
chr16:216025:216056
chr6:166582771:166582783
chr19:54464269:54464480
chr20:10199369:10199501
chr10:96990630:96990718
chr6:151004402:151004610
chr8:57025563:57025929 chr13:37248265:37248280
chr19:1467151:1467183
chr14:106328280:106328426
chr20:55965241:55965253
chr3:16883944:16884162
chr21:45577764:45577826
chr6:170581003:170581096
chr1:1564676:1564690
chr4:1397570:1397650
chr19:3179929:3179985
chr19:51951770:51951911
chr8:687582:687636
chr1:6086599:6086652
chr10:106401933:106401941
chr3:239683:239720
chr17:73839230:73839273
chr1:221050478:221050491
chr11:1332237:1332286
chr2:73928331:73928354
chr1:3077720:3077741
chr2:47206751:47206855
chr9:29214375:29214383
chr14:85997836:85997946
chr22:43627412:43627566
chr9:71788636:71788870
chr20:21492917:21492931
chr5:45696095:45696108
chr3:123242028:123242130
chr21:44819374:44819432
chr22:220313472:220313492
chr13:23733902:23733940
chr8:35093160:35093180
chr7:32338303:32338342
chr14:50829747:50830001
chr2:5813752:5813893
chr17:73839499:73839523
chr16:12997270:12997416
chr7:2774625:2774646
chr20:62200085:62200109
chr2:8723890:8723900
chr6:1620159:1620204
chr2:99439256:99439395
chr6:163670668:163670704
chr6:20024352:20024422
chr3:38081466:38081537
chr10:7452356:7452391
chr9:117266875:117266928
chr12:7060734:7060909
chr19:10870440:10870451
chr20:3653597:3653644
chr3:47051337:47051366
chr16:56313147:56313258
chr8:65282679:65282693
chr7:3134380:3134520
chr12:6664477:6664942
chr8:54792994:54793073
chr1:77333197:77333207
chr20:49158144:49158301
chr15:79382228:79382307
chr5:92907787:92907881
chr1:146369387:146369494
chr11:123355219:123355301
chr1:229568006:229568012
chr19:48918187:48918247
chr19:42703701:42703778
chr14:75800718:75800727
chr4:76860974:76861103
chr13:110357693:110357853
chr20:61885738:61885787
chr20:62199644:62199673
chr9:132650733:132650800
chr2:45232449:45232493
chr4:134072180:134072187
chr6:20320098:20320141
chr13:109793301:109793322
chr8:121021099:121021235
chr19:3688173:3688181
chr17:46749238:46749330 chr11:67171082:67171115
chr9:95728320:95728335
chr21:44819309:44819337
chr19:47152996:47153006
chr1:149223680:149223845
chr11:63974228:63974540
chr20:3653378:3653398
chr7:2758845:2758885
chr2:198063780:198063957
chr19:19571691:19571731
chr6:166970525:166970559
chr8:97506696:97507459
chr7:21415130:21415142
chr14:70654420:70654435
chr13:25745075:25745153
chr19:37498702:37498719
chr9:134148582:134148640
chr4:1210659:1210715
chr4:1210785:1210901
chr9:1045544:1045552
chr12:115109640:115109662
chr13:28498832:28498881
chr6:85483796:85483914
chr12:115109783:115109814
chr19:39826266:39826272
chr7:156798241:156798342
chr11:91183790:91184000
chr7:2672631:2672761
chr7:156795190:156795205
chr8:28637012:28637063
chr13:25320305:25320319
chr8:86350666:86350689
chr12:51718198:51718251
chr6:117086335:117086374
chr15:96904744:96904775
chr13:112758478:112758496
chr17:17295442:17295619
chr16:28996532:28996602
chr13:112758807:112758835
chr14:99706032:99706158
chr14:36987163:36987184
chr2:43398069:43398085
chr6:90504290:90504359
chr13:28503165:28503235
chr3:154797891:154798152
chr6:28367069:28367128
chr1:40974762:40974913
chr22:50319158:50319194
chr12:115103722:115103767
chr5:122435250:122435295
chr10:134599210:134599245
chr17:117854571:117854818
chr15:96890743:96890812
chr11:45114836:45114845
chr1:151811102:151811203
chr7:633049:633101
chr4:148402315:148402431
chr3:50313747:50313762
chr6:42072513:42072527
chr1:32237851:32237877
chr11:60718854:60718885
chr4:5894624:5894634
chr2:105478832:105478873
chr15:96890847:96890880
chr10:101822013:101822096
chr11:65661484:65661564
chr5:177989059:177989077
chr1:40781681:40781778
chr13:28498910:28498956
chr14:52294765:52294902
chr3:47029500:47029628
chr7:151328862:151328895
chr19:55553070:55553087
chr17:40822427:40822434
chr19:3178517:3178545
chr11:76299657:76299682

-continued

| | | | |
|---|---|---|---|
| chr17:78238406:78238540 | chr11:65408444:65408551 | chr10:101089443:101089462 | chr13:29106898:29106944 |
| chr8:22547919:22547980 | chr11:130271850:130271875 | chr7:4848865:4848900 | chr20:3653265:3653330 |
| chr9:2159888:2159931 | chr7:644366:644393 | chr17:4389757:4389831 | chr2:102187418:102187570 |
| chr4:85419917:85419951 | chr4:7651988:7652061 | chr10:6094775:6094827 | chr11:32355271:32355288 |
| chr12:108169078:108169144 | chr1:47900111:47900152 | chr22:50319330:50319373 | chr1:2706134:2706161 |
| chr7:45068249:45068308 | chr13:99064107:99064184 | chr8:8654900:8654936 | chr16:58497351:58497369 |
| chr2:177016575:177016595 | chr2:119916553:119916571 | chr11:70864168:70864186 | chr17:56409588:56409742 |
| chr3:9595511:9595532 | chr16:54967319:54967361 | chr3:194118678:194118738 | chr6:50787949:50787984 |
| chr6:90894747:90894799 | chr20:44037518:44037624 | chr4:104641038:104641088 | chr20:61992292:61992315 |
| chr19:41641865:41641879 | chr4:8263785:8263806 | chr22:40796311:40796475 | chr16:68390251:68390361 |
| chr12:66276079:66276191 | chr16:2317671:2317694 | chr1:221049959:221050007 | chr22:19710841:19710855 |
| chr20:61638096:61638108 | chr10:22542557:22542582 | chr8:67873654:67873665 | chr13:109793122:109793152 |
| chr7:155250669:155250691 | chr12:123518638:123518773 | chr11:63637374:63637410 | chr1:4715727:4715734 |
| chr2:39187231:39187239 | chr6:20024500:20024569 | chr9:36458494:36458734 | chr16:88496790:88496819 |
| chr5:116283745:116283908 | chr13:25744912:25744924 | chr8:142276277:142276297 | chr8:105478845:105478857 |
| chr7:152622786:152622794 | chr2:96987068:96987098 | chr7:1552786:1552837 | chr11:67204881:67205042 |
| chr5:170735618:170735626 | chr2:144694722:144694809 | chr3:133661417:133661556 | chr10:12223668:12223715 |
| chr20:41817998:41818052 | chr19:22605150:22605168 | chr2:67625058:67625155 | chr5:169724354:169724470 | and Table 4b consists of the following methylation haplotype blocks:

| | | | |
|---|---|---|---|
| chr3:187676563:187676644 | chr1:109633869:109633984 | chr17:14203010:14203043 | chr3: 197840391:197840554 |
| chr7:391332:391394 | chr12:66276079:66276191 | chr16:86321477:86321575 | chr17:62774587:62774620 |
| chr8:11565988:11565997 | chr1:246745796:246745918 | chr21:38081090:38081187 | chr11:2847667:2847695 |
| chr7:104581511:104581826 | chr21:35321105:35321239 | chr17:1960261:1960274 | chr2:19561301:19561322 |
| chr7:5371156:5371187 | chr17:36666183:36666252 | chr6:20024500:20024569 | chr5:132161708:132161721 |
| chr21:38080525:38080550 | chr1:161039226:161039378 | chr19:38705029:38705203 | chr3:127469356:127469468 |
| chr8:17509194:17509223 | chr11:114010500:114010527 | chr14:73712457:73712489 | chr4:24801800:24801810 |
| chr5:140207807:140207820 | chr19:55765372:55765427 | chr3:186685648:186685718 | chr14:73181172:73181203 |
| chr20:62369207:62369221 | chr3:5061424:5061583 | chr9:98111682:98111739 | chr6:20024006:20024141 |
| chr17:79406164:79406253 | chr7:102066465:102066505 | chr6:43192429:43192519 | chr3:170137456:170137470 |
| chr16:29164276:29164303 | chr17:27912311:27912415 | chr2:45029881:45029891 | chr9:96715356:96715374 |
| chr2:177017367:177017378 | chr17:80358785:80358913 | chr7:105319436:105319486 | chr9:139090266:139090459 |
| chr21:47971700:47971722 | chr1:169637173:169637186 | chr17:56565349:56565374 | chr22:44391923:44391940 |
| chr1:218098391:218098398 | chr12:22094366:22094373 | chr13:21050140:21050156 | chr1:145562732:145562809 |
| chr1:19251999:19252025 | chr6:10391058:10391093 | chr10:11704590:11704643 | chr19:6753492:6753523 |
| chr8:96085373:96085420 | chr19:4108798:4108818 | chr8:143813256:143813294 | chr4:8202378:8202403 |
| chr19:18113497:18113578 | chr1:78512134:78512213 | chr12:52627050:52627068 | chr5:115298830:115298848 |
| chr3:65342396:65342412 | chr2:105459552:105459571 | chr6:27655609:27656143 | chr2:105459597:105459623 |
| chr14:105640730:105640770 | chr13:28498669:28498711 | chr7:129781353:129781457 | chr9:139716146:139716160 |
| chr15:96865945:96865955 | chr17:76886714:76886754 | chr16:85344383:85344563 | chr6:42335118:42335231 |
| chr12:125039261:125039301 | chr7:155595704:155595716 | chr1:36788051:36788066 | chr3:122296676:122296709 |
| chr2:112124096:112124151 | chr4:186560264:186560311 | chr10:126300538:126300694 | chr2:131797613:131797636 |
| chr2:232186706:232186761 | chr19:49338972:49339092 | chr2:242785210:242785261 | chr10:94822392:94822422 |
| chr4:2814622:2814718 | chr5:54527322:54527355 | chr7:42267805:42267822 | chr13:50701694:50701724 |
| chr2:171570261:171570269 | chr17:59482595:59482615 | chr5:122422290:122422309 | chr13:100630745:100630775 |
| chr3:138663980:138664002 | chr8:141849327:141849357 | chr12:52115509:52115548 | chr10:11212536:11212603 |
| chr22:36773395:36773570 | chr17:1960955:1960972 | chr10:131757046:131757057 | chr9:129377680:129377714 |
| chr17:40822613:40822653 | chr6:42072312:42072322 | chr8:57026239:57026410 | chr15:74658177:74658190 |
| chr19:12306143:12306166 | chr3:170137395:170137413 | chr22:20078423:20078511 | chr2:25500296:25500316 |
| chr22:20783998:20784048 | chr17:7287595:7287642 | chr2:220313255:220313272 | chr10:102986952:102986973 |
| chr1:154375706:154375773 | chr14:103568958:103569000 | chr11:67205095:67205113 | chr21:44819226:44819239 |
| chr17:76127253:76127408 | chr2:71116046:71116096 | chr14:37136001:37136019 | chr12:115109842:115109855 |
| chr1:45009127:45009259 | chr8:142046260:142046307 | chr16:29675880:29675899 | chr22:39148239:39148256 |
| chr18:72916692:72916705 | chr12:51717855:51717865 | chr9:14346053:14346085 | chr20:43726616:43726631 |
| chr2:109834010:109834148 | chr2:177030210:177030276 | chr16:66621433:66621441 | chr19:50058236:50058275 |
| chr4:8082086:8082177 | chr9:138999207:138999217 | chr3:128210809:128210826 | chr15:96903029:96903092 |
| chr6:41515921:41515938 | chr6:27114547:27114655 | chr8:55371721:55371728 | chr4:94755870:94755918 |
| chr19:10624949:10624963 | chr5:176858541:176858704 | chr10:22624363:22624510 | chr6:37551119:37551243 |
| chr14:94254076:94254092 | chr9:92099055:92099114 | chr22:20785437:20785462 | chr7:36679543:36679660 |
| chr16:31488890:31488912 | chr2:71116232:71116257 | chr5:42952051:42952113 | chr11:123066909:123066942 |
| chr17:74141537:74141566 | chr6:100895678:100895697 | chr9:1045691:1045747 | chr17:16570355:16570361 |
| chr21:44819099:44819123 | chr5:132158710:132158741 | chr5:177379756:177379834 | chr6:166976776:166976796 |
| chr15:27136915:27136924 | chr17:33815330:33815432 | chr1:225655594:225655619 | chr4:16084937:16084953 |
| chr6:10393363:10393497 | chr6:26123664:26123979 | chr3:184504253:184504484 | chr3:151936218:151936283 |
| chr2:73147431:73147444 | chr7:24324675:24324683 | chr22:19711226:19711257 | chr12:114878759:114878791 |
| chr19:48946520:48946657 | chr1:221050180:221050273 | chr12:110236002:110236058 | chr2:220299635:220299643 |
| chr5:50694887:50694985 | chr5:2748507:2748516 | chr10:106401268:106401303 | chr21:38076854:38076871 |
| chr8:38757858:38757899 | chr7:3134644:3134670 | chr18:19756867:19756897 | chr2:157186445:157186485 |
| chr9:126785062:126785097 | chr16:55362634:55362703 | chr22:30662059:30662077 | chr11:65661646:65661754 |
| chr8:142276522:142276533 | chr22:47070535:47070641 | chr10:105344492:105344526 | chr9:134128101:134128135 |
| chr16:88758463:88758479 | chr12:96564033:96564157 | chr20:46044275:46044343 | chr3:129694365:129694378 |
| chr10:114136302:114136365 | chr19:3672066:3672080 | chr16:88767062:88767096 | chr2:233925180:233925317 |
| chr11:67804601:67804688 | chr12:111845175:111845270 | chr14:60952393:60952405 | chr17:17415395:17415403 |
| chr2:160761118:160761165 | chr7:100465077:100465161 | chr2:8715562:8715637 | chr9:1045788:1045818 |

-continued

| | | | |
|---|---|---|---|
| chr9:127265806:127265816 | chr3:15314976:15315000 | chr7:2757237:2757317 | chr4:16085139:16085180 |
| chr1:151870591:151870681 | chr3:186490345:186490366 | chr8:145900685:145900715 | chr6:157970252:157970307 |
| chr21:37757965:37758006 | chr9:127258187:127258274 | chr3:128765137:128765158 | chr21:38081477:38081492 |
| chr19:3179842:3179904 | chr7:156797306:156797346 | chr6:137244466:137244484 | chr19:16482519:16482633 |
| chr5:110406515:110406530 | chr19:14089841:14089870 | chr6:170581242:170581310 | chr18:18823158:18823243 |
| chr19:58629492:58629522 | chr10:134046101:134046188 | chr4:103790673:103790911 | chr7:158362709:158362731 |
| chr21:46334450:46334460 | chr4:3304775:3304980 | chr4:37585982:37585993 | chr1:178455974:178456004 |
| chr4:184828032:184828058 | chr2:129037557:129037569 | chr12:2030316:2030331 | chr2:27301795:27301826 |
| chr12:64784380:64784575 | chr7:1959874:1959887 | chr22:39147922:39148082 | chr13:79170266:79170271 |
| chr2:70057016:70057043 | chr6:26216260:26216306 | chr19:18770323:18770328 | chr10:121277212:121277385 |
| chr17:40822041:40822061 | chr22:50986956:50986986 | chr16:56672432:56672464 | chr13:79170302:79170323 |
| chr2:25425395:25425417 | chr1:112058209:112058223 | chr5:37834847:37834913 | chr16:68676460:68676466 |
| chr6:68028552:68028131 | chr22:19510978:19511029 | chr6:27832225:27832236 | chr17:1960297:1960323 |
| chr2:177016618:177016669 | chr11:639650:639673 | chr5:72677925:72677938 | chr2:25384521:25384555 |
| chr16:88769941:88770131 | chr2:71134585:71134608 | chr5:134386305:134386316 | chr19:3179353:3179432 |
| chr3:48520626:48520665 | chr6:43612899:43612908 | chr3:138664166:138664281 | chr2:43397997:43398041 |
| chr3:170137672:170137687 | chr18:13641703:13641723 | chr6:1393814:1393833 | chr11:134202273:134202302 |
| chr14:73712647:73712670 | chr16:85296061:85296086 | chr5:92908827:92908853 | chr21:44819309:44819337 |
| chr17:59482675:59482690 | chr16:50308403:50308417 | chr19:4374698:4374799 | chr19:47152996:47153006 |
| chr11:69229767:69229875 | chr19:2252604:2252633 | chr22:37881408:37881495 | chr3:128211282:128211310 |
| chr7:4248707:4248866 | chr2:176948107:176948120 | chr12:7284161:7284199 | chr11:63974228:63974540 |
| chr2:66666590:66666648 | chr2:66673634:66673719 | chr20:56194053:56194195 | chr5:115152519:115152539 |
| chr8:145900816:145901119 | chr19:16197083:16197146 | chr11:47416527:47416633 | chr7:56242832:56242853 |
| chr5:139227605:139227613 | chr7:139553288:139553487 | chr16:11327169:11327181 | chr5:172370231:172370335 |
| chr17:72462820:72462912 | chr3:128210683:128210713 | chr2:162280416:162280438 | chr4:102711857:102711879 |
| chr2:235055127:235055264 | chr2:162280538:162280561 | chr17:36718317:36718336 | chr1:203032620:203032687 |
| chr5:2740503:2740527 | chr15:70767238:70767293 | chr14:102555012:102555047 | chr5:176023813:176023852 |
| chr17:1588162:1588384 | chr1:27160026:27160126 | chr19:16482409:16482500 | chr4:158143143:158143233 |
| chr5:3600942:3600993 | chr3:184405603:184405680 | chr5:72678105:72678117 | chr2:119611407:119611447 |
| chr2:129492325:129492360 | chr19:58220236:58220403 | chr2:118593925:118593956 | chr3:192125879:192125900 |
| chr3:44063876:44063942 | chr9:99639697:99639735 | chr19:36247848:36247862 | chr18:9404557:9404633 |
| chr11:69920045:69920065 | chr20:57224759:57224776 | chr21:45577764:45577826 | chr1:47899900:47899973 |
| chr19:55766296:55766320 | chr8:99961491:99961523 | chr18:77199431:77199443 | chr14:105527019:105527137 |
| chr2:239755874:239755896 | chr5:92908162:92908213 | chr7:632944:632992 | chr3:50312991:50313021 |
| chr12:62584918:62584946 | chr5:157346588:157346611 | chr6:170581003:170581096 | chr22:47070183:47070285 |
| chr6:157557373:157557415 | chr19:13210490:13210503 | chr1:1564676:1564690 | chr14:27065959:27066053 |
| chr19:58868331:58868347 | chr5:140871224:140871238 | chr19:3179929:3179985 | chr7:27197712:27197726 |
| chr12:115103838:115103858 | chr6:20024224:20024319 | chr8:687582:687636 | chr16:2317491:2317523 |
| chr7:150329304:150329321 | chr4:186560344:186560355 | chr3:47122364:47122371 | chr7:557581:557595 |
| chr6:29521498:29521580 | chr9:971674:971703 | chr9:96715493:96715509 | chr9:134148582:134148640 |
| chr3:184504534:184504593 | chr11:44340718:44340785 | chr1:221050478:221050491 | chr14:38066924:38066944 |
| chr6:45631538:45631561 | chr19:35505322:35505399 | chr2:219738428:219738541 | chr4:1210659:1210715 |
| chr6:137814560:137814567 | chr8:145104394:145104455 | chr2:73928331:73928354 | chr4:1210785:1210901 |
| chr2:220313636:220313657 | chr16:31488816:31488849 | chr16:85095505:85095535 | chr3:181438113:181438133 |
| chr12:111099505:111099564 | chr12:131464602:131464618 | chr2:47206751:47206855 | chr2:63284055:63284066 |
| chr10:130832367:130832381 | chr12:47701048:47701077 | chr3:186490394:186490603 | chr10:13390041:13390139 |
| chr7:155556566:155556600 | chr12:115138274:115138280 | chr20:21492917:21492931 | chr18:11947874:11947897 |
| chr20:62473619:62473818 | chr1:112058303:112058337 | chr5:45696095:45696108 | chr9:6645173:6645184 |
| chr6:27835219:27835269 | chr17:7287359:7287475 | chr21:44819374:44819432 | chr8:142414178:142414227 |
| chr6:158411773:158411853 | chr7:156799150:156799168 | chr1:200842812:200842842 | chr13:28498832:28498881 |
| chr8:142413012:142413121 | chr19:13215304:13215327 | chr2:220313472:220313492 | chr11:63774985:63775047 |
| chr5:1878568:1878601 | chr3:196367554:196367677 | chr9:134128181:134128299 | chr7:87228807:87228922 |
| chr12:113675732:113675977 | chr11:67186574:67186616 | chr9:96713741:96713787 | chr11:128609074:128609245 |
| chr16:68390618:68390663 | chr17:35299478:35299512 | chr17:75231575:75231615 | chr22:47070690:47070785 |
| chr20:22562975:22562988 | chr9:87905314:87905325 | chr17:73839499:73839523 | chr13:96294381:96294499 |
| chr17:44847184:44847220 | chr13:109793272:109793287 | chr10:118900000:118900044 | chr5:179507584:179507627 |
| chr16:50715337:50715362 | chr17:47816851:47816941 | chr17:3814755:3814785 | chr8:28637012:28637063 |
| chr2:19556014:19556079 | chr1:170630065:170630080 | chr18:11948030:11948038 | chr10:79380018:79380032 |
| chr4:107774:107793 | chr5:180230752:180230844 | chr20:62200085:62200109 | chr12:51718198:51718251 |
| chr17:79315001:79315013 | chr8:38627595:38627699 | chr4:102711896:102711974 | chr7:155259609:155259665 |
| chr13:19918950:19918984 | chr21:38597974:38598066 | chr19:38886138:38886154 | chr12:52652502:52652523 |
| chr15:57072647:57072802 | chr20:24759511:24759539 | chr4:81189711:81189729 | chr12:125053451:125053464 |
| chr6:45631260:45631269 | chr1:47899663:47899729 | chr6:1620159:1620204 | chr2:97428602:97428718 |
| chr11:1779926:1779973 | chr2:73147905:73147942 | chr14:74981388:74981406 | chr17:17295442:17295619 |
| chr17:44846986:44847044 | chr6:152631073:152631120 | chr9:5841793:5841956 | chr16:28996532:28996602 |
| chr16:50308506:50308653 | chr9:137663233:137663244 | chr7:27197885:27197933 | chr16:2317602:2317631 |
| chr2:220313356:220313384 | chr8:898406:898416 | chr6:166970726:166970758 | chr7:95402297:95402335 |
| chr3:196367690:196367895 | chr20:22557745:22557769 | chr6:163670668:163670704 | chr17:15244821:15244853 |
| chr5:171605385:171605414 | chr19:3180080:3180104 | chr13:79182034:79182044 | chr3:192126077:192126114 |
| chr9:37903889:37903895 | chr19:3369701:3369714 | chr6:20024352:20024422 | chr2:43398069:43398085 |
| chr5:172659760:172659766 | chr2:10471490:10471518 | chr15:99993103:99993143 | chr12:124877816:124877872 |
| chr19:3369814:3369834 | chr3:67706421:67706705 | chr3:148336056:148336126 | chr1:208132616:208132726 |
| chr3:128211534:128211604 | chr11:20618888:20618918 | chr3:38081466:38081537 | chr17:61512658:61512683 |
| chr2:133403686:133403797 | chr2:63282949:63282956 | chr7:156796586:156796676 | chr19:42071605:42071726 |
| chr5:3594724:3594745 | chr21:38069675:38069705 | chr16:56313147:56313258 | chr10:101292552:101292646 |
| chr8:61764645:61764655 | chr2:119602826:119602837 | chr1:155265254:155265284 | chr5:137795191:137795306 |
| chr8:145106961:145106989 | chr8:22398142:22398178 | chr9:69197259:69197281 | chr22:50319158:50319194 |
| chr17:79450423:79450451 | chr19:46319060:46319085 | chr7:3134380:3134520 | chr12:115103722:115103767 |
| chr2:45231787:45231831 | chr7:105319545:105319563 | chr16:86613029:86613062 | chr12:123131513:123131635 |

-continued

| | | | |
|---|---|---|---|
| chr14:52534718:52534943 | chr14:70756090:70756120 | chr22:19711923:19711938 | chr13:114875997:114876008 |
| chr12:5997166:5997213 | chr2:242140582:242140589 | chr16:54324380:54324392 | chr17:79134237:79134248 |
| chr15:96886880:96886915 | chr15:65689324:65689361 | chr20:43945282:43945292 | chr3:129295780:129295896 |
| chr22:50050779:50050844 | chr19:1132141:1132179 | chr11:123355219:123355301 | chr10:102881084:102881114 |
| chr17:36105480:36105490 | chr8:101661869:101661916 | chr7:149487306:149487319 | chr15:96890743:96890812 |
| chr22:46367343:46367373 | chr8:134510944:134511107 | chr7:27209526:27209582 | chr2:219847214:219847286 |
| chr22:19753445:19753480 | chr9:136710340:136710362 | chr6:19692010:19692112 | chr10:6213930:6214079 |
| chr9:95821885:95821901 | chr20:62199474:62199549 | chr2:43020374:43020394 | chr11:45114836:45114845 |
| chr10:77167577:77167584 | chr15:78632860:78633002 | chr3:157824208:157824217 | chr4:81952496:81952527 |
| chr16:28505658:28505862 | chr12:121530481:121530644 | chr19:23254232:23254336 | chr4:159091800:159091863 |
| chr7:121950428:121950564 | chr10:13701335:13701356 | chr2:69064579:69064611 | chr19:16197202:16197336 |
| chr6:107956258:107956267 | chr8:61764675:61764770 | chr20:62199644:62199673 | chr10:122708551:122708626 |
| chr8:10588991:10589016 | chr3:195488911:195488924 | chr6:20320098:20320141 | chr7:633049:633101 |
| chr9:110350145:110350159 | chr1:200842879:200842912 | chr8:121021099:121021235 | chr14:105531892:105532022 |
| chr9:134465995:134466015 | chr3:24536601:24536664 | chr8:57069774:57069786 | chr3:50313747:50313762 |
| chr8:145901158:145901388 | chr10:21789267:21789303 | chr21:46902922:46902964 | chr6:42072513:42072527 |
| chr15:74832704:74833132 | chr8:66864145:66864243 | chr17:36666562:36666605 | chr11:88242385:88242459 |
| chr6:30431723:30431770 | chr7:45067930:45067978 | chr19:3688173:3688181 | chr1:32237851:32237877 |
| chr5:3606576:3606611 | chr5:37834828:37834844 | chr7:139876374:139876418 | chr15:41795065:41795089 |
| chr20:56247297:56247315 | chr6:166582771:166582783 | chr9:87905154:87905186 | chr18:46298176:46298192 |
| chr5:76373633:76373641 | chr15:76635175:76635200 | chr8:10588937:10588948 | chr5:1495316:1495431 |
| chr17:68164684:68164749 | chr19:57182975:57183010 | chr6:100901494:100901618 | chr3:138679355:138679366 |
| chr13:79181662:79181784 | chr8:84051808:84052120 | chr11:1332088:1332114 | chr5:134880200:134880327 |
| chr6:1384169:1384189 | chr4:85418694:85418729 | chr10:6094775:6094827 | chr2:66666698:66666809 |
| chr22:23558969:23559146 | chr12:125039318:125039343 | chr22:50319330:50319373 | chr6:42072328:42072373 |
| chr5:3600677:3600690 | chr2:66673956:66673991 | chr8:8654900:8654936 | chr9:101822013:101822096 |
| chr17:73749653:73749685 | chr6:151004402:151004610 | chr3:194118678:194118738 | chr6:19691985:19692003 |
| chr4:24801685:24801698 | chr1:6054866:6054949 | chr22:40796311:40796475 | chr5:177989059:177989077 |
| chr10:77167421:77167439 | chr17:46691788:46691802 | chr1:221049959:221050007 | chr2:177014492:177014518 |
| chr4:111543271:111543299 | chr11:65408444:65408551 | chr11:63637374:63637410 | chr19:55553070:55553087 |
| chr17:73483828:73483897 | chr12:115103886:115103900 | chr9:36458494:36458734 | chr17:40822427:40822434 |
| chr12:124941370:124941476 | chr11:130271850:130271875 | chr8:142276277:142276297 | chr19:3178517:3178545 |
| chr22:24181054:24181071 | chr8:22409072:22409160 | chr7:1552786:1552837 | chr10:124910708:124910730 |
| chr19:23185803:23185818 | chr5:72715504:72715573 | chr3:133661417:133661556 | chr13:29106180:29106363 |
| chr2:73114219:73114237 | chr18:46307700:46307753 | chr15:64244503:64244684 | chr9:126135891:126135950 |
| chr16:68318872:68318933 | chr17:40441433:40441470 | chr4:184828385:184828403 | chr17:56409588:56409742 |
| chr20:31215990:31216058 | chr13:26625651:26625662 | chr8:98290100:98290333 | chr6:50787949:50787984 |
| chr20:21486625:21486638 | chr1:157164679:157164693 | chr14:38080503:38080552 | chr16:2286867:2286879 |
| chr6:117869097:117869149 | chr11:15134983:15135110 | chr13:31480961:31480979 | chr7:129425931:129426013 |
| chr5:177210046:177210086 | chr20:44037518:44037624 | chr11:67171584:67171666 | chr16:68390251:68390361 |
| chr16:56669343:56669402 | chr12:49627611:49627624 | chr12:22094594:22094657 | chr22:19710841:19710855 |
| chr9:124982160:124982166 | chr4:8263785:8263806 | chr11:65408370:65408410 | chr1:1148346:1148354 |
| chr1:9910785:9910800 | chr9:126776168:126776183 | chr18:13641584:13641601 | chr16:88496790:88496819 |
| chr8:22547919:22547980 | chr16:85644561:85644674 | chr19:4916881:4917023 | chr8:134094859:134094975 |
| chr21:38077472:38077482 | chr10:22542557:22542582 | chr1:210391015:210391076 | chr5:138850540:138850606 |
| chr4:2801307:2801417 | chr6:106434088:106434131 | chr14:38080557:38080579 | chr12:6882964:6882984 |
| chr2:10471620:10471684 | chr13:112707953:112708006 | chr17:46619163:46619183 | chr7:155246915:155246940 |
| chr1:179713235:179713255 | chr12:49689395:49689400 | chr12:52652454:52652489 | chr10:12223668:12223715 |
| chr7:45068249:45068308 | chr19:18760938:18760989 | chr2:171786280:171786350 | chr22:20783780:20783802 |
| chr2:177016575:177016595 | chr12:123518638:123518773 | chr2:66667886:66667913. | |

16. The method of claim 15, wherein the health condition is a tumor and wherein said at least 15,000 methylation haplotype blocks comprises at least 2 methylation haplotype blocks from those provided in Tables 4a and 4b.

17. The method of claim 16, wherein said at least 15,000 methylation haplotype blocks comprises at least 50 methylation haplotype blocks from those provided in Tables 4a and 4b.

18. A method of identifying at least 15,000 methylation haplotype blocks comprising:
   determining methylation haplotypes in a plurality of nucleic acid segments across a whole genome;
   combining the methylation haplotypes and calculating methylation linkage disequilibrium on the combined methylation haplotypes;
   partitioning each segment into a plurality of methylation haplotype blocks, thereby identifying at least 15,000 methylation haplotype blocks, each methylation haplotype block comprising a plurality of methylation haplotypes indicative of a health condition, tissue of origin, germ layer of origin, or organ of origin, wherein said methylation haplotype blocks comprise a plurality of methylation sites for which the methylation status of adjacent methylation sites is coordinated; and
   calculating a group specific index (GSI) based on the normalized fraction of methylated haplotypes at different methylation haplotype block lengths.

19. The method of claim 18, wherein the $r^2$ value of two adjacent CpG sites is no less than 0.5 in the methylation haplotype blocks.

* * * * *